US009082265B2

(12) United States Patent
Fujisawa et al.

(10) Patent No.: US 9,082,265 B2
(45) Date of Patent: Jul. 14, 2015

(54) GAMING MACHINE WHICH REARRANGES SYMBOLS AFTER VARYING AND DISPLAYING THE SYMBOLS

(71) Applicants: Universal Entertainment Corporation, Koto-ku, Tokyo (JP); Aruze Gaming America, Inc., Las Vegas, NV (US)

(72) Inventors: Masumi Fujisawa, Tokyo (JP); Takehisa Itagaki, Tokyo (JP); Yoichi Kato, Tokyo (JP); Daisyun Okamoto, Tokyo (JP); Hiroki Munakata, Tokyo (JP)

(73) Assignees: UNIVERSAL ENTERTAINMENT CORPORATION, Tokyo (JP); ARUZE GAMING AMERICA, INC., Las Vegas, NV (US)

(*) Notice: Subject to any disclaimer, the term of this patent is extended or adjusted under 35 U.S.C. 154(b) by 84 days.

(21) Appl. No.: 13/895,495

(22) Filed: May 16, 2013

(65) Prior Publication Data

US 2013/0310145 A1 Nov. 21, 2013

(30) Foreign Application Priority Data

May 18, 2012 (JP) ................................ 2012-114970

(51) Int. Cl.
*G06F 17/00* (2006.01)
*G06F 19/00* (2011.01)
*G07F 17/34* (2006.01)

(52) U.S. Cl.
CPC ...................................... *G07F 17/34* (2013.01)

(58) Field of Classification Search
CPC . G07F 17/32; G07F 17/3225; G07F 17/3227; G07F 17/3244; G07F 17/326; G07F 17/3267; G07F 17/3286; G07F 17/34
USPC ........................ 463/16–20, 25, 29–31, 40–43
See application file for complete search history.

(56) References Cited

U.S. PATENT DOCUMENTS

| | | | | |
|---|---|---|---|---|
| 6,439,993 | B1 * | 8/2002 | O'Halloran | 463/16 |
| 7,758,414 | B1 * | 7/2010 | Marks et al. | 463/20 |
| 8,096,869 | B2 * | 1/2012 | Yoshimi | 463/20 |
| 8,177,622 | B2 * | 5/2012 | Englman | 463/20 |
| 8,827,796 | B2 * | 9/2014 | Vermaak et al. | 463/20 |
| 2003/0064779 | A1 * | 4/2003 | Suda | 463/20 |
| 2004/0033827 | A1 * | 2/2004 | Gilmore et al. | 463/20 |
| 2007/0060245 | A1 * | 3/2007 | Veenker | 463/16 |
| 2007/0287529 | A1 * | 12/2007 | Kojima | 463/20 |
| 2008/0108411 | A1 * | 5/2008 | Jensen et al. | 463/20 |
| 2008/0318664 | A1 * | 12/2008 | Saito | 463/20 |
| 2009/0227351 | A1 * | 9/2009 | Yoshizawa | 463/20 |
| 2009/0239632 | A1 * | 9/2009 | Leupp et al. | 463/20 |

(Continued)

*Primary Examiner* — Milap Shah
(74) *Attorney, Agent, or Firm* — KMF Patent Services, PLLC; Kenneth M. Fagin, Esq.; S. Peter Konzel, Esq.

(57) ABSTRACT

Provided is a gaming machine in which elaborate presentation effects for rearranging wild symbols are devised and which has a high game feeling. In the gaming machine, when the wild symbols are rearranged in a plurality of columns, on the condition that winning has occurred in a drawing, premium presentation effects are performed. When it is determined that the wild symbols are rearranged in the plurality of columns, the wild symbols are rearranged in each one column when the character appears at one time.

8 Claims, 145 Drawing Sheets

(56) References Cited

U.S. PATENT DOCUMENTS

| | | | | |
|---|---|---|---|---|
| 2010/0016061 | A1* | 1/2010 | Gomez et al. | 463/20 |
| 2010/0093424 | A1* | 4/2010 | Kono et al. | 463/20 |
| 2010/0178976 | A1* | 7/2010 | Berman et al. | 463/20 |
| 2011/0021261 | A1* | 1/2011 | Kadode et al. | 463/20 |
| 2011/0105215 | A1* | 5/2011 | Mizue | 463/20 |
| 2011/0250947 | A1 | 10/2011 | Okamoto | |
| 2011/0312400 | A1* | 12/2011 | Schultz | 463/20 |
| 2013/0184045 | A1* | 7/2013 | Vermaak et al. | 463/20 |

* cited by examiner

FIG. 10

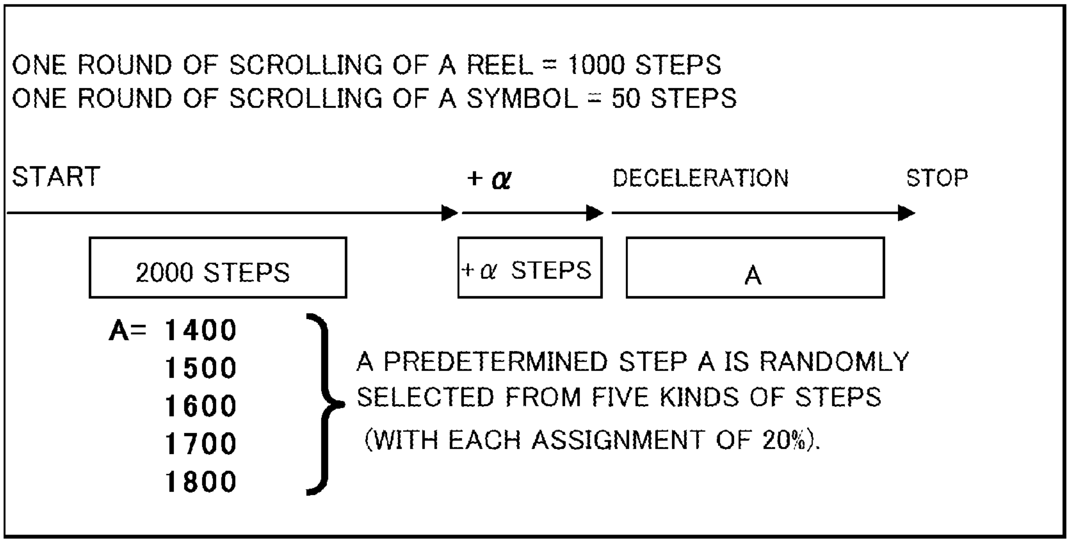

WHEN REELS START TO DECELERATE, A TANTALIZING SOUND IS OUTPUTTED. HOWEVER, SINCE IF THE SOUND IS OUTPUTTED EACH TIME AT A DECELERATION START TIMING, A PLAYER CAN DETECT POSITIONS WHERE SYMBOLS ARE TO BE STOPPED, A PLURALITY OF KINDS OF TIMINGS ARE PREPARED.

(1) A DECELERATION START TIMING
(2) FROM A TIMING AT WHICH REELS PROCEED BY 50 STEPS FROM THE DECELERATION START TIMING.
(3) FROM A TIMING AT WHICH REELS PROCEED BY 100 STEPS FROM THE DECELERATION START TIMING.
(4) FROM A TIMING AT WHICH REELS PROCEED BY 150 STEPS FROM THE DECELERATION START TIMING.
(5) FROM A TIMING AT WHICH REELS PROCEED BY 200 STEPS FROM THE DECELERATION START TIMING.

A TIMING IS RANDOMLY SELECTED FROM THE TIMINGS (1) TO (5) WITH EACH ASSIGNMENT OF 20%.

FIG. 18A

| REMAINING COUNT-UP NUMBER | NUMBER OF SECONDS FOR ONE COUNT OF INCREMENTING |
|---|---|
| 1~2 | 2.10 |
| 3 | 1.70 |
| 4 | 1.30 |
| 5 | 1.20 |
| 6~7 | 1.00 |
| 8~9 | 0.80 |
| 10~11 | 0.70 |
| 12 | 0.60 |
| 13~17 | 0.50 |
| 18~23 | 0.40 |
| 24~30 | 0.30 |
| 31~45 | 0.24 |
| 46~50 | 0.18 |
| 51~80 | 0.16 |
| 81~100 | 0.13 |
| 101 OR MORE | REWRITING |

FIG. 18B

| THRESHOLD VALUE | NUMBER OF SECONDS |
|---|---|
| LESS THAN 1 TIME | 0.5 |
| 1 TIME – LESS THAN1.5 TIMES | 1 |
| 1.5 TIMES – LESS THAN 2.5 TIMES | 2 |
| 2.5 TIMES – LESS THAN 3.5 TIMES | 3 |
| 3.5 TIMES – LESS THAN 4.5 TIMES | 4 |
| 4.5 TIMES – LESS THAN 5.5 TIMES | 5 |
| 5.5 TIMES – LESS THAN 6.5 TIMES | 6 |
| 6.5 TIMES – LESS THAN 7.5 TIMES | 7 |
| 7.5 TIMES – LESS THAN 8.5 TIMES | 8 |
| 8.5 TIMES – LESS THAN 9.5 TIMES | 9 |
| 9.5 TIMES – LESS THAN 10.5 TIMES | 10 |
| 10.5 TIMES – LESS THAN 11.5 TIMES | 11 |
| 11.5 TIMES – LESS THAN 12.5 TIMES | 12 |
| 12.5 TIMES – LESS THAN 13.5 TIMES | 13 |
| 13.5 TIMES – LESS THAN 14.5 TIMES | 14 |
| 14.5 TIMES – LESS THAN 15.5 TIMES | 15 |
| 15.5 TIMES – LESS THAN 16.5 TIMES | 16 |
| 16.5 TIMES – LESS THAN 17.5 TIMES | 17 |
| 17.5 TIMES – LESS THAN 18.5 TIMES | 18 |
| 18.5 TIMES – LESS THAN 19.5 TIMES | 19 |
| 19.5 TIMES – LESS THAN 20.5 TIMES | 20 |
| 20.5 TIMES – LESS THAN 21.5 TIMES | 21 |
| 21.5 TIMES – LESS THAN 22.5 TIMES | 22 |
| 22.5 TIMES – LESS THAN 23.5 TIMES | 23 |
| 23.5 TIMES – LESS THAN 24.5 TIMES | 24 |
| 24.5 TIMES – LESS THAN 25 TIMES | 25 |
| 25 TIMES – LESS THAN 50 TIMES | 30 |
| 50 TIMES OR MORE | 35 |

FIG. 22

| KIND OF BUTTON | DURING IDLING | DURING GAMING | DURING ERROR | DURING AN AUDIT SCREEN STATE | TAKE WIN OR GAMBLE |
|---|---|---|---|---|---|
| HELP | LIGHTING-UP | LIGHTING-DOWN | LIGHTING-DOWN | LIGHTING-DOWN | LIGHTING-UP |
| LANGUAGE SWITCHING | LIGHTING-UP | LIGHTING-DOWN | LIGHTING-DOWN | LIGHTING-DOWN | LIGHTING-DOWN |
| VOLUME | LIGHTING-UP | LIGHTING-UP | LIGHTING-DOWN | LIGHTING-DOWN | LIGHTING-UP |
| NUMBER OF LINES | LIGHTING-UP (WHEN SELECTION IS POSSIBLE) | LIGHTING-DOWN | LIGHTING-DOWN | LIGHTING-DOWN | LIGHTING-DOWN |
| NUMBER OF BETS | LIGHTING-UP | LIGHTING-DOWN | LIGHTING-DOWN | LIGHTING-DOWN | LIGHTING-DOWN |
| PAY TABLE | LIGHTING-UP | LIGHTING-DOWN | LIGHTING-DOWN | LIGHTING-DOWN | LIGHTING-UP |

FIG. 23
| REGION | DISPLAY NATIONAL FLAG SETTING | DISPLAY LANGUAGE | DISPLAY BUTTON | DAT/TGA NAME |
|---|---|---|---|---|
| US | US OR CHINA | ENGLISH (USA) | 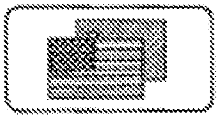 | btn_flag_u_cham |
| | | CHINESE (CHN) |  | btn_flag_u_amch |
| OTHERS | US OR CHINA | ENGLISH (UK) |  | btn_flag_u_chem |
| | | CHINESE (CHN) |  | btn_flag_u_egch |
| LANGUAGE SWITCHING IMPOSSIBLE | — | — | PAY TABLE | — |

| SCREEN | CONTROL PANEL | OPERATION |
|---|---|---|
| EXIT | HELP | SHIFTING TO A BASE GAME SCREEN |
| PREV. | BET ×1 | SHIFTING TO A PREVIOUS PAGE |
| NEXT | BET ×2 | SHIFTING TO THE NEXT PAGE |

| REGION | DISPLAY LANGUAGE | NATIONAL FLAG | FUNCTION AND TOUCH BUTTON |
|---|---|---|---|
| NORTH AMERICA | ENGLISH | US/CHINA | US FLAG ON A FRONT SIDE |
| MACAO | ENGLISH | US/CHINA | US FLAG ON A FRONT SIDE |
| OTHERS | ENGLISH | US/CHINA | US FLAG ON A FRONT SIDE |

FIG. 39A

TABLE A (TABLE WITH NO JACKPOT)

| ID | Payout | Weight |
|---|---|---|
| 0 | 30 | 5 |
| 1 | Jackpot | 0 |
| 2 | 100 | 4 |
| 3 | Lion | 8 |
| 4 | 50 | 5 |
| 5 | Free Game | 15 |
| 6 | 200 | 2 |
| 7 | Princess | 8 |
| 8 | 30 | 5 |
| 9 | 1000 | 2 |
| 10 | 100 | 4 |
| 11 | Book | 8 |
| 12 | 50 | 5 |
| 13 | Armory | 15 |
| 14 | 120 | 2 |
| 15 | Battle | 8 |
| Total | | 96 |

FIG. 39B

TABLE B (TABLE WITH A JACKPOT)

| ID | Payout | Weight |
|---|---|---|
| 0 | 30 | 5 |
| 1 | Jackpot | 8 |
| 2 | 100 | 1 |
| 3 | Lion | 8 |
| 4 | 50 | 5 |
| 5 | Free Game | 15 |
| 6 | 200 | 2 |
| 7 | Princess | 8 |
| 8 | 30 | 5 |
| 9 | 1000 | 0 |
| 10 | 100 | 1 |
| 11 | Book | 8 |
| 12 | 50 | 5 |
| 13 | Armory | 15 |
| 14 | 120 | 2 |
| 15 | Battle | 8 |
| Total | | 96 |

FIG. 40A

CASE OF A VARIATION V01:

OCCURRENCE PROBABILITY = Total Bet × 2657205/ (PROGRESSIVE INITIAL CREDIT) × 524051

$$\text{TABLE B SELECTION PROBABILITY} = \frac{(\text{TOTAL BET}) \times 2657205}{(\text{PROGRESSIVE INITIAL CREDIT}) \times 524051}$$

FIG. 40B

CASE OF A VARIATION V02:

OCCURRENCE PROBABILITY = Total Bet × 167403915 / (PROGRESSIVE INITIAL CREDIT) × 33539264

$$\text{TABLE B SELECTION PROBABILITY} = \frac{(\text{TOTAL BET}) \times 167403915}{(\text{PROGRESSIVE INITIAL CREDIT}) \times 33539264}$$

FIG. 40C

CASE OF A VARIATIONS V03 - V07:

OCCURRENCE PROBABILITY = Total Bet × 39858075 / (PROGRESSIVE INITIAL CREDIT) × 8384816

$$\text{TABLE B SELECTION PROBABILITY} = \frac{(\text{TOTAL BET}) \times 39858075}{(\text{PROGRESSIVE INITIAL CREDIT}) \times 8384816}$$

FIG. 42
CREDIT
730
BET
30
WIN
0
WINDMILL BONUS
HELP
VOLUME
1 ¢
30
1

FIG. 45A

HEAD

| EQUIPAGE | PAYOUT | DISPLAY UPON SELECTION |
|---|---|---|
| WARRIOR HELMET | HIGH PAYOUT | GOLD FRAME |
| HAT | LOW PAYOUT | SILVER FRAME |
| EMPTY BOX | NO PAYOUT | DARK FRAME |

FIG. 45B

RIGHT HAND

| EQUIPAGE | PAYOUT | DISPLAY UPON SELECTION |
|---|---|---|
| ARMORY (SWORD) | HIGH PAYOUT | GOLD FRAME |
| FARMING TOOL | LOW PAYOUT | SILVER FRAME |
| EMPTY BOX | NO PAYOUT | DARK FRAME |

FIG. 58
CREDIT
730
BET
30
WIN
0
FREE GAMES
HELP
VOLUME
1 ¢
30
1
BONUS REELS IN PLAY
FREE GAME
0 OF 5

FIG. 60
CREDIT
730
BET
30
WIN
BONUS REELS IN PLAY
FREE GAME
0 OF 5
5 FREE GAMES
START
HELP
VOLUME
1 ¢
30
1
BONUS REELS IN PLAY
FREE GAME
0 OF 5

NO WILDS

FIG. 76
CREDIT
730
BET
30
WIN
0
PRINCESS BONUS
DECLARE YOUR LOVE TO THE BEAUTIFUL PRINCESS !
HELP
VOLUME
1 ¢
30
1

FIG. 83
CREDIT
730
BET
30
WIN
0
BATTLE BONUS
DEFEAT THE KNIGHT OF THE MIRRORS !
HELP
VOLUME
1 ¢
30
1

FIG. 92
CREDIT
730
BET
30
WIN
0
200
200
200
60
END
20
BET1BUTTON:PREV. BET10BUTTON:NEXT SPIN/MAX BET BUTTON:TO SELECT
HELP
VOLUME
1 ¢
30
1
BONUS WIN
420

FIG. 95
CREDIT
730
BET
30
WIN
0
CHALLENGE FOR JACKPOT
THIS IS THE LAST BATTLE !
HELP
VOLUME
1 ¢
30
1

FIG. 103A

REVIVAL DRAWING TABLE A
(UPON SELECTING A DRAWING TABLE A)

| ID | | WEIGHT |
|---|---|---|
| 0 | WINNING | 1 |
| 1 | NON-WINNING | 2 |
| Total | | 3 |

FIG. 103B

REVIVAL DRAWING TABLE B
(UPON SELECTING A DRAWING TABLE A)

| ID | | WEIGHT |
|---|---|---|
| 0 | WINNING | 12 |
| 1 | NON-WINNING | 23 |
| Total | | 35 |

INTRODUCTION
PRESENTATION EFFECTS

OUTCOME DISPLAY REPRESENTATION EFFECTS:
UPON FAILING IN A REVIVAL

FIG. 112A

●DEFINED NUMBER-OF-TIME TABLE
FOR GRADUATION ASCENDING (REVIVAL SUCCESS TIME)

| | PATTERN 1 | PATTERN 2 | PATTERN 3 | PATTERN 4 | PATTERN 5 |
|---|---|---|---|---|---|
| FIRST GRADUATION | 2 | 2 | 2 | 1 | 8 |
| SECOND GRADUATION | 2 | 2 | 2 | 1 | 8 |
| THIRD GRADUATION | 4 | 4 | 4 | 2 | 8 |
| FOURTH GRADUATION | 4 | 4 | 4 | 2 | 8 |
| FIFTH GRADUATION | 4 | 4 | 4 | 2 | 8 |
| SIXTH GRADUATION | 4 | 4 | 4 | 2 | 8 |
| SEVENTH GRADUATION | 4 | 4 | 4 | 2 | 8 |
| EIGHTH GRADUATION | 4 | 4 | 4 | 2 | 8 |
| NINTH GRADUATION | 4 | 100 | 1 | 2 | 8 |
| TO ACHIEVE ALL-LIGHTING-UP | 32 | 128 | 29 | 16 | 72 |

FIG. 112B

●DEFINED NUMBER-OF-TIME TABLE FOR GRADUATION ASCENDING
(REVIVAL FAILURE TIME)

| | PATTERN 6 | PATTERN 7 | PATTERN 8 | PATTERN 9 | PATTERN 10 |
|---|---|---|---|---|---|
| FIRST GRADUATION | 2 | 2 | 2 | 1 | 8 |
| SECOND GRADUATION | 2 | 2 | 2 | 1 | 8 |
| THIRD GRADUATION | 4 | 4 | 4 | 2 | 8 |
| FOURTH GRADUATION | 4 | 4 | 4 | 2 | 8 |
| FIFTH GRADUATION | 4 | 4 | 4 | 2 | 8 |
| SIXTH GRADUATION | 4 | 4 | 4 | 2 | 8 |
| SEVENTH GRADUATION | 4 | 4 | 4 | 2 | 8 |
| EIGHTH GRADUATION | 4 | 4 | 4 | 2 | 8 |
| NINTH GRADUATION | — | — | — | — | — |
| TO ACHIEVE REACHING THE EIGHTH GRADUATION. | 28 | 28 | 28 | 28 | 28 |

FIG. 113A

●PATTERN SELECTION PROBABILITY TABLE
(REVIVAL SUCCESS TIME)

| | WEIGHT |
|---|---|
| PATTERN 1 | 12 |
| PATTERN 2 | 2 |
| PATTERN 3 | 2 |
| PATTERN 4 | 1 |
| PATTERN 5 | 1 |
| total | 18 |

FIG. 113B

●PATTERN SELECTION PROBABILITY TABLE
(REVIVAL FAILURE TIME)

| | WEIGHT |
|---|---|
| PATTERN 6 | 1 |
| PATTERN 7 | 0 |
| PATTERN 8 | 0 |
| PATTERN 9 | 0 |
| PATTERN 10 | 0 |
| total | 1 |

FIG. 113C

●ALL-LIGHTING-UP PROBABILITY DRAWING TABLE
BY AN EACH-TIME DRAWING WITH RESPECT TO EACH PATTERN.

| ALL-LIGHTING-UP PROBABILITY | PATTERN 1 | PATTERN 2 | PATTERN 3 | PATTERN 4 | PATTERN 5 |
|---|---|---|---|---|---|
| 0 | 18 | 0 | 1 | 0 | 1 |
| 1/200 | 0 | 1 | 0 | 0 | 0 |
| 1/20 | 1 | 0 | 0 | 1 | 1 |
| 1/10 | 0 | 0 | 0 | 0 | 0 |
| 1/2 | 1 | 0 | 0 | 0 | 0 |
| Total | 20 | 1 | 1 | 1 | 2 |

FIG. 116

●PREMIUM PRESENTATION EFFECTS OCCURRENCE ASSIGNMENT TABLE

| THE NUMBER OF REELS | 1 | 2 | 3 | 4 | 5 |
|---|---|---|---|---|---|
| BASE GAME | 1 | 3 | 1 | 1 | 1 |
| PREMIUM | 0 | 1 | 1 | 1 | 1 |
| Total | 1 | 4 | 2 | 2 | 2 |

FIG. 118A

| | | | | |
|---|---|---|---|---|
| WILD | | WILD | | WILD |
| | WILD | WILD | | |
| | | | WILD | |

FIG. 118B

| | |
|---|---|
| FIRST TIME | FIRST REEL |
| SECOND TIME | THIRD REEL |
| THIRD TIME | SECOND REEL |
| FOURTH TIME | FIFTH REEL |
| FIFTH TIME | FOURTH REEL |

FIG. 118C

| | |
|---|---|
| FIRST TIME | SECOND REEL |
| SECOND TIME | THIRD REEL |
| THIRD TIME | FIFTH REEL |
| FOURTH TIME | FIRST REEL |
| FIFTH TIME | FOURTH REEL |

FIRST SCATTERING

SECOND SCATTERING

THIRD SCATTERING

FOURTH SCATTERING

FIFTH SCATTERING

FIG. 122

| INDEX | CLASSIFI-CATION | REEL SKIP | AFTER FINISHING REPRESENTATION EFFECTS | REPRESENTATION EFFECTS CONTENTS | SOUND CONTROL: LONG READY-TO-WIN STATE SOUND | SOUND CONTROL: STOP SOUND |
|---|---|---|---|---|---|---|
| 1 | 1-A | POSSIBLE | | LOSING HIS BALANCE RECOVERING HIS BALANCE | | |
| 2 | 1-B | IM-POSSIBLE | | LOSING HIS BALANCE →SANCHO DROPPING AND A HIGH-SPEED READY-TO-WIN STATE ROTATION →FEATURE-IN | NONE | SOUND DEDICATED TO CONCURRENT STOPPING OF THE FIRST AND THIRD REEL |
| 3 | 1-C | IM-POSSIBLE | FINAL LOOP RETAINED | LOSING HIS BALANCE →SANCHO DROPPING AND A HIGH-SPEED READY-TO-WIN STATE →LOSING | NONE | SOUND DEDICATED TO CONCURRENT STOPPING OF THE FIRST AND THIRD REEL |
| 4 | 2-A | POSSIBLE | | A GUST OF WIND BLOWS WIND DIES DOWN. | | |
| 5 | 2-B | POSSIBLE | | A GUST OF WIND BLOWS DON QUIXOTE SNEEZES. | | |
| 6 | 2-C | POSSIBLE | FINAL LOOP RETAINED | A GUST OF WIND BLOWS ARMOR WHICH DON QUIXOTE IS WEARING IS BLOWN OFF. | | |
| 7 | 2-D | IM-POSSIBLE | FINAL LOOP RETAINED | A GUST OF WIND BLOWS → SANCHO AND DON QUIXOTE ARE BLOWN OFF DON QUIXOTE CRASHES AGAINST REEL PARTS, → FEATURE-IN | NONE | SOUND DEDICATED TO STOPPING OF ALL REELS |
| 8 | 3-A | POSSIBLE | | DON QUIXOTE SHOUTS. NO BODY REACTS | | |
| 9 | 3-B | IM-POSSIBLE | FINAL LOOP RETAINED | DON QUIXOTE SHOUTS. → ROSINANTE STARTS TO RUN. → RUNNING INTO A TREE → GETTING DIZZY. | | |
| 10 | 3-C | IM-POSSIBLE | | DON QUIXOTE SHOUTS. →ROSINANTE STARTS TO RUN. →RUNNING INTO A TREE →DON QUIXOTE DROPPING DOWN AND A FRAME FEED READY-TO-WIN STATE → FEATURE-IN | NONE | |
| 11 | 3-D | IM-POSSIBLE | FINAL LOOP RETAINED | DON QUIXOTE SHOUTS. →ROSINANTE STARTS TO RUN. →RUNNING INTO A TREE →DON QUIXOTE DROPPING DOWN AND A FRAME FEED READY-TO-WIN STATE →LOSING | NONE | |
| 12 | 3-E | IM-POSSIBLE | | DON QUIXOTE SHOUTS. →ROSINANTE STARTS TO RUN. → SANCHO ALSO STARTS TO RUN. →FEATURE-IN FROM FULL-SCREEN PRESENTATION EFFECTS | NONE | SOUND DEDICATED TO STOPPING OF ALL REELS |
| 13 | 4-A | POSSIBLE | | THE SKY BECOMES CLOUDY. THE SKY BECOMES CLEAR. | | |
| 14 | 4-B | IM-POSSIBLE | | THE SKY BECOMES CLOUDY. →BEING CAUGHT IN A THUNDERSTORM AND A LOW-SPEED READY-TO-WIN STATE ROTATION →FEATURE-IN (A BONUS TRIGGER SYMBOL STRUCK BY LIGHTNING) | NONE | SOUND DEDICATED TO STOPPING |
| 15 | 4-C | IM-POSSIBLE | FINAL LOOP RETAINED | THE SKY BECOMES CLOUDY. →BEING CAUGHT IN A THUNDERSTORM AND A LOW-SPEED READY-TO-WIN STATE ROTATION →LOSING (DON QUIXOTE STRUCK BY LIGHTNING) | NONE | SOUND DEDICATED TO STOPPING |
| 16 | 5-A | IMPOSSIBLE | | FEATURE-IN FROM FULL-SCREEN PRESENTATION EFFECTS | NONE | SOUND DEDICATED TO STOPPING OF ALL REELS |

LOSING HIS BALANCE

SANCHO DROPPING AND
A HIGH-SPEED READY-TO-WIN STATE ROTATION

A SUDDEN GUST OF WIND BLOWS

DON QUIXOTE SNEEZES

ARMOR IS TAKEN OFF

DON QUIXOTE IS BLOWN OFF AND CRASHES AGAINST REEL PARTS

ROSINANTE STARTS TO RUN

RUNNING INTO A TREE

DON QUIXOTE DROPS DOWN

DON QUIXOTE WITH A READY-TO-WIN STATE (FRAME FEED)

DON QUIXOTE WITH A SUCCESS
IN A READY-TO-WIN STATE (FEATURE-IN)

DON QUIXOTE WITH A FAILURE
IN A READY-TO-WIN STATE (LOSING)

ROSINANTE STARTS TO RUN

SANCHO STARTS TO RUN →
FULL-SCREEN PRESENTATION EFFECTS

THE SKY BECOMES CLOUDY

THUNDERSTORM

THUNDER LOW-SPEED READY-TO-WIN STATE ROTATION, AND SUCCESS (A BONUS SYMBOL STRUCK BY LIGHTNING)

THUNDER LOW-SPEED READY-TO-WIN STATE ROTATION, AND FAILURE (DON QUIXOTE STRUCK BY LIGHTNING)

WINDMILL FULL-SCREEN PRESENTATION EFFECTS

FIG. 143

| No | TABLE | NO PRESENTATION EFFECTS | LOSING HIS BALANCE | | | A SUDDEN GUST OF WIND BLOWS. | | | |
|---|---|---|---|---|---|---|---|---|---|
| | | | 1-A RECOVERING HIS BALANCE | HIGH-SPEED READY-TO-WIN STATE ROTATION-OK 1-B | HIGH-SPEED READY-TO-WIN STATE ROTATION-NO 1-C | WIND DIES DOWN. 2-A | SNEEZING 2-B | ARMOR BLOWN OFF 2-C | DON QUIXOTE CRASHES AGAINST REEL PARTS. 2-D |
| 1 | BONUS-IN TIME | 30 | 2 | 10 | 0 | 2 | 3 | 4 | 10 |
| 2 | READY-TO-WIN-STATE LOSING TIME | 39 | 3 | 0 | 10 | 3 | 10 | 8 | 0 |
| 3 | NON- READY-TO-WIN-STATE LOSING TIME | 75 | 5 | 0 | 0 | 4 | 2 | 2 | 0 |

| No | DON QUIXOTE SHOUTS. | | | | | THE SKY BECOMES CLOUDY. | | | FULL-SCREEN | TOTAL |
|---|---|---|---|---|---|---|---|---|---|---|
| | NO REACTION 3-A | RUNNING INTO A TREE AND GETTING DIZZY | THREE/FRAME FEED - OK | THREE/FRAME FEED - NO 3-D | FULL-SCREEN 3-E | THE SKY BECOMES CLEAR. 4-A | THUNDER/ LOW-SPEED ROTATOIN-OK 4-B | THUNDER/ LOW-SPEED ROTATION -NO 4-C | 5-A | |
| 1 | 2 | 3 | 10 | 0 | 5 | 2 | 10 | 0 | 7 | 100 |
| 2 | 3 | 10 | 0 | 7 | 0 | 2 | 0 | 5 | 0 | 100 |
| 3 | 5 | 2 | 0 | 0 | 0 | 5 | 0 | 0 | 0 | 100 |

FIG. 144

■DEGREES OF RELIABILITY OF BONUS
ARRANGEMENT OF RESPECTIVE PRESENTATION EFFECTS

| No | TABLE | | LOSING HIS BALANCE | | | A SUDDEN GUST OF WIND BLOWS. | | | |
|---|---|---|---|---|---|---|---|---|---|
| | | NO PRESENTATION EFFECTS | RECOVERING HIS BALANCE 1-A | HIGH-SPEED READY-TO-WIN STATE ROTATION - OK 1-B | HIGH-SPEED READY-TO-WIN STATE ROTATION - NO 1-C | WIND DIES DOWN. 2-A | SNEEZING 2-B | ARMOR BLOWN OFF 2-C | DON QUIXOTE CRASHES AGAINST REEL PARTS. 2-D |
| 1 | | 1.05% | 1.05% | 100.00% | 0.00% | 1.29% | 2.86% | 4.00% | 100.00% |

| | DON QUIXOTE SHOUTS. | | | | | THE SKY BECOMES CLOUDY. | | | FULL-SCREEN | |
|---|---|---|---|---|---|---|---|---|---|---|
| No | NO REACTION 3-A | RUNNING INTO A TREE AND GETTING DIZZY 3-B | THREE/FRAME FEED - OK 3-C | THREE/FRAME FEED - NO 3-D | FULL-SCREEN 3-E | THE SKY BECOMES CLEAR. 4-A | THUNDER/ LOW-SPEED ROTATOIN- OK 4-B | THUNDER/ LOW-SPEED ROTATION - NO 4-C | 5-A | TOTAL |
| 1 | 1.05% | 2.86% | 100.00% | 0.00% | 100.00% | 1.06% | 100.00% | 0.00% | 100.00% | 6.1522 |

FIG. 145

TOTAL OCCURRENCE FREQUENCIES OF RESPECTIVE PRESENTATION EFFECTS 1/3.5

| | | | LOSING HIS BALANCE | | | A SUDDEN GUST OF WIND BLOWS. | | | |
|---|---|---|---|---|---|---|---|---|---|
| No | TABLE | NO PRESENTATION EFFECTS | RECOVERING HIS BALANCE 1-A | HIGH-SPEED READY-TO-WIN STATE ROTATION - OK 1-B | HIGH-SPEED READY-TO-WIN STATE ROTATION - NO 1-C | WIND DIES DOWN. 2-A | SNEEZING 2-B | ARMOR BLOWN OFF 2-C | DON QUIXOTE CRASHES AGAINST REEL PARTS. 2-D |
| 1 | BONUS-IN TIME | 0.0075 | 0.0005 | 0.0025 | 0 | 0.0005 | 0.00075 | 0.001 | 0.0025 |
| 2 | READY-TO-WIN-STATE LOSING TIME | 0.02925 | 0.00225 | 0 | 0.0075 | 0.00225 | 0.0075 | 0.006 | 0 |
| 3 | NON- READY-TO-WIN-STATE LOSING TIME | 0.675 | 0.045 | 0 | 0 | 0.036 | 0.018 | 0.018 | 0 |
| | TOTAL | 0.71175 | 0.04775 | 0.0025 | 0.0075 | 0.03875 | 0.02625 | 0.025 | 0.0025 |
| | | 1.4 | 20.9 | 400.0 | 133.3 | 25.8 | 38.1 | 40.0 | 400.0 |

| | DON QUIXOTE SHOUTS. | | | | | THE SKY BECOMES CLOUDY. | | | FULL-SCREEN | |
|---|---|---|---|---|---|---|---|---|---|---|
| No | NO REACTION 3-A | RUNNING INTO A TREE AND GETTING DIZZY 3-B | THREE/FRAME FEED - OK 3-C | THREE/FRAME FEED - NO 3-D | FULL-SCREEN 3-E | THE SKY BECOMES CLEAR. 4-A | THUNDER/ LOW-SPEED ROTATOIN-OK 4-B | THUNDER/ LOW-SPEED ROTATION - NO 4-C | 5-A | TOTAL |
| 1 | 0.0005 | 0.00075 | 0.0025 | 0 | 0.00125 | 0.0005 | 0.0025 | 0 | 0.00175 | 0.025 |
| 2 | 0.00225 | 0.0075 | 0 | 0.00525 | 0 | 0.0015 | 0 | 0.00375 | 0 | 0.075 |
| 3 | 0.045 | 0.018 | 0 | 0 | 0 | 0.045 | 0 | 0 | 0 | 0.9 |
| | 0.04775 | 0.02625 | 0.0025 | 0.00525 | 0.00125 | 0.047 | 0.0025 | 0.00375 | 0.00175 | |
| | 20.9 | 38.1 | 400.0 | 190.5 | 800.0 | 21.3 | 400.0 | 266.7 | 571.4 | |

GAMING MACHINE WHICH REARRANGES SYMBOLS AFTER VARYING AND DISPLAYING THE SYMBOLS

CROSS REFERENCE TO RELATED APPLICATIONS

This application claims priority of Japanese Patent Application No. 2012-114970 filed on May 18, 2012. The contents of this application are incorporated herein by reference in their entirety.

BACKGROUND OF THE INVENTION

1. Field of the Invention

The present invention relates to a gaming machine which rearranges symbols after varying and displaying the symbols.

2. Description of the Background Art

Conventionally, a slot machine has been disclosed, for example, in U.S. patent application publication No. 2011/0250947. In such a slot machine, when a player inputs coins, bills, or the like into an insertion slot of the slot machine and operates a spin button, in a symbol display area provided on a front face of a housing, a plurality of symbols are displayed in a scrolling manner and thereafter, each of the symbols is automatically stopped. Based on a combination of the symbols which have been stopped, a variety of awards such as a bonus are determined.

In general, as symbols, a plurality of kinds of symbols such as bonus trigger symbols, wild symbols, and the like, in addition to normal symbols, are set. The wild symbols are almighty symbols serving as substitutes for the other symbols. Accordingly, when the wild symbols are rearranged, expectations that winning would occur and a payout could be obtained are raised. Therefore, in the gaming machine, what sort of presentation effects the wild symbols are rearranged in is of importance in enhancing gaming characteristics of the gaming machine.

An object of the present invention is to provide a gaming machine in which elaborate presentation effects for rearranging symbols beneficial for a player, such as wild symbols, are rearranged are devised and which has a high game feeling.

SUMMARY OF THE INVENTION

The present invention is a gaming machine including:

a display on which a plurality of symbols are rearranged in a manner of a matrix including a plurality of rows and a plurality of columns; and a controller being programmed to execute processes (A1) to (A3) below described.

(A1) A process in which a drawing is conducted to rearrange wild symbols collectively in one column on the display.

(A2) A process in which a drawing is conducted to determine, when an outcome of the drawing in the process (A1) is that the wild symbols are rearranged in two or more columns, whether or not premium presentation effects, occurring only when the wild symbols are displayed in the two or more columns, are performed.

(A3) A process in which the premium presentation effects are performed on condition that it is determined in the process (A2) that the premium presentation effects are performed.

According to the present invention, the premium presentation effects are conducted, thereby allowing a player to have an expectation that the wild symbols are displayed in the whole respective two or more columns. Therefore, a player can raise an expectation that the likelihood of receiving a payout is increased and in addition thereto, the player can raise an expectation that the player can receive a large payout.

In the present invention, furthermore, the arrangement of the wild symbols is conducted before the plurality of symbols are rearranged, whereby after the arrangement of the wild symbols, a player can more raise attention and an expectation for the rearrangement of the plurality of symbols than usual, and a sense of expectation for a payout can be maintained up until the rearrangement of all the symbols has been finished.

In addition, a plurality of kinds of the premium presentation effects are set and each probability with which each of the kinds of the presentation effects is selected can be associated with a number of columns in which the wild symbols are rearranged. In this case, a degree of expectation for the number of columns in which the wild symbol(s) is/are rearranged varies depending on the contents of the premium presentation effects. Therefore, it is made possible for a player to enjoy gaming while being moved from hope to sorrow by the contents of the premium presentation effects.

The controller in the present invention may execute a process (B1) below described.

(B1) A process in which a character is caused to appear on the display, the wild symbol is rearranged in one column when the character appears at one time and the character is caused to appear at a plurality of times when the wild symbols are rearranged in two or more columns, and the wild symbols are rearranged at the plurality of times, at each of which the wild symbols in one column are rearranged.

According to the present invention, the wild symbol is rearranged only in one column when the character appears at one time. Therefore, a player can expect not only that the character would appear but also that after the character has appeared, the character would appear again and the wild symbol would be rearranged in another column.

In addition, a configuration in which a plurality of kinds of behaviors of the character are set and each of the behaviors is associated with a likelihood with which the wild symbol is arranged or is associated with a number of columns on which a wild symbol/wild symbols is/are arranged can also be adopted. In this case, a degree of advantageousness (degree of expectation) brought about by the arrangement of the wild symbol(s) varies depending on the behaviors of the character. Therefore, it is made possible for a player to enjoy gaming while being moved from hope to sorrow by the behaviors of the character.

The controller in the present invention may execute executes processes (C1) and (C2) below described, instead of the process (B1), when an outcome of the drawing is that the wild symbols are rearranged in the two or more columns.

(C1) A process in which order of the rearrangement of the wild symbol in the two or more columns is determined by conducting a drawing.

(C2) A process in which the wild symbol is rearranged in one of the two or more columns, which has won in the drawing, in a process in which in accordance with the order determined in the process (C1), with respect to the one of the two or more columns, the character is caused to appear from one of right and left ends of the display, to traverse the display in a row direction, and to make an exit to the other of the right and left ends.

According to the present invention, when the wild symbols are rearranged in two or more columns, the order is determined by the drawing. Therefore, a way of arranging the wild symbols becomes diversified and a player can enjoy the presentation effects in which the wild symbols are rearranged, thereby enhancing amusement in gaming.

The controller in the present invention may execute processes (D1) and (D2) below described, instead of the process (C1).

(D1) A process in which it is confirmed whether or not an outcome is that the wild symbol is rearranged in one of the two or more columns, which is the nearest to an end on a side on which the character appears.

(D2) A process in which when the confirmed outcome is that the wild symbol is rearranged in the one of the two or more columns, which is the nearest to the end on the side on which the character appears, a redrawing to determine order of the rearrangement of the wild symbol is conducted.

According to the present invention, no rearrangement of the wild symbol is conducted for a column on the side on which the character appears, for example, a column on the leftmost side in a case where the character appears from the left side and in a case opposite thereto, a column on the rightmost side, and the redrawing is conducted. Since it is difficult to confirm the presentation effects for the column near to the side on which the character appears, this deficiency is avoided by conducting the redrawing, thereby allowing a player to sufficiently enjoy the presentation effects.

The present invention is a gaming machine including:

a display on which a plurality of symbols are rearranged in a plurality of rows and a plurality of columns;

a presentation effects device for conducting presentation effects related to a specific symbol; and a controller being programmed to execute processes (E1) to (E5) below described.

(E1) A process in which the plurality of symbols to be rearranged on the display are determined.

(E2) A process in which the plurality of symbols determined in the process (E1) are rearranged on the display.

(E3) A process in which a column among the plurality of columns on the display, in which specific symbols are rearranged in all rows, is determined.

(E4) A process in which when a number of the columns determined in the process (E3) is a plural number, it is determined whether or not special presentation effects are conducted.

(E5) A process in which when it is determined in the process (E4) that the special presentation effects are conducted, the special presentation effects are conducted by the presentation effects device.

According to the present invention, the specific presentation effects are conducted, thereby allowing a player to have an expectation that the specific symbols are displayed in the whole respective two or more columns. Therefore, when the specific symbols are those beneficial for a player when rearranged, the player can raise an expectation.

The present invention can provide the gaming machine in which elaborate presentation effects for rearranging the symbols beneficial for a player, such as wild symbols, are rearranged are devised and which has a high game feeling.

BRIEF DESCRIPTION OF THE DRAWINGS

FIG. 10 is an explanatory diagram of deceleration modes of reels;

FIG. 18A is an explanatory diagram with a table showing a relationship between the remaining count-up number and the number of seconds;

FIG. 18B is an explanatory diagram with a table showing a relationship between each multiplying factor and each number of seconds;

FIG. 22 is an explanatory diagram of a lighting-up state of each language switching touch button;

FIG. 23 is an explanatory diagram of the language switching touch buttons;

FIG. 39A shows a revival drawing tables;

FIG. 39B shows a revival drawing tables;

FIG. 40A is an explanatory diagram of a method of determining selection probabilities in a revival drawing table B;

FIG. 40B is an explanatory diagram of a method of determining selection probabilities in a revival drawing table B;

FIG. 40C is an explanatory diagram of a method of determining selection probabilities in a revival drawing table B;

FIG. 45A is an explanatory diagram of one example of equipages in an equipage bonus game;

FIG. 45B is an explanatory diagram of one example of equipages in an equipage bonus game;

FIG. 82 is an explanatory diagram of a modified example of the Princess Dolcia game;

FIG. 83 is an explanatory diagram of an operation process of a battle-with-mirror knight game;

FIG. 84 is an explanatory diagram of the operation process of the battle-with-mirror knight game;

FIG. 85 is an explanatory diagram of the operation process of the battle-with-mirror knight game;

FIG. 86 is an explanatory diagram of the operation process of the battle-with-mirror knight game;

FIG. 87A is an explanatory diagram of the operation process of the battle-with-mirror knight game;

FIG. 87B is an explanatory diagram of the operation process of the battle-with-mirror knight game;

FIG. 88 is an explanatory diagram of an operation process of a fight-against-lion game;

FIG. 89 is an explanatory diagram of the operation process of the fight-against-lion game;

FIG. 90 is an explanatory diagram of the operation process of the fight-against-lion game;

FIG. 91 is an explanatory diagram of the operation process of the fight-against-lion game;

FIG. 92 is an explanatory diagram of the operation process of the fight-against-lion game;

Figure 93A:
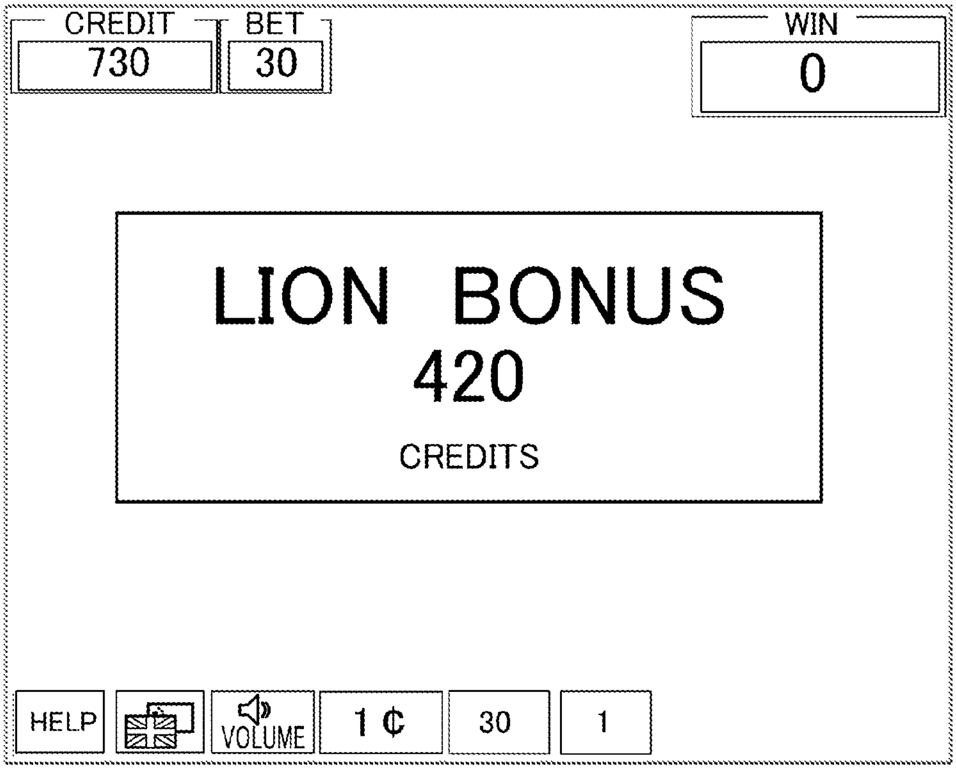
Figure 93B:
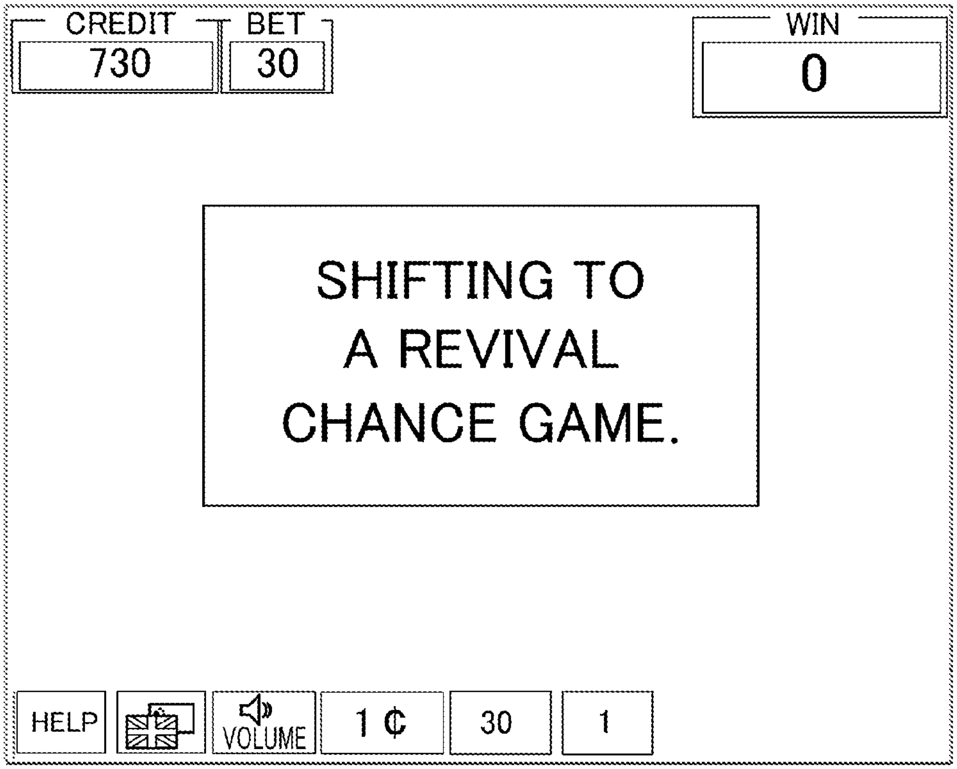
Figure 94:
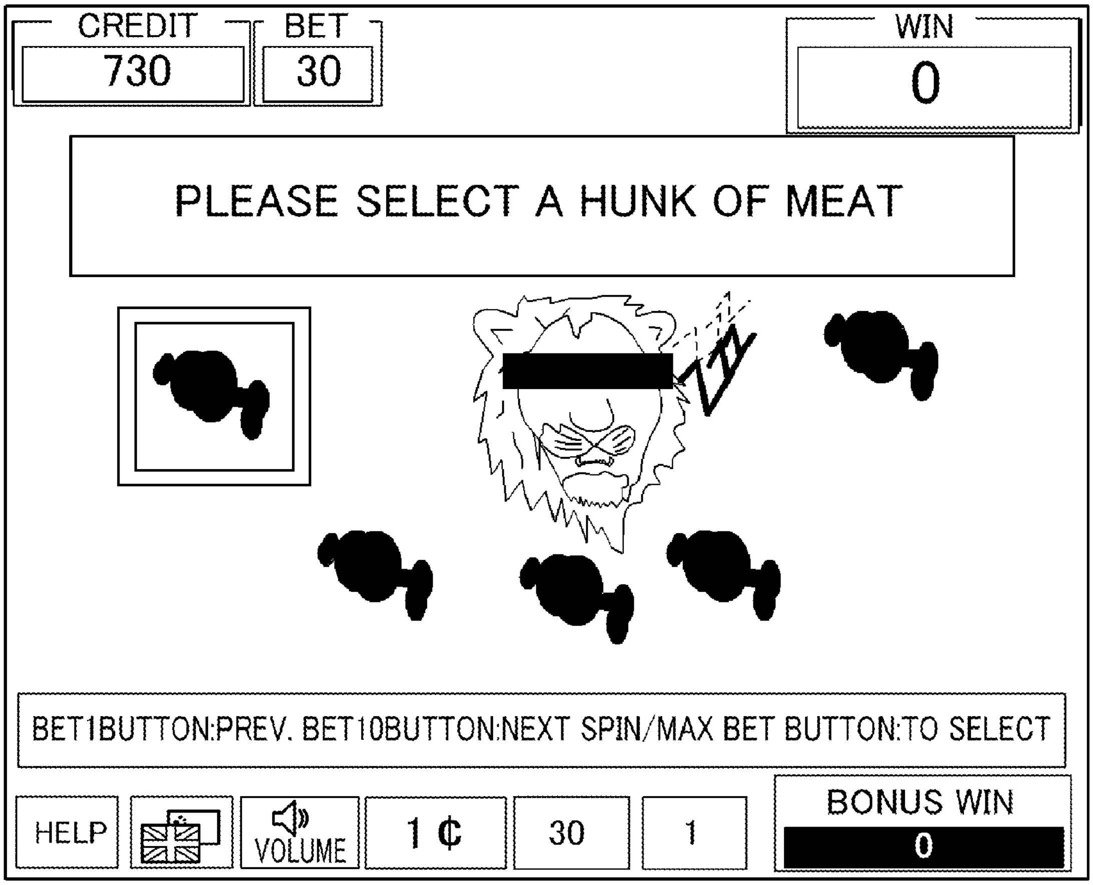
Figure 95:
Figure 96:
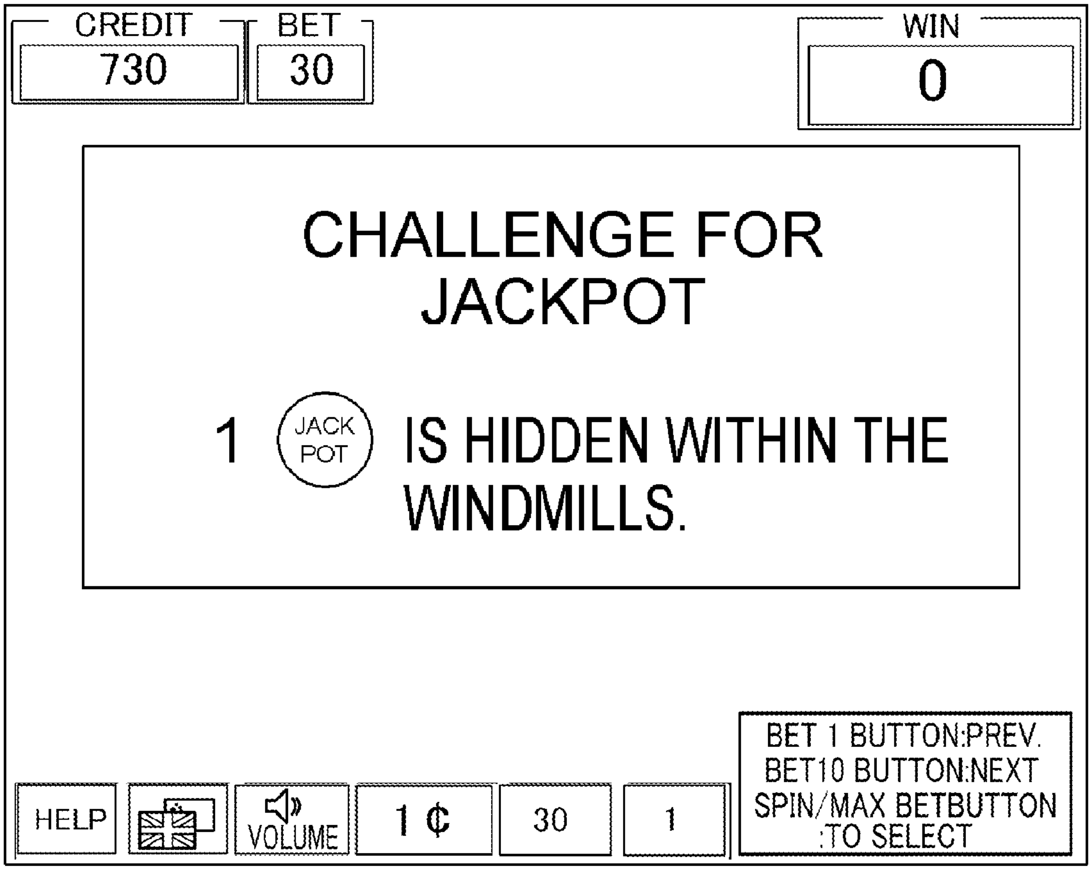
Figure 97:
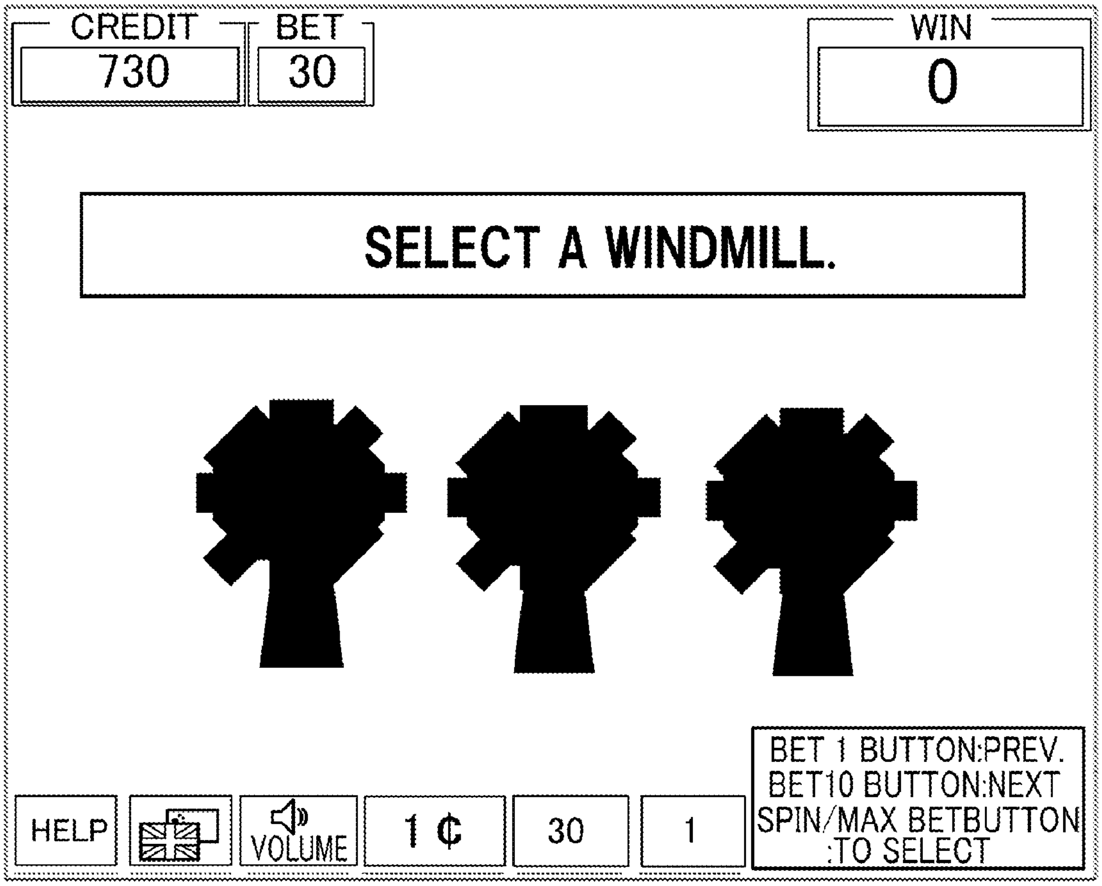
Figure 98A:
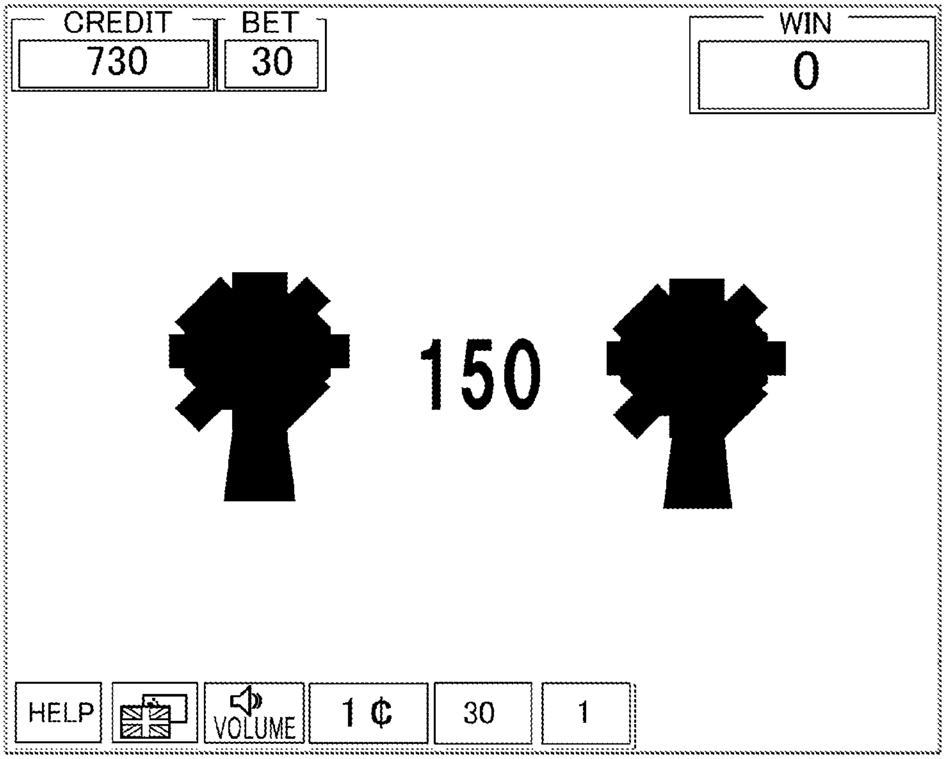
Figure 98B:
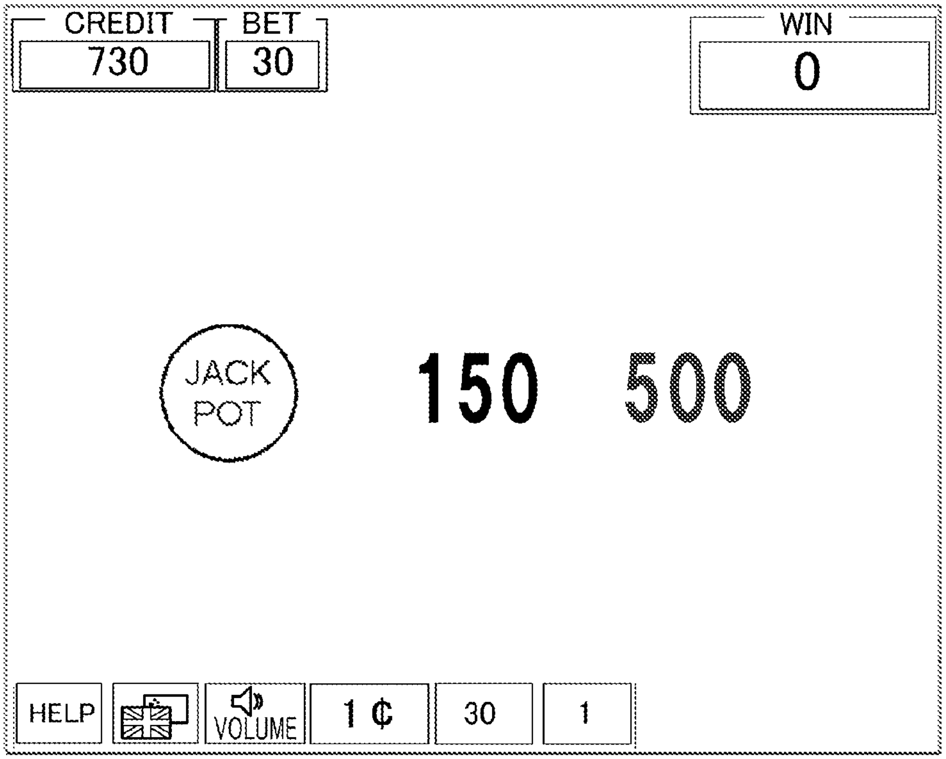
Figure 99A:
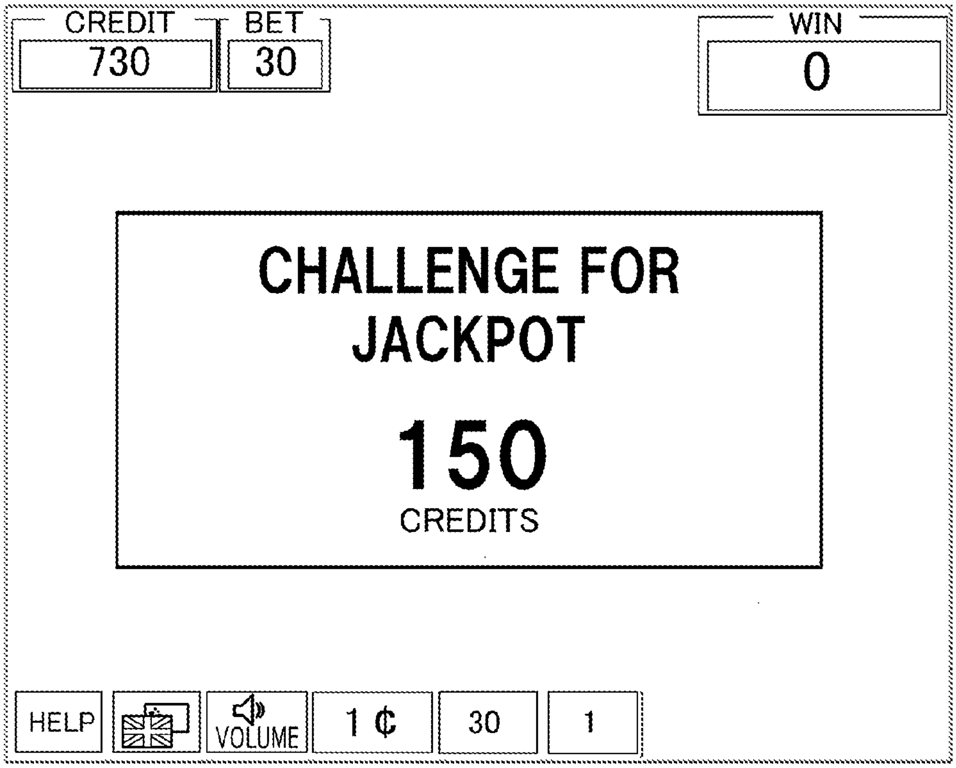
Figure 99B:
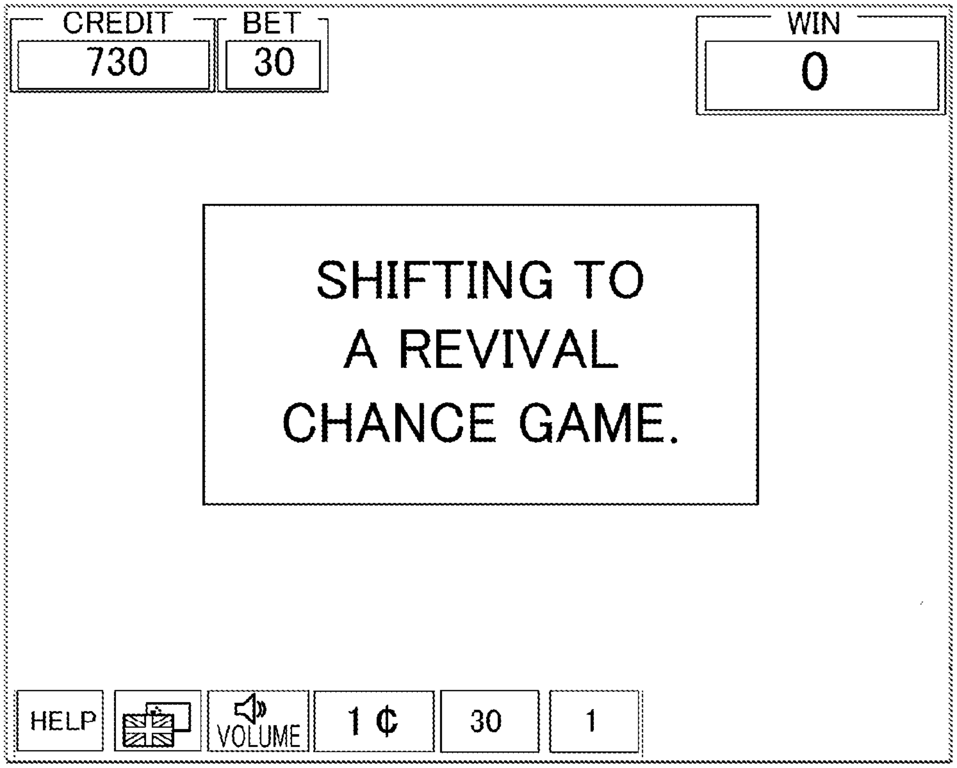
Figure 100A:
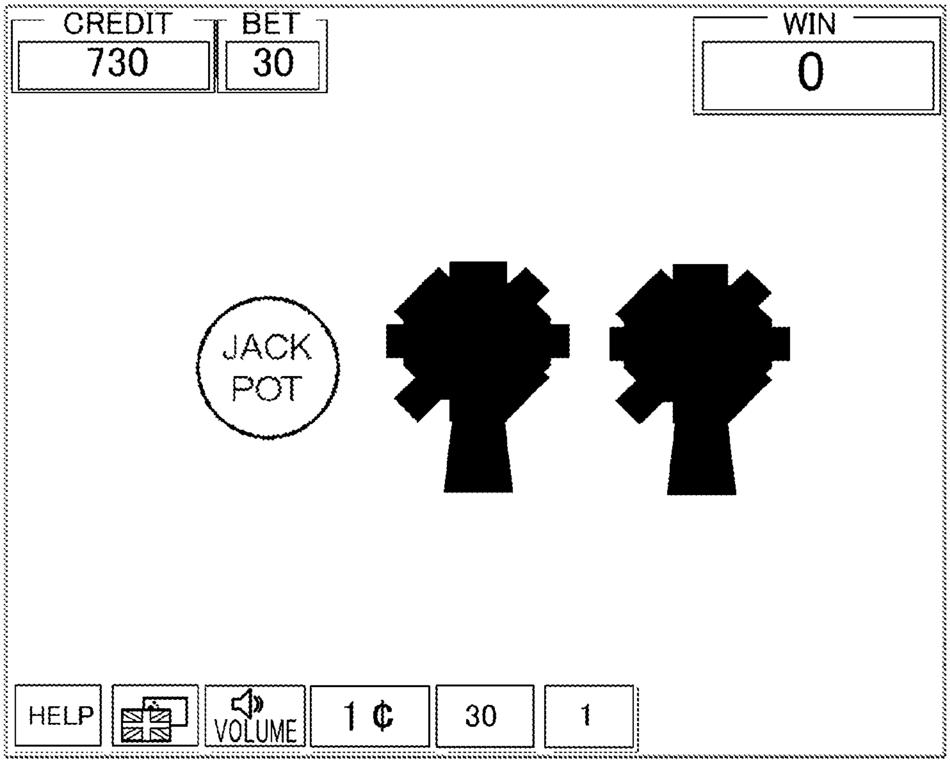
Figure 100B:
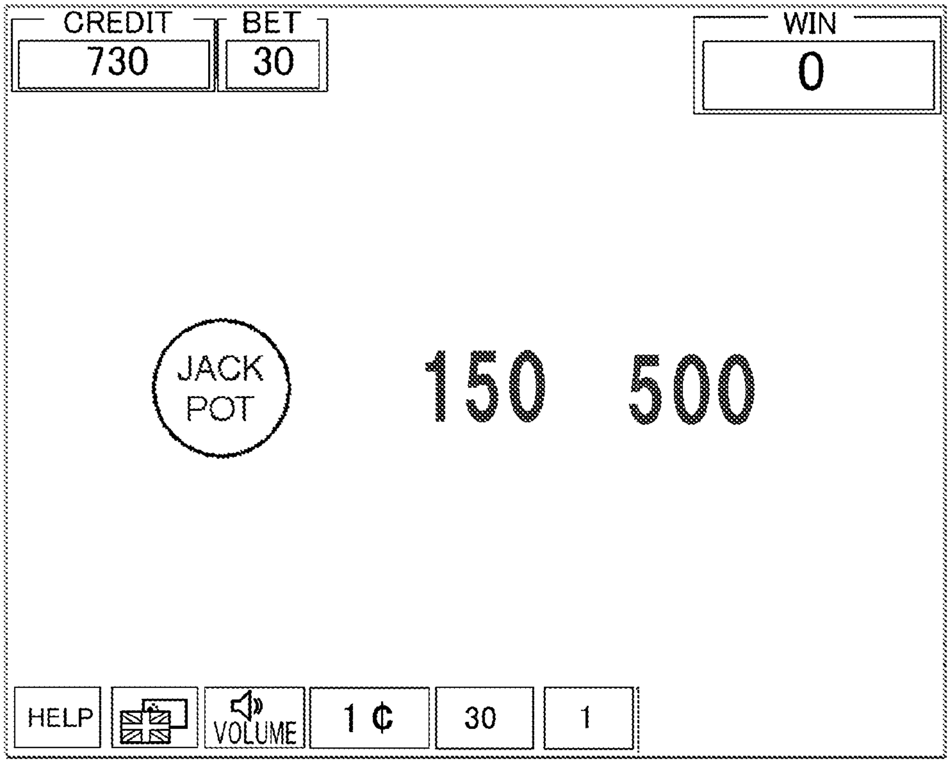
Figure 101A:
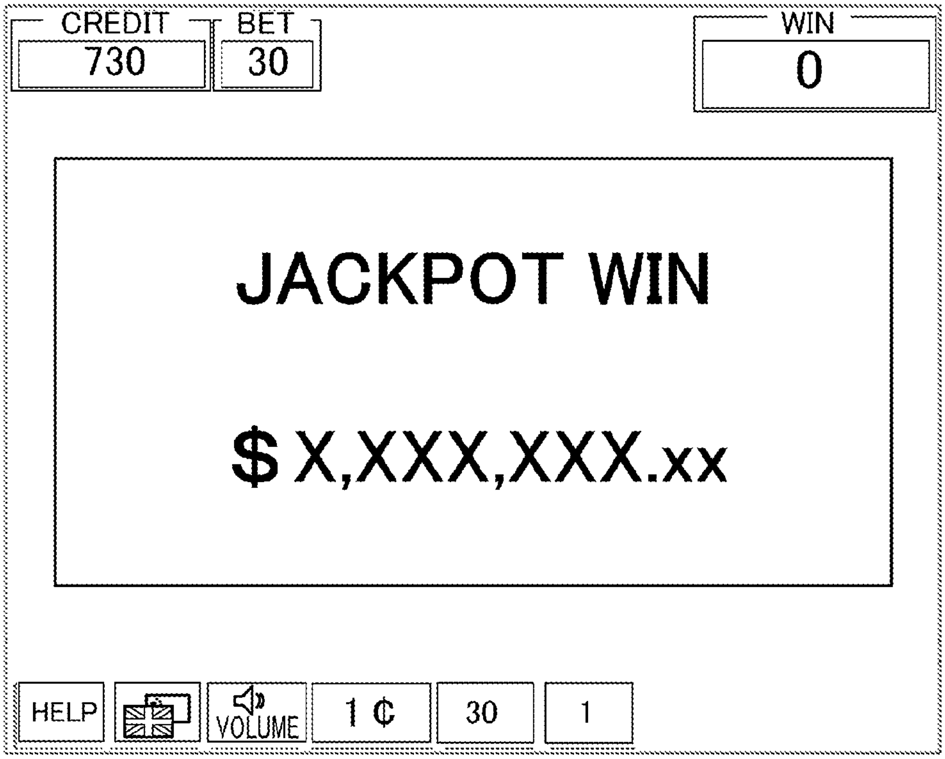
Figure 101B:
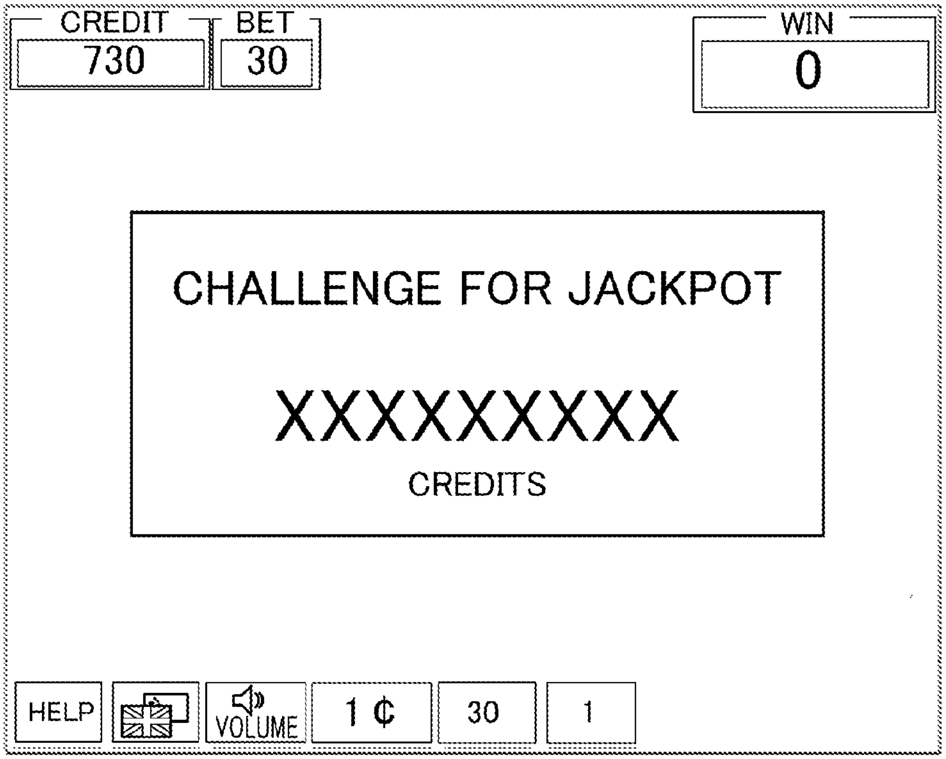
Figure 102:
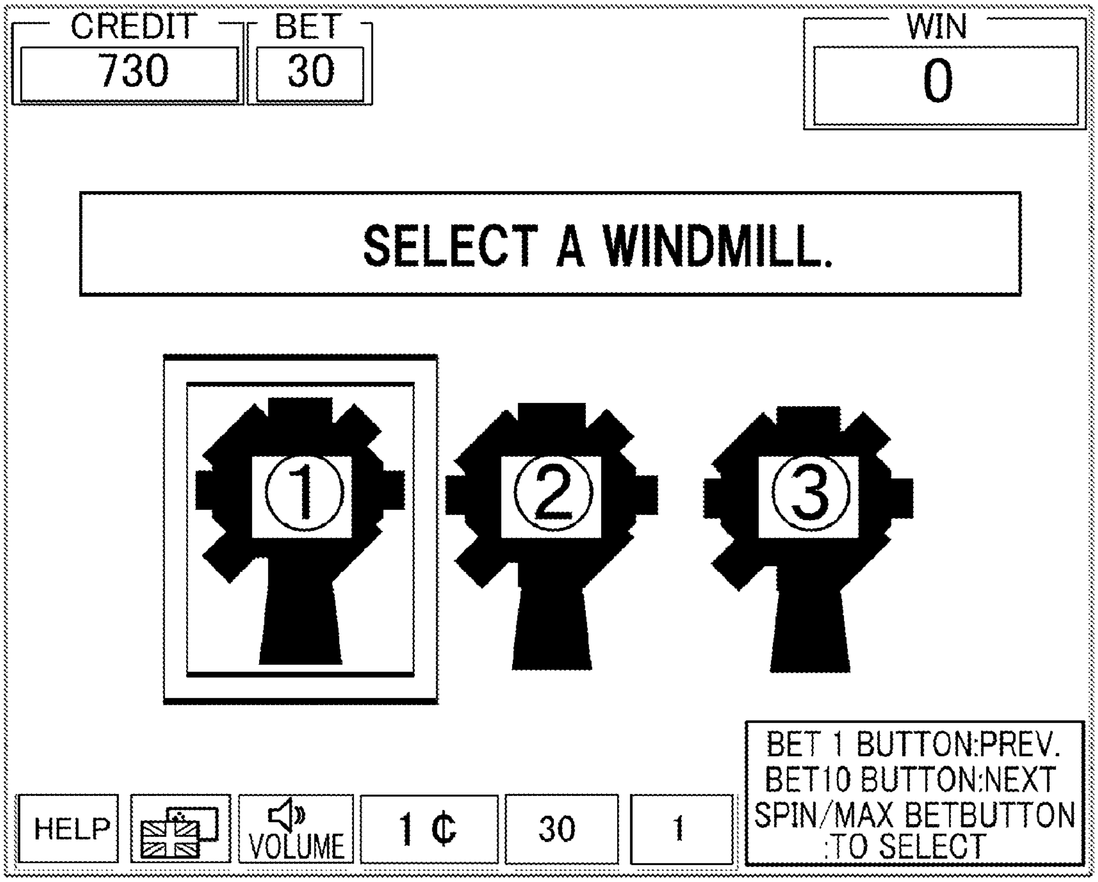
Figure 104:
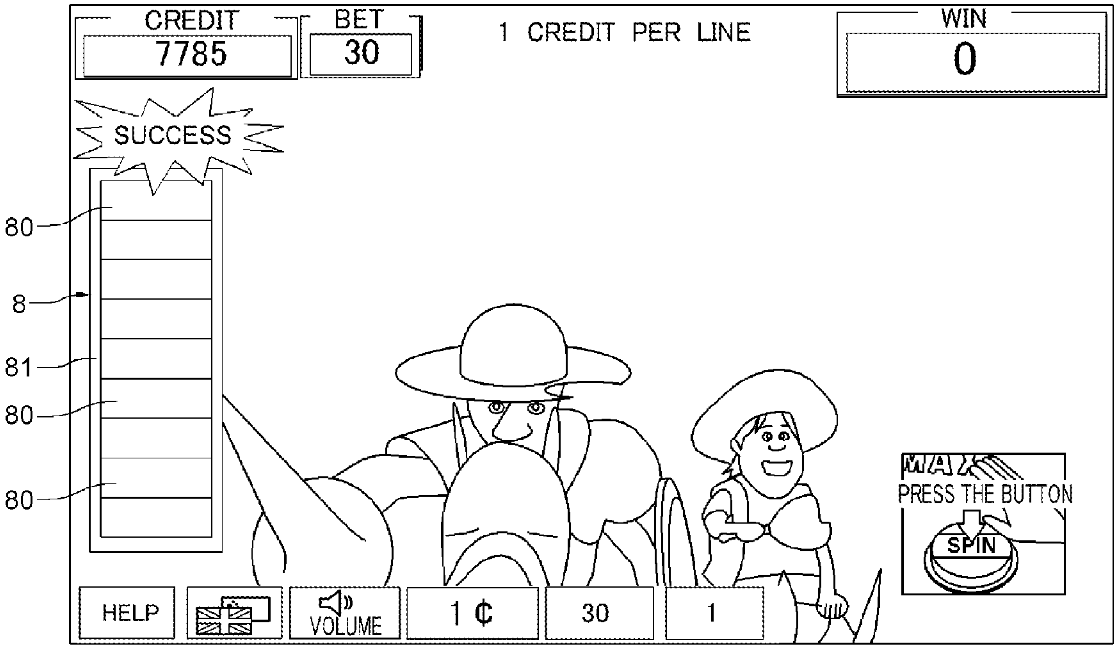
Figure 105:
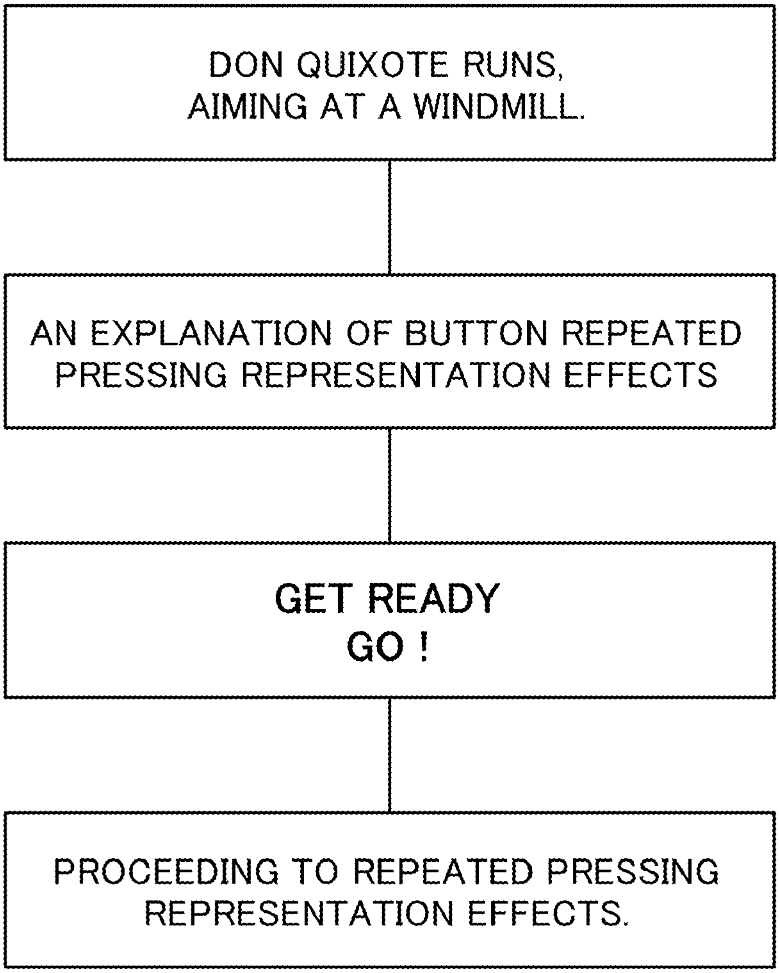
Figure 106A:
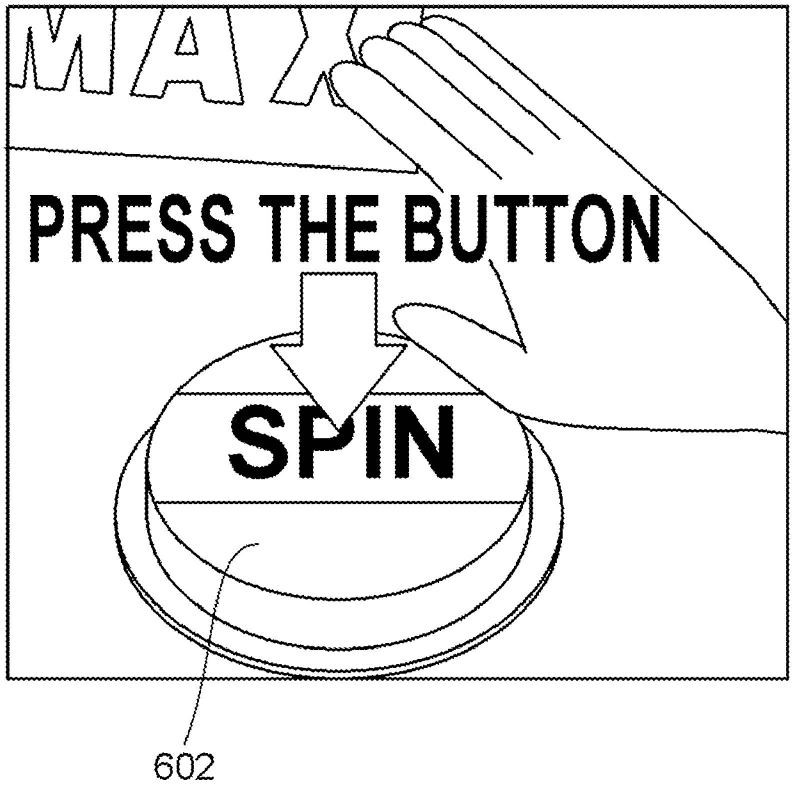
Figure 106B:
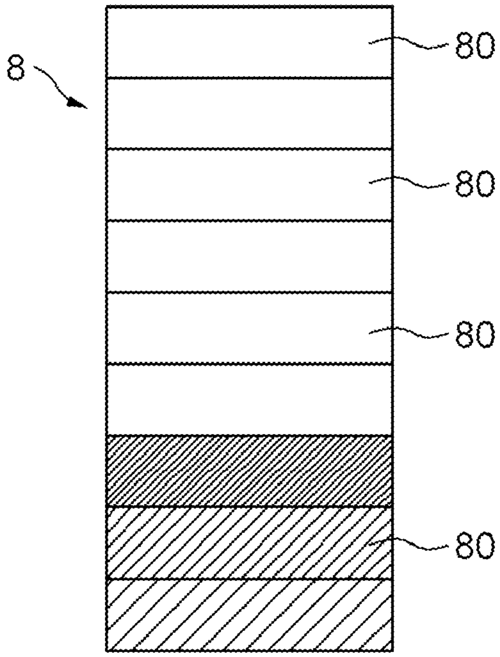
Figure 107:
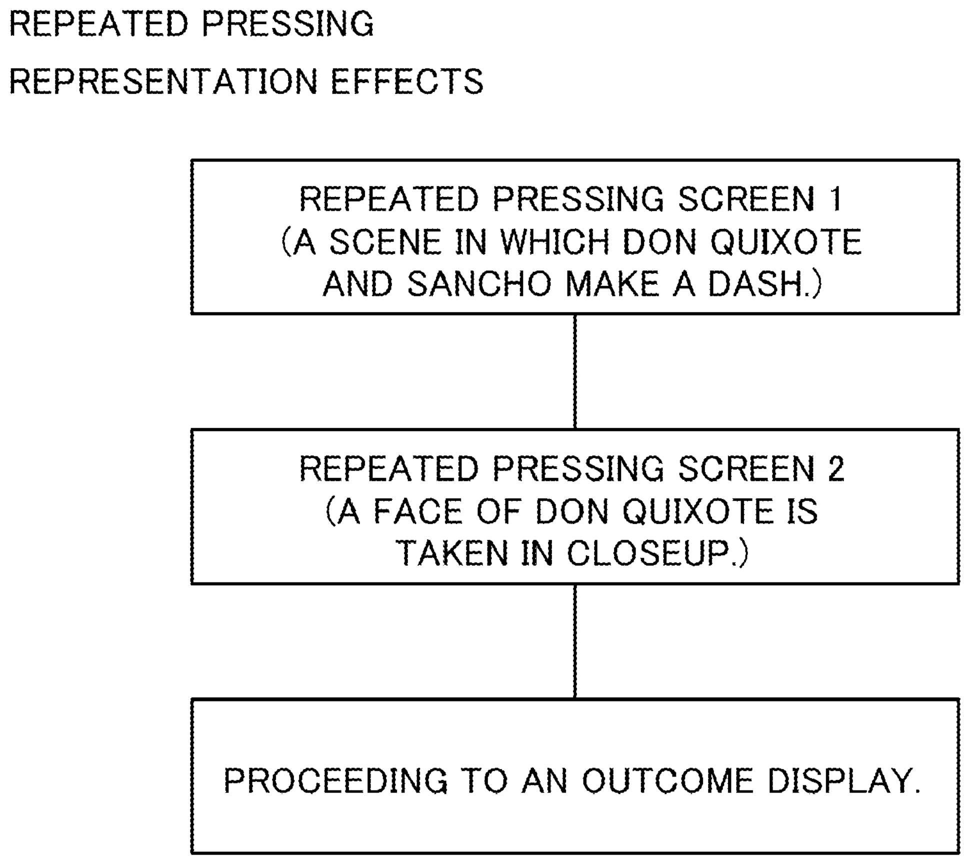
Figure 108:
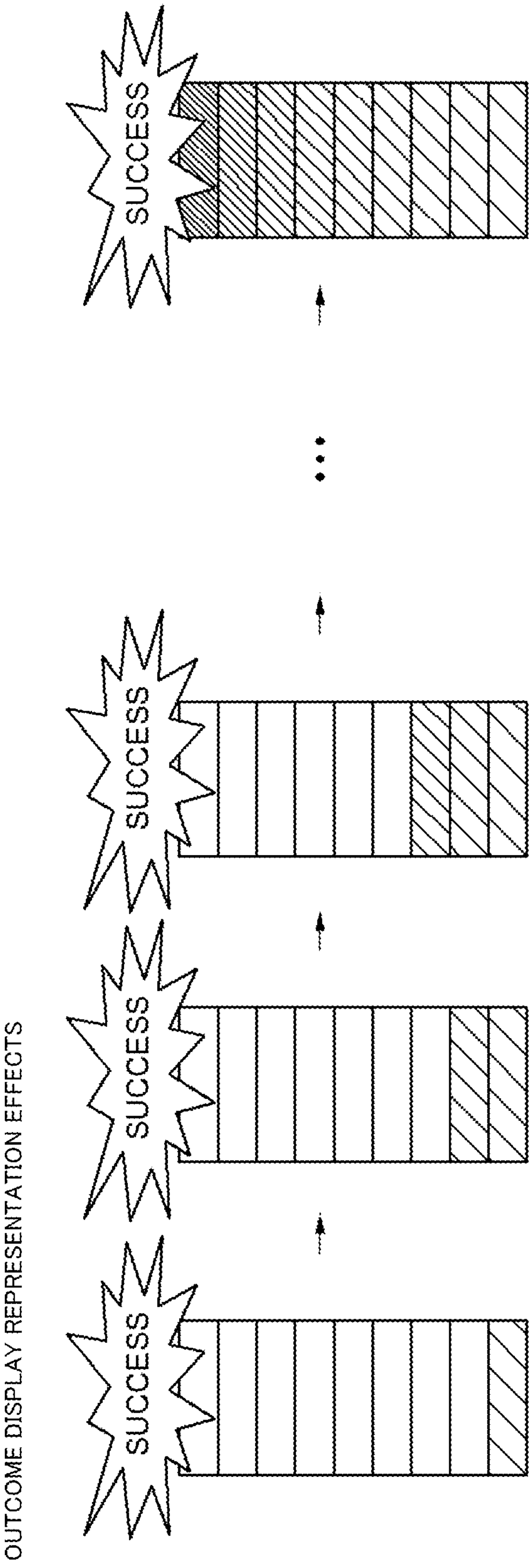
Figure 109:
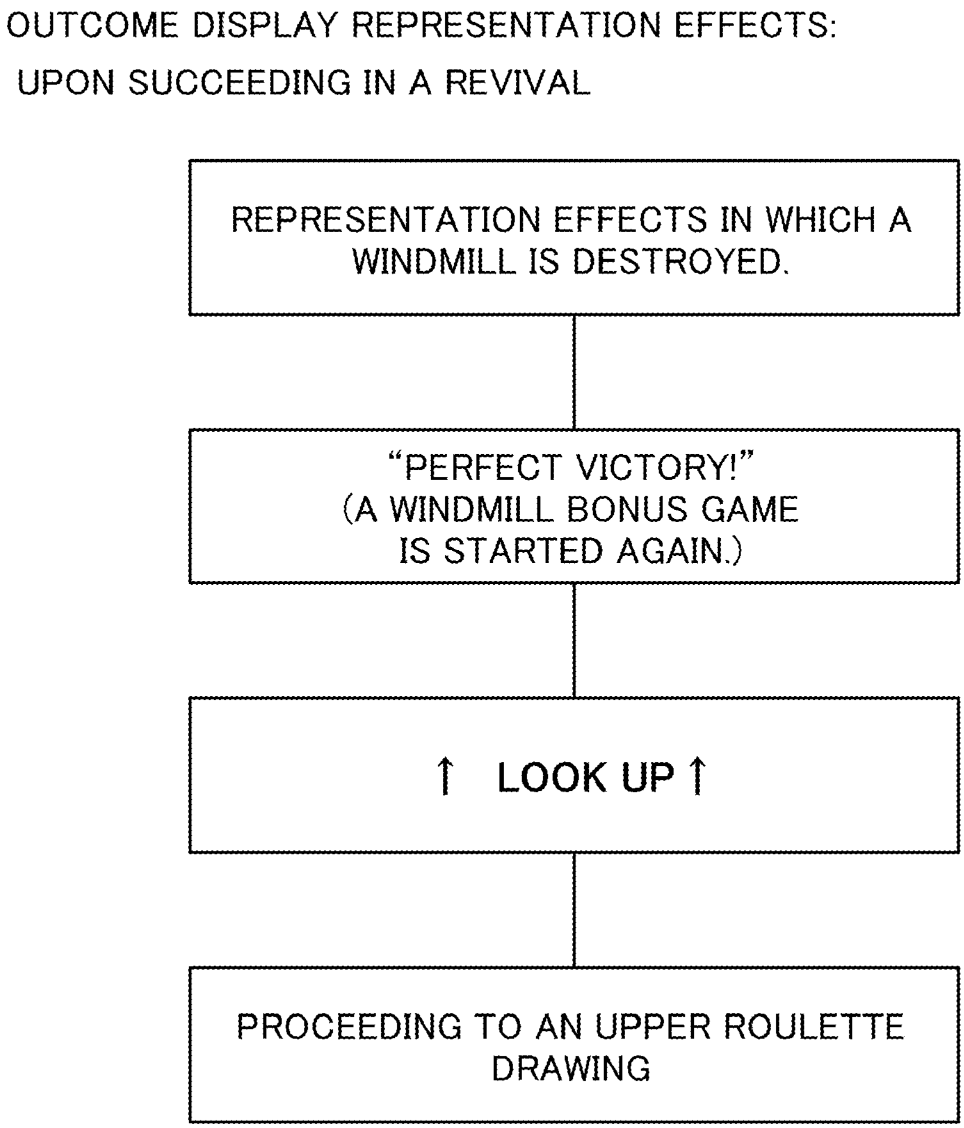
Figure 110:
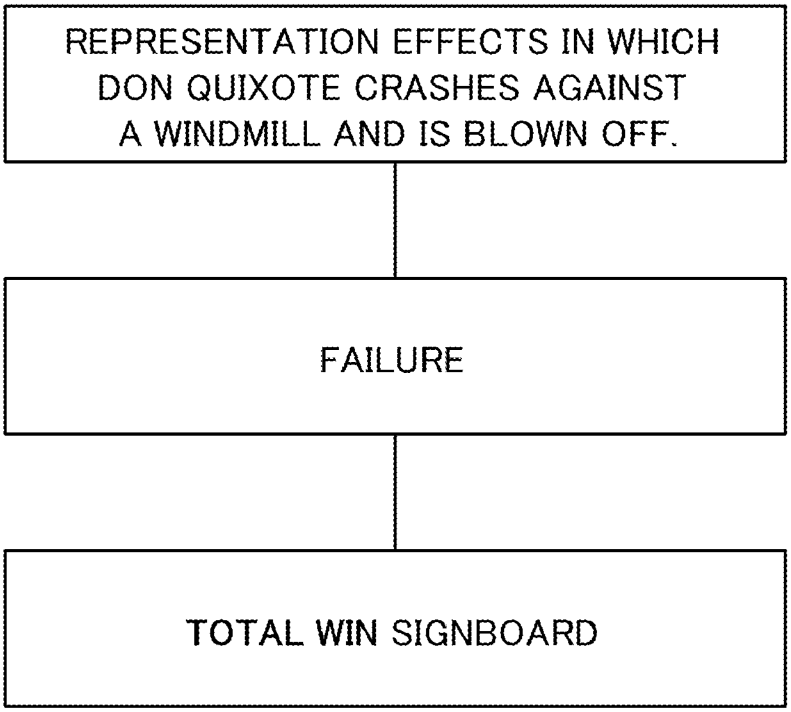
Figure 111:
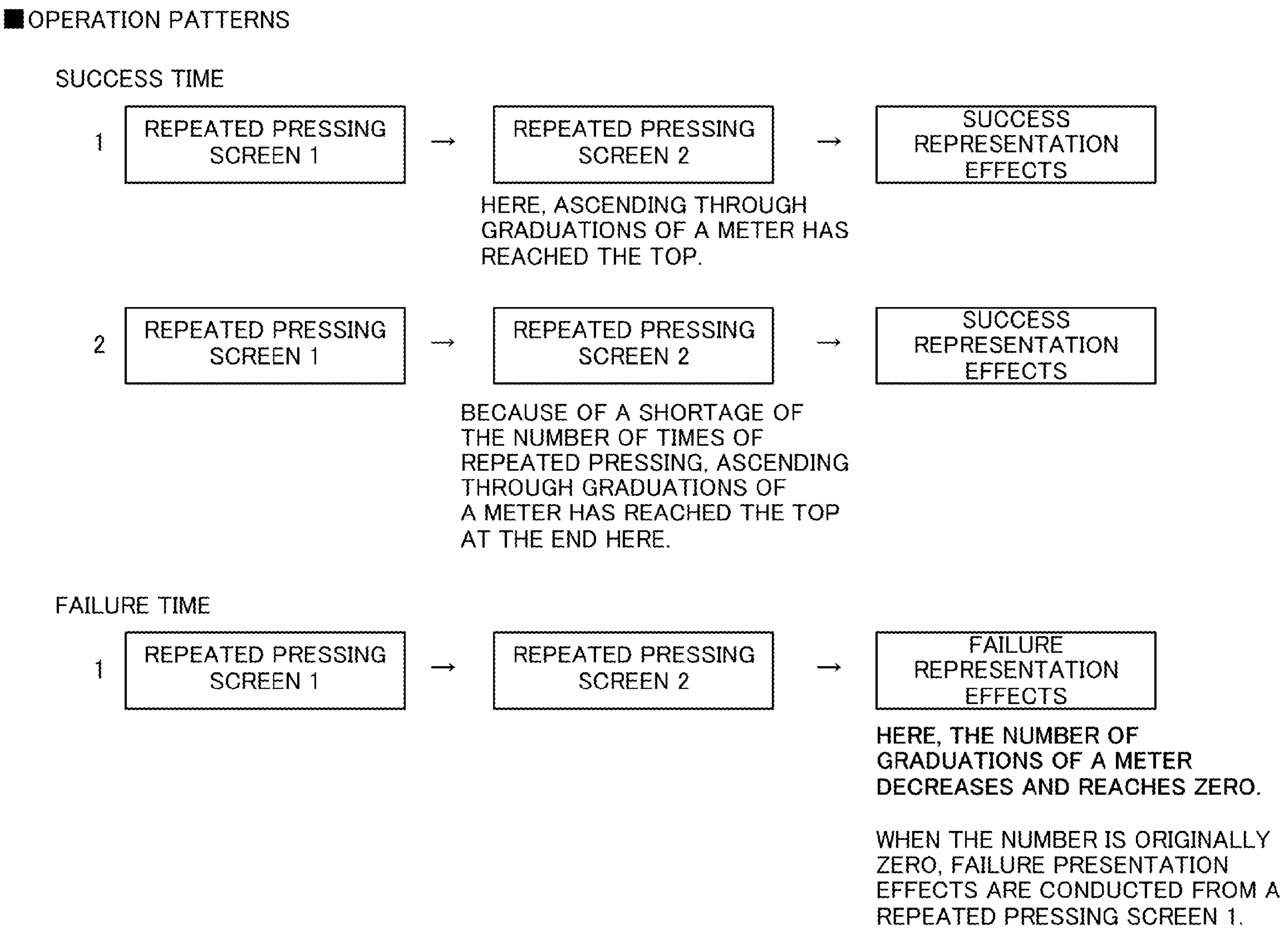
Figure 114A:
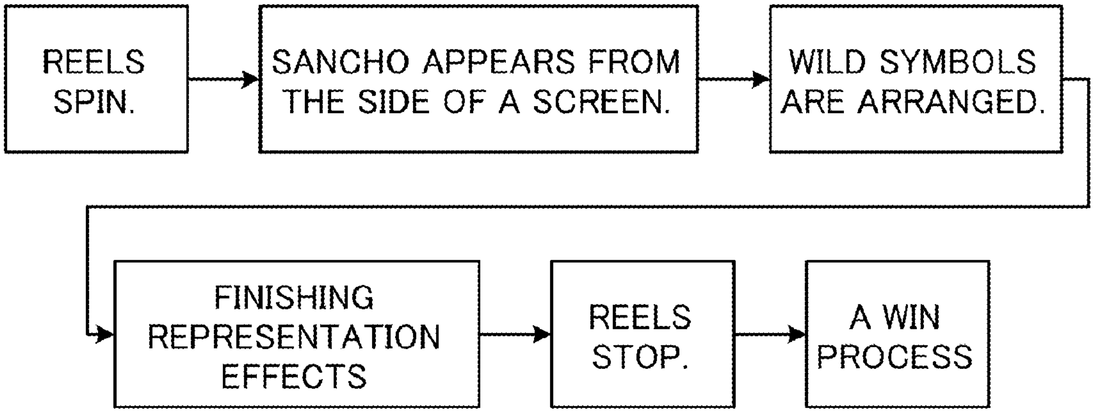
Figure 114B:
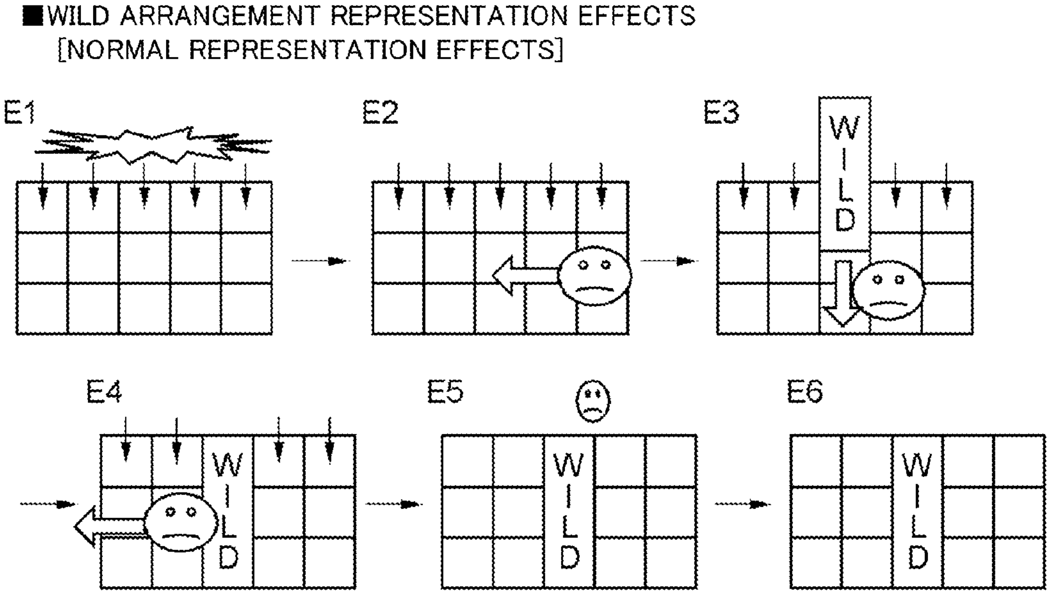
Figure 115A:
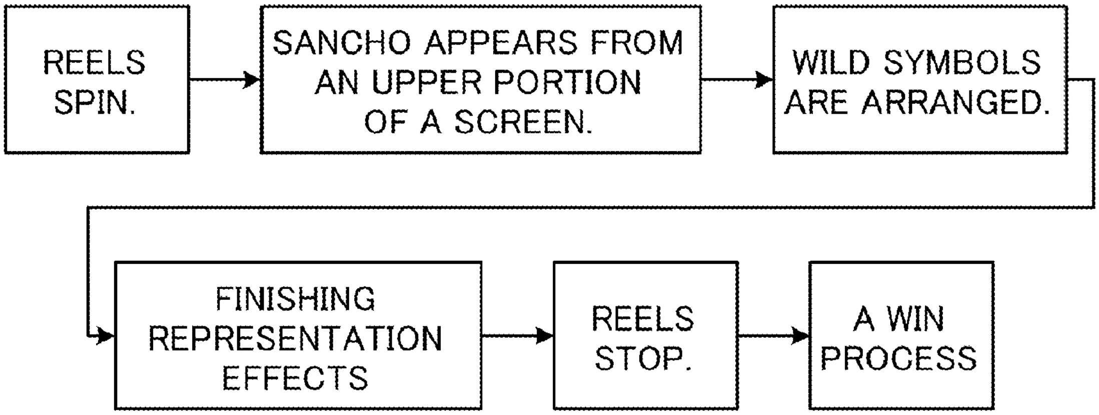
Figure 115B:
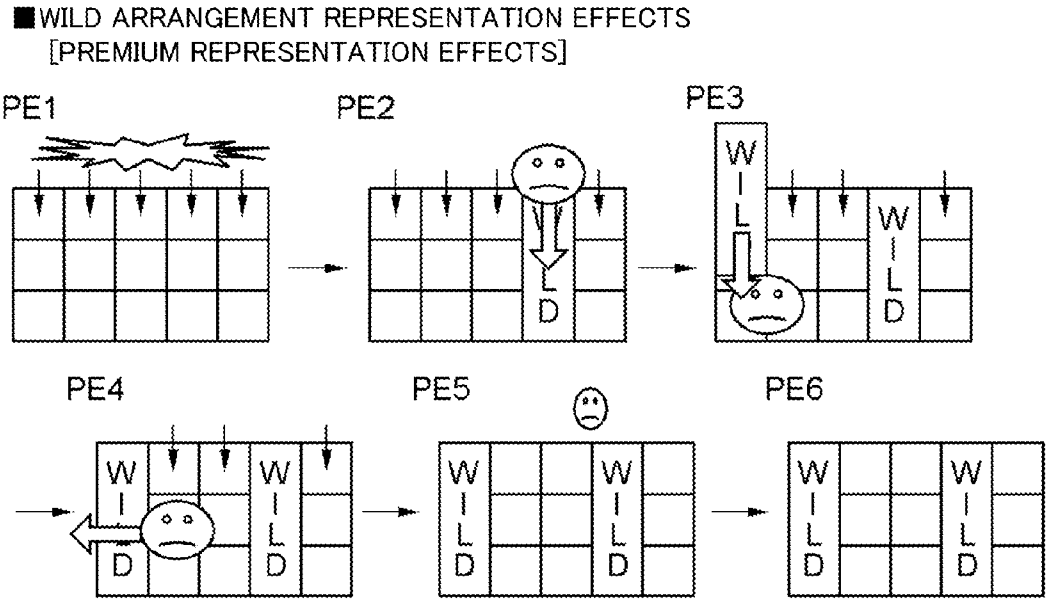
Figure 117:
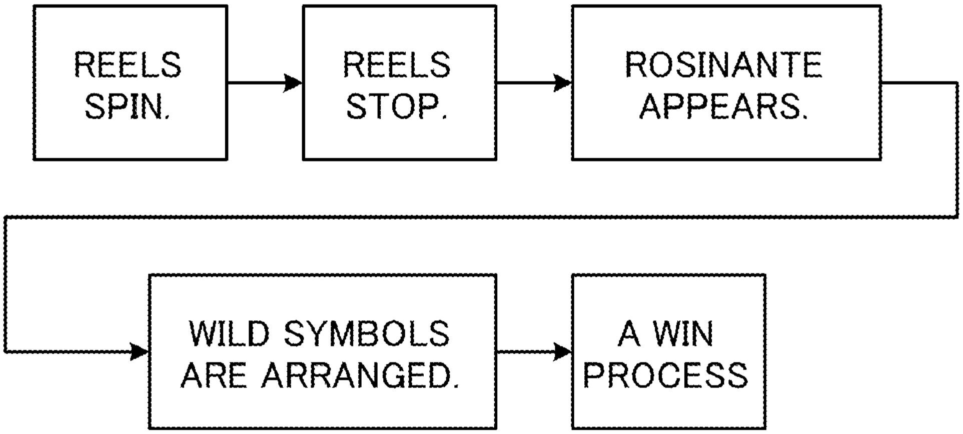
Figure 119A:
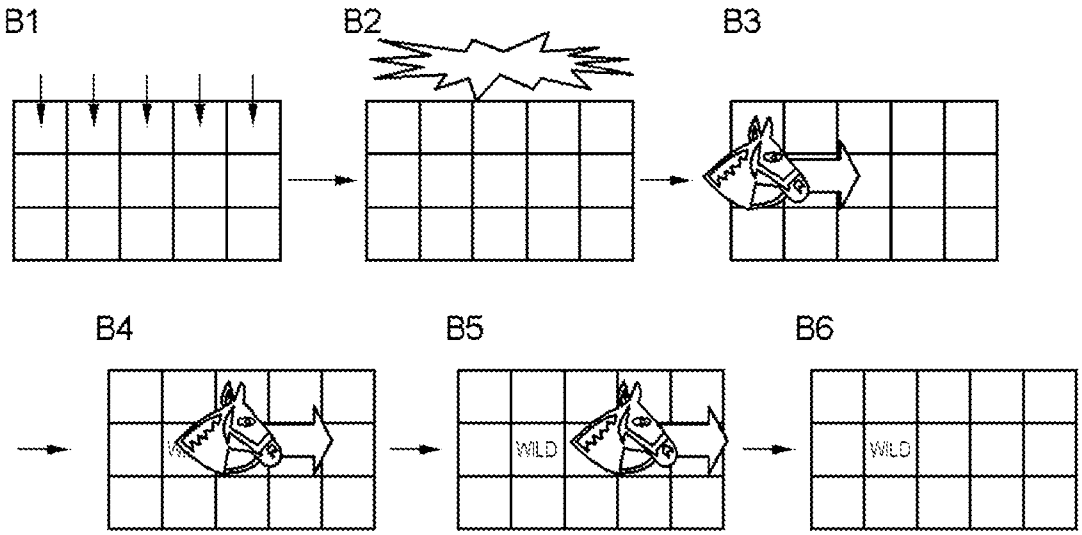
Figure 119B:
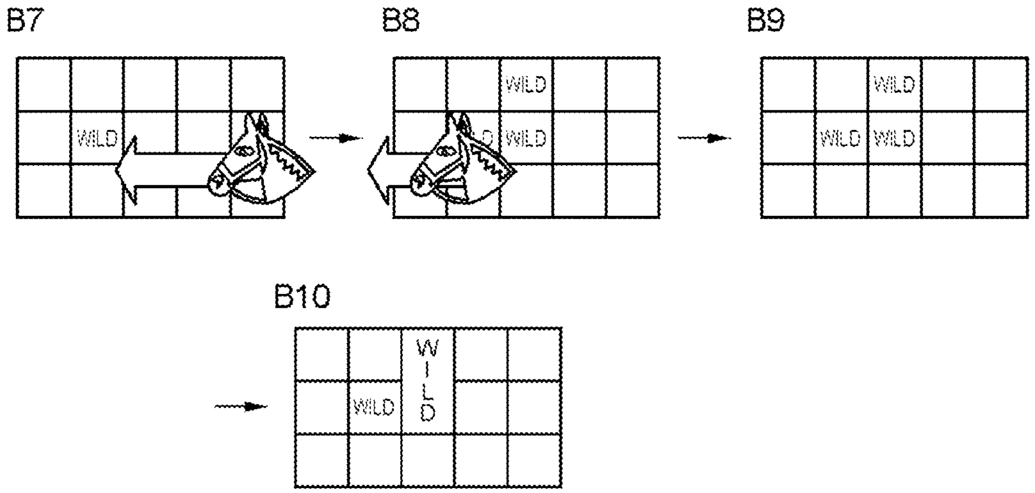
Figure 119C:
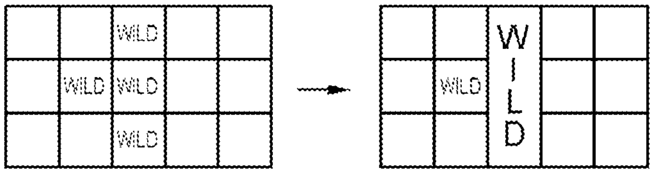
Figure 120A:
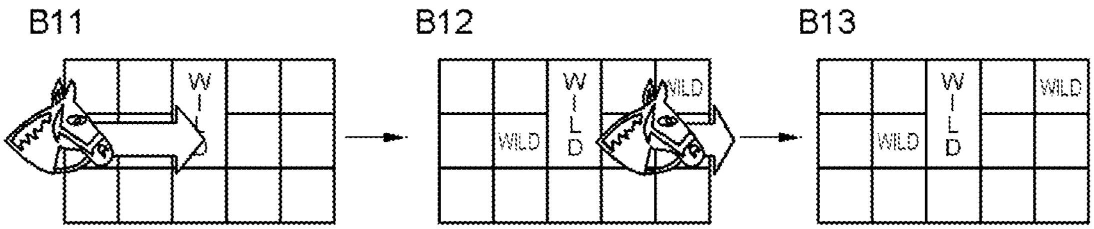
Figure 120B:
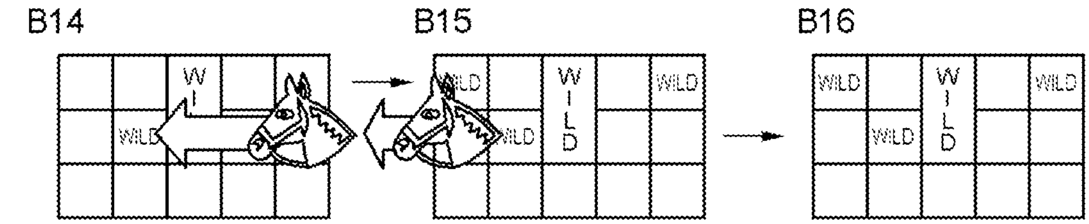
Figure 120C:
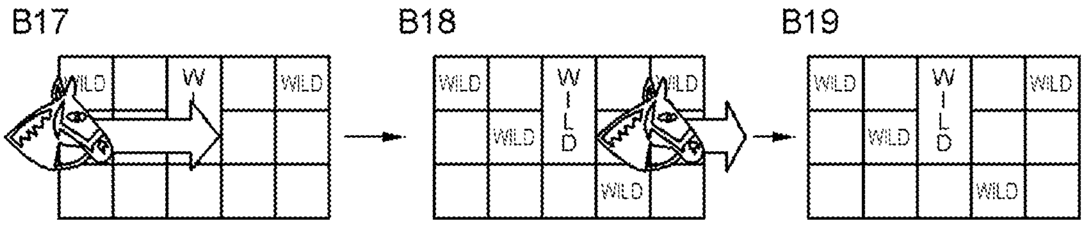
Figure 121:
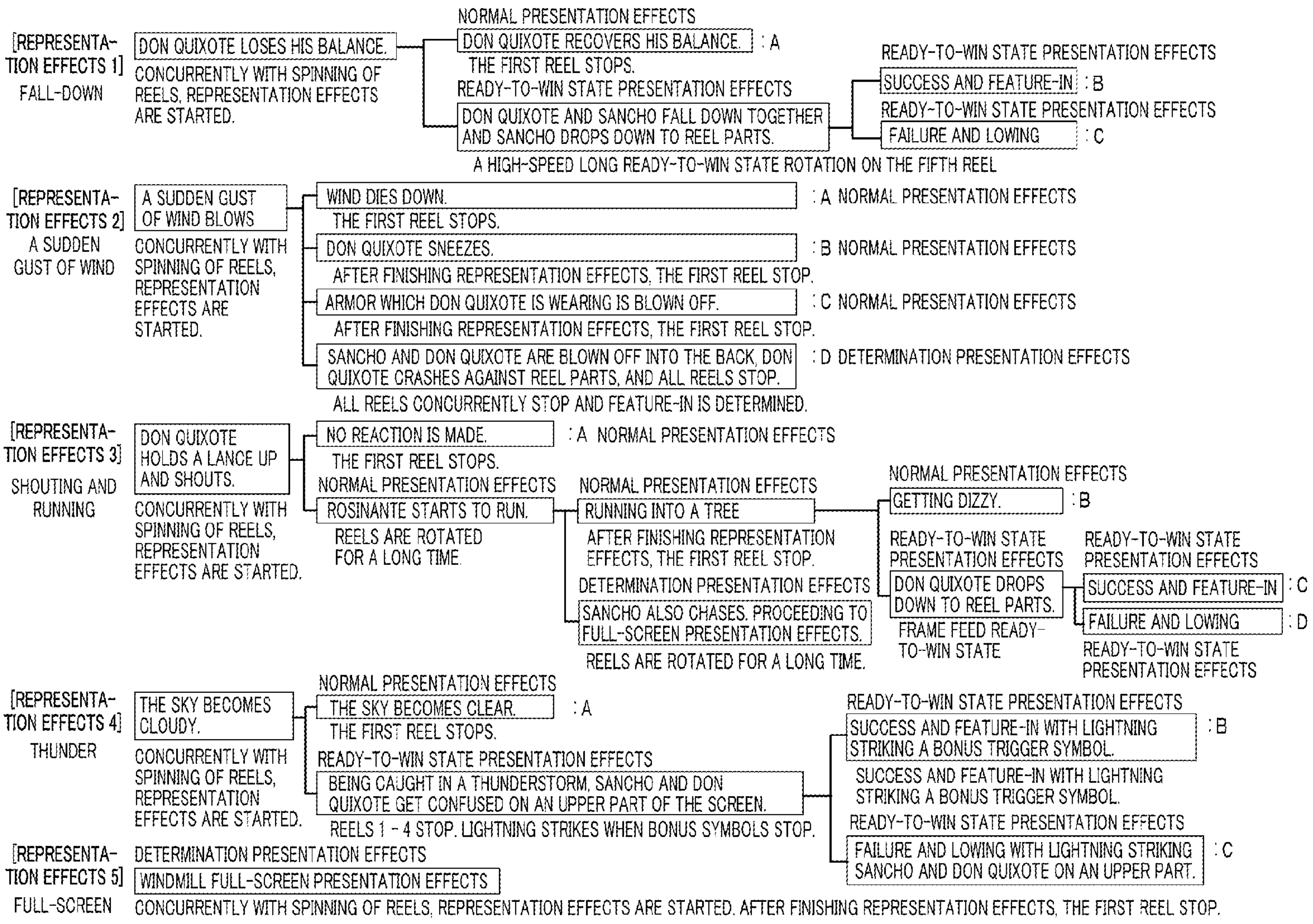
Figure 123:
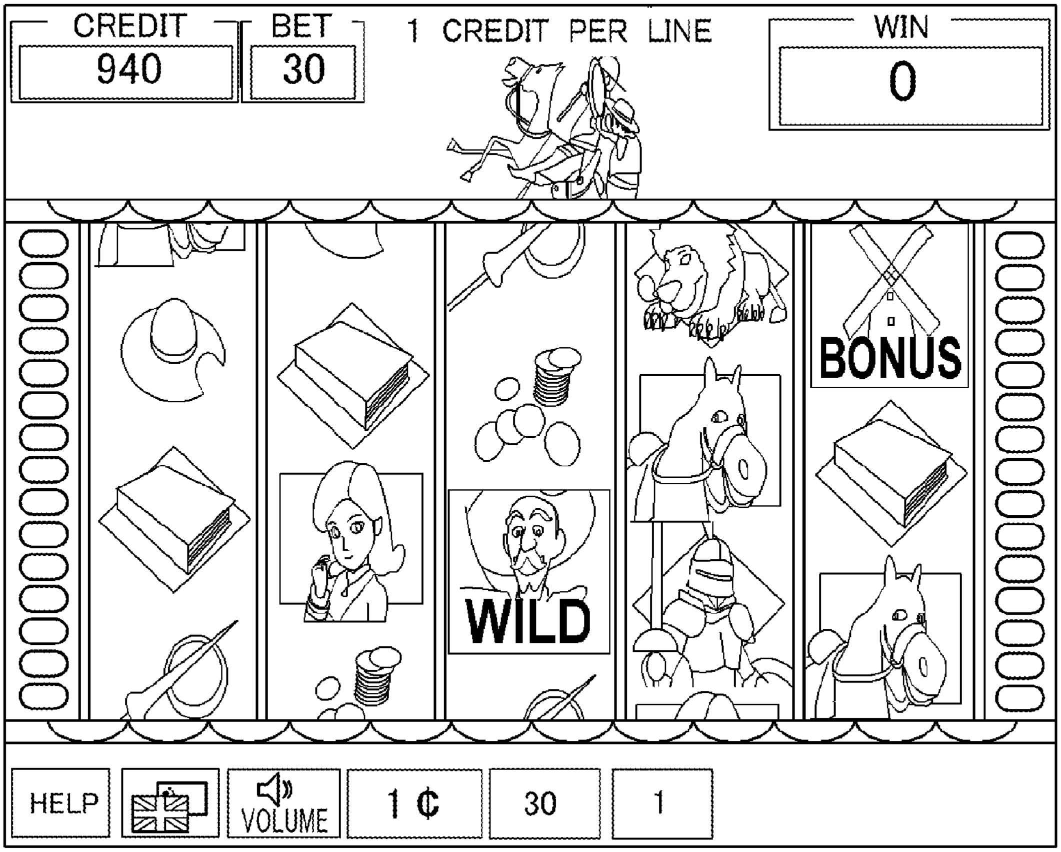
Figure 124:
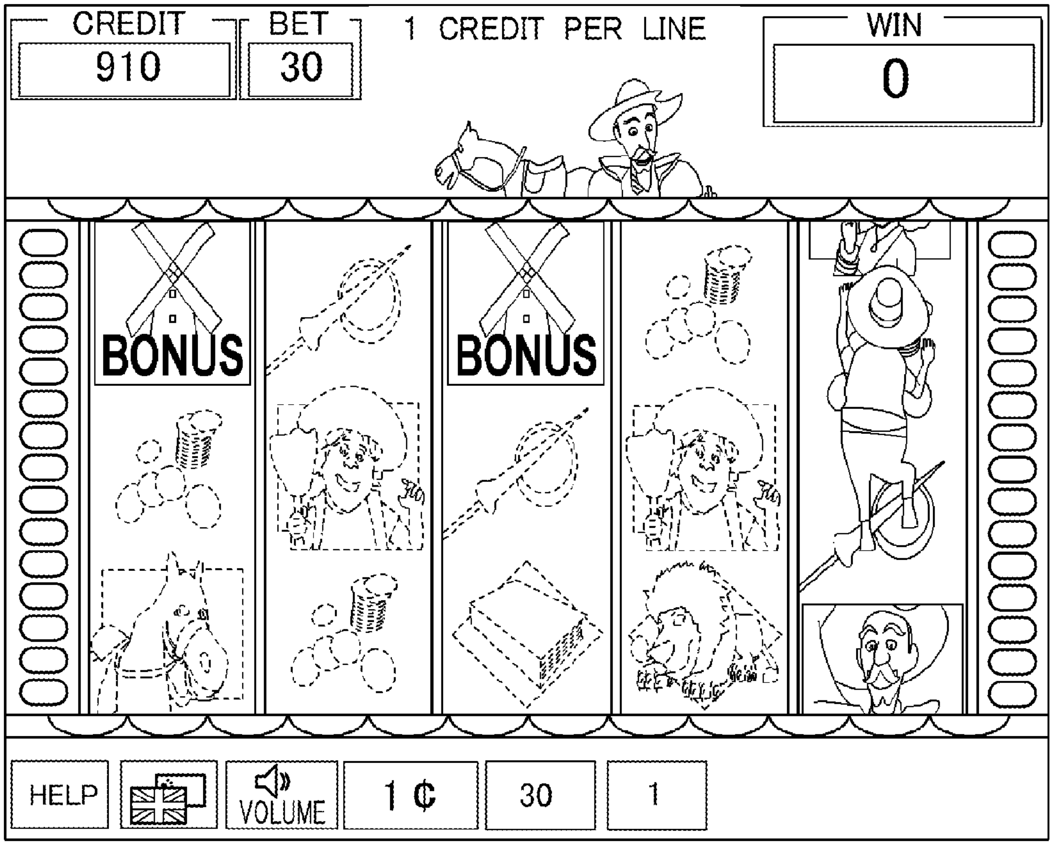
Figure 125:
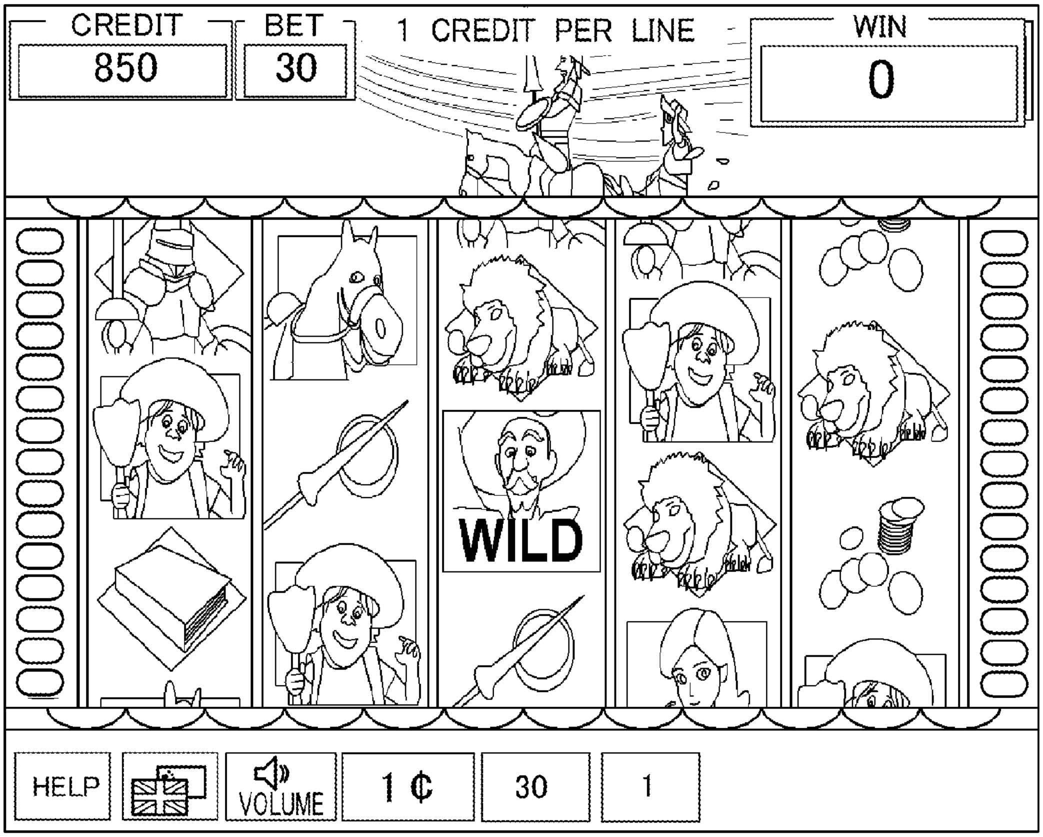
Figure 126:
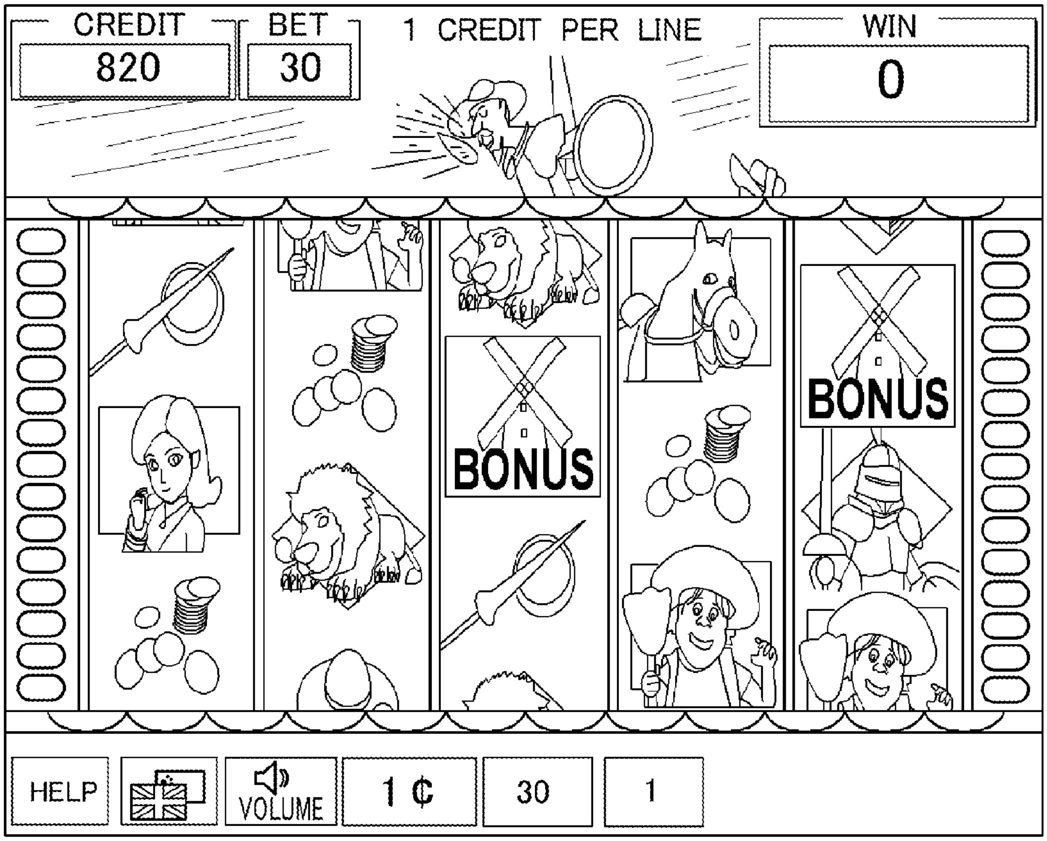
Figure 127:
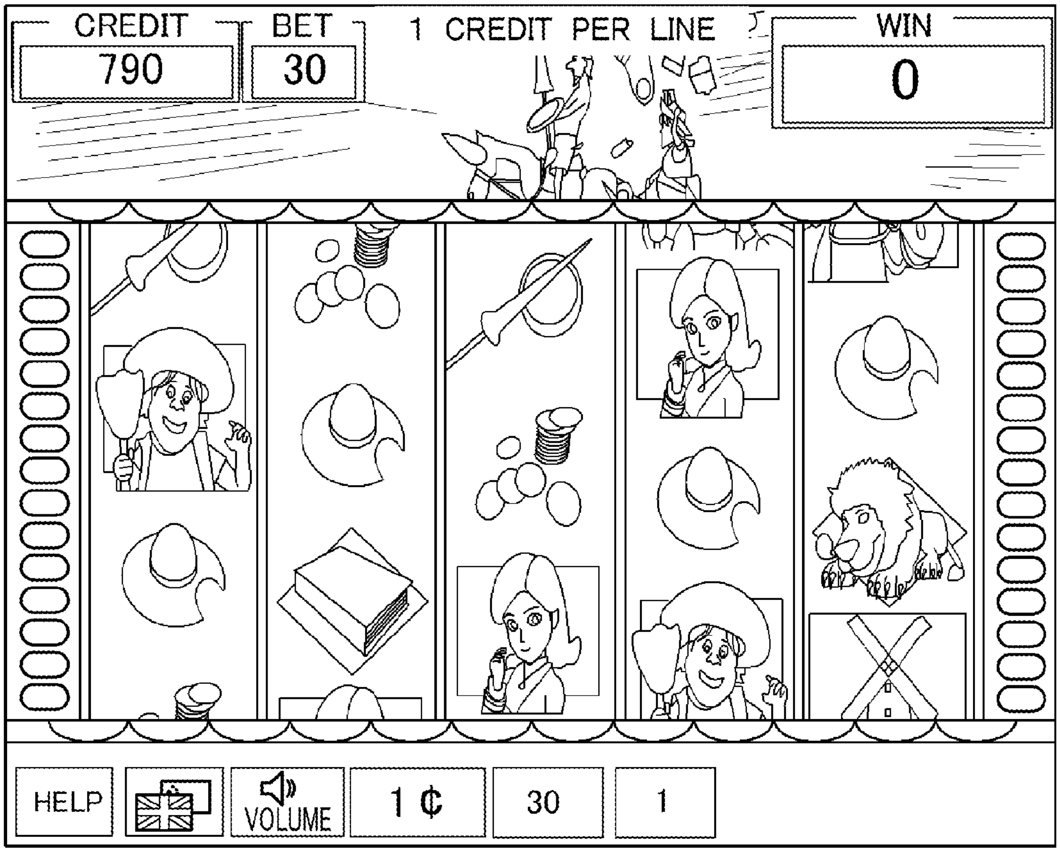
Figure 128:
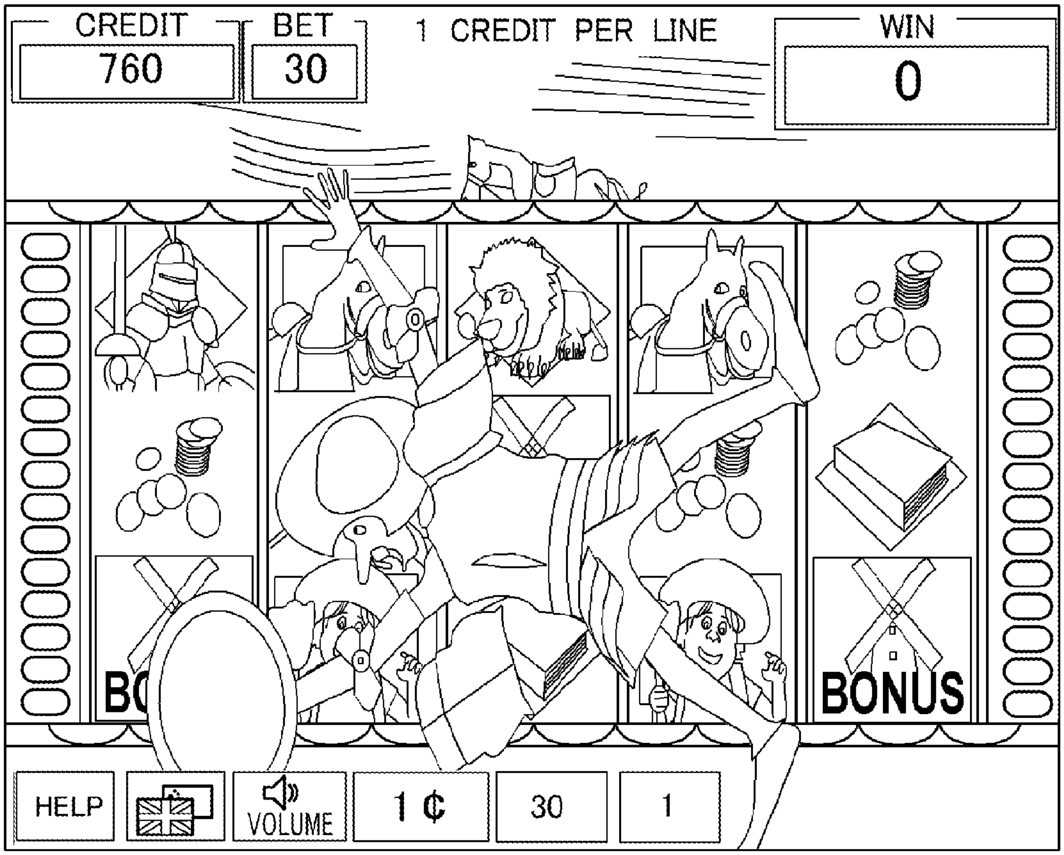
Figure 129:
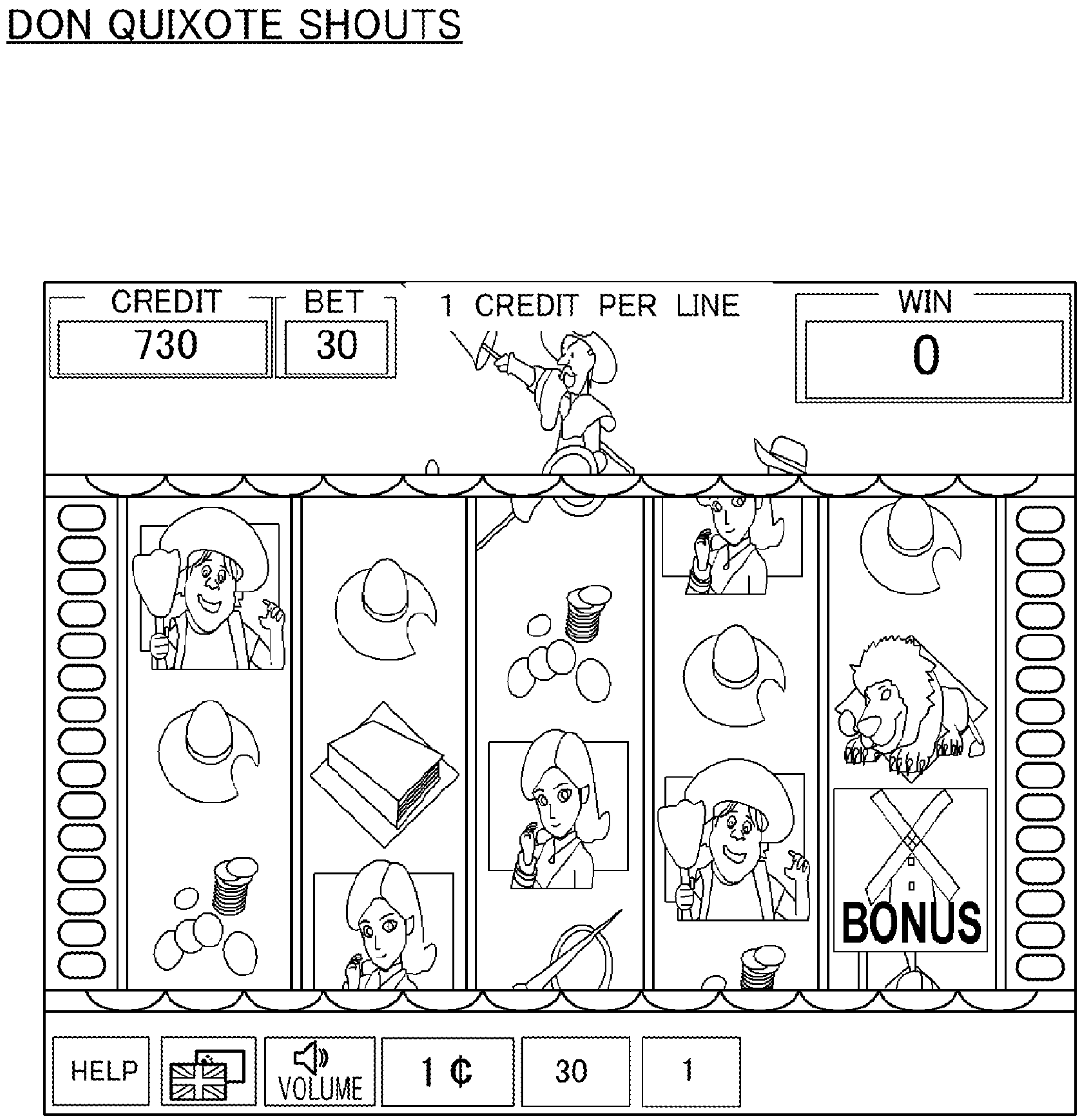
Figure 130:
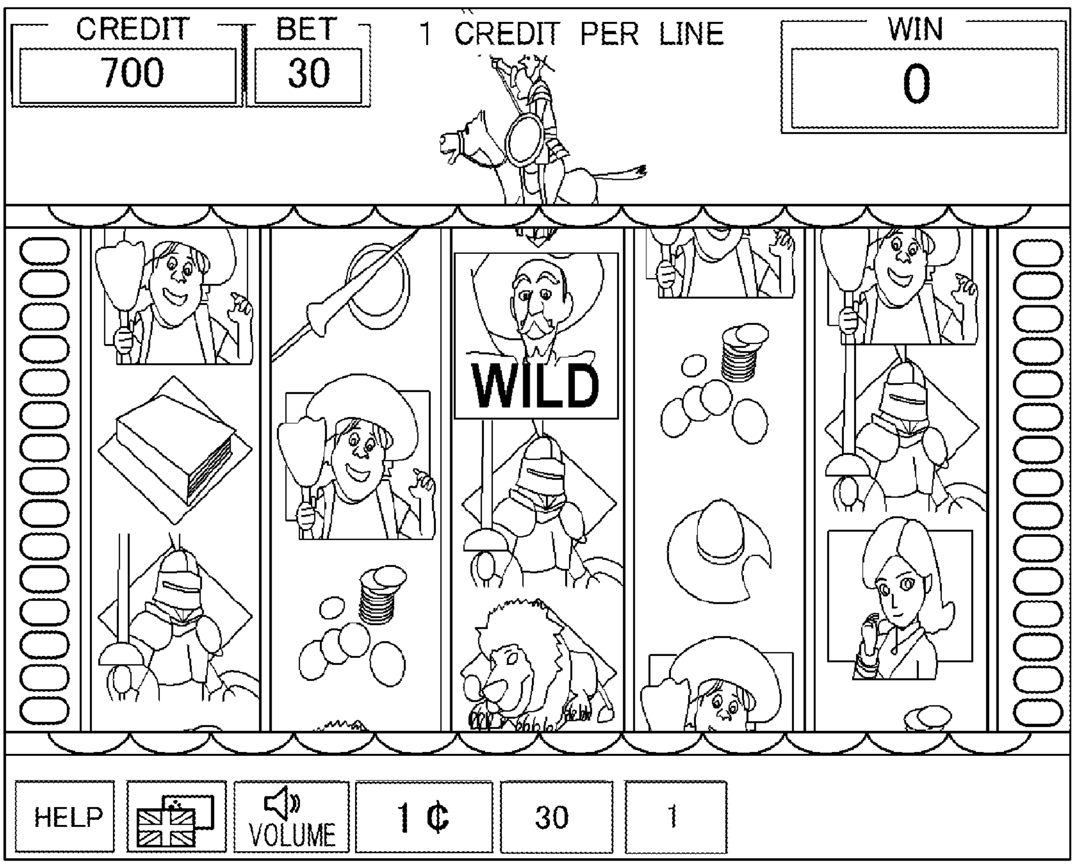
Figure 131:
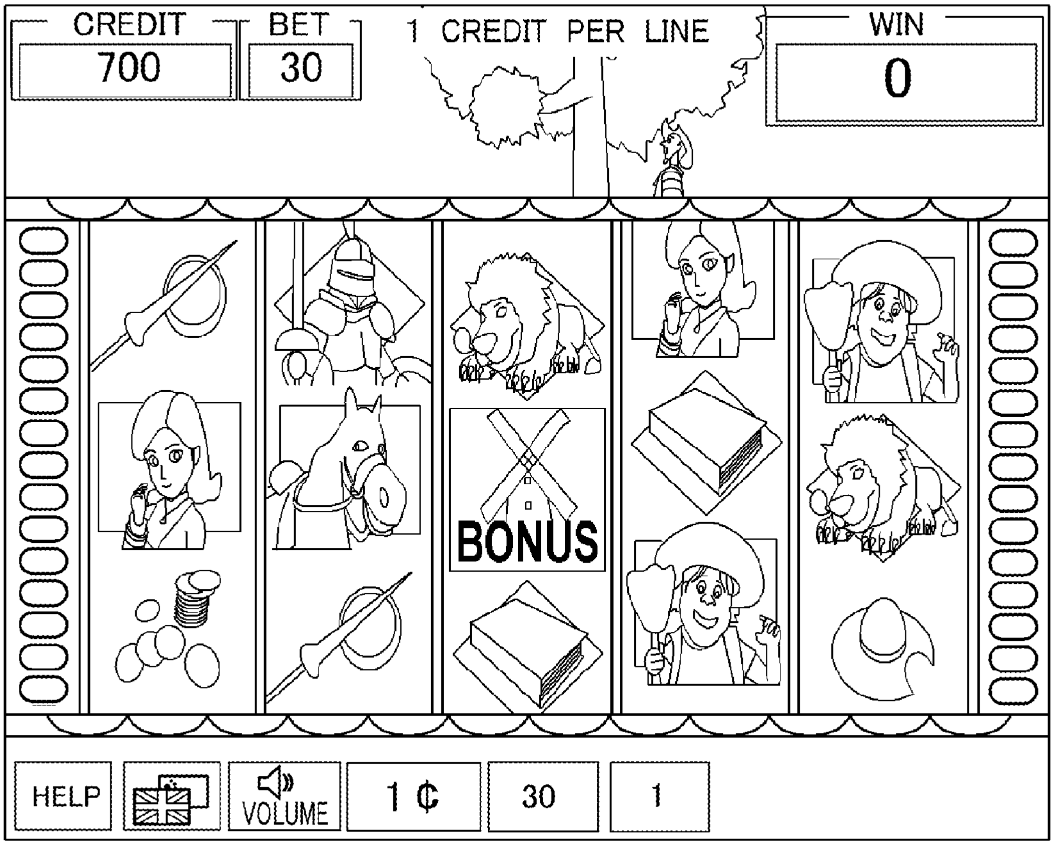
Figure 132:
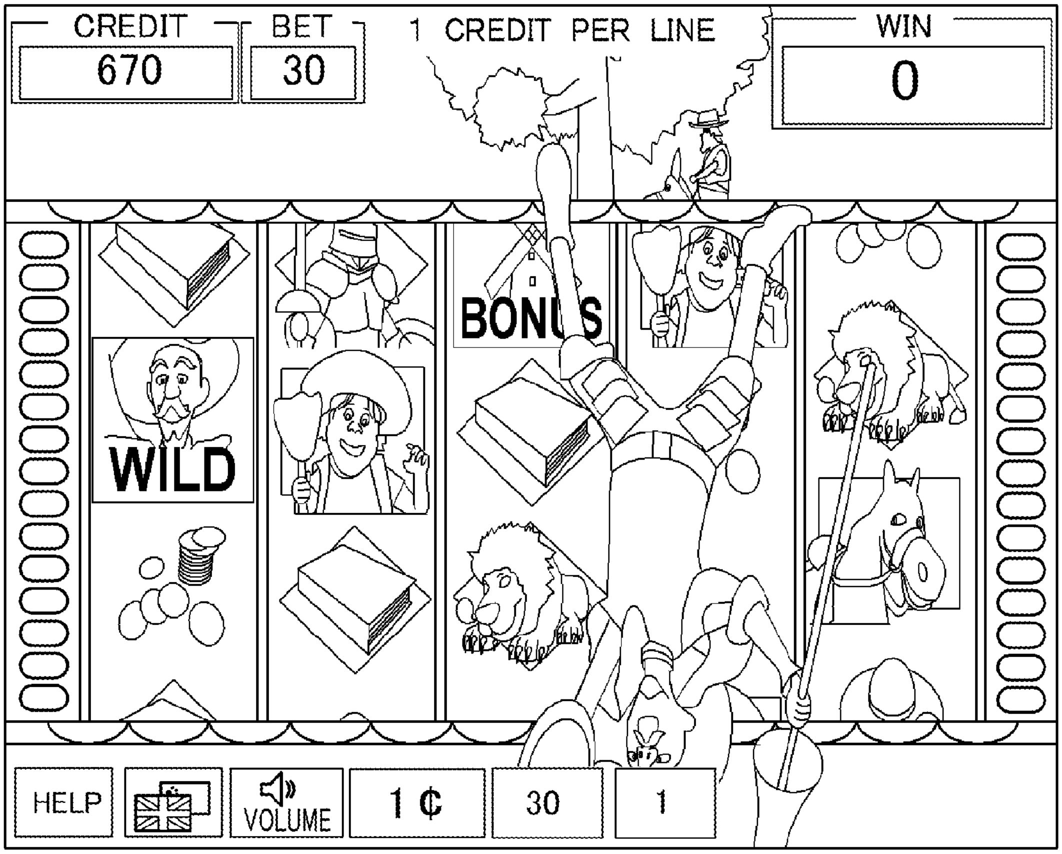
Figure 133:
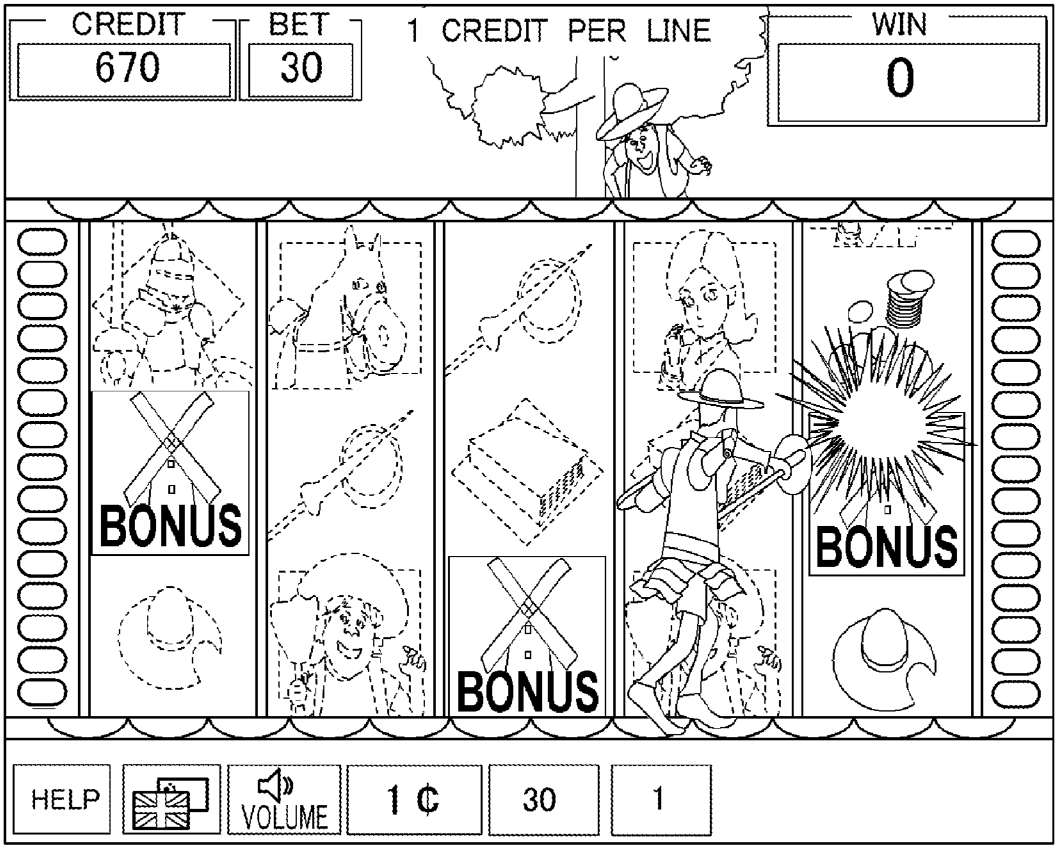
Figure 134:
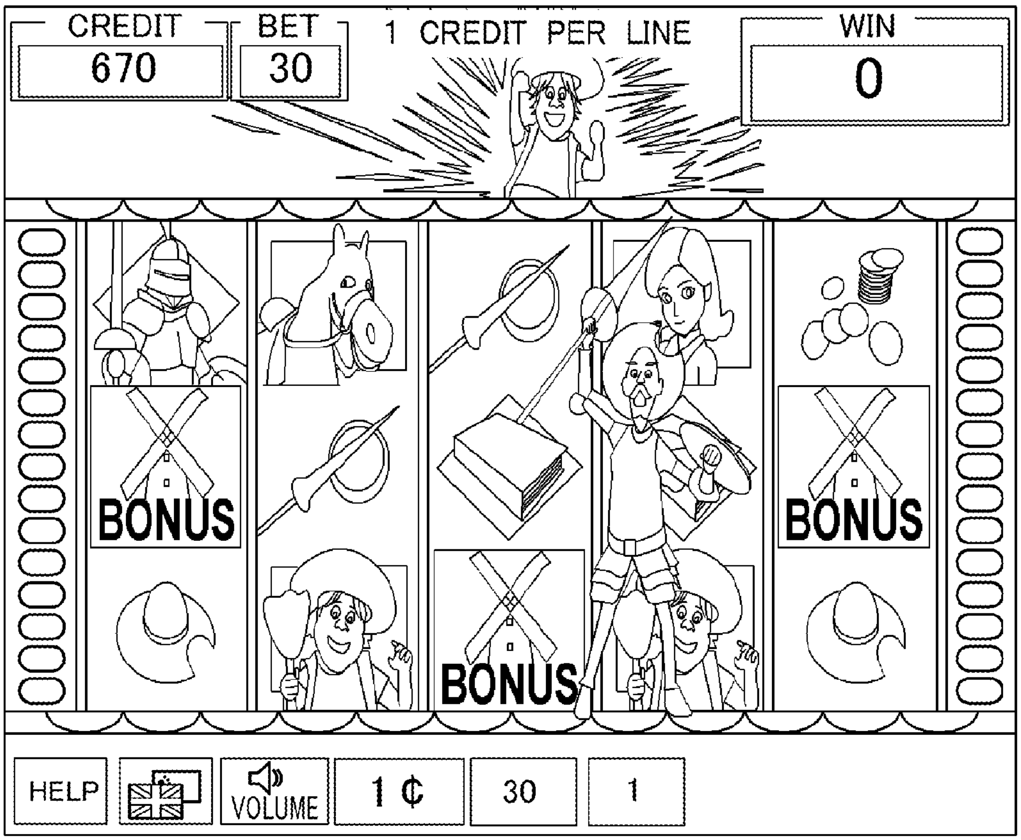
Figure 135:
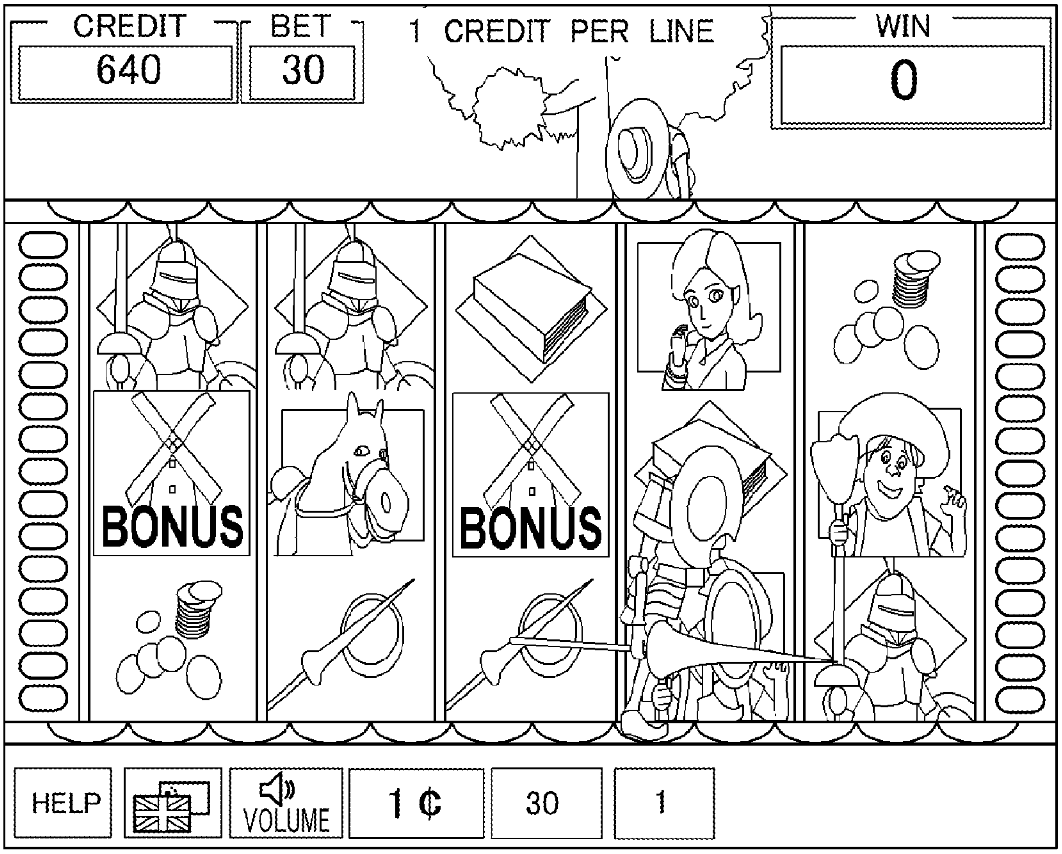
Figure 136:
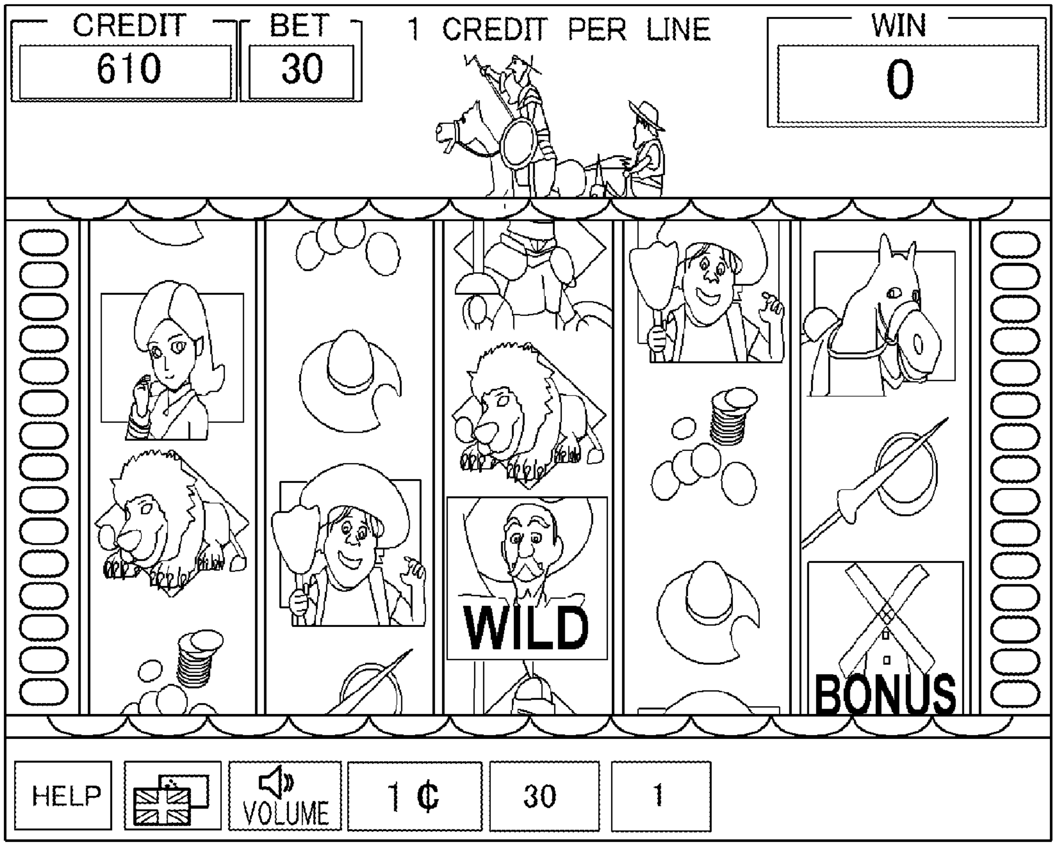
Figure 137:
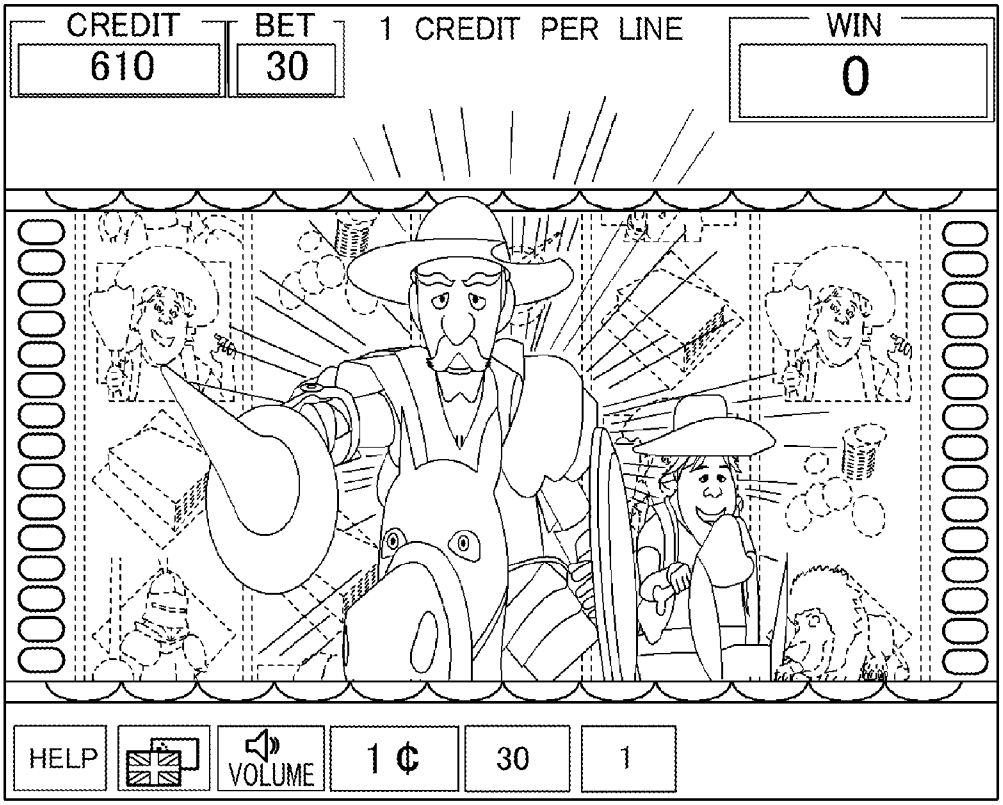
Figure 138:
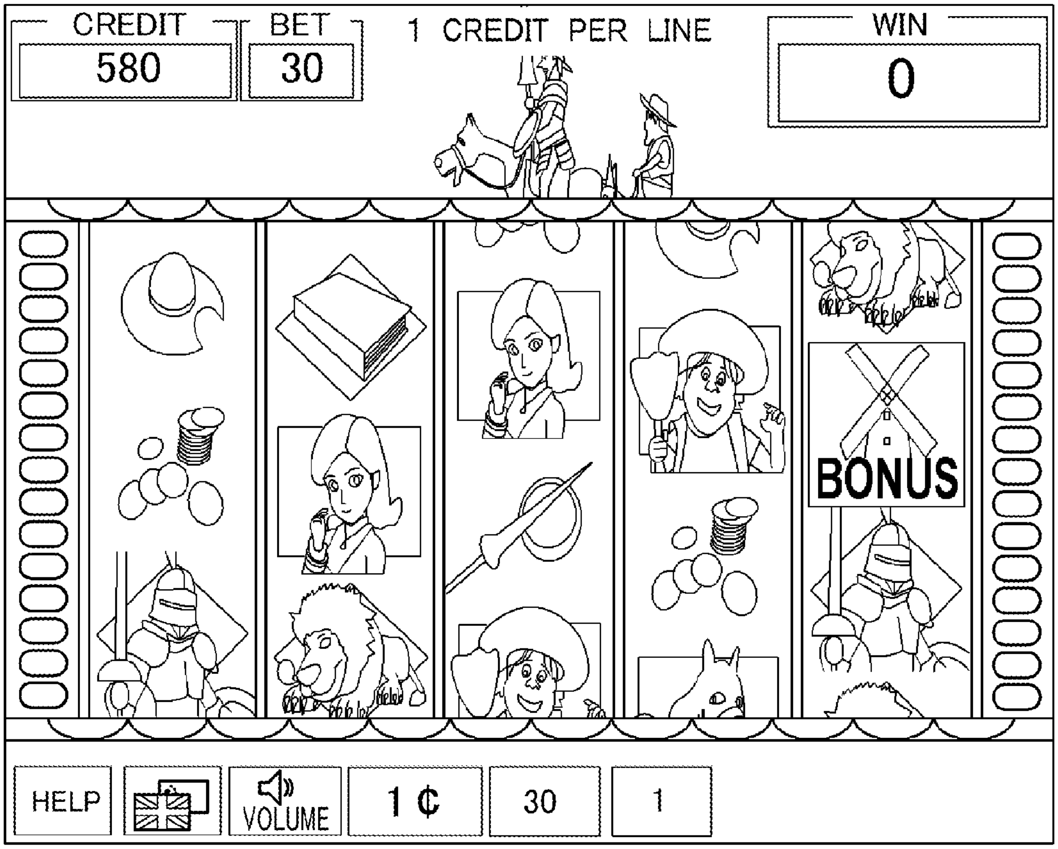
Figure 139:
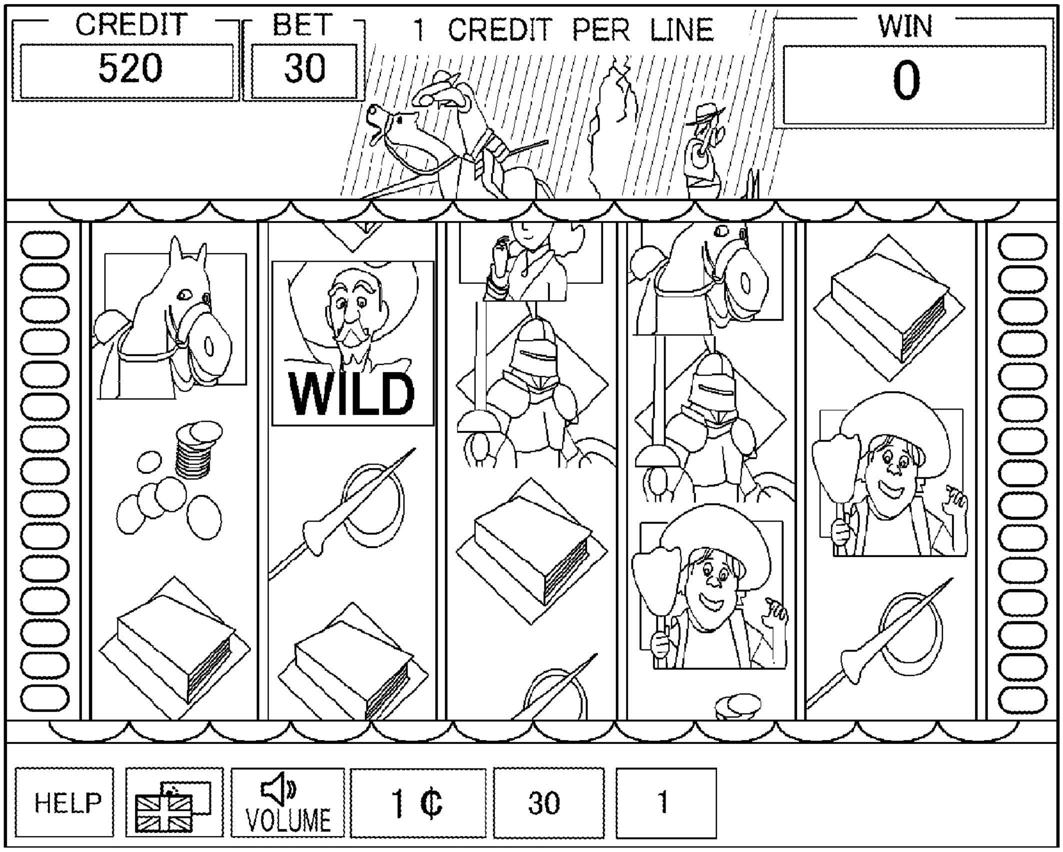
Figure 140:
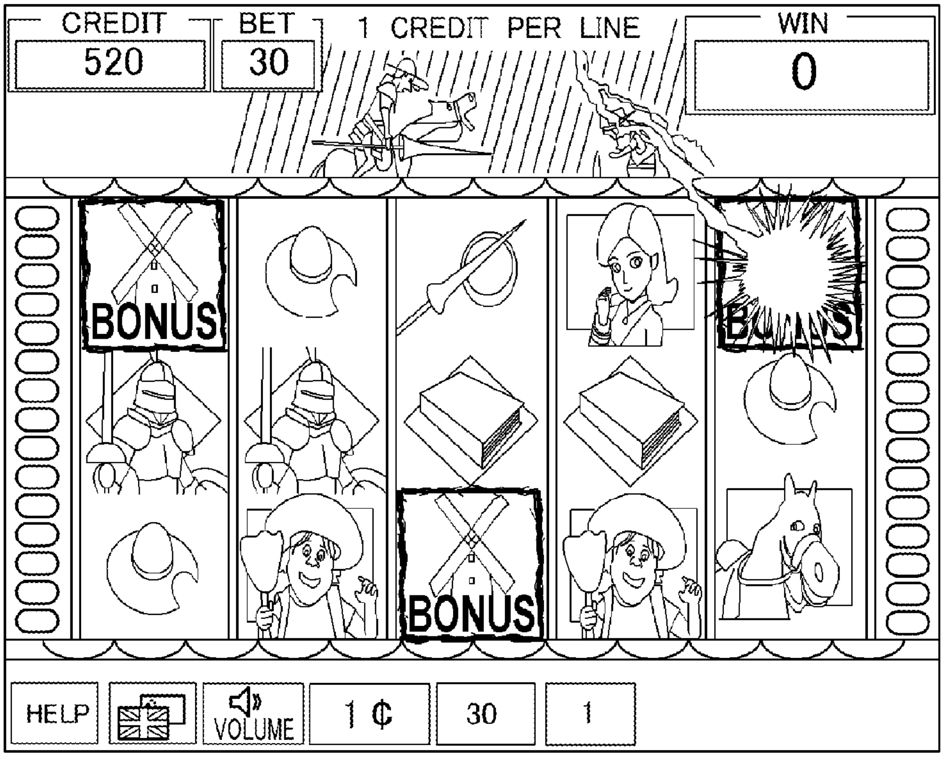
Figure 141:
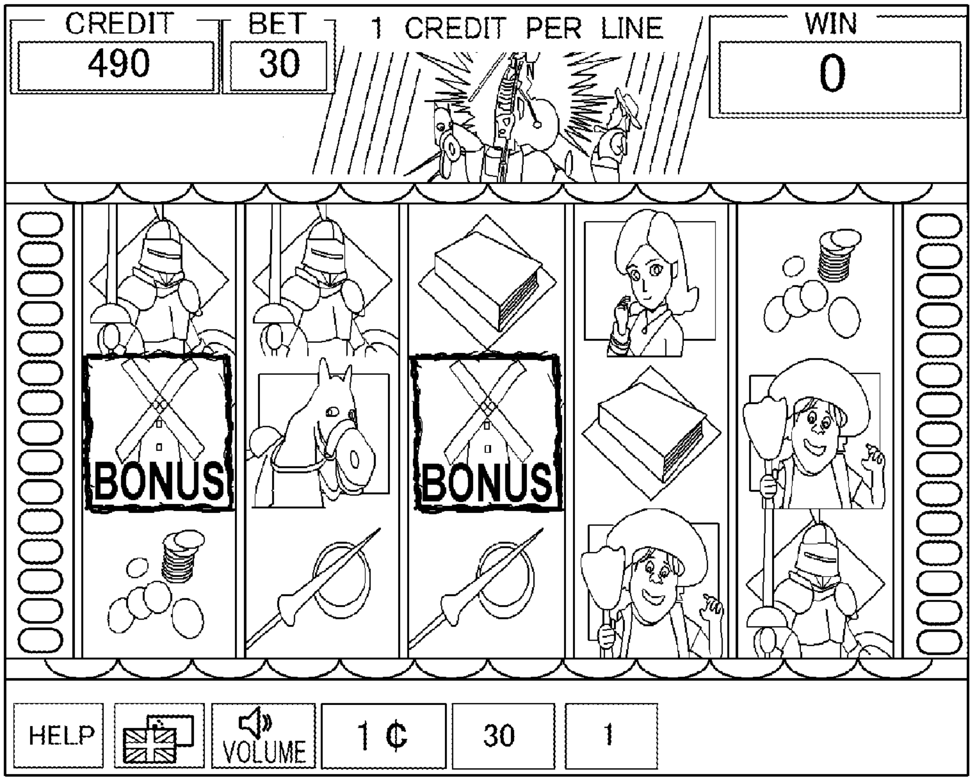
Figure 142:
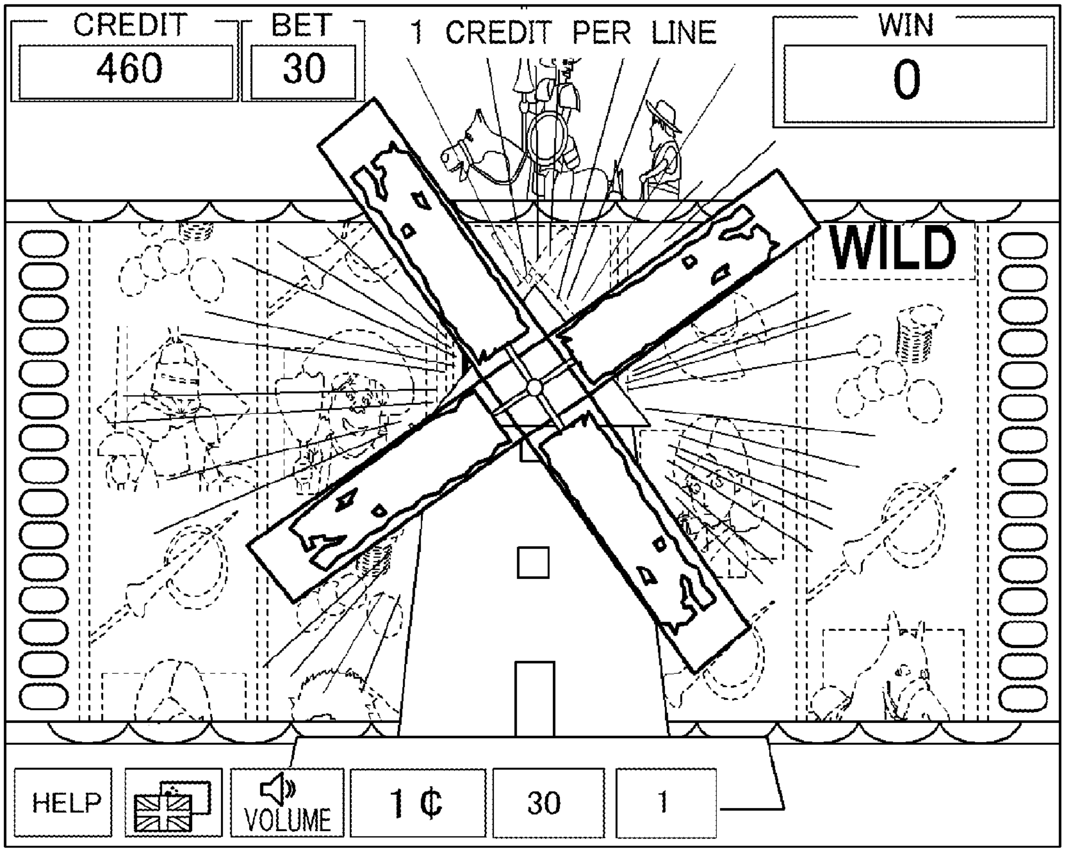

FIG. 93A is an explanatory diagram of the operation process of the fight-against-lion game;

FIG. 93B is an explanatory diagram of the operation process of the fight-against-lion game;

FIG. 94 is an explanatory diagram of a modified example of the fight-against-lion game;

FIG. 95 is an explanatory diagram of an operation process of a jackpot challenge game;

FIG. 96 is an explanatory diagram of the operation process of the jackpot challenge game;

FIG. 97 is an explanatory diagram of the operation process of the jackpot challenge game;

FIG. 98A is an explanatory diagram of the operation process of the jackpot challenge game;

FIG. 98B is an explanatory diagram of the operation process of the jackpot challenge game;

FIG. 99A is an explanatory diagram of the operation process of the jackpot challenge game;

FIG. 99B is an explanatory diagram of the operation process of the jackpot challenge game;

FIG. 100A is an explanatory diagram of the operation process of the jackpot challenge game;

FIG. 100B is an explanatory diagram of the operation process of the jackpot challenge game;

FIG. 101A is an explanatory diagram of the operation process of the jackpot challenge game;

FIG. 101B is an explanatory diagram of the operation process of the jackpot challenge game;

FIG. 102 is an explanatory diagram of the operation process of the jackpot challenge game;

FIG. 103A shows revival drawing tables in a windmill destruction game (revival chance game);

FIG. 103B shows revival drawing tables in a windmill destruction game (revival chance game);

FIG. 104 is an explanatory diagram of an operation process of the windmill destruction game (revival chance game);

FIG. 105 is an explanatory diagram of the operation process of the windmill destruction game (revival chance game);

FIG. 106A is an explanatory diagram of the operation process of the windmill destruction game (revival chance game);

FIG. 106B is an explanatory diagram of the operation process of the windmill destruction game (revival chance game);

FIG. 107 is an explanatory diagram of the operation process of the windmill destruction game (revival chance game);

FIG. 108 is an explanatory diagram of the operation process of the windmill destruction game (revival chance game);

FIG. 109 is an explanatory diagram of the operation process of the windmill destruction game (revival chance game);

FIG. 110 is an explanatory diagram of the operation process of the windmill destruction game (revival chance game);

FIG. 111 is an explanatory diagram of the operation process of the windmill destruction game (revival chance game);

FIG. 112A shows tables showing the defined numbers of times of moving-up of graduations in the windmill destruction game (revival chance game);

FIG. 112B shows tables showing the defined numbers of times of moving-up of graduations in the windmill destruction game (revival chance game);

FIG. 113A shows selection probability tables and an explanatory diagram of all-lighting-up drawing in the windmill destruction game (revival chance game);

FIG. 113B shows selection probability tables and an explanatory diagram of all-lighting-up drawing in the windmill destruction game (revival chance game);

FIG. 113C shows selection probability tables and an explanatory diagram of all-lighting-up drawing in the windmill destruction game (revival chance game);

FIG. 114A is an operation flow and an explanatory diagram of an operation process of a wild symbol expand game;

FIG. 114B is an operation flow and an explanatory diagram of an operation process of a wild symbol expand game;

FIG. 115A is an operation flow and an explanatory diagram of an operation process of the wild symbol expand game;

FIG. 115B is an operation flow and an explanatory diagram of an operation process of the wild symbol expand game;

FIG. 116 shows a premium presentation effects drawing table in the wild symbol expand game;

FIG. 117 shows an operation flow of a wild symbol scatter game;

FIG. 118A is an explanatory diagram of an operation process of the wild symbol scatter game;

FIG. 118B is an explanatory diagram of an operation process of the wild symbol scatter game;

FIG. 118C is an explanatory diagram of an operation process of the wild symbol scatter game;

FIG. 119A is an explanatory diagram of the operation process of the wild symbol scatter game;

FIG. 119B is an explanatory diagram of the operation process of the wild symbol scatter game;

FIG. 119C is an explanatory diagram of the operation process of the wild symbol scatter game;

FIG. 120A is an explanatory diagram of the operation process of the wild symbol scatter game;

FIG. 120B is an explanatory diagram of the operation process of the wild symbol scatter game;

FIG. 120C is an explanatory diagram of the operation process of the wild symbol scatter game;

FIG. 121 is an explanatory diagram of presentation effects patterns;

FIG. 122 is an explanatory diagram of the presentation effects patterns;

FIG. 123 is an explanatory diagram of presentation effects;

FIG. 124 is an explanatory diagram of presentation effects;

FIG. 125 is an explanatory diagram of presentation effects;

FIG. 126 is an explanatory diagram of presentation effects;

FIG. 127 is an explanatory diagram of presentation effects;

FIG. 128 is an explanatory diagram of presentation effects;

FIG. 129 is an explanatory diagram of presentation effects;

FIG. 130 is an explanatory diagram of presentation effects;

FIG. 131 is an explanatory diagram of presentation effects;

FIG. 132 is an explanatory diagram of presentation effects;

FIG. 133 is an explanatory diagram of presentation effects;

FIG. 134 is an explanatory diagram of presentation effects;

FIG. 135 is an explanatory diagram of presentation effects;

FIG. 136 is an explanatory diagram of presentation effects;

FIG. 137 is an explanatory diagram of presentation effects;

FIG. 138 is an explanatory diagram of presentation effects;

FIG. 139 is an explanatory diagram of presentation effects;

FIG. 140 is an explanatory diagram of presentation effects;

FIG. 141 is an explanatory diagram of presentation effects;

FIG. 142 is an explanatory diagram of presentation effects;

FIG. 143 shows presentation effects drawing tables;

FIG. 144 shows a table showing degrees of bonus reliability of the respective presentation effects; and FIG. 145 shows a table showing occurrence frequencies of the respective presentation effects.

DESCRIPTION OF THE PREFERRED EMBODIMENTS

A gaming machine according to the present invention triggers a plurality of kinds of bonus games including a progressive bonus game when a game outcome of a base game includes a predetermined number of bonus trigger symbols. Instead of including the progressive bonus game, the plurality of kinds of bonus games may includes a first bonus game and a second bonus game which fixed payouts, differing from each other, are provided in accordance with the game outcome of the base game. The reason is that the present invention has a feature in that a difference is made between a probability (i) with which it is randomly determined whether or not one of the plurality of kinds of bonus games is executed again after finishing the progressive bonus game whose payout is extremely large as compared with those of the other bonus games and a probability (ii) with which it is randomly determined whether or not one of the plurality of kinds of bonus games is executed again after finishing the other bonus games. More specifically, the probability (i) is set to be lower than the probability (ii). From the similar point of view, not being the payout in the progressive bonus game which varies depending on accumulated amounts of the payouts, the payouts of both of the first bonus game and second bonus game are fixed and the payout of the second bonus game is made larger than that of the first bonus game, thereby allowing the similar object to be achieved. This object is to adjust a balance between the payouts by lowering a likelihood of retriggering the bonus game from a state in which the large payout has been obtained, through employing a configuration in which looping of the bonus games is conducted.

The gaming machine according to the present invention includes at least a display, a storage device, and a game controller.

The display is to display a game outcome and rearrange a plurality of symbols in a manner of a matrix composed of a plurality of rows and columns.

The storage device has stored thereon at least the following programs and tables.

(1) Game programs to execute the base game and the plurality of kinds of bonus games.

(2) A plurality of bonus game loop drawing tables used for drawing for determining whether or not the bonus game is retriggered immediately after finishing the bonus game.

(3) First presentation effects data related to predictive presentation effects to be displayed on the display when a game outcome is a drawing outcome which triggers the bonus game.

(4) Second presentation effects data related to predictive presentation effects to be displayed on the display when a game outcome is a drawing outcome which includes a particular number of bonus trigger symbols which is one fewer than the predetermined number.

(5) Third presentation effects data related to predictive presentation effects to be displayed on the display when a game outcome is not a drawing outcome which includes the predetermined number or the particular number of bonus trigger symbols.

The game controller is programmed to execute the below-described (A-1) and (A-2) processes, the below-described (B-1) and (B-2) processes, the below-described (C-1) to (C-4) processes, the below-described (D-1) to (D-3) processes, and the below-described (E-1) and (E-2) processes.

(A-1) A process in which when the base game is executed and a bonus game other than the progressive bonus game is triggered, a payout according to a bonus is provided, and a drawing for determining whether or not, subsequently to the finishing of the bonus game, a bonus game is retriggered is conducted using a first bonus game loop drawing table of the plurality of bonus game loop drawing tables.

(A-2) A process in which when the base game is executed and the progressive bonus game is triggered, a payout of a progressive bonus in the progressive bonus game is provided and a drawing for determining whether or not, subsequently to the finishing of the bonus game, a bonus game is retriggered is conducted using a second bonus game loop drawing table of the plurality of bonus game loop drawing tables, a retrigger winning probability in the second bonus game loop drawing table being lower than a retrigger winning probability in the first bonus game loop drawing table.

(B-1) A process in which presentation effects determined based on a game outcome are displayed on the display.

(B-2) A process in which in a case where the predictive presentation effects are those determined based on the first presentation effects data or the second presentation effects data, when particular presentation effects are selected, a cancel operation of the predictive presentation effects is deactivated until the predictive presentation effects are finished.

(C-1) A process for drawing for determining a game outcome which results through rearranging a plurality of symbols on the display.

(C-2) A process for a drawing for causing the display to rearrange wild symbols on the display.

(C-3) A process for causing the display to display the game outcome in the process (C-1).

(C-4) A process in which when the drawing outcome in the process (C-2) is that the wild symbols are rearranged, after the plurality of symbols have been rearranged on the display, a character is caused to appear on the display, the wild symbols are rearranged in one column when the character appears at one time and the character is caused to appear at a plurality of times when the wild symbols are rearranged in two or more columns, and the wild symbols are rearranged at the plurality of times, at each of which the wild symbols in one column are rearranged.

(D-1) A process for drawing for rearranging the wild symbols collectively in one column on the display.

(D-2) A process for drawing for determining, when the drawing outcome of the drawing in the process (D-1) is that the wild symbols are rearranged in two or more columns, whether or not premium presentation effects, occurring only when the wild symbols are displayed in two or more columns, are performed.

(D-3) A process in which the premium presentation effects are performed on the condition that it is determined in the process (D-2) that the premium presentation effects are performed.

(E1) A process in which when the base game is executed and a bonus game of one of the first bonus game and the second bonus game is triggered, a fixed payout according to a bonus in the one bonus game is provided, and a drawing for determining whether or not, subsequently to the finishing of the bonus game, a bonus game is retriggered is conducted using the first bonus game loop drawing table of the plurality of bonus game loop drawing tables.

(E2) A process in which when the base game is executed and a bonus game the other bonus game, distinct from the one bonus game, of the first bonus game and the second bonus game is triggered, a fixed payout of a bonus in the other bonus game is provided and a drawing for determining whether or not, subsequently to the finishing of the bonus game, a bonus game is retriggered is conducted using the second bonus game loop drawing table of the plurality of bonus game loop drawing tables, a retrigger winning probability in the second bonus game loop drawing table being lower than a retrigger winning probability in the first bonus game loop drawing table.

Here, in the present invention, "to trigger" is to activate an initial bonus game and "to retrigger" is to activate a bonus game occurring subsequent to the finishing of the initial bonus game. In this way, "to trigger" and "to retrigger" are in common with each other in that the bonus game is each activated.

In the present invention, a "trigger" condition is, for example, that a predetermined number of trigger symbols (three bonus symbols in the present embodiment) are rearranged on the display, and a "retrigger" condition is that predetermined presentation effects (presentation effects in windmill destruction presentation effects, in which a windmill is destroyed, in the present embodiment) occur. In this way, in the present invention, the "trigger" condition and the "retrigger" condition are different from each other and are activated by the different conditions.

As described above, "to trigger" and "to retrigger" are different from each other in the condition to "trigger" ("retrigger") the bonus game. However, "to trigger" and "to retrigger" are not necessarily required to be different from each other as triggering (a phenomenon corresponding thereto) which is recognized by a player, the "trigger" condition and the "retrigger" conditions may be the same as each other. As one example thereof, when the "trigger" condition is that the predetermined number of bonus symbols are rearranged, the "retrigger" condition may be that the predetermined number of bonus symbols are rearranged as with the "trigger" condition. More specifically, when the "trigger" condition is that the three bonus symbols are rearranged on the display, the "retrigger" condition, which is to activate the bonus game occurring subsequent to the finishing of the initial bonus game, may be that the three bonus symbols are rearranged on the display as with the "trigger" condition. In this case, the rearrangement of the three bonus symbols in "retriggering" may be conducted during the execution of the bonus game and may be conducted by respinning after the finishing of the bonus game. In the former case, the bonus game being previously conducted is forcibly terminated, and as a result, the bonus game to be "retriggered" is conducted immediately after the finishing the previously conducted bonus game.

In the present invention, the "progressive bonus game" is a bonus game in which a portion or all of a fund obtained by accumulating a portion of bet amounts is provided at one time or a plurality of times during the execution of the game on the display. In particular, a bonus game, among the above-described bonus games, in which all of the accumulated fund is provided all at once at one time and thereafter, the game is finished is referred to as a progressive jackpot game.

The display for rearranging the symbols and the display for displaying the predictive presentation effects or the presentation effects to display character images related to particular symbols such as the wild symbols may be implemented by one display or be individually implemented by a plurality of displays.

Figure 1:
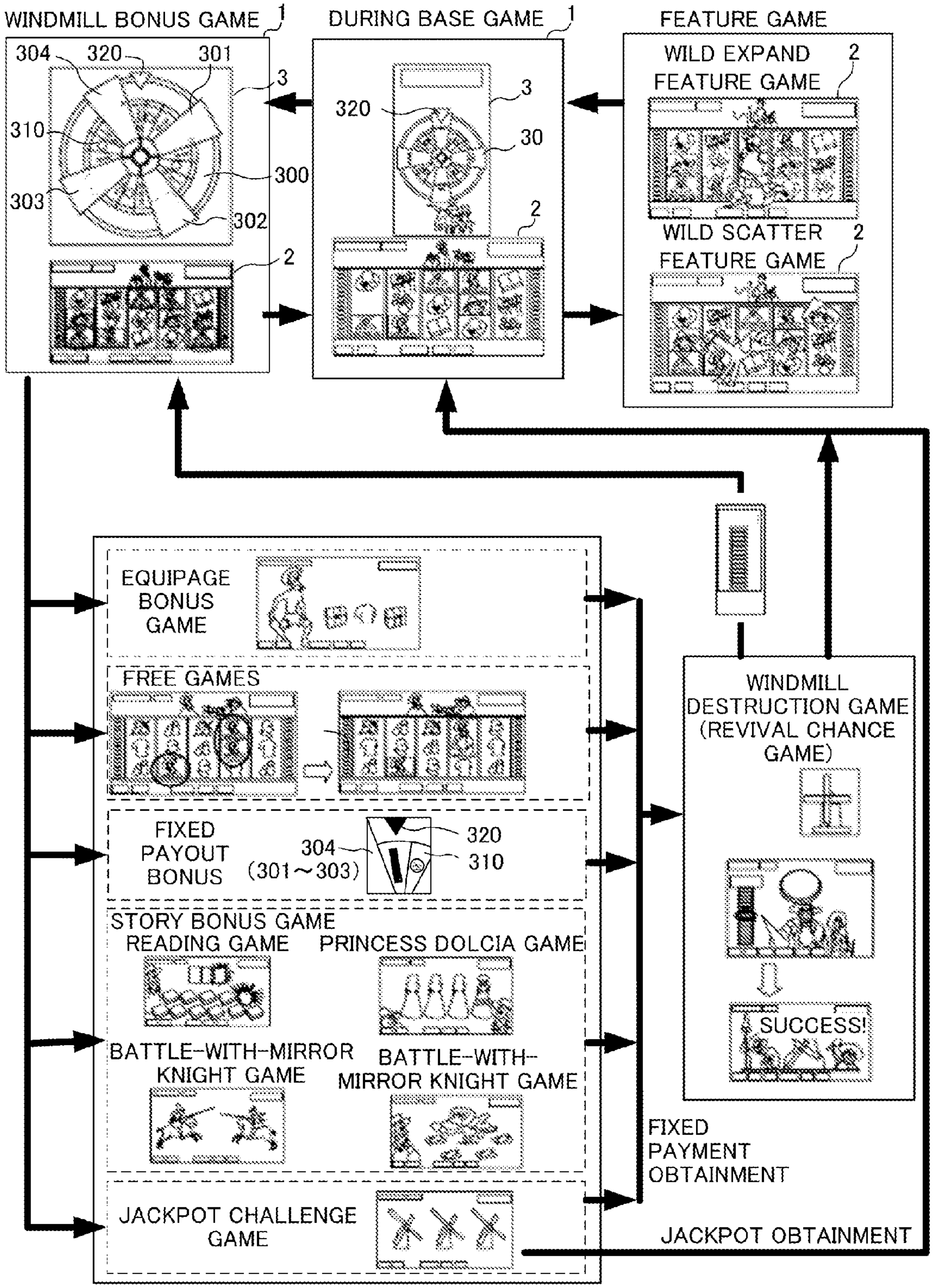
FIG. 1 is a basic game flow of a gaming machine.

As shown in FIG. 1, each of gaming machines 1 includes a display 2 and a top box 3.

Figure 8:
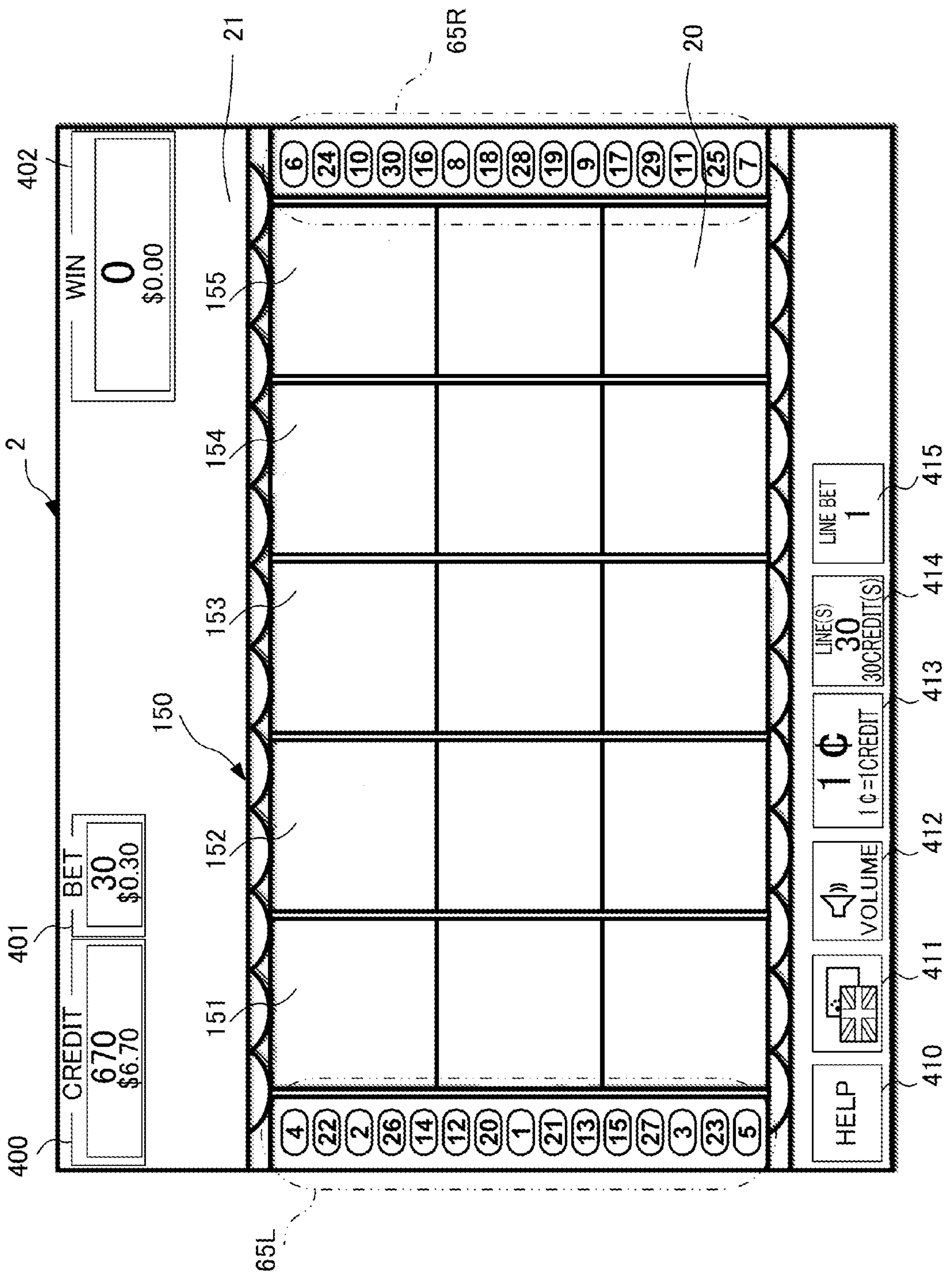
FIG. 8 is an explanatory diagram of a display image on a display.

The display 2 is to display a rearrangement drawing outcome of a plurality of symbols. As shown in FIG. 8, the display 2 has a symbol display region 20 and a presentation effects display region 21. On the symbol display region 20, a plurality of symbols are rearranged in a manner of a matrix having three rows and five columns. On the presentation effects display region 21, a variety of presentation effects such as presentation effects for the bonus game are displayed.

Figure 7:
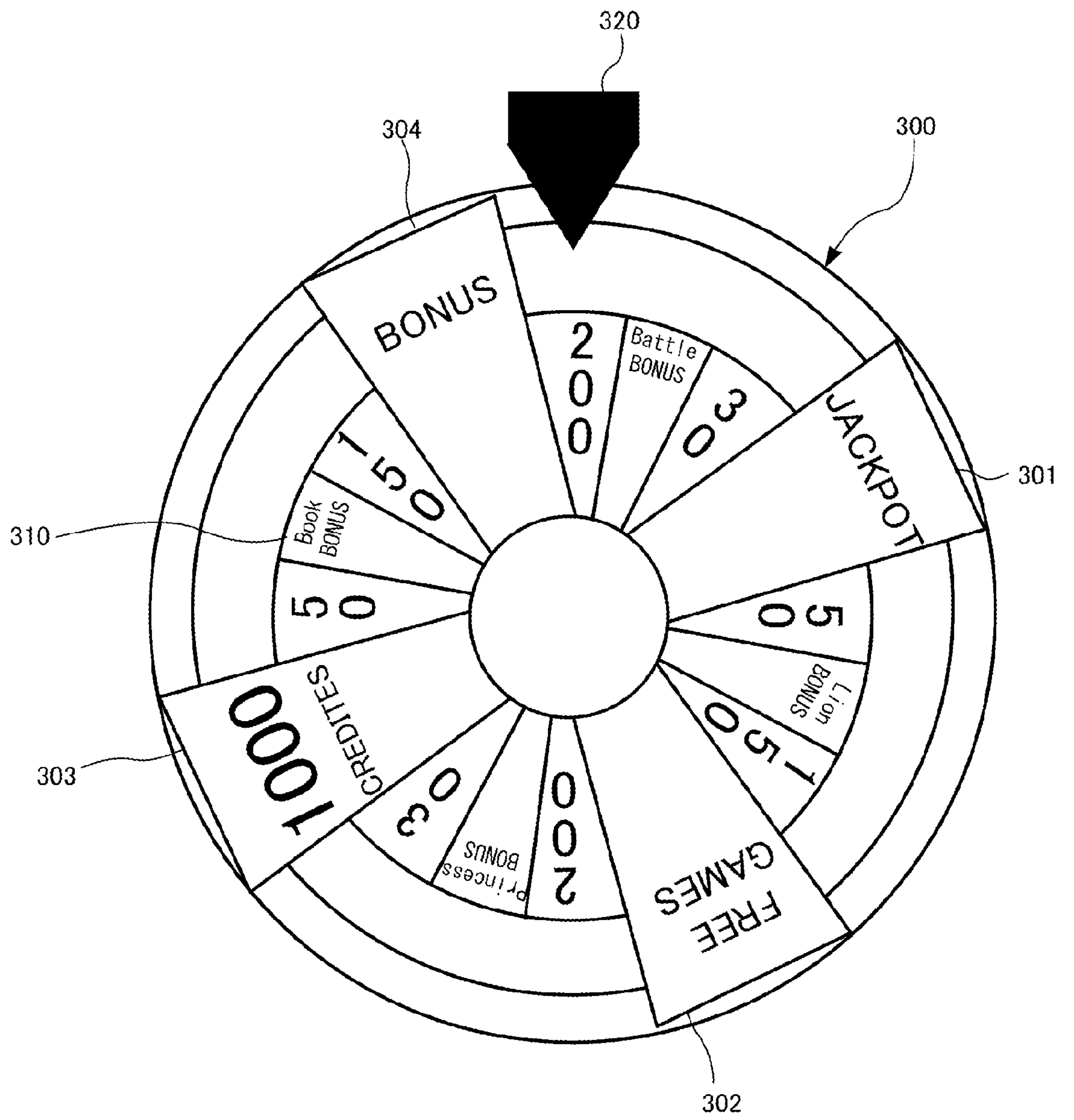
FIG. 7 is a front view of a windmill roulette.

As shown in FIG. 7, the top box 3 includes a mechanical windmill roulette 300 for indicating a kind of the won bonus game. The windmill roulette 300 includes four vane parts 301, 302, 303, and 304 and an inner periphery roulette 310. On these vane parts 301 to 304 and the inner periphery roulette 310, kinds of the bonus games are inscribed. Of course, the top box 3 may be displayed on the display 2 as a video image.

Next, the gaming machine according to the present invention will be described in more detail with reference to the accompanying drawings.

<Description of Outline of Gaming Machine>

Figure 3:
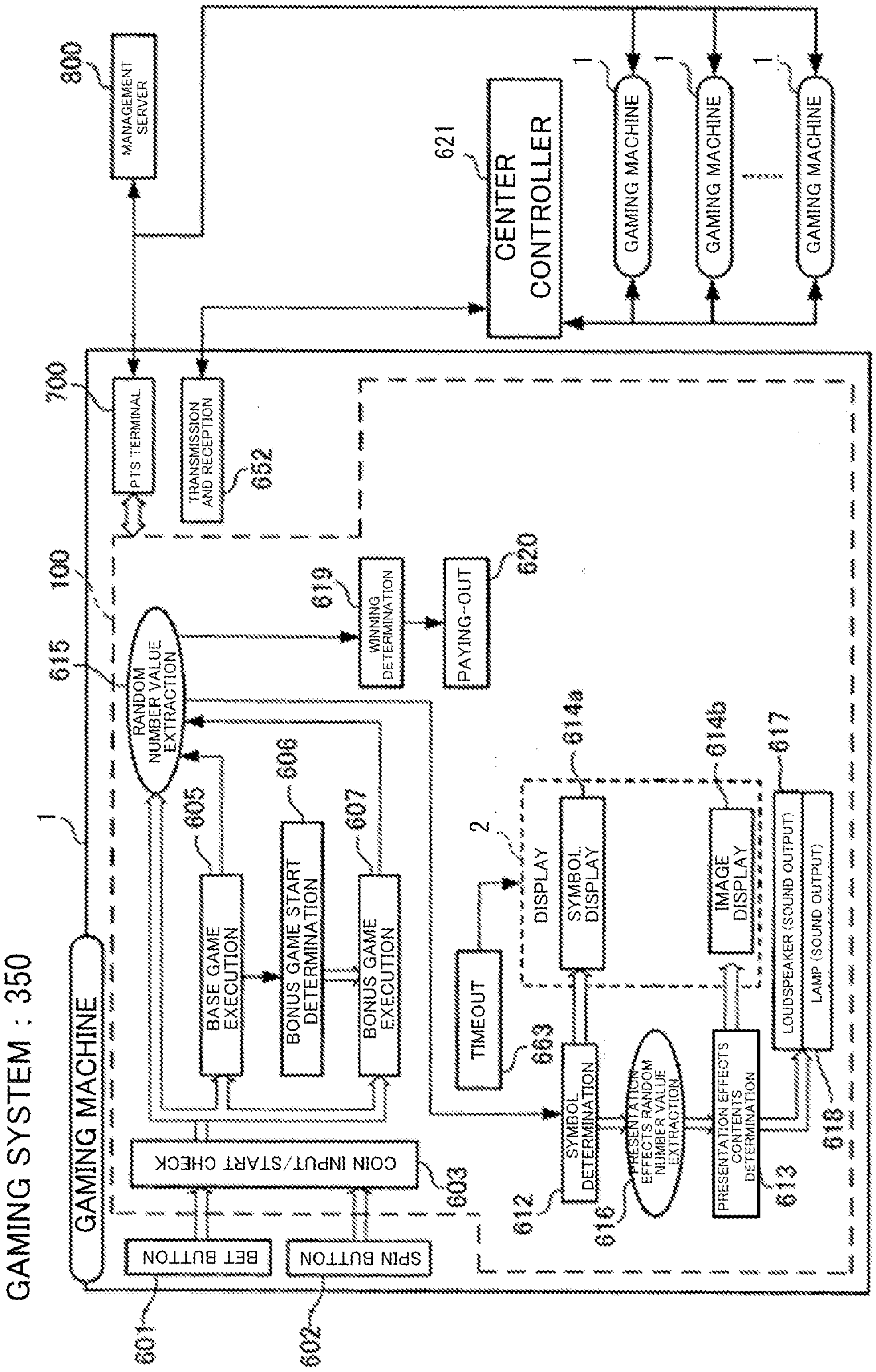
FIG. 3 is a functional game flow of the gaming machine.

As shown in FIG. 3, a plurality of gamine machines 1 are connected to a center controller 621, are capable of communicating data with the center controller 621, and are configured to be multiplayer-type gaming machines. The connection of the gaming machines 1 with the center controller 621 may be any of wired and wireless connections and may be a combination of these.

The center controller 621 is to control the plurality of gaming machines 1. In the present embodiment, the center controller 621 is the so-called hall server installed in a gaming house having the plurality of gaming machines 1. A respectively unique identification number is attached to each of the gaming machines 1, and the center controller 621 identifies a source of data transmitted from each of the gaming machines 1 by using the identification number. In addition, also when data is transmitted from the center controller 621 to each of the gaming machines 1, a destination thereof is designated by using the identification number.

As show in FIG. 1, each of the gaming machines 1 includes the display 2 and the top box 3.

The display 2 is to display the rearrangement drawing outcome of the plurality of symbols. As shown in FIG. 8, the display 2 has the symbol display region 20 and the presentation effects display region 21. On the symbol display region 20, the plurality of symbols are rearranged in a manner of the matrix having three rows and five columns. On the presentation effects display region 21, a variety of presentation effects such as presentation effects of each bonus game are displayed.

As shown in FIG. 7, the top box 3 includes the mechanical windmill roulette 300 for indicating a kind of each won bonus game. The windmill roulette 300 includes the four vane parts 301, 302, 303, and 304 and the inner periphery roulette 310. On these vane parts 301 to 304 and the inner periphery roulette 310, the kinds of the bonus games are inscribed. Of course, the top box 3 may be displayed on the display 2 as a video image.

Figure 5:
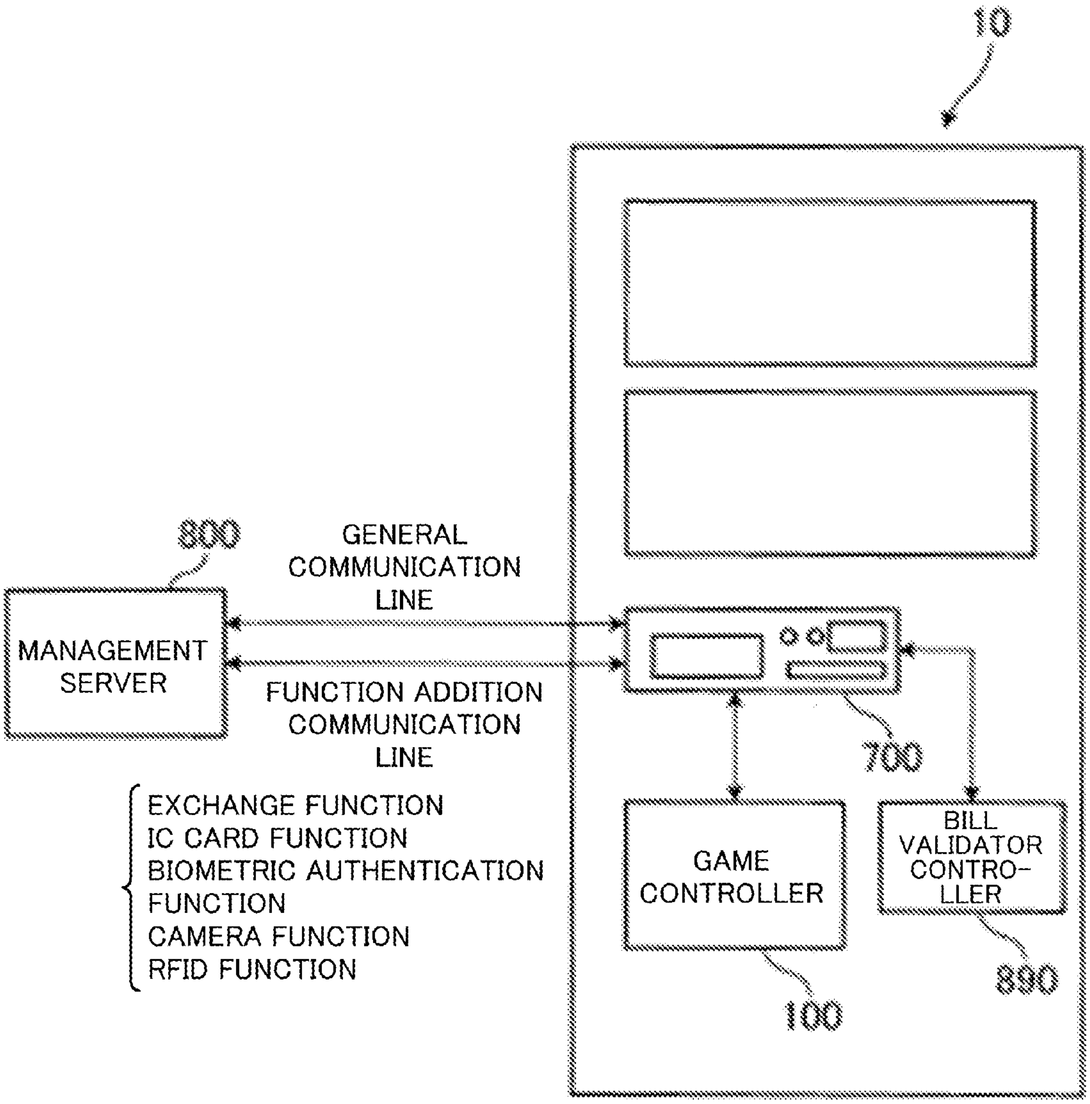
FIG. 5 is a block diagram of the PTS system.

The game controller 100 shown in FIG. 5 is to control a variety of operations in a game and as described above, is programmed to execute the processes of the above-mentioned (A-1) and (A-2), the processes of the above-mentioned (B-1) and (B-2), the processing of the above-mentioned (C-1) to (C-4), the processes of the above-mentioned (D-1) to (D-3). Of course, the controller for conducting the above-mentioned each process is not limited to the game controller 100 and may be other controller.

<Outline of Game Contents>

As shown in FIG. 1, each of the gaming machines 1 has a configuration in which a windmill bonus game and a feature game are executed within a period of the execution of a base game.

The windmill bonus game is a bonus in which when three trigger symbols are rearranged on the display 2 (refer to FIG. 41), a kind of a bonus game, from among the plurality of bonus games, to be executed is displayed on the windmill roulette 300 of the top box 3. The plurality of bonus games includes an "equipage bonus game", "free games", a "fixed payout bonus", a "story bonus game", and a "jackpot challenge game". This windmill bonus game includes the potential that the windmill bonus game is repeated through conducting a revival drawing, with the number of times being limited to 10 times. An outcome of the revival drawing in the windmill bonus game is displayed as the windmill destruction presentation effects which are revival challenge presentation effects.

The feature game is a kind of a bonus game and includes an "expand wild feature game" and a "wild scatter feature game". The "expand wild feature game" is a bonus game in which symbols in one column or a plurality of columns are changed to wild symbols before reels is stopped. The "wild scatter feature game" is a bonus game in which the symbols in the one column or the plurality of columns are changed to the wild symbols after the reels have been stopped.

<Outline of Game Flow>

Figure 2:
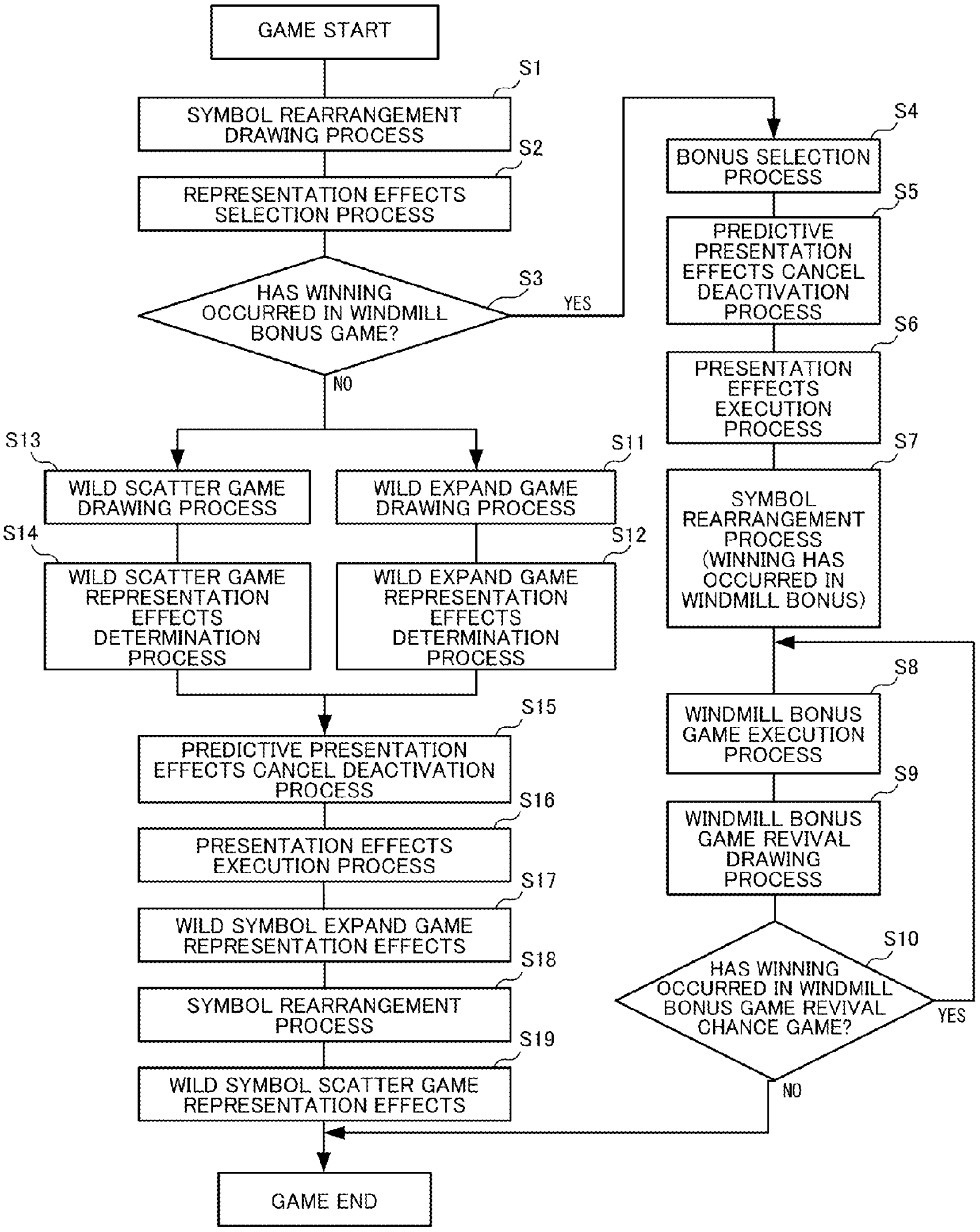
FIG. 2 is a basic game flow of the gaming machine.

As shown in FIG. 2, each of the gaming machines 1 conducts a symbol rearrangement drawing process as the base game (S1) and executes a presentation effects selection process (S2). The presentation effects selection process is executed by extracting random number values for the presentation effects and selecting presentation effects corresponding to the extracted random number values from a presentation effects drawing table.

Each of the gaming machines 1 determines whether or not winning has occurred in the windmill bonus (S3). This determination is conducted, for example, by determining whether or not a drawing outcome in which three or more trigger symbols (bonus symbols) are displayed on the display 2 has occurred in the symbol rearrangement drawing process.

When the winning has occurred in the windmill bonus (S3: YES), a bonus game selection process is executed (S4). In this bonus game selection process, one bonus selection drawing table is selected from a predetermined plurality of bonus game selection tables and based on this bonus game selection table, a kind of a bonus game is selected. In the present embodiment, as the plurality of bonus game selection tables, a bonus game selection table A (refer to FIG. 39A) with no drawing value of the jackpot challenge game assigned and a bonus game selection table B (refer to FIG. 39B) with a drawing value of the jackpot challenge game assigned are included. A probability with which the bonus game selection table B having the potential of the jackpot challenge game is selected varies depending on the number of BETs and a progressive initial value credit. In other words, the larger the number of BETs is, the more easily the drawing table B is selected, and the larger the progressive initial value credit is, the more difficult the selection of the bonus game selection table B becomes.

Next, each of the gaming machines 1 executes a predictive presentation effects cancel deactivation process (S5) and thereafter, a presentation effects execution process is conducted (S6).

In the predictive presentation effects cancel deactivation process, it is determined whether or not the predictive presentation effects are selected in the presentation effects selection process at S2, and when the predictive presentation effects are selected, the cancel operation of the predictive presentation effects is deactivated. The details of the predictive presentation effects cancel deactivation process will be described later. In addition, if the predictive presentation effects are not associated with the presentation effects upon the occurrence of the winning in the windmill bonus game, it is not required to provide the step of the predictive presentation effects cancel deactivation process.

The presentation effects execution process is executed by displaying the presentation effects selected in the presentation effects selection process at S2 on the display 2 and controlling a loudspeaker 617 and a lamp 618 which will be later described with reference to FIG. 3.

Next, each of the gaming machines 1 conducts a rearrangement process for the symbols in accordance with the drawing outcome in the symbol rearrangement drawing process at S1 (S7) and thereafter, a windmill bonus game execution process is conducted (S8). At S7, three or more trigger symbols are displayed on the display 2. Thus, a player can confirm that the winning in the windmill bonus game has occurred. In addition, there may be a case where before the three or more trigger symbols are displayed on the display 2, "determination presentation effects" are executed in the presentation effects execution process at S6, thereby allowing a player to confirm that the winning in the windmill bonus game has occurred.

In the windmill bonus game execution process, the windmill roulette 300 of the top box 3 is rotated and stopped, thereby displaying a kind of the bonus game to be executed. On the vane parts 301 to 304 and the inner periphery roulette 310 of the windmill roulette 300, the kinds of the bonus games are specified, and when the windmill roulette 300 has been stopped, a bonus game indicated by an indication part 320 is the won bonus game. A kind of the selected bonus game is any of the "equipage bonus game", the "free games", the "fixed payout bonus", the "story bonus game", and the "jackpot challenge game".

The selection of the bonus game in the windmill bonus game is conducted, for example, by making reference to the drawing tables shown in FIG. 39A and FIG. 39B. In the drawing table shown in FIG. 39A, a jackpot is not assigned in the bonus game to be drawn and in the drawing table B shown in FIG. 39B, the jackpot is assigned in the bonus game to be drawn. In these drawing tables A and B, besides the assignment of the jackpot, assignments of the fixed payout (100) and the fixed payout (1000) are different, but the other assignments are the same as each other. In the drawing table A with no assignment of the jackpot, the assignments of the fixed payout (100) and the fixed payout (1000) are high, as compared with those in the drawing table B. This is because an expected value of the jackpot is allocated to the fixed payout (100) and the fixed payout (1000) in the drawing table A, thereby making the expected values in the drawing table A and the drawing table B the same as each other.

Although which one of the drawing tables A and B is selected is appropriately determined, for example, in order to determine a probability of selecting the drawing table B, any of the equations shown in FIG. 40A FIG. 40B, and FIG. 40C can be used. These equations shown in these drawings are each to define a drawing probability of the drawing table B based on the number of bets in the game and an initial credit, and in the equations, coefficients are respectively different. The reason for this difference in the coefficients is that these coefficients are set in accordance with the winning probabilities in the windmill bonus game played on each of the gaming machines 1. For example, in one of the gaming machines 1, in which a drawing probability of the windmill bonus game is set to be low, one of the equations, in which a drawing probability in the drawing table B is high, is adopted, whereas in one of the gaming machines 1, in which a drawing probability of the windmill bonus game is set to be high, one of the equations, in which a drawing probability in the drawing table B is low, is adopted.

When the windmill bonus game process has been finished, each of the gaming machines 1 executes a windmill bonus game revival drawing process (S9). The windmill bonus game revival drawing process is to conduct a drawing for determining whether or not the windmill bonus game execution process is conducted again with a predetermined probability.

In the windmill bonus game revival drawing process, one revival drawing table from among a plurality of revival drawing tables having different revival winning probabilities is selected, and it is determined based on this revival drawing table whether or not the windmill bonus game is revived (retriggered). In the present embodiment, a revival drawing table A (refer to FIG. 103A) having a high revival winning probability and a revival drawing table B (refer to FIG. 103B) having a low revival winning probability are included. The revival drawing table A is selected when reference to a bonus game selection drawing table A (refer to FIG. 103A) is made in the bonus game selection process at S4. The revival drawing table B is selected when reference to a bonus game selection drawing table B (refer to FIG. 103B) is made in the bonus game selection process at S4. Accordingly, in the revival drawing table B, a winning probability in the revival drawing is set to be low by a degree to which winning in the jackpot challenge game is likely to occur.

In the windmill bonus game revival drawing process, presentation effects in accordance with an outcome of the revival drawing are conducted. In the present embodiment, the windmill destruction presentation effects destroying the windmill are executed. In the windmill destruction presentation effects, the windmill is broken when the winning in the revival drawing occurs, and the windmill is not broken when no winning in the revival drawing occurs. In these windmill destruction presentation effects, presentation effects which urge a player to repeatedly press an operation button are displayed. An outcome of the player's repeated pressing of the button is displayed as a meter, and when a value of the meter reaches a value of MAX, the windmill is destroyed. When no winning occurs, a value of the meter does not reach the value of MAX and the windmill is not destroyed.

As the operation button for the repeated pressing presentation effects, typically, a SPIN button 602 (refer to FIG. 3) is used. As the operation button, a BET button 601 (refer to FIG. 3) may be used, and in addition, a button for the repeated pressing presentation effects, separate from the SPIN button 602 and the BET button 601, may be provided.

However, when the jackpot challenge game as the windmill bonus game is selected and an outcome of winning a jackpot has occurred, the windmill bonus game revival drawing process is not executed or the revival drawing by making reference to the table having the low revival winning probability is conducted. In addition, when the windmill bonus game is continued at a predetermined number of times (for example, 10 times) including the time of first winning, the game is forcibly terminated without conducting the revival drawing.

When the windmill bonus game revival drawing process has been finished, it is determined whether or not winning in the revival drawing of the windmill bonus game has occurred (S10). In the process at S10, when the winning in the revival drawing of the windmill bonus game has occurred (S10: YES), each of the gaming machines 1 retriggers the windmill bonus game (S8), and when no winning in the revival drawing of the windmill bonus game has occurred (S10: NO), each of the gaming machines 1 terminates the game.

On the other hand, when the determination outcome at S3 is "NO" (when no winning in the windmill bonus game has occurred), each of the gaming machines 1 conducts a wild expand drawing process (S11) and conducts a process for determining expand presentation effects of wild symbols (S12). In the wild expand drawing process, the reels (columns) on which expanding the wild symbols is conducted are determined. At this time, when it is determined that the wild symbols in two or more columns are expanded, a drawing for determining whether or not the premium presentation effects are conducted is conducted. When winning in these premium presentation effects has occurred, one part or all of the presentation effects selected in the presentation effects selection process at S2 is rewritten.

In addition, when the determination outcome at S3 is "NO" (when no winning in the windmill bonus game has occurred), each of the gaming machines 1 conducts a wild scattering drawing process (S13) and conducts a process for determining scattering presentation effects of the wild symbols (S14). In the wild scattering drawing process, symbol positions in which the wild symbols are scattered are determined by a drawing.

Next, each of the gaming machines 1, as at S5, conducts a predictive presentation effects cancel deactivation process (S15). In this predictive presentation effects cancel deactivation process, it is determined whether or not the predictive presentation effects are selected in the presentation effects selection process at S2, and when the predictive presentation effects are selected, the cancel of the predictive presentation effects is deactivated.

Each of the gaming machines 1 further executes a presentation effects execution process (S16) and wild symbol expand presentation effects (S17). When the process at S16 and the wild symbol expand presentation effects at S17 overlap in a time-series manner, priority is given to the wild symbol expand presentation effects. Of course, after completing the execution of the normal presentation effects, the wild symbol expand presentation effects may be executed by delaying the timing.

Subsequently, each of the gaming machines 1, as at S7, conducts a rearrangement process of the symbols in accordance with the drawing outcome in the symbol rearrangement drawing process at S1 (S18).

When the symbol rearrangement process (S18) has been finished, scattering presentation effects of the wild symbols are executed (S19). In the scattering presentation effects, the wild symbols are scattered in determined symbol positions. In the present embodiment, the scattering of the wild symbols is made by Rosinante (horse) appearing on the display 2. Rosinante traverses from side to side on the display at one time or a plurality of times. At this time, Rosinante scatters the wild symbols in one reel among the reels (columns) targeted for the scattering of the wild symbols. Since on the display 2 of each of the gaming machines 1, five reels are displayed, Rosinante shuttles on the display at up to five times. When the wild symbols are scattered in a plurality of reels, the reels in which the scattering is conducted are determined by a drawing. On the other hand, when the plurality of wild symbols are scattered in the same one reel, the order is randomly determined. In addition, when the wild symbols have already been stopped upon the scattering presentation effects, no scattering presentation effects are conducted.

When the scattering presentation effects of the wild symbols have been finished, each of the gaming machines 1 provides a payout in accordance with an outcome of the symbol rearrangement and finishes the game.

<Detailed Description of Gaming Machine>

As shown in FIG. 3, the plurality of gamine machines 1 are connected to the center controller 621 are capable of communicating data with the center controller 621, and are configured to be multiplayer-type gaming machines. The connection of the gaming machines 1 with the center controller 621 may be any of wired and wireless connections and may be a combination of these.

Each of the gaming machines 1 has the BET button 601, the SPIN button 602, the game controller 100, a transmission and reception part 652, and a PTS terminal 700.

The BET button 601 has a function of accepting a bet amount when operated by a player. Furthermore, this BET button 601 can also be used, when operated during the execution of the base game, for an operation of finishing the base game, for example, when a reel skip and presentation effects cancel are executed.

The SPIN button 602 has a function of accepting a start of a game such as the base game when operated by a player, that is, when the player performs a start operation. In the present embodiment, the SPIN button 602 is operated by a player upon the repeated pressing presentation effects in the windmill destruction game. Furthermore, this SPIN button 602 can also be used, as with the BET button 601, when operated during the execution of the base game, for the operation of finishing the base game, for example, when the reel skip and the presentation effects cancel are executed.

The game controller 100 has a coin input/start check part 603, a base game execution part 605, a bonus game start determination part 606, a bonus game execution part 607, a random number value extraction part 615, a symbol determination part 612, a presentation effects random number value extraction part 616, a presentation effects contents determination part 613, a loudspeaker part 617, a lamp part 618, a winning determination part 619, a paying-out part 620, and the display 2.

The base game execution part 605 has a function of executing the base game on the condition that the BET button 601 is operated. The base game start determination part 606 determines based on a combination of symbols rearranged in the base game whether or not the bonus game is executed. In other words, the base game start determination part 606 has a function of determining that winning in the bonus game has occurred when trigger symbols are rearranged on a predetermined condition and a function of shifting the process to the bonus game execution part 607 so as to execute a bonus game from the next unit game.

Here, the "unit game" consists of a series of operations from when accepting a bet is started to when a winning state is achieved. For example, the unit game in the base game consists of a bet time during which the bet is accepted, a game time during which the stopped symbols are rearranged, and a paying-out time during which a payout process for providing a payout is conducted, each of the times performed at one time. The unit game in the base game is referred to as a unit base game.

The bonus game execution part 607 has a function of executing a bonus game in which a plurality of free games are repeated only by operating the SPIN button 602.

The symbol determination part 612 has a function of determining symbols targeted for the rearrangement by using random number values from the random number value extraction part 615, a function of rearranging the determined symbols on the symbol display region 20 of the display 2, a function of outputting symbol rearrangement information to the winning determination part 619, a function of adding increased particular symbols as one part of the plurality of symbols used for the determination of the symbols, a function of replacing one part or all of the increased particular symbols with one part or all of the plurality of symbols used for the determination of the symbols, and a function of outputting a presentation effects designation signal to the presentation effects random number value extraction part 616 based on a state of the rearrangement of the symbols.

The presentation effects random number value extraction part 616 has a function of extracting the presentation effects random number values upon the reception of the presentation effects designation signal from the symbol determination part 612 and a function of outputting the presentation effects random number values to the presentation effects contents determination part 613. The presentation effects contents determination part 613 has a function of determining presentation effects contents by using the presentation effects random number values, a function of outputting image information of the determined presentation effects contents to a presentation effects display region 614*b* of the display 2, and a function of outputting audio and light emitting information of the determined presentation effects contents to the loudspeaker part 617 and the lamp part 618.

The winning determination part 619 has a function of determining the presence and absence of winning when the symbol rearrangement information, pertinent to a display state in which the symbols are rearranged on the display 2, is obtained, a function of calculating a payout amount based on a winning combination when it is determined that the winning has occurred, and a function of outputting a payout signal based on the payout amount to the paying-out part 620. The paying-out part 620 has a function of paying out to a player a gaming value in a form such as coins, medals, and a credit. In addition, the paying-out part 620 has a function of adding credit data in accordance with the paid-out credit to credit data stored in an IC card inserted to the PTS terminal 700.

In addition, the game controller 100 is connected to the PTS terminal 700. The PTS terminal 700 is a unit in which an LCD, a microphone, a human body detection camera, and the like are integrated and has a function of, for example, performing presentation effects of a game by conducting intercommunication with the game controller 100. In particular, the PTS terminal 700 is provided with a card insertion slot, thereby allowing the IC card to be inserted thereinto. Thus, a player inserts the IC card into the card insertion slot and can use a credit stored on the IC card on each of the gaming machines 1. A mechanical configuration of the PTS terminal 700 will be described later.

In addition, when receiving the credit data from the PTS terminal 700, the game controller 100 updates a credit display on the display 2. Furthermore, the game controller 100 outputs redemption credit data to the PTS terminal 700 when there is redemption in the game.

In addition, each of the plurality of gaming machines 1 is communicably connected to a management server 800 via the PTS terminal 700 included therein, and downloading of images and management of the IC card and the credit are performed in a collective manner.

(Operations of Gaming Machine 1)

Each of the gaming machines 1 first executes a base game process (the base game or the like). The below-described series of operations are executed.

(Coin Input and Start Check)

First, each of the gaming machines 1 checks whether or not the BET button 601 is pressed by a player and subsequently, checks whether or not the SPIN button 602 is pressed by a player.

(Symbol Determination)

Next, when the SPIN button 602 is pressed by a player, each of the gaming machines 1 extracts the symbol determination random number values and in accordance with a plurality of video reels displayed on the display 2, determines symbols displayed to a player when scrolling of the symbol columns is stopped.

(Symbol Display)

Next, each of the gaming machines 1 starts the scrolling of the symbol columns on each of the video reels and stops the scrolling so as to display the determined symbols to a player.

(Winning Determination)

Next, when the scrolling of the symbol columns on each of the video reels has been stopped, each of the gaming machines 1 determines whether or not a combination of symbols displayed to a player are associated with winning.

(Paying-out)

Next, when the combination of symbols displayed to a player is associated with the winning, each of the gaming machines 1 provides to a player a benefit in accordance with a kind of the combination of symbols.

For example, when the combination of the symbols associated with paying-out of coins is displayed, each of the gaming machines 1 pays out to a player coins whose number is associated with the combination of symbols.

Next, it is determined whether or not a bonus combination has been won. When the bonus combination has been won, the bonus game process is executed. On the other hand, when no bonus combination has been won, the base game is reexecuted. Information pertinent to the initiation and termination of the unit game such as the base game in a period during which the above-mentioned base game and the base game including the bonus games are being executed and execution state information indicating the bet amount for the unit game are transmitted to the center controller 621. Thus, the execution state information of each of the gaming machines 1 is managed by the center controller 621 in a centralized manner.

(Electrical Configuration of Slot Machine)

Next, with reference to FIG. 6, a circuit configuration which each of the gaming machines 1 includes will be described.

A gaming board 50 includes: a CPU 51, a ROM 52, and a boot ROM 53, which are connected to one another by an internal bus; a card slot 55 associated with a memory card 54; and an IC socket 57 associated with a GAL (Generic Array Logic) 56.

The memory card 54 is composed of a nonvolatile memory and has a game program and a game system program stored thereon. The game program includes a program related to game proceeding and a program for executing presentation effects by images and sounds. In addition, the game program includes a symbol determination program. The symbol determination program is a program for determining symbols to be rearranged on the display block 28.

In addition, the game program includes: respective symbols for each of the symbol columns on the display block; code Nos.; base game symbol table data indicating base game symbol tables indicating a relationship of correspondence with the random number values; respective symbols for each of the symbol columns on the display block; code Nos.; bonus game symbol table data indicating bonus game symbol tables indicating a relationship of correspondence with the random number values; symbol No. determination table data indicating symbol column determination tables; code No. determination table data indicating code No. determination tables; wild symbol increased number determination data indicating wild symbol increased number determination tables; trigger symbol increased number determination table data indicating trigger symbol increased number determination tables; odds data indicating a relationship of correspondence of kinds and the numbers of rearranged symbols with payout amounts; and the like.

In addition, the card slot 55 is configured such that the memory card 54 can be inserted thereto and pulled out therefrom and is connected to a mother board 70 by an IDE bus. Accordingly, the memory card 54 is pulled out from the card slot 53 and another game program is written in the memory card 54, and the memory card 54 is inserted into the card slot 53, thereby allowing a kind and contents of a game played on each of the gaming machines 1 to be changed.

The GAL 56 is a kind of a PLD (Programmable Logic Device) having a fixed OR array architecture. The GAL 56 includes a plurality of input ports and output ports and when each of the input ports has received a predetermined input, corresponding data is outputted from each of the output ports.

In addition, the IC socket 57 is configured such that the GAL 56 is detachable and is connected to the mother board 70 by a PCI bus. The memory card 54 is replaced with a memory card having another program written thereon or the program written on the memory card 54 is replaced with another program, thereby allowing the contents of a game played on each of the gaming machines 1 to be changed.

The CPU 51, the ROM 52, and the boot ROM 53 connected to one another by the internal bus are connected to the mother board 70 by the PCI bus. The PCI bus transmits signals between the mother board 70 and the gaming board 50 and supplies power from the mother board 70 to the gaming board 50.

The ROM 52 has an authentication program stored thereon. The boot ROM 53 has stored thereon an auxiliary authentication program, a program (boot code) for allowing the CPU 51 to activate the auxiliary authentication program, and the like.

The authentication program is a program (tampering check program) for authenticating the game program and the game system program. The auxiliary authentication program is a program for authenticating the above-mentioned authentication program. The authentication program and the auxiliary authentication program are written along a procedure (authentication procedure) for authenticating that a targeted program is not tampered.

The mother board 70 is configured by using a commercially available general-purpose mother board (a printed wiring board having basic components of a personal computer mounted thereon) and includes a main CPU 71, a ROM (Read Only Memory) 72, a RAM (Random Access Memory) 73, and a communication interface 82. The mother board 70 corresponds to the game controller 100 in the present embodiment.

The ROM 72 is composed of a memory device such as a flash memory and has stored thereon a program such as a BIOS (Basic Input/Output System) executed by the main CPU 71 and permanent data. When the BIOS is executed by the main CPU 71, an initialization process for predetermined peripheral devices is conducted. In addition, via the gaming board 50, a process for loading the game program and the game system program stored on the memory card 54 is started. In the present invention, the ROM 72 may be a ROM in which contents can be rewritten or a ROM in which the contents cannot be rewritten.

The RAM 73 has stored thereon data used when the main CPU 71 operates and programs such as the symbol determination program. For example, when the process for loading the above-described game program and game system program and the authentication program is conducted, these can be stored thereon. In addition, the RAM 73 is provided with working areas for executing each of the above-mentioned programs. For example, provided are an area for storing each counter which manages each of the number of games, the number of bets, the number of payouts, the number of credits, and the like and an area for storing symbols (code Nos.) determined by drawing.

The communication interface 82 is to communicate with the center controller 621 such as a server via a communication line. In addition, connected to the mother board 70 by USBs are the later-described door PCB (Printed Circuit Board) 90 and main body PCB 110. In addition, connected to the mother board 70 is a power source unit 81. Furthermore, connected to the mother board 70 by the USB is the PTS terminal 700.

When power is supplied from the power source unit 81 to the mother board 70, the main CPU 71 of the mother board 70 is activated and the power is supplied to the gaming board 50 via the PCI bus, thereby activating the CPU 51.

Connected to the door PCB 90 and the main body PCB 110 are input devices such as switches and sensors; and peripheral devices whose operations are controlled by the main CPU 71.

Connected to the door PCB 90 are a control panel 30, a reverter 91, a coin counter 92C, and a cold-cathode tube 93.

The control panel 30 is provided with a reserve switch 31S, a collect switch 32S, a game rule switch 33S, a 1-BET switch 34S, a 2-BET switch 35S, a 3-BET switch 37S, a 5-BET switch 38S, a 10-BET switch 39S, a PLAY 2 LINES switch 40S, a PLAY 10 LINES switch 41S, a PLAY 20 LINES switch 42S, a PLAY 30 LINES switch 43S, a MAX BET switch 44S, a gamble switch 45S, and a spin switch 46S so as to correspond to the above-described respective buttons. Each of the switches detects that each of the corresponding buttons is pressed by a player and outputs a signal to the main CPU 71.

The reverter 91 identifies the propriety of each coin inputted to a coin entry 36 and discharges each coin other than each legitimate coin from a coin payout opening. In addition, the coin counter 92C detects the accepted legitimate coins and counts the number of these coins.

The reverter 91 operates based on a control signal outputted from the main CPU 71 and distributes the legitimate coins selected by the coin counter 92C to a hopper 113 or a cashbox. When the hopper 113 is not filled with the coins, the legitimate coins are distributed to the hopper 113 and when the hopper 113 is filled with the coins, the legitimate coins are distributed to the cashbox.

The cold-cathode tube 93 functions as a backlight installed on a side of back surfaces of a presentation effects mechanism 131 and a lower image display panel 141 and lights up based on a control signal outputted from the main CPU 71.

Connected to the main body PCB 110 are the presentation effects mechanism 131, the loudspeaker 112, the hopper 113, a coin detection part 113S, a touch panel 69, a bill entry 22, a graphic board 130, a key switch 173S, and a data indicator 174. The loudspeaker 112 outputs sound such as BGM based on a control signal outputted from the main CPU 71.

The hopper 113 operates based on a control signal outputted from the main CPU 71 and pays out coins, whose payout number is designated, from the coin payout opening to a coin tray not shown. The coin detection part 113S detects the coins provided by the hopper 113 and outputs a signal to the main CPU 71.

The touch panel 69 detects a position touched by a finger or the like of a player on the display 2 and outputs a signal corresponding to the detected position to the main CPU 71.

The bill entry 22 is to identify the propriety of each bill and accept each legitimate bill into a cabinet. The each bill inputted into the cabinet is converted into a number of coins and a credit corresponding to the number of coins is added as a credit which a player has.

The graphic board 130 controls a display of images, performed by each of the presentation effects mechanism 131 and the lower image display panel 141, based on a control signal outputted from the main CPU 71. The graphic board 130 includes a VDP (Video Display Processor) for generating image data based on a control signal outputted from the main CPU 71 and a video RAM for storing the image data generated by the VDP. The image data used when the image data is generated by the VDP is included in the game program read out from the memory card 54 and stored in the RAM 73.

In addition, the graphic board 130 includes a VDP (Video Display Processor) for generating image data based on a control signal outputted from the main CPU 71 and a video RAM for temporarily storing the image data generated by the VDP. The image data used when the image data is generated by the VDP is included in the game program read out from the memory card 54 and stored in the RAM 73.

The key switch 173S is provided on a keypad and, when the keypad is operated by a player, outputs a predetermined signal to the main CPU 71. The data indicator 174 indicates data read out by a card reader 172 and data inputted via the keypad by a player based on a control signal outputted from the main CPU 71.

(Game System)

Figure 4:
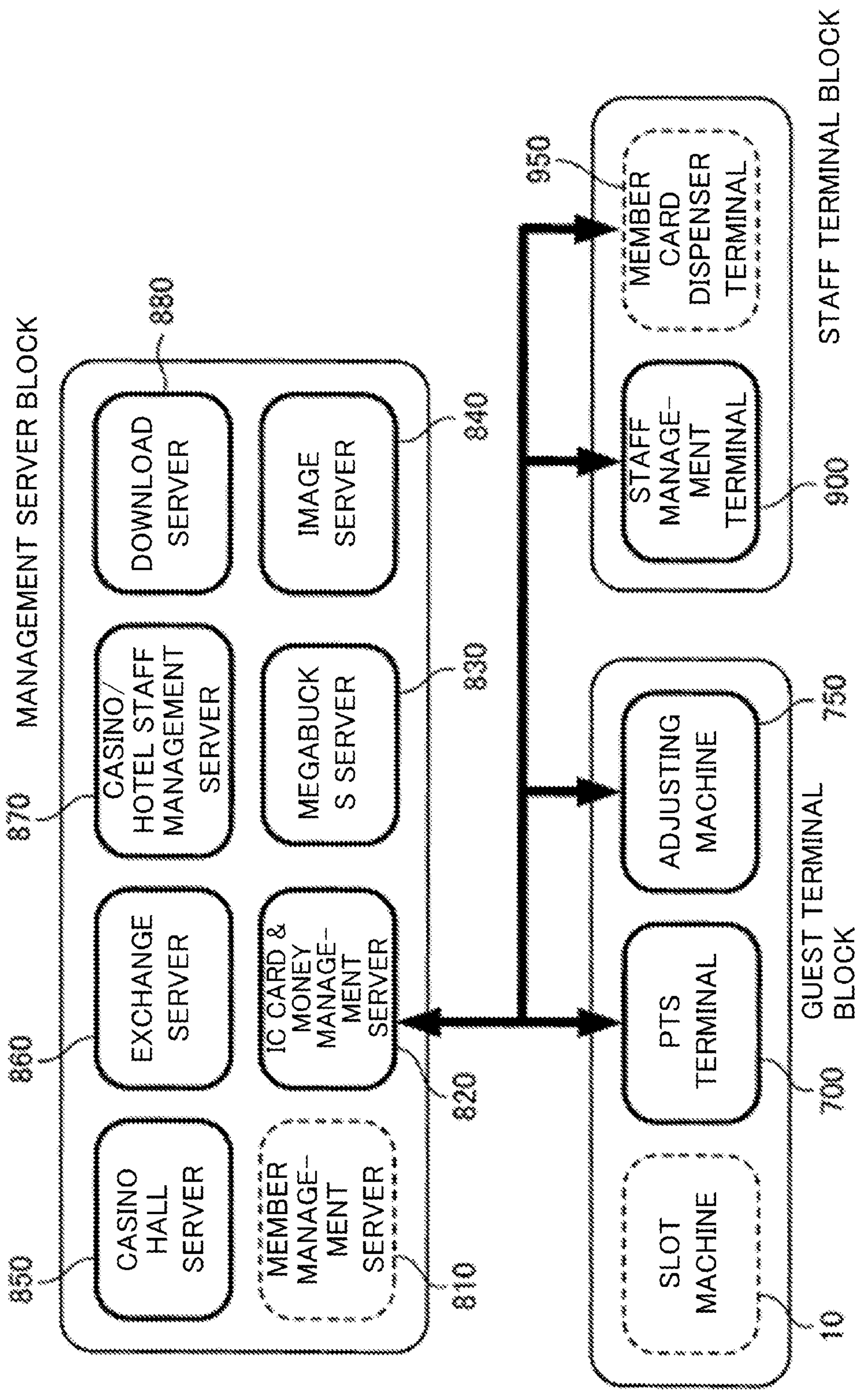
FIG. 4 is a block diagram of a PTS system.

As shown in FIG. 4, the game system is divided into three blocks of: a management server block, a guest terminal block, and a staff terminal block. The management server block has a casino hall server 850, an exchange server 860, a casino/hotel staff management server 870, and a download server 880.

The casino hall server 850 is a server for managing the whole of a casino hall where the gaming machines 1 are installed. The exchange server 860 is a server for creating exchange rate data based on exchange information or the like. The casino/hotel staff management server 870 is a server for managing the casino hall or staff of a hotel related to the casino hall. The download server 880 is a server for downloading, for example, information pertinent to a game and latest information such as news and notifying a player of the pieces of information via the PTS terminal 700 of each of the gaming machines 1.

In addition, the management server block has a member management server 810, an IC card & money management server 820, a megabucks server 830, and an image server 840.

The member management server 810 is a server for managing member information of a player playing a game on each of the gaming machines 1. The IC card & money management server 820 is a server for managing the IC card used in each of the gaming machines 1. Specifically, the IC card & money management server 820 is a server for storing fractional cash data so as to correspond to an identification code and outputting the fractional cash data to the PTS terminal 700. The IC card & money management server 820 also creates and manages denomination rate data. The megabucks server 830 is a server for managing, for example, a megabucks game in which a grand total of wagers placed at a plurality of gaming machines 1 installed in a plurality of casino halls becomes a payout. The image server 840 is a server for downloading an image related to a game and a latest image of news or the like and notifying a player of these through the PTS terminal 700 of each of the gaming machines 1.

The guest terminal block has a slot machine 10, the PTS terminal 700, and an adjusting machine 750. The PTS terminal 700 is attachable to the slot machine 10 and can mutually communicate with the management server 800. The adjusting machine 750 is a machine for adjusting an account by conducting cashing based on cash data stored in the IC card which a player has and storing data of coins and bills as cash data on the IC card.

The staff terminal block has a staff management terminal 900 and a member card dispenser terminal 950. The staff management terminal 900 is a terminal for allowing casino hall staff to manage the gaming machines 1. In particular, in a case of the present embodiment, the casino hall staff manages whether the number of accumulated IC cards stocked in the PTS terminal 700 is excessive or insufficient. The member card dispenser terminal 950 is a terminal which a player playing a game in a casino hall uses upon issuing a member card.

(PTS Terminal 700)

As shown in FIG. 5, the PTS terminal 700 is incorporated into a PTS system. The PTS terminal 700 attached to the slot machine 10 is communicably connected to the game controller 100 of the slot machine 10 and a bill validator controller 890.

The PTS terminal 700 updates presentation effects of a game using sound, images, and the like and credit data through communicating with the game controller 100. In addition, the PTS terminal 700 transmits the credit data required to adjust an account through communicating with the bill validator controller 890.

In addition, the PTS terminal 700 is communicably connected to the management server 800. The PTS terminal 700 is in communication with the management server 800 on two lines of a general communication line and a function addition communication line.

The PTS terminal 700 communicates data, for example, cash data, identification code data, member information of a player on the general communication line. On the other hand, the PTS terminal 700 communicates data related to functions newly added on the function addition communication line. In a case of the present embodiment, the PTS terminal 700 communicates data related to an exchange function, an IC card function, a biometric authentication function, a camera function, and a RFID (Radio Frequency IDentification) function which is a function of identifying a solid body by using radio waves on the function addition communication line.

(Detail of Display Screen: Display)

As shown in FIG. 8, the display 2 has a function of displaying still image information such as a variety of symbols, numerical values, and marks and moving image information such as presentation effects images. Furthermore, the display 2 has the touch panel as an input device and has a function of being operable to accepting a variety of instructions inputted by a pressing operation by a player. The display 2 has the symbol display region 20 and the presentation effects display region 21. The symbol display region 20 displays a reel screen including symbols shown in FIG. 1. The presentation effects display region 21 displays a variety of pieces of image information pertinent to the presentation effects (normal presentation effects, predictive presentation effects, determination presentation effects, etc.) executed during the proceeding of a game as moving images and still images.

In the present embodiment, the symbol display region 20 and the presentation effects display region 21 are set on the same one screen. However, the present invention is not limited thereto.

(Detail of Display Screen: Payline Box)

Figure 9:
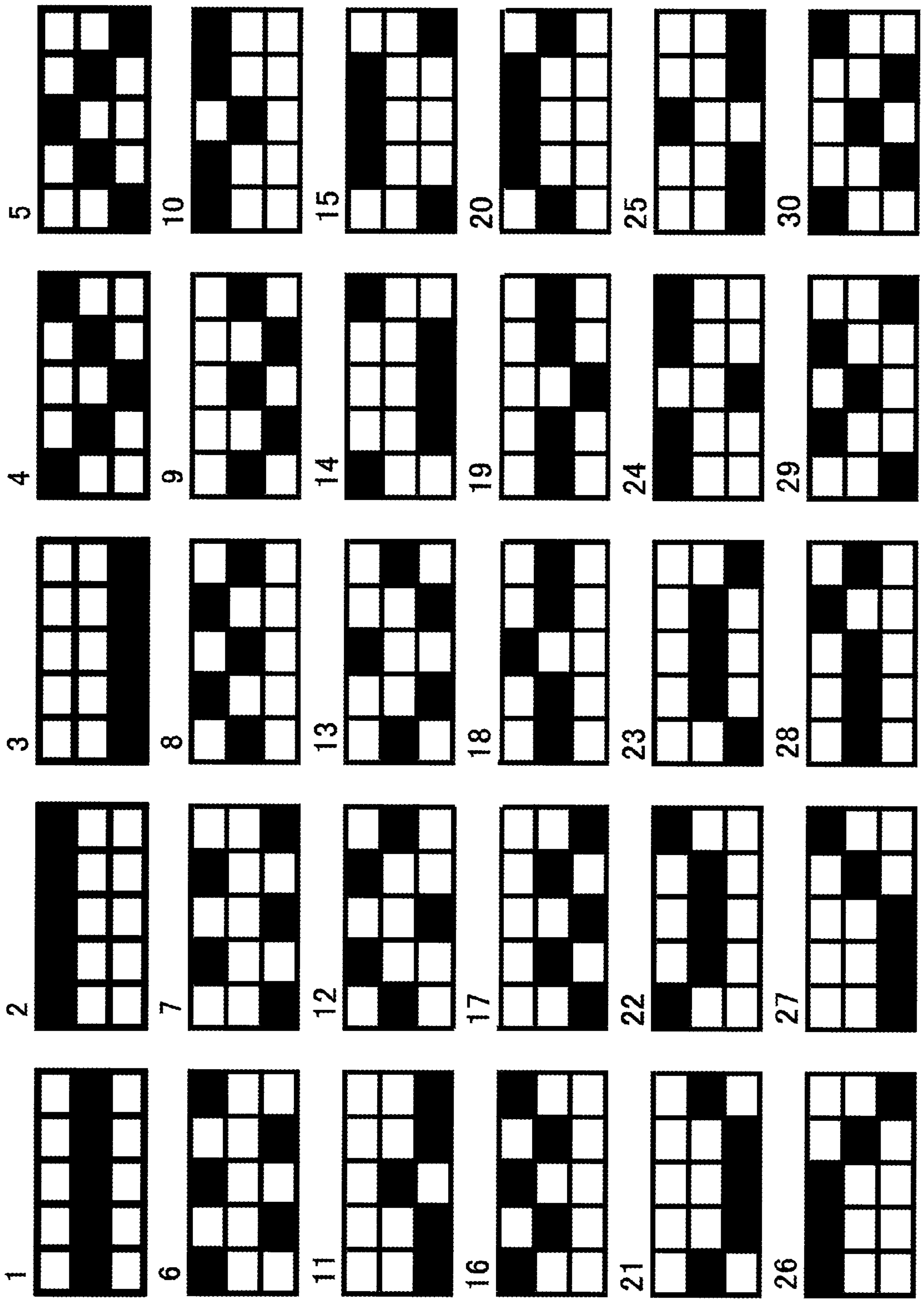
FIG. 9 is an explanatory diagram of bet lines (payline boxes)

As shown in FIG. 9, the symbol display region 20 forms payline boxes in a display window. The payline boxes form 30 kinds of paylines using combinations of boxes consisting of three rows and five columns. In addition, as shown in FIG. 8, payline occurrence columns are arranged symmetrically on right and left sides of the display window 150. The payline occurrence column on the left side viewed from a side of a player has 15 payline occurrence parts 65L. On the other hand, the payline occurrence column on the right side has 15 payline occurrence parts 65R.

Each of the payline occurrence parts 65L forms a pair with any of the payline occurrence parts 65R. Each payline, which is a line extending from each of the payline occurrence parts 65L toward any of the payline occurrence parts 65R which has a relationship of the pair with each of the payline occurrence parts 65L, is previously defined. The each payline is associated with the above-mentioned payline boxes.

The each payline is activated by forming a connection between the payline occurrence parts 65L and 65R. In a case other than the above-mentioned case, the each payline is deactivated. The effective number of the paylines is determined based on a bet amount. In a case of the MAX bet which is the largest bet amount, 30 paylines which is the largest number are activated. Each of the activated paylines establishes each winning combination of symbols.

(Reel Control)

Each of the columns in the symbol display region 20 shown in FIG. 8 constitutes each reel. As shown in FIG. 10, one round of scrolling of each of the reels consists of 1000 steps and one round of scrolling of one symbol consists of 50 steps. When the number of the steps of scrolling of each of the reels has reached 2000 steps+$\alpha$ steps since the start of scrolling, each of the reels starts deceleration, and after a predetermined step A, the symbols is stopped. The predetermined step A is randomly selected from five kinds of steps. Assignment of the respective steps is even. As described above, the deceleration step A is selected from the plurality of kinds, thereby making it impossible for a player to easily detect positions where the symbols are to be stopped.

On the other hand, when the reels decelerate, a deceleration sound is outputted. This deceleration sound is referred to as a tantalizing sound. In the present embodiment, the timing at which the deceleration sound is outputted is randomly selected from five kinds of timings. The five kinds of timings are a deceleration start timing, a timing at which reels proceed by 50 steps from the deceleration start timing, a timing at which reels proceed by 100 steps from the deceleration start timing, a timing at which reels proceed by 150 steps from the deceleration start timing, and a timing at which reels proceed by 200 steps from the deceleration start timing. Assignment of the respective timings is even. As described above, the start timing of outputting the deceleration sound (tantalizing sound) is selected from the plurality of kinds, thereby making it impossible for a player to easily detect positions where the symbols are to be stopped.

(Display Screen of Display)

As shown in FIG. 8, the display window 150 having simulated reels 151 to 155 in the five columns and the payline occurrence parts 65L and 65R symmetrically arranged with the display window 150 located in the center therebetween are included.

Above the display window 150, a credit meter 400, a bet meter 401, and a win meter 402 are arranged. The credit number display part 400 and the bet number display part 401 are arranged on a left end portion viewed from a player. On the other hand, the win meter 402 is arranged on a right end portion viewed from a player. In addition, between the bet meter 401 and the win meter 402, a system font region is arranged. The system font region has a bet information display part and a game state display part in upper and lower tiers, respectively.

The credit meter 400 displays the total credit number. An initial value is zero. The numerical value is increased and decreased by adding a win credit upon the occurrence of "take win" which is winning in a game and by subtracting the bet number upon playing a game and subtracting the bet number upon finishing the collection.

The bet meter 401 displays a "total bet (=the number of bets×the number of lines)". A numerical value is recalculated for each game play. The win meter 402 displays a total credit of won awards in an incremented manner. An initial value is zero. The win meter 402 switchably displays "LINE XX WIN" and "TOTAL WIN XX" and switches the display in conjunction with the payline display upon the occurrence of winning. A display condition is after the occurrence of winning. A display of a numerical value depends on a payline displayed upon the occurrence of winning and the figure of a credit. Details of the win meter 402 will be described later.

A bet information display part 403*a* displays bet information of a game (or a final game). On a first row, the number of bets per line is displayed, a singular or a plural is displayed depending on the number of bets. Specifically, on the first row, in a case of one credit per line, when the number of bets per line is one, "CREDIT" is displayed. On the other hand, in a case of two credits per line, when the number of bets per line is two, "CREDITS" is displayed. It is displayed when a player selects a button.

A game state display part 403*b* displays a current game state. A state display message is not displayed during a game, and when the game is over, "GAME OVER" is displayed. In a case of gamble waiting, "PLAY ON, GAMBLE or TAKE WIN" is displayed. During idling or after the occurrence of winning, it is displayed until an operation of play-on or gamble is performed.

On the other hand, below the display window 150, a HELP touch button 410, a language switching touch button 411, a sound volume switching touch button 412, a denomination button 413, a number-of-lines selection touch button 414, and a bet-per-line selection touch button 415 are arranged. These buttons 410, 411, 412, 413, 414, and 415 are located in this order from the left end to the right end.

The HELP touch button 410, when being touched, displays the first page of a HELP screen. The HELP touch button 410 becomes dark while being deactivated, for example, while the reels are rotating. It is displayed during displaying a base game screen. It is erased by a HELP screen, a free game screen, and a double-up screen.

The language switching touch button 411, when being touched, switches a language between English and Chinese. The language switching touch button 411 is activated only during advertising and becomes dark while being deactivated, for example, while the reels are rotating.

The sound volume switching touch button 412 is to switch a sound volume of a game in three scales and switches the sound volume of a game each time the sound volume switching touch button 412 is touched such that the sound volume of a game is switched to be firstly small, secondly medium, thirdly large, fourthly small, fifthly medium . . . . It is displayed during displaying a base game screen. It is erased during displaying the HELP screen.

The denomination button 413 displays a current denomination set in an audit screen. It is displayed during displaying a screen other than the audit screen.

The number-of-lines selection touch button 414 is used to increase and decrease the number of paylines. In the present embodiment, since the number of lines is fixed to 30 lines, the number-of-lines selection touch button 414 is set to be unable to be touched.

The bet-per-line selection touch button 415 is to allow the number of bets per line to be selected and when being touched, five selection buttons associated with a current betting configuration appear.

(Detail of Display Screen: Line Display: a Case in which Winning has Occurred on a Single Line)

Figure 11:
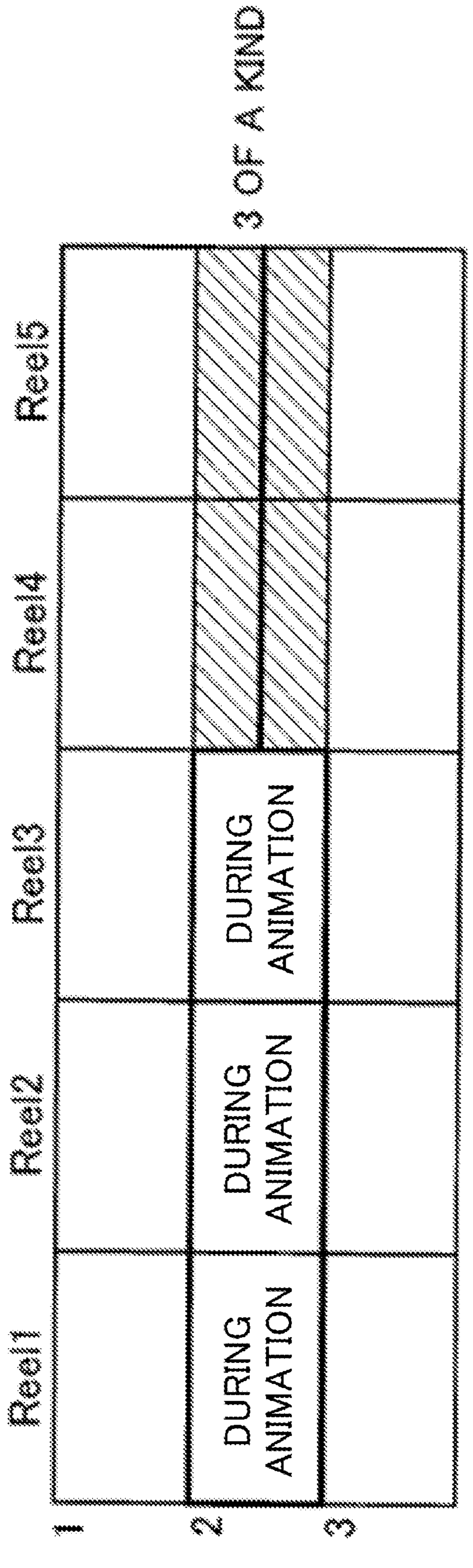
FIG. 11 is an explanatory diagram of the reels on a game screen.

As a case in which winning has occurred on a single line, for example, as shown in FIG. 11, in a case where winning has occurred on a line 2 in a 3-line game, the following two single-line processes 1 and 2 are conducted. In other words, in the single line process 1, the line on which the winning has occurred and a frame enclosing targeted symbols are displayed in a lighting-up manner (not in a blinking manner). In the single-line process 2, animation of the winning-targeted-symbols is started. In a case of winning of scattered symbols such as bonus symbols, only the frame enclosing the symbols is displayed. In addition, until the next game is started, the above-mentioned line display is continued. In addition, in the gray display parts in the drawing, the symbols are displayed below the payline.

(Detail of Display Screen: Line Display: a Case in which Wins on a Plurality of Lines Occur)

Figure 12:
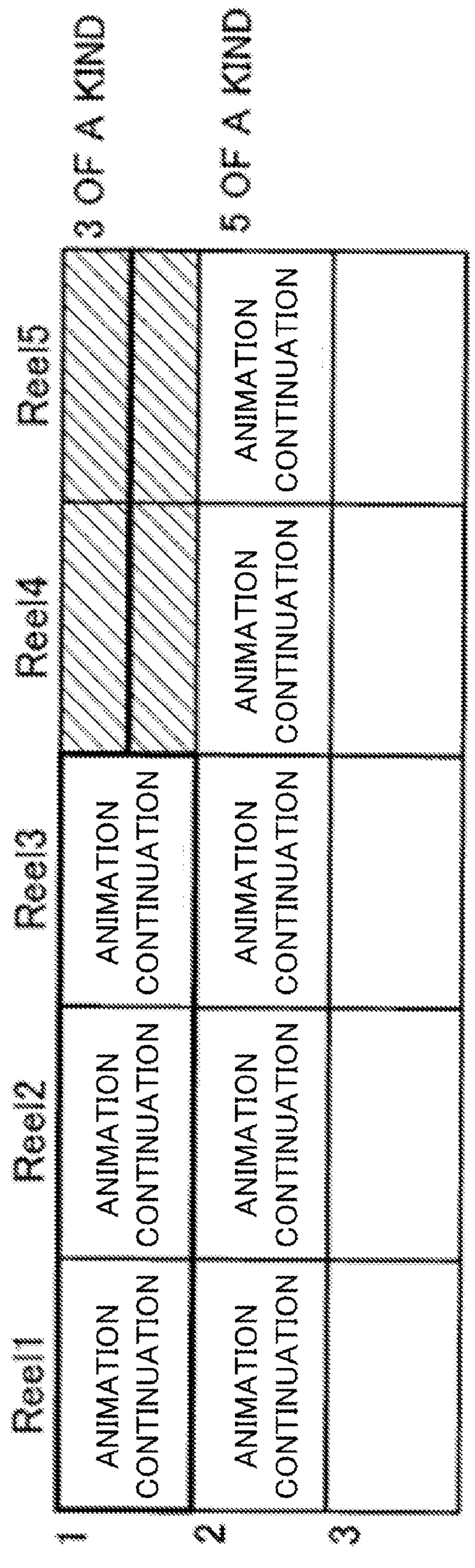
FIG. 12 is an explanatory diagram of the reels on the game screen.

As a case in which winning has occurred on a plurality of lines, for example, as shown in FIG. 12, in a case in which the winning has occurred on a line 1 and a line 2 in the 3-line-game, plurality-of-line processes 1, 2, and 3 are conducted. In the plurality-of-line process 1, each of the lines on which the winning has occurred is individually displayed for one second in a lighting-up manner. In addition, animation of all symbols targeted for winning is continued. Displaying the line winning is conducted in the order starting from a lower line number. In addition, when bonus winning not associated with any line has occurred, presentation effects for the bonus winning are conducted. At this time, on the win meter 402, "bonus winning=XXXXX" is displayed. In addition, on the gray display parts, the symbols are displayed below the paylines.

Figure 13:
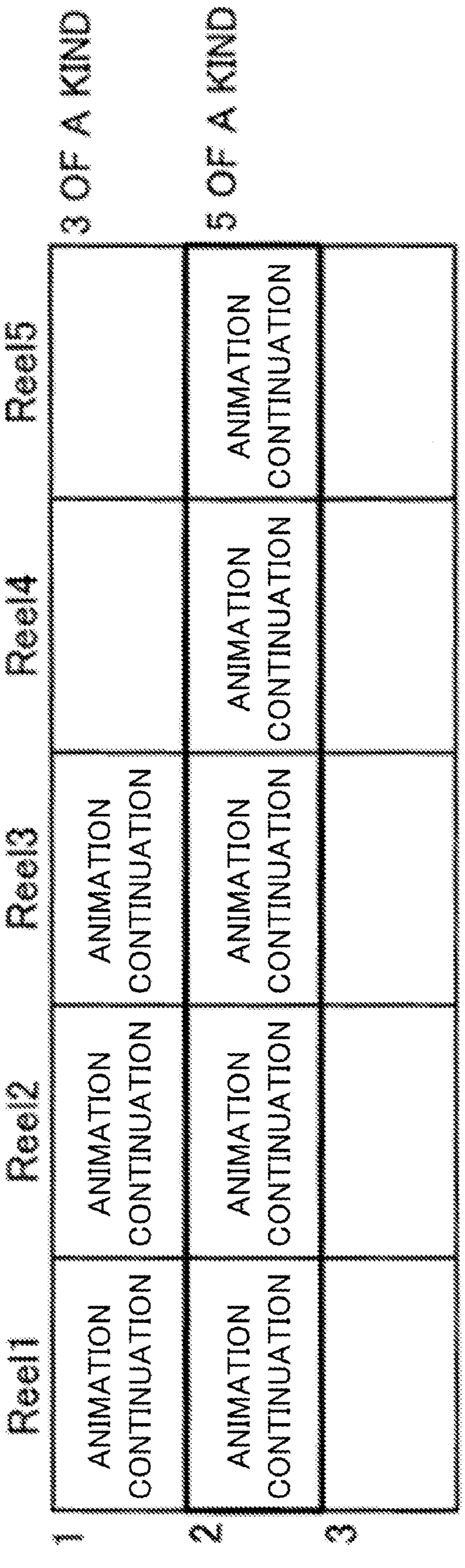
FIG. 13 is an explanatory diagram of the reels on the game screen.

In the plurality-of-line process 2, as shown in FIG. 13, the next targeted line is displayed for one second in the-lighting-up manner. In addition, animation of all symbols targeted for winning is continued. On the gray display parts, the symbols are displayed below the paylines.

In the plurality-of-line process 3, upon finishing the displaying of all of the lines, the process returns to the plurality-of-line process 1 with the initial line display. Until the next game is started, the line display in the plurality-of-line processes 1, 2, and 3 is continued.

(Detail of Display Screen: Line Display: In a Case where Five Kinds of Winning Have Occurred)

Figure 14:
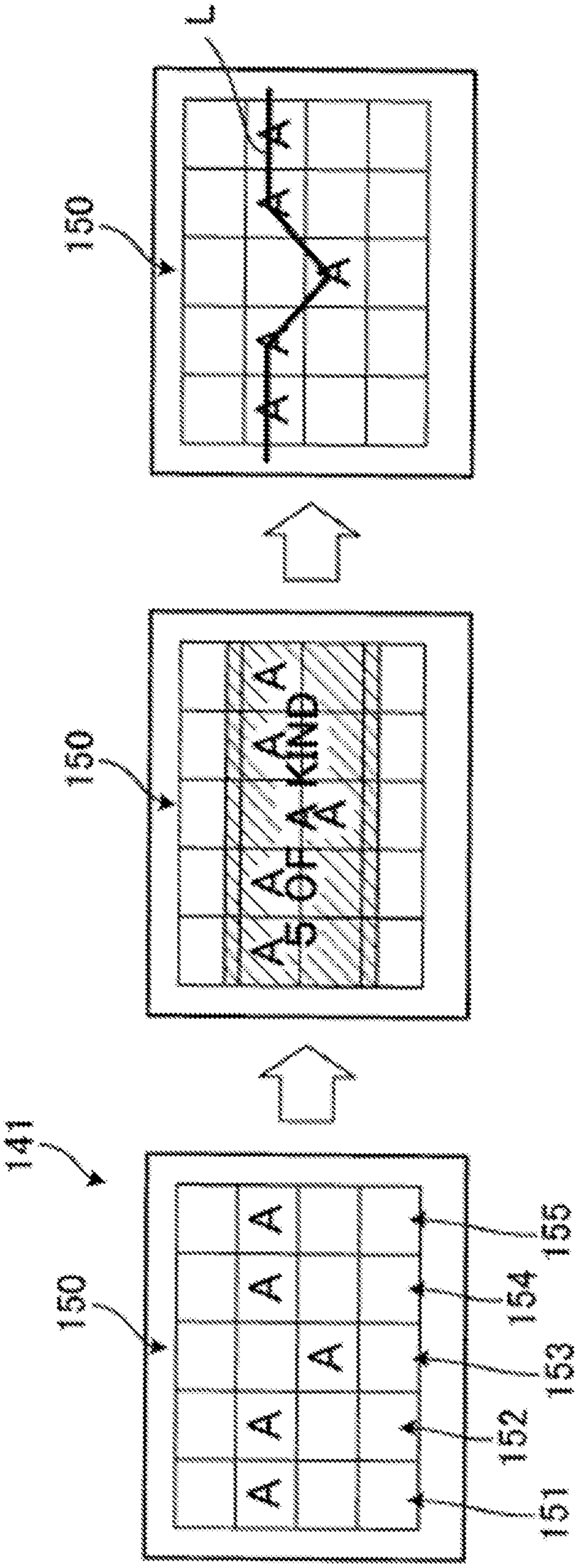
FIG. 14 is an explanatory diagram of the game screen.

Regardless of whether a combination achieves small winning or large winning, when five kinds of symbols are arranged, presentation effects by images and sound are conducted. Differences in the sound are made depending on a kind of a combination. For example, as shown in FIG. 14, when the reels have been stopped, the five kinds of winning are arranged. Thereafter, five kinds of the displays and sounds are outputted. At this time, "5 OF A KIND" is displayed and a voice of "5 OF A KIND" is reproduced. A skip of this process is impossible. In addition, the incrementing and the line display are not conducted here. Thereafter, a payout occurs. Specifically, the payout is incremented and line winning is displayed. A skip of this process is possible.

(Detail of Display Screen: Line Display: In a Case where Big Winning has Occurred)

The following presentation effects are executed based on a multiple of winning Words to be displayed are the following two kinds. The motions are the same as each other. Specifically, when winning whose multiple is 10 to 25 times has occurred, a payout of the winning is referred to as "HIGH PAYOUT". On the other hand, when winning whose multiple is 25 times or more has occurred, a payout of the winning is referred to as "GREAT".

Figure 15:
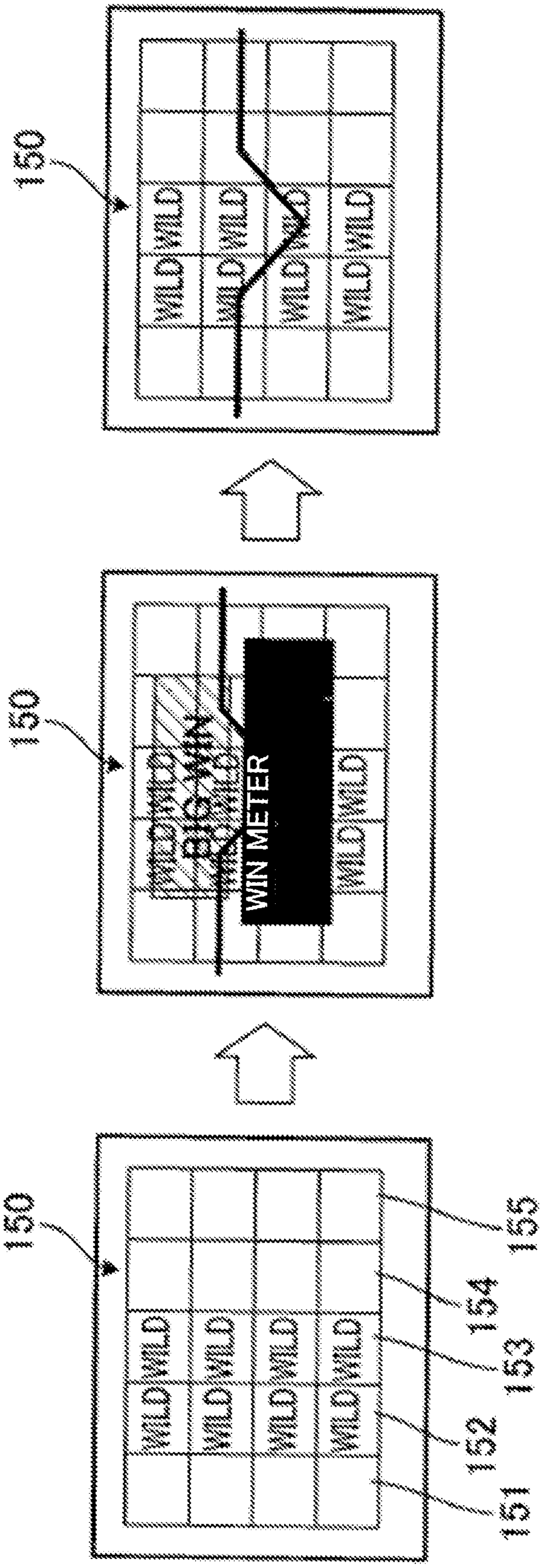
FIG. 15 is an explanatory diagram of the game screen.

An operation performed when winning with no arrangement of the five kinds has occurred will be described. For example, as shown in FIG. 15, when the reels have been stopped, winning whose multiple is greater than or equal to 10 times and less than 25 times has occurred. Thereafter, incrementing is started, "BIG WIN" is displayed, a big-win-time dedicated meter (large meter) is displayed, and a line win is displayed. A skip of these displays is possible. A speed of incrementing in the big-win-time dedicated meter complies with that of an incrementing operation of the win meter 402. Details of the incrementing operation will be described later. When three seconds have elapsed after finishing the incrementing, the display of "BIG WIN" and the large meter are erased. The display of the line win is continued.

Figure 16:
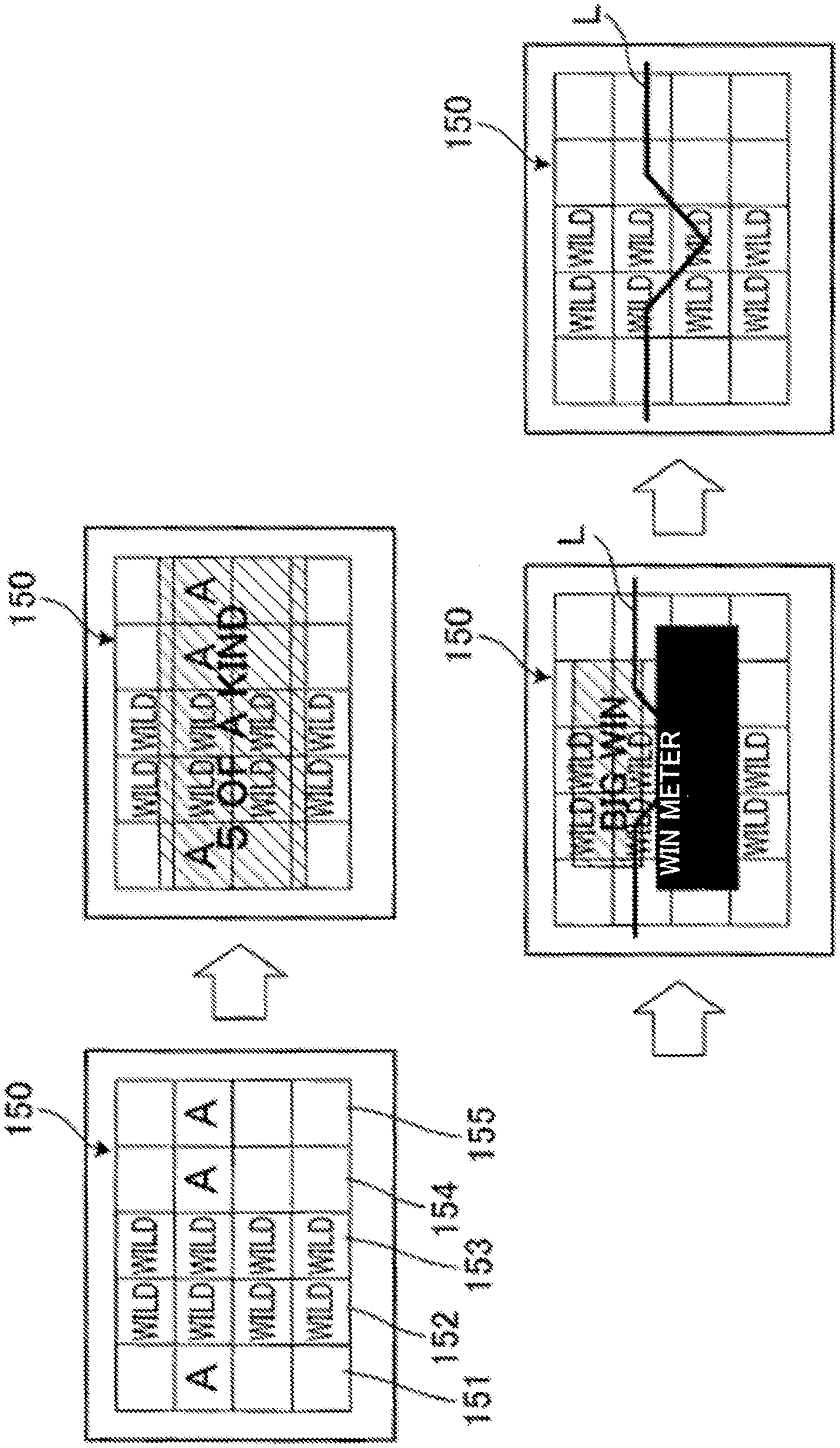
FIG. 16 is an explanatory diagram of the game screen.

An operation performed when the arrangement of the five kinds has occurred will be described. For example, as shown in FIG. 16, when the reels have been stopped, winning whose multiple is greater than or equal to 10 times and less than 25 times has occurred. Thereafter, the display of the five kinds and sound are outputted. Specifically, "5 OF A KIND" is displayed and a voice of "5 OF A KIND" is reproduced. A skip of this process is impossible. In addition, the incrementing and the line display are not conducted here.

Next, the incrementing is started, and big win and the large meter are displayed. Specifically, the incrementing is started. The speed of incrementing in the big-win-time dedicated meter complies with that of the incrementing operation of the win meter 402. The display of "BIG WIN" and the line win is conducted. The skip of this process is possible. When three seconds have elapsed after finishing the incrementing, the display of "BIG WIN" and the large meter are erased. The display of the line win is continued.

(Detail of Display Screen: Win Meter 402)

Figure 17:
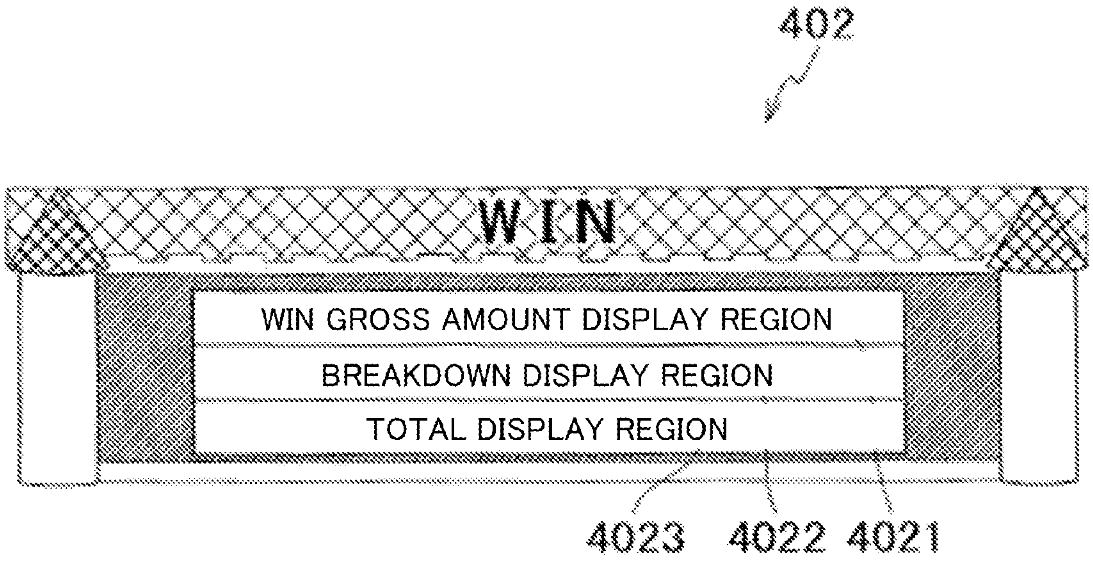
FIG. 17 is an explanatory diagram of a WIN meter.

As shown in FIG. 17, the win meter 402 is to display a win credit and a breakdown in an integrated meter when the winning has occurred. The win meter 402 has a win gross amount display region 4021, a breakdown display region 4022, and a total display region 4023.

(Detail of Display Screen: Win Meter 402: Win Gross Amount Display Region 4021)

The win gross amount display region 4021 displays a win credit and a money amount. Hereinafter, details of display specification will be described. During the idling, immediately after the winning has occurred, "0" is displayed as a gross amount of the winning, and "0" is also displayed for the others. When the SPIN button 46 is pressed down, "0" is displayed. During the win incrementing, an incrementing display is conducted. Upon triggering a bonus pick, "0" is displayed (no winning occurs at the time of triggering).

Upon introducing the free games, a gross amount of immediately preceding winning is displayed. During the rotation of the reels in each of the free games, the gross amount of the immediately preceding winning is displayed. Immediately after the reels have been stopped in each of the free games, when it is immediately after the winning, an amount of the winning in the free game is added to the gross amount of the immediately preceding winning, and the resultant is displayed in an incremented manner. On the other hand, otherwise, a gross amount of immediately preceding winning is displayed. Upon introducing a bonus game, a gross amount of immediately preceding winning is displayed. Immediately after finishing the bonus game, an amount of winning of a bonus or a jackpot is added to the gross amount of the immediately preceding winning, and the resultant is displayed in an incremented manner.

As display images, a credit display such as "12345678" is indicated in an upper row, and a money amount display such as "$123,456.78" is indicated in a lower row.

(Detail of Display Screen: Win Meter 402: Breakdown Display Region 4022)

The breakdown display region 4022, when winning has occurred during the base game or each of the free games, displays the number of a win line and a win credit after the fifth reel has been stopped. At this time, when a plurality of line payouts have concurrently occurred, displaying for each of the line payouts is conducted by delaying the display timing by a unit of 0.5 second. Displaying each of the line payouts is conducted in the order starting from a lower win line number, and after the line payout having the largest number of the win line has been displayed, displaying each of the line payouts is conducted again in the order starting from a lower win line number. When winning of the bonus and the credit payout have occurred, the breakdown display region 4022 displays "BONUS WIN" and a win credit. In addition, when winning obtaining a jackpot in the bonus game has occurred, the breakdown display region 4022 displays a "JACKPOT WIN", and a win credit.

Hereinafter, details of display specification will be described. Immediately after winning has occurred in the base game during the idling, a breakdown of a payout is displayed, and when there are a plurality of payouts, displaying for each of the payouts is conducted by delaying the display timing by 0.5 second. Otherwise, no displaying is conducted. When the SPIN button 46 is pressed down, no displaying is conducted. The breakdown of a payout is displayed during the win incrementing. When there are the plurality of payouts, displaying for each of the payouts is conducted by delaying the display timing by 0.5 second. Upon triggering the bonus pick, no displaying is conducted. Upon introducing the free games, no displaying is conducted. During the rotation of the reels in each of the free games, no displaying is conducted. When there is a line win immediately after the reels have been stopped in each of the free games, a breakdown of a payout is displayed, and there are a plurality of line wins, displaying for each of the payouts of the line wins is conducted by delaying the display timing by 0.5 second. Otherwise, no displaying is conducted.

Upon introducing the bonus game, no displaying is conducted. When a bonus (other than a jackpot) has been won immediately after finishing the bonus game, a bonus win is displayed, and when a jackpot has been won, a jackpot win is displayed. Immediately after winning a credit payout, a bonus win is displayed. After finishing the bonus game (upon returning to the game screen), no displaying is conducted.

As a display image, there is a display "LINE XX WIN=12345678". This display indicates winning in the base game and each of the free games. In addition, there is a display "BONUS WIN=12345678". This display indicates wins in the bonus game and a credit payout. In addition, there is a display "JACKPOT WIN=12345678". This display indicates winning having obtained the jackpot in the bonus game.

(Detail of Display Screen: Win Meter 402: Total Display Region 4023)

The total display region 4023 displays a total of the breakdown display region. Hereinafter, details of display specification will be described. Immediately after winning has occurred in the base game during the idling, a total of winning is displayed. Otherwise, no displaying is conducted. When the SPIN button 46 is pressed down, no displaying is conducted. During the win incrementing, the total of winning is displayed. Upon triggering the bonus pick, no displaying is conducted. During the rotation of the reels in each of the free games, no displaying is conducted. When there is a line win immediately after the reels have been stopped in each of the free games, a total of winning is displayed, and otherwise, no displaying is conducted. Upon introducing the bonus game, no displaying is conducted. Immediately after finishing the bonus game, a total of winning is displayed. Immediately after winning a credit payout, a total of winning is displayed. Immediately after winning a credit payout, a total of winning is displayed. After finishing the bonus game (upon returning to the game screen), no displaying is conducted. As a display image, there is a display "TOTAL WIN=12345678".

(Detail of Display Screen: Win Meter 402: Increment Specification)

(Basic Specification)

A count-up operation is caused to flow smoothly from a low figure to a large figure. In consideration of a difference between an actual money amount (real money amount) and a money amount displayed at that time point (displayed money amount), the count-up operation is controlled. A carry operation is performed concurrently with operations of lower-order digits in conjunction therewith. When the displayed money amount exceeds the actual money (such as the reset upon the occurrence of winning), rewriting is immediately conducted.

(Detail of Increment Operation)

An increment speed is determined with reference to the count-up number. When the remaining count-up number is increased in the middle of the operation, the increment speed is changed to an increment speed which has made reference to the increased count-up number. When the remaining count-up number exceeds "101", rewriting is conducted. Specifically, as shown in FIG. 18A, the increment operation is performed at each increment speed (second(s)) determined for each of the remaining count-up numbers or number ranges.

(Detail of Rewriting)

When the remaining count-up number exceeds "101", rewriting using a value obtained through the calculation of (the remaining count-up number−60) is conducted, and for the remaining 60 counts, count-up is conducted in accordance with a data table. For example, when a state in which the remaining 110 counts are to be conducted has been brought about, rewriting with 50 counts, obtained by subtracting 60 from 110, added is conducted. Concurrently with the rewriting, count-up for the remaining 60 counts is conducted. On the other hand, when the displayed money amount exceeds the real money amount due to the occurrence of resetting caused, for example, when winning in the progressive bonus game has occurred, rewriting is immediately conducted. The above-mentioned numerical values "101", "60", and the like are merely illustrative, and with "101" being a predetermined value and "60" being a decremental value, it may be made possible to set any numerical values.

When the winning in the progressive bonus game has occurred, the increment operation is discontinued, rewriting to the won money amount is immediately conducted, and blinking presentation effects are started. In a state in which the increment operation is discontinued, no blinking presentation effects are performed.

The increment speed may be controlled depending on how many times as large as an amount of one bet an obtained amount of winning is. For example, when an amount of winning is four times as large as an amount of one bet, for example, by making reference to a relationship between each control threshold value and each number of second(s) in a data table shown in FIG. 18B, the increment speed is determined to be four seconds. Furthermore, after the increment speed has been determined based on the data table shown in FIG. 18B, this determined value may be reflected in the data table shown in FIG. 18A. For example, in a case in which the amount of winning is four times as large as the amount of one bet as described above, when the increment speed is determined to be four seconds based on the data table shown in FIG. 18B, this number of four seconds may be set as the number of seconds for the remaining count-up number (1 to 2) in the data table shown in FIG. 18A and the other remaining count-up number may be set to be a value calculated by using a predetermined ratio.

(Detail of Display Screen: Sound Volume Switching Touch Button 412)

Figure 19:
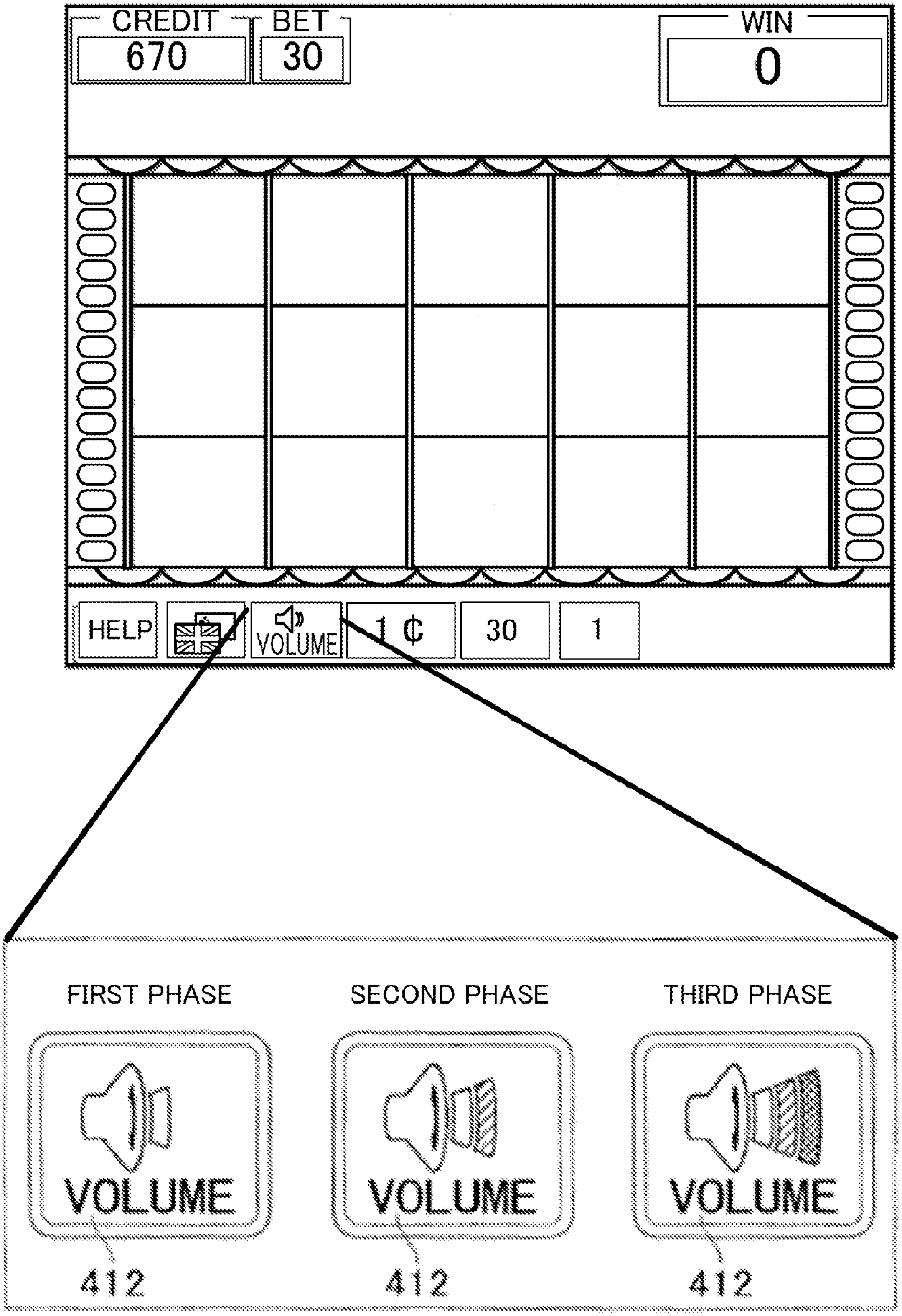
FIG. 19 is an explanatory diagram of sound volume switching touch buttons.
Figure 20A:
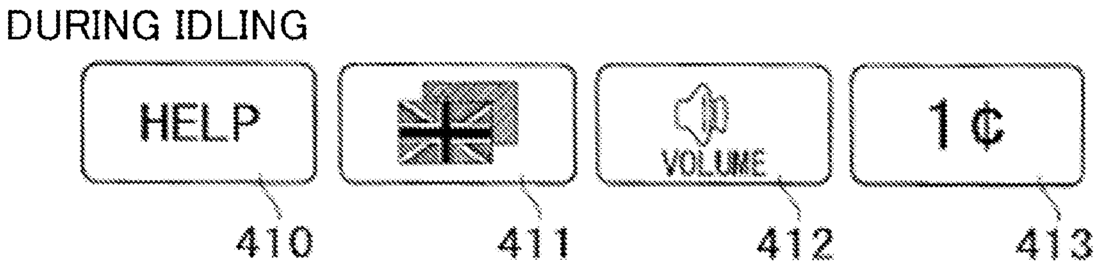
FIG. 20A is an explanatory diagram of the sound volume switching touch buttons.
Figure 20B:
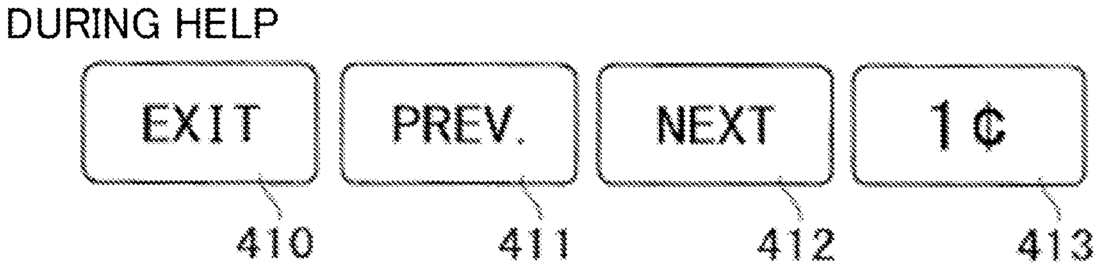
FIG. 20B is an explanatory diagram of the sound volume switching touch buttons.
Figure 20C:
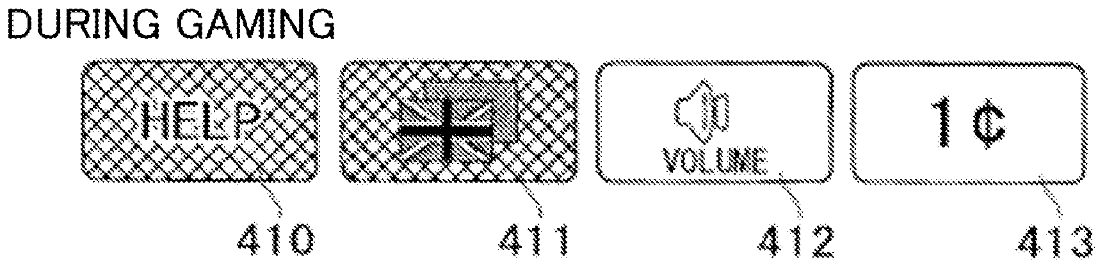
FIG. 20C is an explanatory diagram of the sound volume switching touch buttons.
Figure 20D:
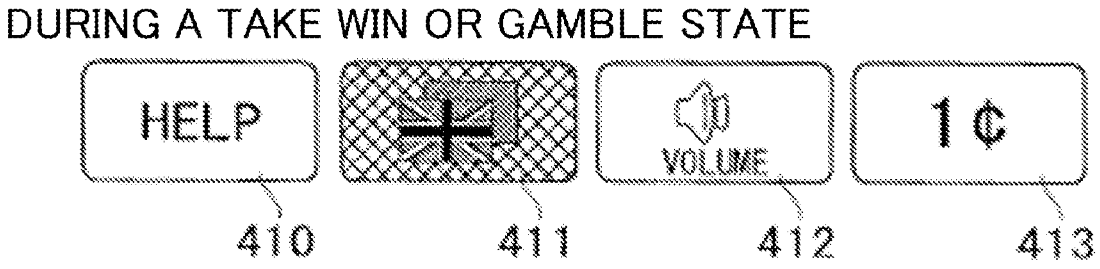
FIG. 20D is an explanatory diagram of the sound volume switching touch buttons.
Figure 21A:
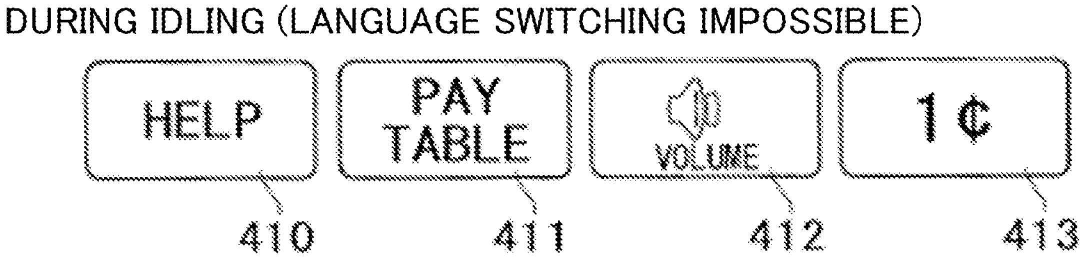
FIG. 21A is an explanatory diagram of the sound volume switching touch buttons.
Figure 21B:
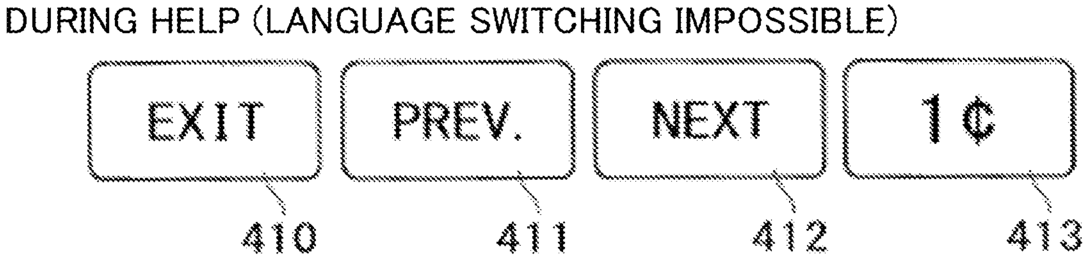
FIG. 21B is an explanatory diagram of the sound volume switching touch buttons.
Figure 21C:
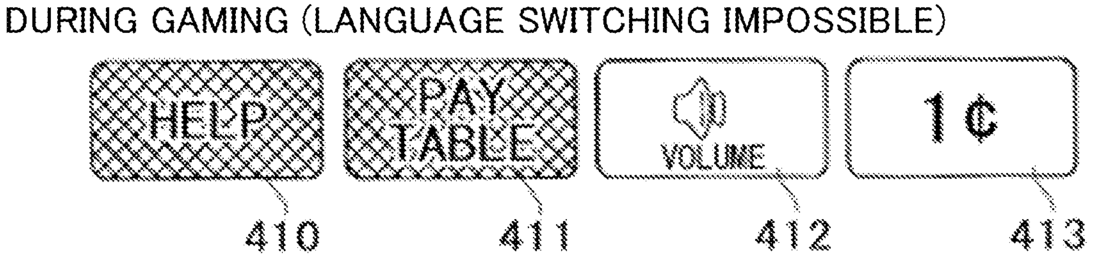
FIG. 21C is an explanatory diagram of the sound volume switching touch buttons.
Figure 21D:
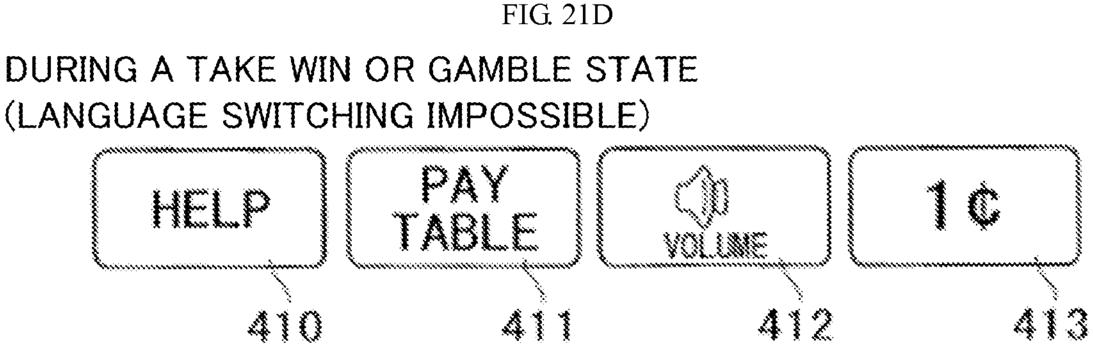
FIG. 21D is an explanatory diagram of the sound volume switching touch buttons.

As shown in FIG. 19, the sound volume switching touch button 412 has a function of allowing a player to arbitrarily select a sound volume. The setting of the volume has a plurality of phases, that is, such as three phases. The setting of the volume may be continuously changed. In a first phase, a minimum sound volume is set. In a second phase, a middle sound volume is set. In a third phase, a maximum sound volume is set. A transition order of the volume phases is: the first phase→the second phase→the third phase→then returning to the first phase.

A default setting among the volume phases is the first phase. Conditions under which the volume phase becomes the default setting are: (1) after activating a game and (2) upon exiting from an audit screen (regardless of whether or not the volume is changed while the audit screen is displayed). Coefficients of sound volume changes are: 30% in the first phase; 70% in the second phase; and 100% in the third phase. As for activated and deactivated states, the sound volume switching touch button 412 is always activated except when the sound volume switching touch button 412 is hidden. When a GUI (Graphical User Interface) such as the HELP touch button 410 is displayed, the sound volume switching touch button 412 is activated. However, since the sound volume switching touch button 412 disappears (is hidden by a NEXT button) from the GUI while HELP is displayed, the sound volume switching touch button 412 cannot be operated. An operation deactivation time from when the sound volume switching touch button 412 is touched, that is, the shortest time period from when the sound volume switching touch button 412 is first touched to when the sound volume switching touch button 412 can be next activated, is 0.15 (150 msec). A default of sound volume setting values on the audit screen is 12. When there is no sound volume touch panel function, the default is "5". A sound volume of a reproduced sound of a sound for which the volume setting on the audit screen is changed is a volume in the default phase of the sound volume switching touch button 412 (a sound volume for which the coefficient in the default phase is reflected).

(Detail of Display Screen: Detail of Screen Touch Buttons)

Arrangements and operations of the HELP touch button 410, the language switching touch button 411, the sound volume switching touch button 412, and the denomination button 413 are illustrated in arrangements in respective operational states shown FIG. 20A to FIG. 20D and FIG. 21A to FIG. 21D, in a light-up and light-down table shown in FIG. 22, and in language settings shown in FIG. 23. For example, an operation can be conducted only during the idling state (the game-over) (the operation can be conducted both when there is a credit and when there is no credit). During the help-operation, the gaming, the error occurrence, and the audit-operation, switching is impossible (with the light-down and deactivation or switching to other button). A national flag of a country of a currently displayed language is displayed on a front side. Even after switching, a state of a previous game is maintained. A default setting in English-speaking countries is English. A default setting in Chinese-speaking countries is Chinese.

(Detail of Display Screen: HELP screen 4101)

Figures 24A, 24B:
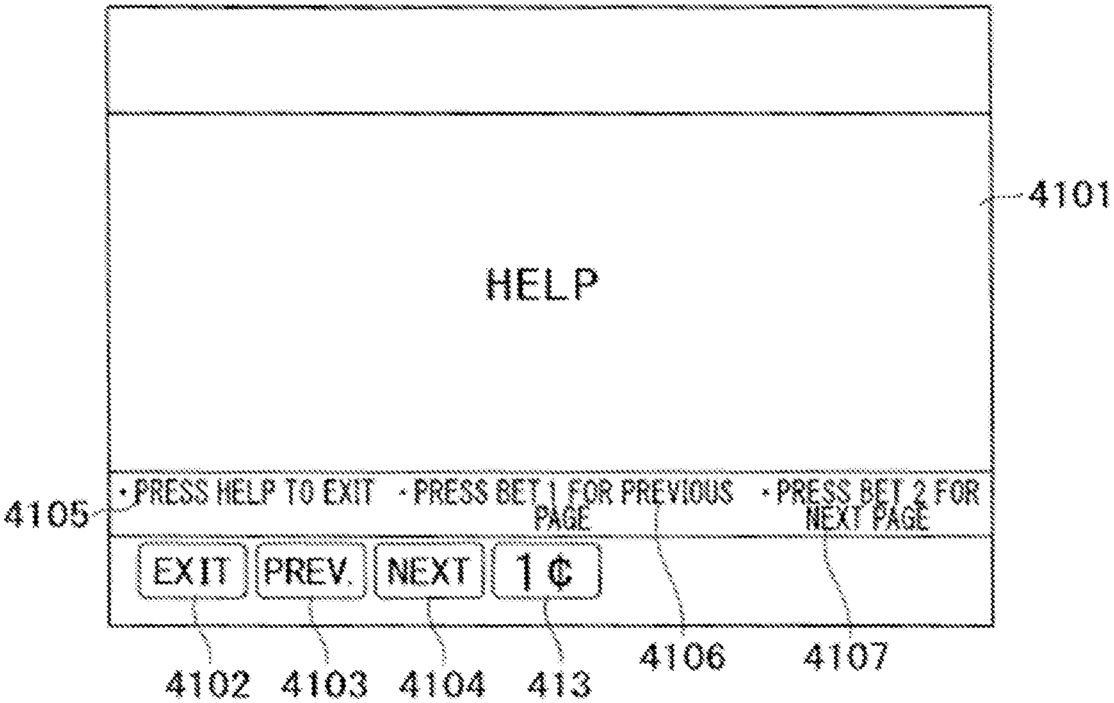
FIG. 24A is an explanatory diagram of a HELP screen.
FIG. 24B is an explanatory diagram of touch buttons of the HELP screen.

As shown in FIG. 24A, on the display 2, a HELP screen 4101 is displayed when the HELP touch button 410 is operated. Below the HELP screen 4101, word display parts 4105, 4106, and 4107 are arranged. On the word display parts 4105, 4106, and 4107, display words are displayed in a system font. In addition, the HELP touch button 410 is switched to an EXIT button 4102, the language switching touch button 411 is switched to a PREV. button 4103, and the sound volume switching touch button 412 is switched to a NEXT button 4104. When the EXIT button 4102 is touched, exiting from the HELP screen is conducted and the screen is returned to the base game screen. When the PREV. button 4103 is touched, the help page is returned to a previous page by one page. When the NEXT button 4104 is touched, the help page is caused to proceed to the next page by one page.

As the display words displayed on the word display part 4105, there are PRESS HELP TO EXIT or the like, and a maximum number of characters which can be displayed thereon is 25. As the display words displayed on the word display part 4106, there are PRESS BET 1 FOR PREVIOUS PAGE or the like, and a maximum number of characters which can be displayed thereon is 36. As the display words displayed on the word display part 4107, there are PRESS BET 2 FOR NEXT PAGE or the like, and a maximum number of characters which can be displayed thereon is 33.

Figure 6:
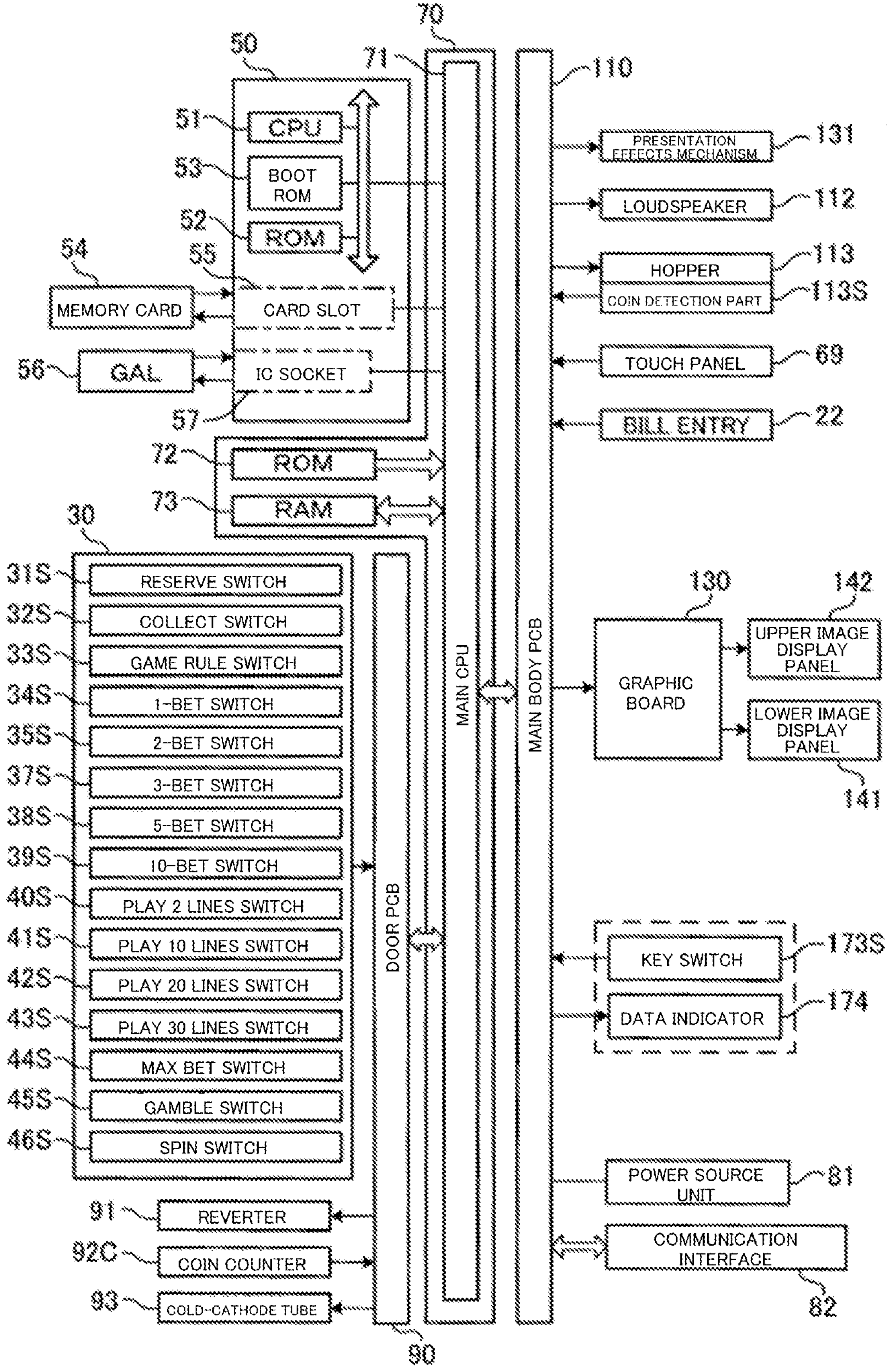
FIG. 6 is an electrical block diagram of the gaming machine.
Figure 25:
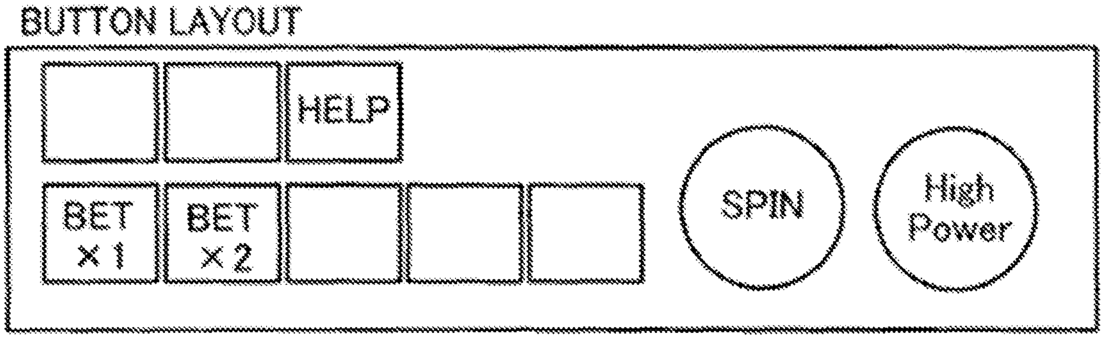
FIG. 25 is an explanatory diagram of a HELP button.

As shown in FIG. 24B and FIG. 25, these buttons 4102, 4103, and 4104 and word display parts 4105, 4106, and 4107 are linked to the control panel 30 (refer to FIG. 6 and the like). The word display parts 4105, 4106, and 4107 are configured such that even when each of the numerical values is changed and each of the patterns is altered, switching to each proper display in accordance therewith can be conducted.

(Detail of Display Screen: HELP screen 4101: Operation Specification)

A process upon entering the HELP screen 4101.

When the HELP touch button 410 is pressed during the idling, while the display of a basic screen in the idling state is maintained on the 2nd screen, only the 1st screen is switched to the HELP screen 4101. Displaying the HELP screen 4101 is conducted only on the 1st screen. During the error occurrence and the audit operation, a HELP touch button 410 LED is lit down, thereby making it impossible to enter the HELP screen 4101. Whether or not it is possible to enter the HELP screen 4101 during the gaming is specified individually for each game. Basically, in each place of destination, it is specified that entering the HELP screen 4101 during any operation other than the idling operation is impossible. On the HELP screen 4101, the first page is invariably first displayed.

A process during the entering the HELP screen 4101.

Upon the occurrence of error/door open, exiting from the HELP screen 4101 (returning to the game screen) is conducted and the error/door open is displayed. When bills or coins are inputted, exiting from the HELP screen 4101 is conducted and a credit is accepted. When an audit key is turned, exiting from the HELP screen 4101 is conducted and the audit screen is displayed. Thereafter, upon exiting from the audit screen, returning to the idling state is conducted. In a case in which a power-off operation is conducted, upon turning on a power supply, the HELP screen 4101 is not displayed and the process enters the idling state. In a case in which a no-inputting-state continues for three minutes with the HELP screen 4101 being displayed, exiting from the HELP screen 4101 is conducted and the process enters the idling state.

(Detail of Display Screen: HELP screen 4101: Page Configuration)

Necessary items are described in a page format in the order of a payout table item, a basic rule item, a win line item, a feature item, a unique benefit feature item, and a number-of-bet item. Each of the items may be described in a plurality of pages.

In the payout table item, all win combinations are described. The combinations are described in order of strength. For example, the order is "a picture symbol→a royal symbol". In the basic rule item, ways of playing and basic plays as plays in a gambling game are described. In the win line item, paylines are described. In the feature item, when there are a plurality of features, each of the features is described in each separate page, and when a payout table distinct from that of the base game is used, it is described after the feature rule. In the unique benefit feature item, game unique feature rules such as "High Power", "Max BET Special", and "RESCUE" are described. In the number-of-bet item, a range of money amounts used for playing a game is displayed. For example, the range of a minimum to a maximum inputted by using the BET button is displayed.

The basic rule item has the following contents as display data: "This game is premised on playing on all lines."; "Select a credit wagered on each line."; "All wins are displayed with credits."; "A win is determined based on symbols on continuous reels, excluding bonus symbols (bonus symbols during each of the free game), starting from a leftmost reel."; "A win is determined based on symbols on lighting-up lines excluding bonus symbols (bonus symbols during each of the free game)."; "A maximum amount of winning is targeted on each line."; "A win on a different line is added."; "Multiplication is conducted for winning on a line with a credit wagered on each line."; "Any erroneous operation nullifies all payouts and plays."; and "It is necessary for a player to check whether a proper credit has been registered before a game is started."

(Detail of Display Screen: Audit Screen)

Figure 26:
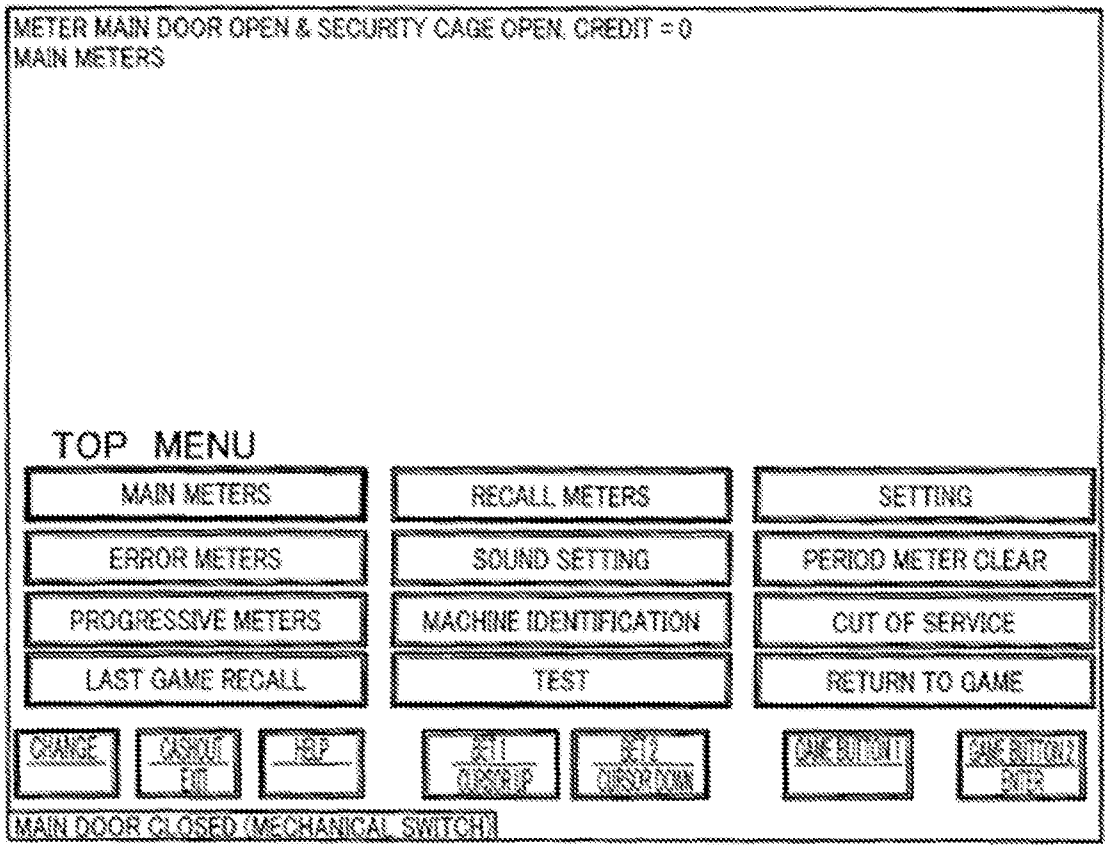
FIG. 26 is an explanatory diagram of an audit screen.
Figure 27:
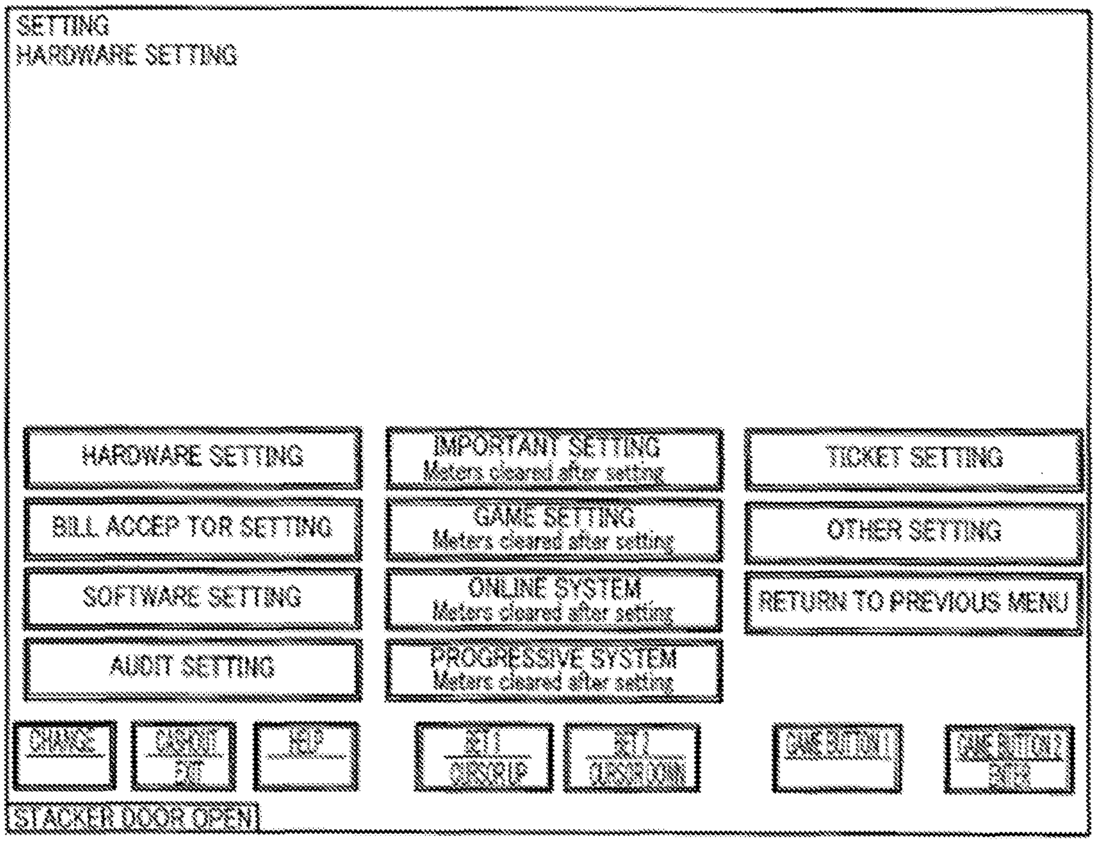
FIG. 27 is an explanatory diagram of the audit screen.

As shown in FIG. 26, on the audit screen, setting of switching of a national flag using an audit menu is made possible. In the setting of switching of a national flag using the audit menu, designation of a "national flag" to be displayed on the touch button upon switching a language can be set with the audit menu. For example, entering the "audit menu" is conducted. Thereafter, when "SETTING" is pressed and as shown in FIG. 27, "SOFTWARE SETTING" is pressed, the process shifts to a screen shown in FIG. 28A. As for operations performed by the control panel 30 and the like, the current specification is taken over.

Figures 28A, 28B:
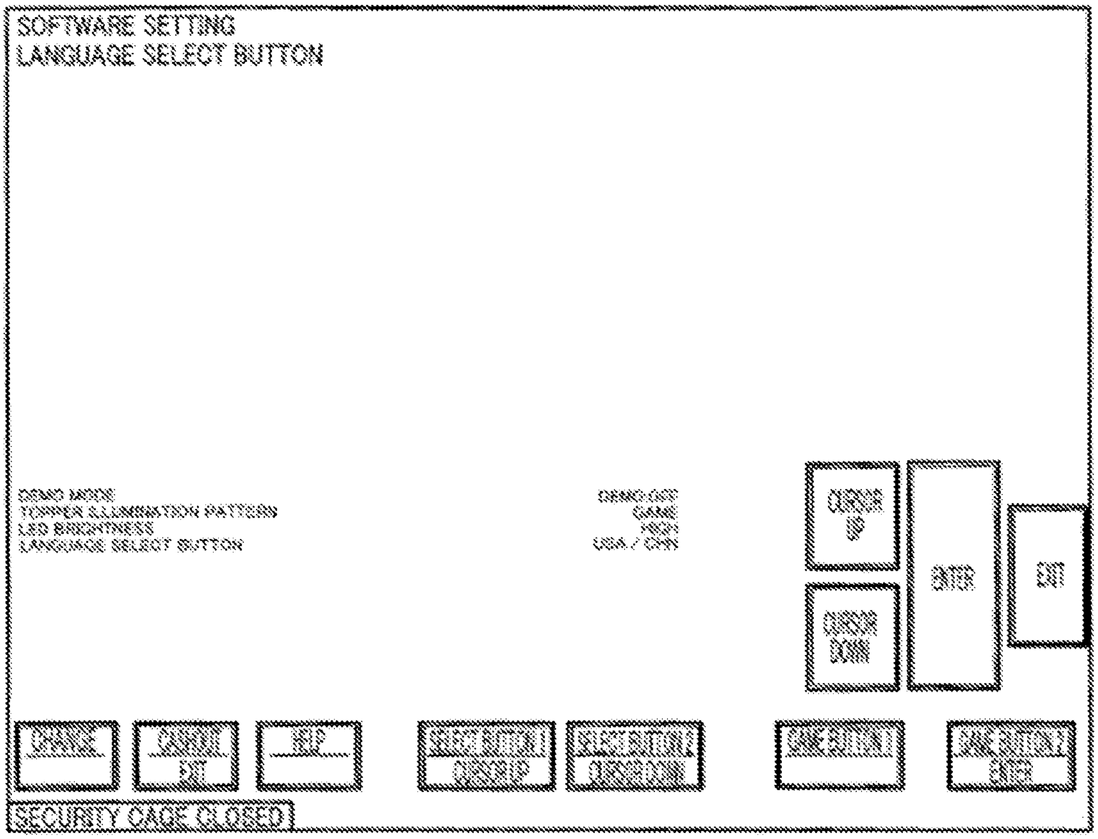
FIG. 28A is an explanatory diagram of the audit screen.
FIG. 28B is an explanatory diagram of a function of the audit screen.

In the screen shown in FIG. 28A, a "LANGUAGE SELECT BUTTON DISPLAY" item is added. With respect to the language switching button, a display in this hierarchy becomes any of the following. Specifically, "LANGUAGE SELECT BUTTON DISPLAY" becomes any of "DISABLED", "UK/CHN", and "US/CHN".

In addition, an initial display upon clearing an RAM becomes as shown in FIG. 28B. In other words, in North America, a display language is English, a national flag is US/China, and a US flag on a function and touch button is on a front side. In Macao, a display language is English, a national flag is US/China, and a US flag on the function and touch button is on a front side. In the other region, a display language is English, a national flag is US/China, and a US flag on the function and touch button is on a front side.

Figure 29:
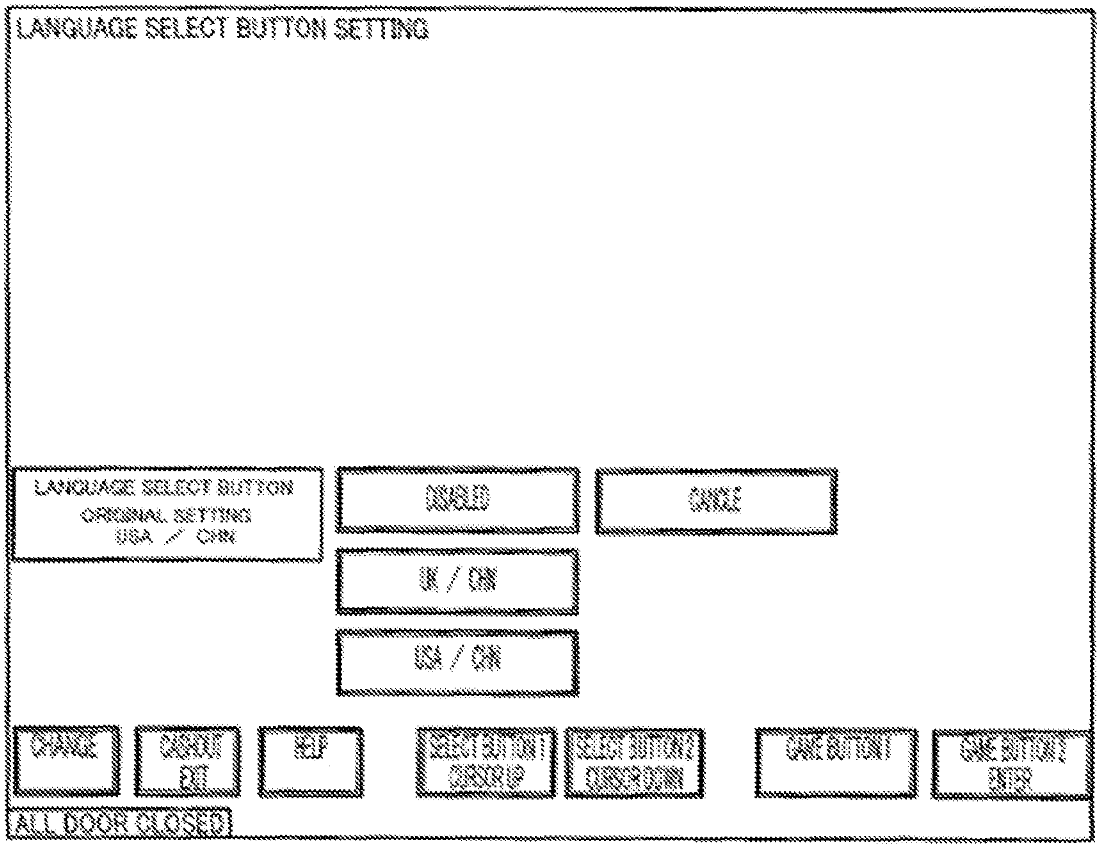
FIG. 29 is an explanatory diagram of a display language.

In addition, upon selecting the "LANGUAGE SELECT BUTTON DISPLAY" item, a screen shown in FIG. 29 appears. Selected items are enclosed by red frames. In addition, as for the operations performed by the control panel 30 and the like, the current specification is taken over. Here, "DISABLED" is for switching function disabling setting (only English). A display is changed from the language switching touch button to "PAYTABLE TOUCH BUTTON". After touching (determination with the button), a screen in a one level higher hierarchy appears, and the determination is reflected thereon. On the "UK/CHN", a British flag is set. On the "USA/CHN", a U.S. flag is set. They also function to set switching enabling (switching touch button display). After touching (determination with the button), a screen in a one level higher hierarchy appears, and the determination is reflected thereon. The flag of a country of the selected language becomes a touch button on a front side (the Chinese flag is behind.). The "CANCEL" is to cancel this screen and return to a one level higher hierarchy. The previously set contents remain as they are.

(Control Panel 30)

Figure 30:
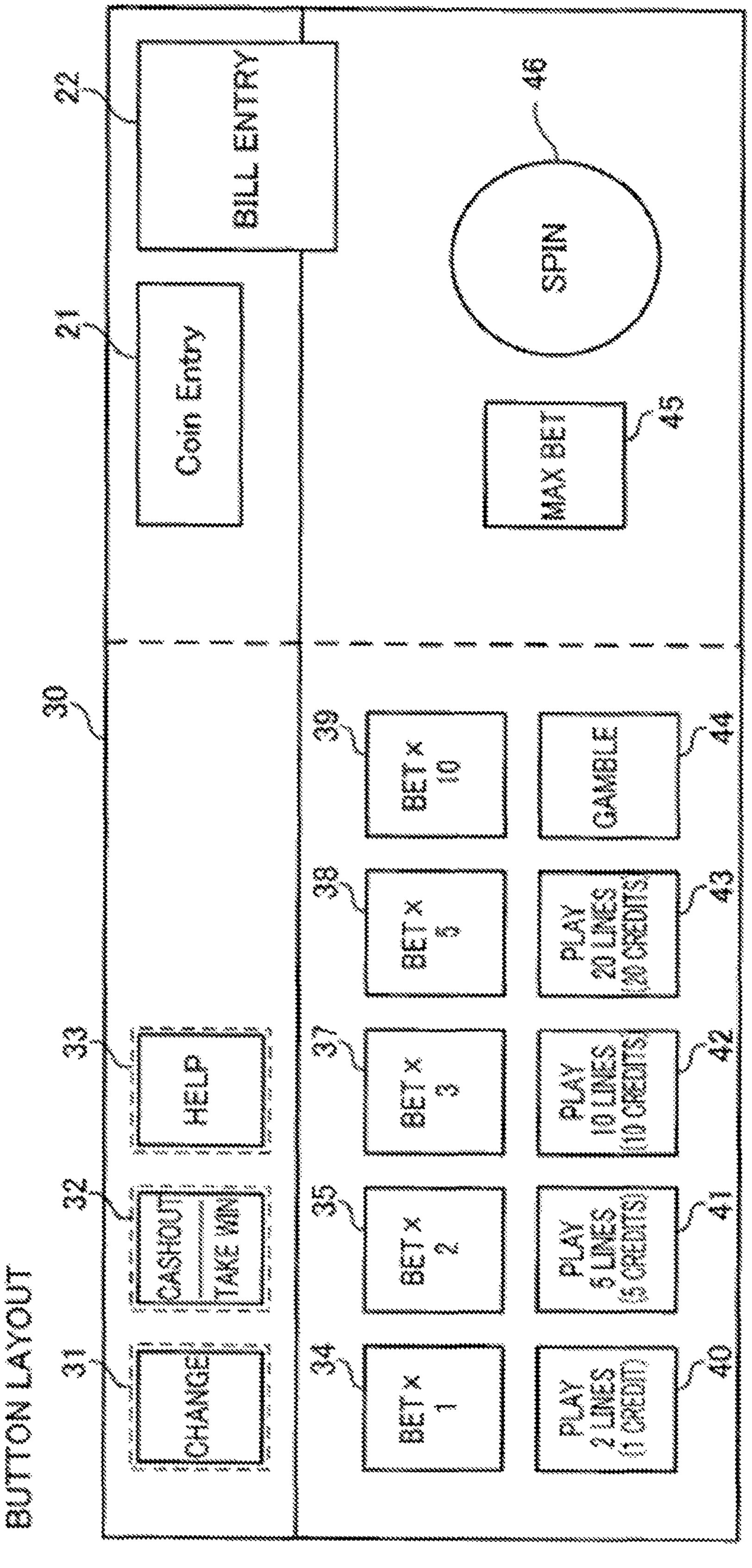
FIG. 30 is an explanatory diagram of the audit screen.
Figure 31A:
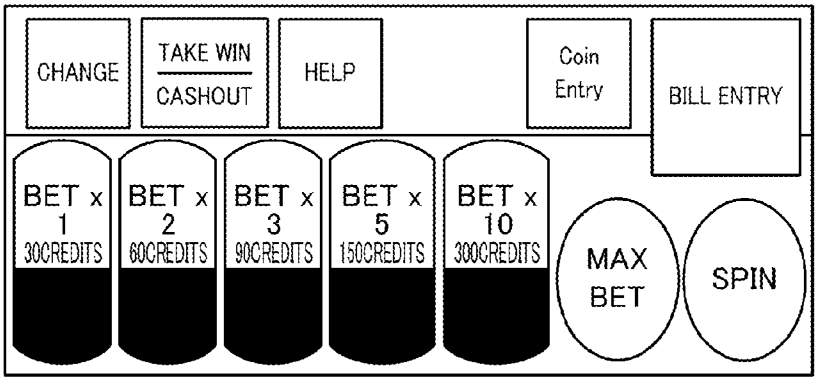
FIG. 31A is a front view of a control panel.
Figure 31B:
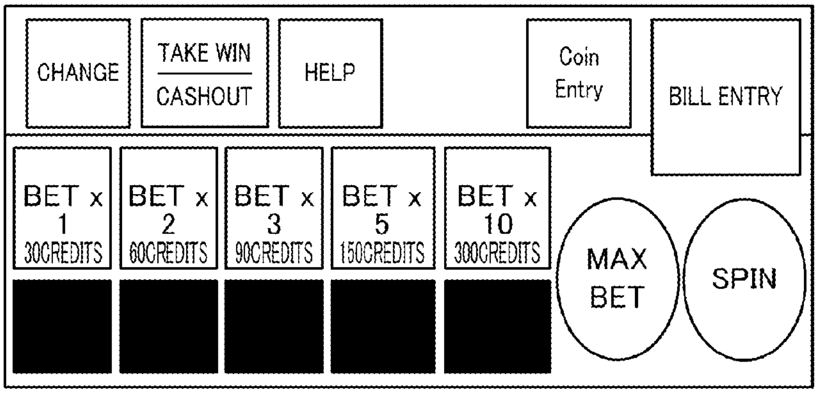
FIG. 31B is a front view of a control panel.
Figure 31C:
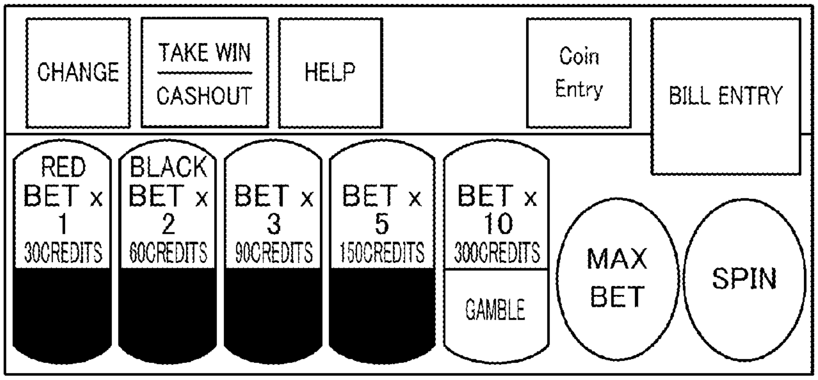
FIG. 31C is a front view of a control panel.
Figure 31D:
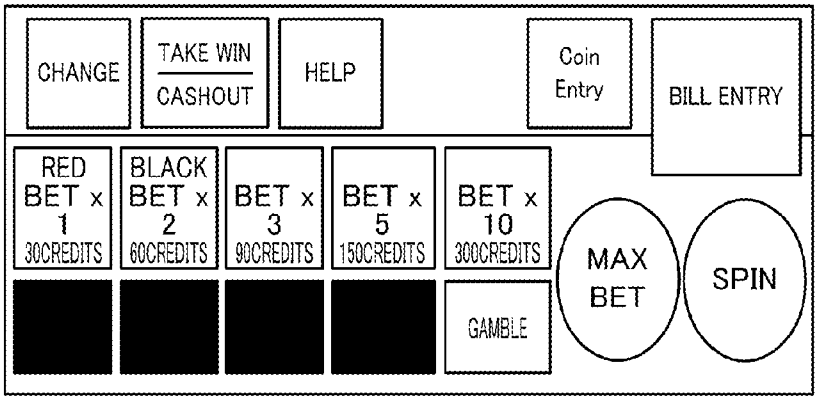
FIG. 31D is a front view of a control panel.

Below the lower image display panel 141 on which the audit screen and the like are displayed, as shown in FIG. 30, the control panel 30 is located. The control panel 30 includes a variety of buttons, the coin entry 21 for accepting coins inside the cabinet, the bill entry 22, and the like.

Specifically, on the control panel 30, a CHANGE button 31, a CASHOUT button 32, and a HELP button 33 are located on an upper stage in an area on the observer's left, and a 1-BET button 34, a 2-BET button 35, a 3-BET button 37, a 5-BET button 38, and a 10-BET button 39 are located on a middle stage in the area on the observer's left. Furthermore, the control panel 30 includes a PLAY 2 LINES button 40, a PLAY 5 LINES button 41, a PLAY 10 LINES button 42, a PLAY 20 LINES button 43, and a GAMBLE button 44 which are located on a lower stage in the area on the observer's left. The control panel 30, as shown in FIG. 31A to FIG. 31D, may be configured so as to allow button designs to be replaced in accordance with a kind of a game and the like.

The control panel 30 allows selections similar to those performed by the touch panel, on a variety of selection screens. For example, by operating the 1-BET button 34, a cursor upon the selection can be moved in a left direction, and by operating the 10-BET button 39, the cursor upon the selection can be moved in a right direction. It is preferable that upon the operation thereof, a light source inside each of the buttons is lit up.

In addition, as shown in FIG. 30, the control panel 30 includes the coin entry 21 and the bill entry 22 which are located on an upper stage in an area on the observer's right and a MAX BET button 45 and a SPIN button 46 which are located on a lower stage in the area on the observer's right.

The above-mentioned CHANGE button 31 is an operation button used upon leaving a seat or upon requesting exchange of money from hall staff. The CASHOUT button 32 is used to add an amount of credit data pertinent to credits obtained in a variety of games to an amount of credit data stored in the IC card inserted into the PTS terminal 700, namely, an account-adjusting button. The HELP button 33 is a button pressed when a way of operating a game and the like are unknown, and when the HELP button 33 is pressed, a variety of pieces of help information are displayed on the below-described presentation effects mechanism 131 and lower image display panel 141.

The 1-BET button 34 is a button for allowing each one of credits, which a player has, to be bet for each active payline each time the 1-BET button 34 is pressed. The 2-BET button 35 is a button for starting a game with two bets for each active payline. In addition, the 3-BET button 37 is a button for starting a game with three bets for each active payline. In addition, the 5-BET button 38 is a button for staring a game with five bets for each active payline. In addition, the 10-BET button 39 is a button for staring a game with 10 bets for each active payline. The MAX BET button 45 is a button for activating 20 paylines which are a maximum number of paylines when being pressed. This causes the number of activated paylines L to be a maximum number of "20". Accordingly, by pressing each of the 1-BET button 34, the 2-BET button 35, the 3-BET button 37, the 5-BET button 38, the 10-BET button 39, and the MAX BET button 45, the number of bets placed on each one of the active paylines is determined.

The PLAY 2 LINES button 40, when being pressed, is a button for activating two paylines. This causes the number of activated paylines to be "two". The PLAY 5 LINES button 41, when being pressed, is a button for activating five paylines. This causes the number of activated paylines to be "five". The PLAY 10 LINES button 42, when being pressed, is a button for activating 10 paylines. This causes the number of activated paylines to be "10". The PLAY 20 LINES button 43, when being pressed, is a button for activating 20 paylines. This causes the number of activated paylines to be "20".

The GAMBLE button 44 is an operation button used upon shifting to a gamble game, for example, after finishing a bonus game. Here, the gamble game is a game played by using the obtained credits.

The SPIN button 46 is a button used upon starting the scrolling of symbols. In addition, this SPIN button 46 also functions as a button for starting a bonus game and adding a payout obtained in the bonus game to an amount of the credits. The coin entry 21 is to accept coins inside the cabinet. The bill entry 22 is to identify the propriety of each bill and accept legitimate bills inside the cabinet.

(Detail of Operation of Control Panel 30)

Contents of the operations of the control panel 30 are altered and restricted in conjunction with the contents and process operations of the display screen of the lower image display panel 141.

(Detail of Operation of Control Panel 30: Immediately after Clearing a RAM)

Figure 32A:
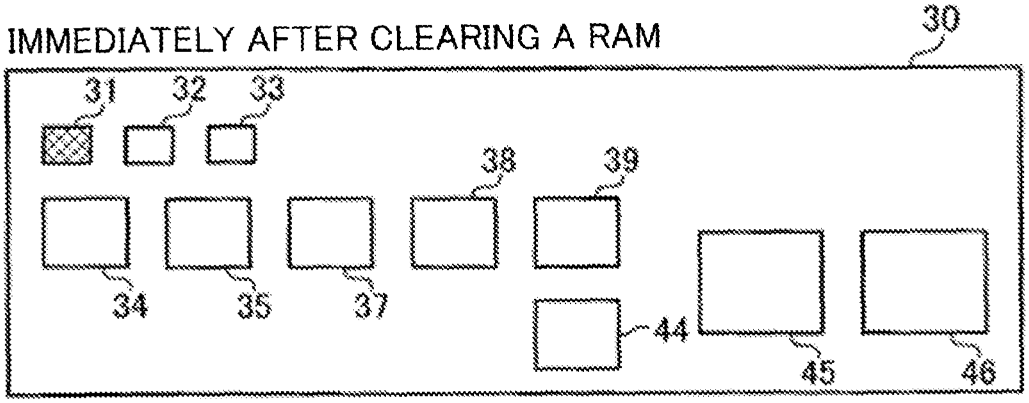
FIG. 32A is an explanatory diagram showing operation state of the control panel.

As shown in FIG. 32A, the CHANGE button 31 is lit down and deactivated, and each time the CHANGE button 31 is pressed down, lighting-up and lighting-down are repeated. The CASHOUT button 32 is lit down and deactivated. The HELP button 33 is lit up and activated. The 1-BET button 34 to the 10-BET button 39 are lit up and activated. The GAMBLE button 44 is lit down and deactivated. The MAX BET button 45 is lit down and deactivated. The SPIN button 46 is lit down and deactivated.

The GAMBLE button 44 is present only when the GAMBLE ENABLE is set. The GAMBLE button 44 is lit up and activated basically only when the "PLAY ON, GAMBLE OR TAKE WIN" is displayed. Otherwise, the GAMBLE button 44 is lit down and deactivated.

(Detail of Operation of Control Panel 30: In an Idling State (with No Credit))

Figure 32B:
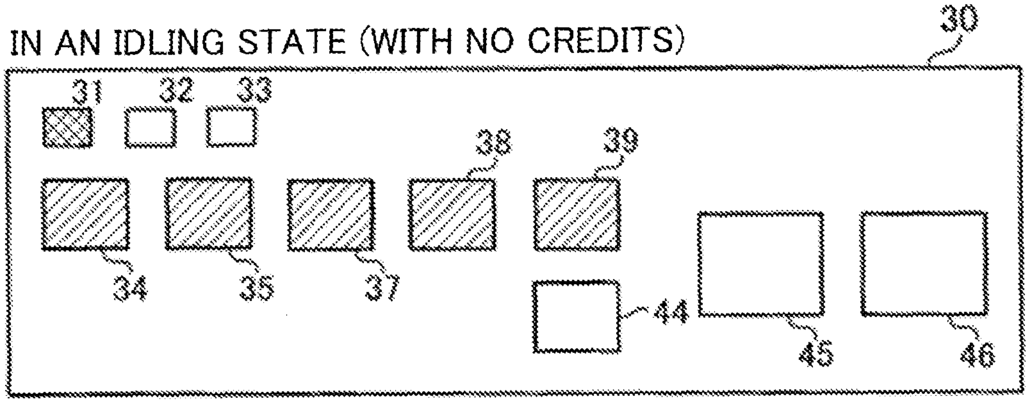
FIG. 32B is an explanatory diagram showing operation state of the control panel.

As shown in FIG. 32B, the CHANGE button 31 is lit down and activated. Each time the CHANGE button 31 is pressed down, lighting-up and lighting-down are repeated. The CASHOUT button 32 is lit down and activated. The HELP button 33 is lit up and activated. The 1-BET button 34 to 10-BET button 39 are lit down or up and activated. In other words, a state of a previous play is held. The GAMBLE button 44 is lit down and activated. The MAX BET button 45 is lit down and activated. The SPIN button 46 is lit down and activated.

(Detail of Operation of Control Panel 30: In an Idling State (with Credits))

Figure 32C:
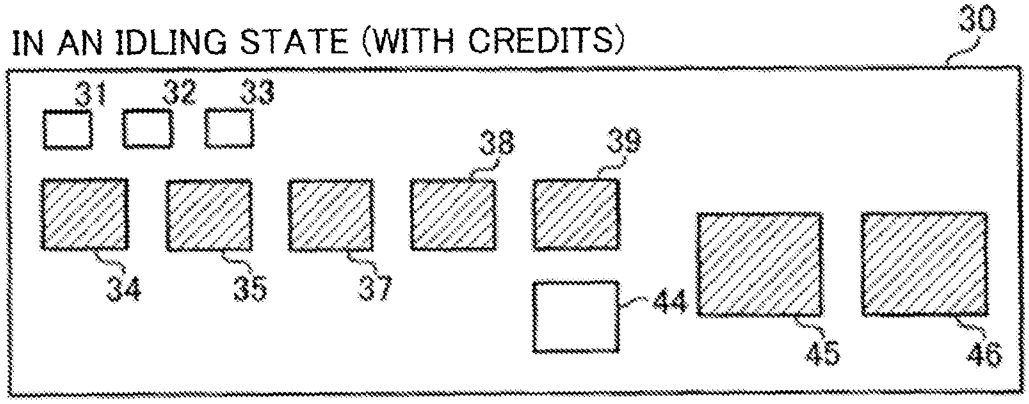
FIG. 32C is an explanatory diagram showing operation state of the control panel.

As shown in FIG. 32C, the CHANGE button 31 is lit down and activated. Each time the CHANGE button 31 is pressed down, lighting-up and lighting-down are repeated. The CASHOUT button 32 is lit up and activated. The HELP button 33 is lit up and activated. The 1-BET button 34 to 10-BET button 39 are lit down or up and activated. In other words, a state of a previous play is held. The GAMBLE button 44 is lit down and deactivated. The MAX BET button 45 is lit up when a maximum bet can be placed, and upon pressing the MAX BET button 45, a game is started with the "maximum bet". When there is a credit less than a maximum bet, the MAX BET button 45 is lit up, and upon pressing the MAX BET button 45, the maximum bet which can be placed is selected. When there is a credit less than one bet, the MAX BET button 45 is lit down and deactivated. The SPIN button 46 is lit up and activated in a bet pattern in which the remaining credit is selected. When the remaining credit is less than an amount in the selected bet pattern, the SPIN button 46 is lit down and deactivated.

(Detail of Operation of Control Panel 30: a SPIN Button 46 Pressing and Releasing PLAY)

Figure 33A:
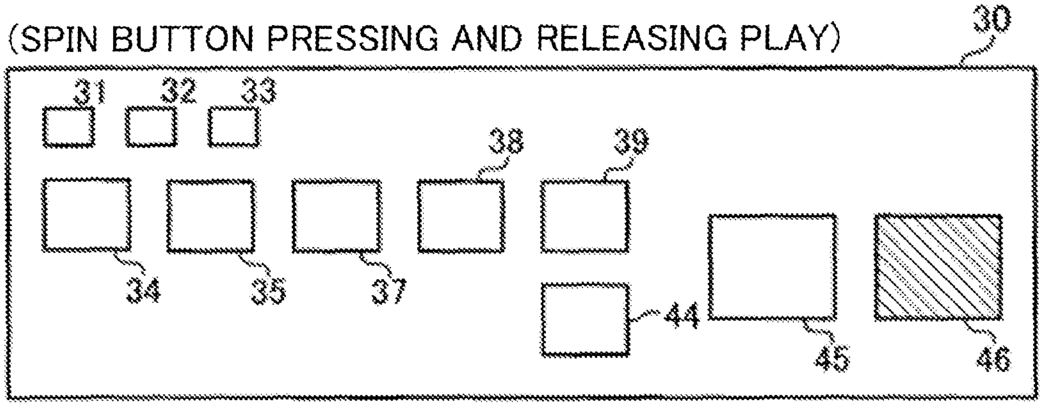
FIG. 33A is an explanatory diagram showing operation state of the control panel.

As shown in FIG. 33A, when being pressed and released, the SPIN button 46 actuates automatic betting. The MAX BET button 45 is lit down and deactivated. The other buttons are lit down and deactivated. With the automatic betting function (button), the same operations as those performed during the reel spinning and the win incrementing are performed. However, during the win incrementing, when the lighting-up button thereof is pressed, the next game is started, instead of the game-over. Upon the occurrence of a payout, the same operation as that performed during the win incrementing is performed. Upon the occurrence of losing, the same operation as that performed during the reel spinning is performed. Upon waiting for a feature game, it is necessary to press down the SPIN button 46 again when the SPIN button 46 is to be pressed down.

(Detail of Operation of Control Panel 30: While the HELP Screen is Displayed)

Figure 33B:
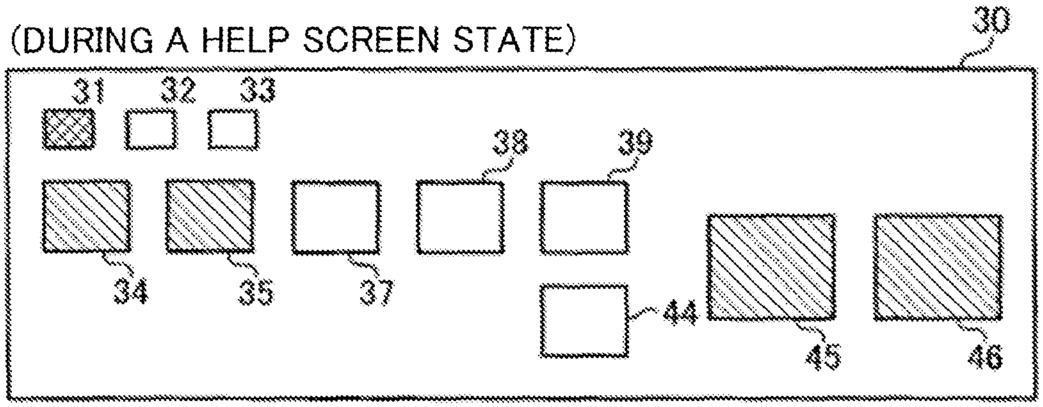
FIG. 33B is an explanatory diagram showing operation state of the control panel.

As shown in FIG. 33B, the CHANGE button 31 is lit down and activated. Each time the CHANGE button 31 is pressed down, lighting-up and lighting-down are repeated. The CASHOUT button 32 is lit down and deactivated. The HELP button 33 is lit up and activated. By pressing down the HELP button 33, the HELP is finished. The 1-BET button 34 is lit up and activated. By pressing down the 1-BET button 34, the HELP screen proceeds to the next page. The 2-BET button 35 is lit up and activated. By pressing down the 2-BET button 35, the HELP screen returns to a previous page. The MAX BET button 45 is lit up and activated. By pressing down the MAX BET button 45, the HELP is finished. The SPIN button 46 is lit up and activated. By pressing down the SPIN button 46, the HELP is finished. The other buttons are lit down and deactivated.

(Detail of Operation of Control Panel 30: During the Reel Spinning (the Same as Also in Each of the Free Games))

Figure 33C:
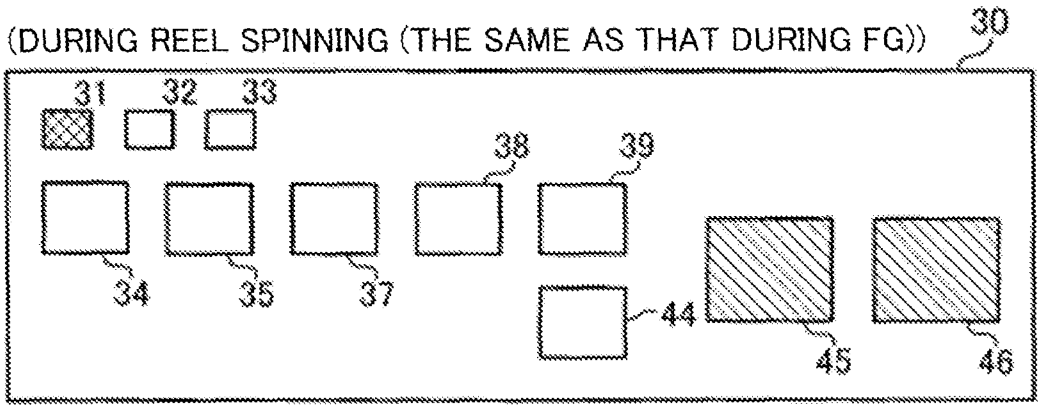
FIG. 33C is an explanatory diagram showing operation state of the control panel.

As shown in FIG. 33C, the CHANGE button 31 is lit down and activated. Each time the CHANGE button 31 is pressed down, lighting-up and lighting-down are repeated. The CASHOUT button 32 is lit down and deactivated. The HELP button 33 is lit down and deactivated. The MAX BET button 45 is lit up and activated. By pressing down the MAX BET button 45, a quick stop is performed. The SPIN button 46 is lit up and activated. By pressing down the SPIN button 46, the quick stop is performed. The other buttons are lit down and deactivated.

(Detail of Operation of Control Panel 30: a Screen of Presentation Effects Which can be Cancelled is Displayed)

Figure 34A:
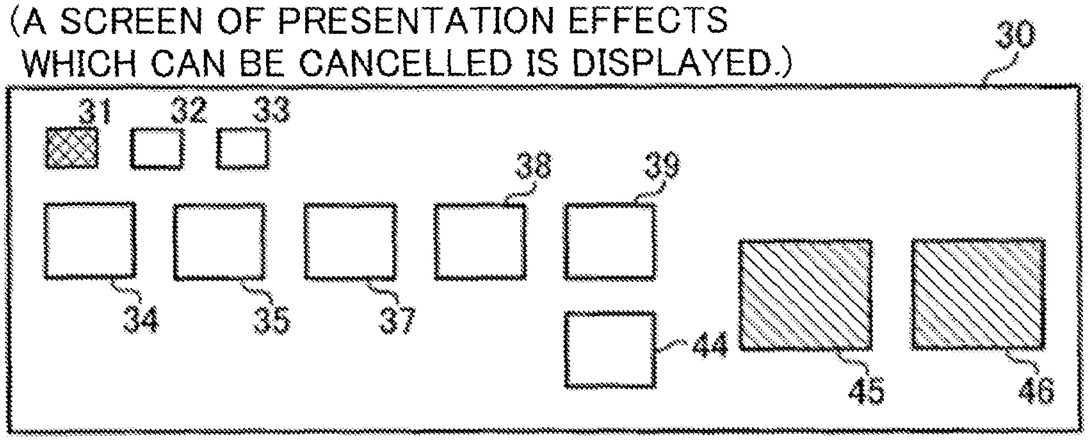
FIG. 34A is an explanatory diagram showing operation state of the control panel.

As shown in FIG. 34A, the CHANGE button 31 is lit down and activated. Each time the CHANGE button 31 is pressed down, lighting-up and lighting-down are repeated. The CASHOUT button 32 is lit down and deactivated. The HELP button 33 is lit down and deactivated. The MAX BET button 45 is lit up and activated. By pressing down the MAX BET button 45, the presentation effects are cancelled. The SPIN button 46 is lit up and activated. By pressing down the SPIN button 46, the presentation effects are cancelled. The other buttons are lit down and deactivated.

(Detail of Operation of Control Panel 30: In the Base Game Upon the Win Incrementing)

Figure 34B:
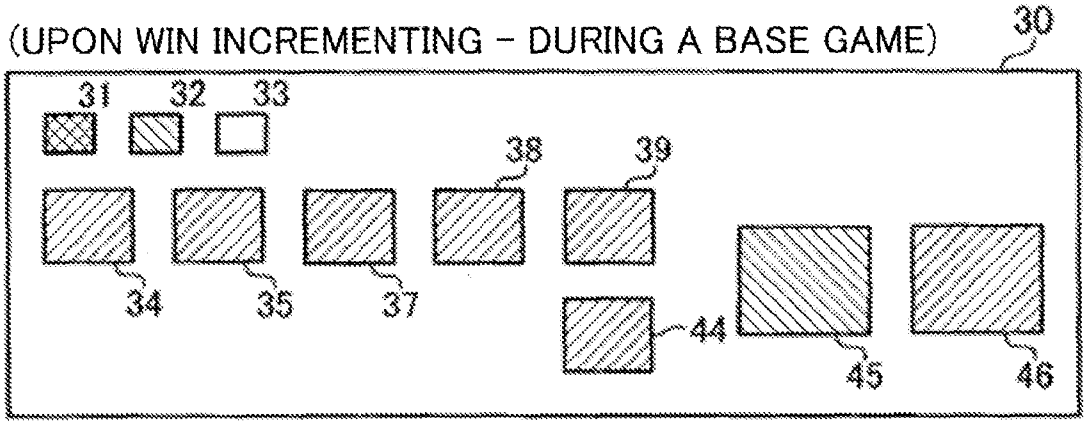
FIG. 34B is an explanatory diagram showing operation state of the control panel.

As shown in FIG. 34B, the CHANGE button 31 is lit down and activated. Each time the CHANGE button 31 is pressed down, lighting-up and lighting-down are repeated. The CASHOUT button 32 is lit up and activated. By pressing down the CASHOUT button 32, the incrementing is cancelled. The HELP button 33 is lit down and activated. The 1-BET button 34 to 10-BET button 39 are lit down or up and activated. By pressing down each of the 1-BET button 34 to 10-BET button 39, the incrementing is cancelled, the game-over occurs, a change to the selected bet is conducted, and lighting-up is performed. In other words, a state of a previous play is held. The 1-BET button 34 to 10-BET button 39 may be lit down or up and activated, and by pressing down each of the 1-BET button 34 to 10-BET button 39, the incrementing may be cancelled and the game-over may occur. The MAX BET button 45 is lit up and activated. By pressing down the MAX BET button 45, the incrementing is cancelled and operations from the take-win to the game-over are performed. The SPIN button 46 is lit up and activated. By pressing down the SPIN button 46, the incrementing is cancelled and operations from the take-win to the game-over are performed. Furthermore, when any credit which allows repeated betting is held, the next game is started. The SPIN button 46 may be lit up and activated, and by pressing down the SPIN button 46, the incrementing may be cancelled and the game-over may occur. The GAMBLE button 44 is lit up and activated when gambling is activated. By pressing down the GAMBLE button 44, the incrementing is cancelled, and a gamble screen is displayed. The GAMBLE button 44 is lit down and deactivated when gambling is deactivated.

(Detail of Operation of Control Panel 30: Upon the Win Incrementing in Each of the Free Games)

Figure 35A:
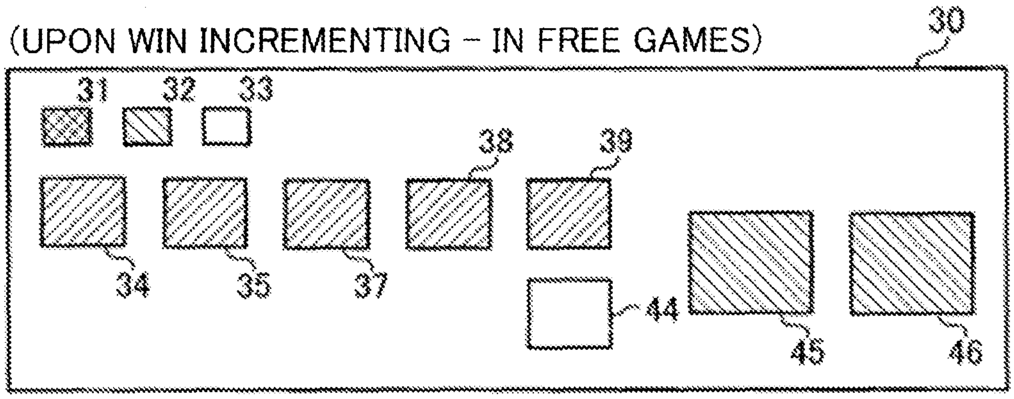
FIG. 35A is an explanatory diagram showing operation state of the control panel.

As shown in FIG. 35A, the CHANGE button 31 is lit down and activated. Each time the CHANGE button 31 is pressed down, lighting-up and lighting-down are repeated. The CASHOUT button 32 is lit up and activated. When there is/are the remaining game(s), the next game is started. When there is no remaining game, the operation shifts to a TOTAL WIN signboard. The HELP button 33 is lit down and deactivated. The 1-BET button 34 to 10-BET button 39 are lit down or up and activated. Among the 1-BET button 34 to 10-BET button 39, only the button pressed for placing any of bets to trigger each of the free games is lit up. When there is/are the remaining game (s), the next game is started. When there is no remaining game, the operation shifts to the TOTAL WIN signboard. The MAX BET button 45 is lit up and activated. When there is/are the remaining game (s), the next game is started. When there is no remaining game, the operation shifts to the TOTAL WIN signboard. The SPIN button 46 is lit up and activated. When there is/are the remaining game (s), the next game is started. When there is no remaining game, the operation shifts to the TOTAL WIN signboard. The GAMBLE button 44 is lit down and deactivated.

(Detail of Operation of Control Panel 30: After Winning in Each of the Free Games and Upon the Incrementing of a Triggered Payout)

Figure 35B:
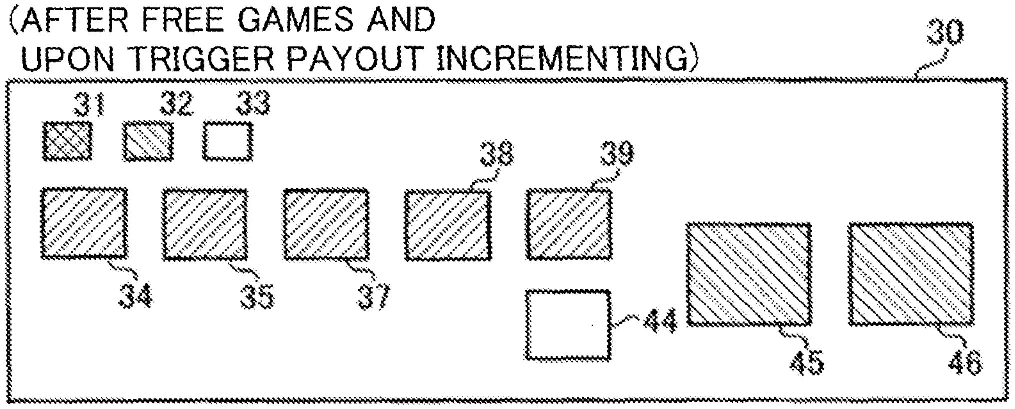
FIG. 35B is an explanatory diagram showing operation state of the control panel.

As shown in FIG. 35B, the CHANGE button 31 is lit down and activated. Each time the CHANGE button 31 is pressed down, lighting-up and lighting-down are repeated. The CASHOUT button 32 is lit up and activated. By pressing down the CASHOUT button 32, the incrementing is cancelled and the operation shifts to the next step. The HELP button 33 is lit down and deactivated. The 1-BET button 34 to 10-BET button 39 are lit down or up and activated. Among the 1-BET button 34 to 10-BET button 39, only the button pressed for placing any of bets to trigger each of the free games is lit up. By pressing down each of the 1-BET button 34 to 10-BET button 39, the operation shifts to the next step. The MAX BET button 45 is lit up and activated. By pressing down the MAX BET button 45, the incrementing is cancelled and the operation shifts to the next step. The SPIN button 46 is lit up and activated. By pressing down the SPIN button 46, the operation shifts to the next step. The GAMBLE button 44 is lit down and deactivated.

(Detail of Operation of Control Panel 30: Upon Selection Waiting—Direct Selection on the Control Panel 30)

Figure 35C:
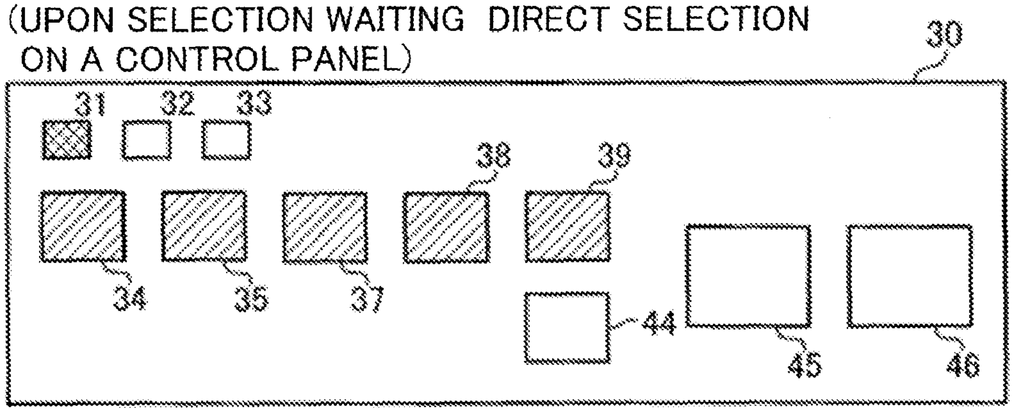
FIG. 35C is an explanatory diagram showing operation state of the control panel.

As shown in FIG. 35C, the CHANGE button 31 is lit down and activated. Each time the CHANGE button 31 is pressed down, lighting-up and lighting-down are repeated. The CASHOUT button 32 is lit down and deactivated. The HELP button 33 is lit down and deactivated. When being assigned to selection buttons, the 1-BET button 34 to 10-BET button 39 are lit up and activated. When not being assigned to selection buttons, the 1-BET button 34 to 10-BET button 39 are lit down and deactivated. The MAX BET button 45 is lit down and deactivated. The SPIN button 46 is lit down and deactivated. The GAMBLE button 44 is lit down and deactivated.

(Detail of Operation of Control Panel 30: Upon Selection Waiting—Selection by Moving a Cursor)

Figure 36A:
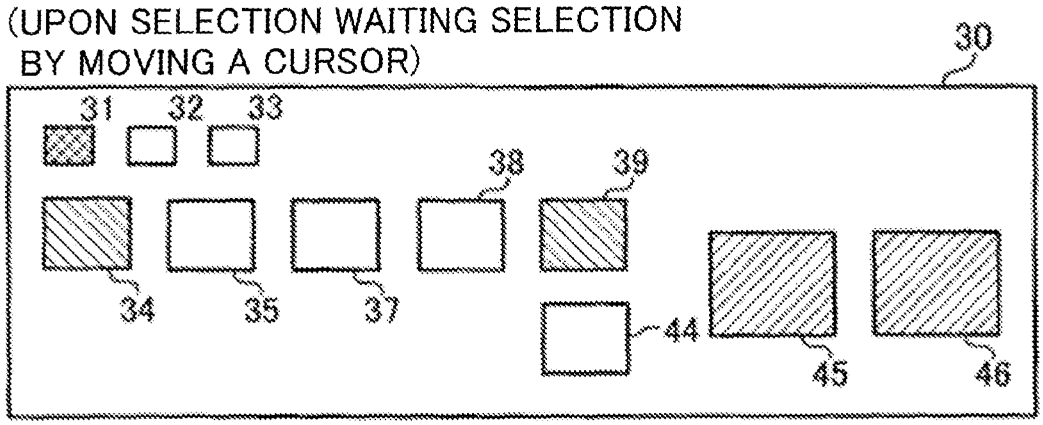
FIG. 36A is an explanatory diagram showing operation state of the control panel.

As shown in FIG. 36A, the CHANGE button 31 is lit down and activated. Each time the CHANGE button 31 is pressed down, lighting-up and lighting-down are repeated. The CASHOUT button 32 is lit down and deactivated. The HELP button 33 is lit down and deactivated. The 1-BET button 34 is lit up and activated. By pressing down the 1-BET button 34, a cursor moves to the next selection choice. The 10-BET button 39 is lit up and activated. By pressing down the 10-BET button 39, the cursor moves to a previous selection choice. The MAX BET button 45, when an icon thereof is selected by the cursor, is lit up and activated. The MAX BET button 45, when the icon is not selected by the cursor, is lit down and deactivated. The SPIN button 46, when an icon thereof is selected by the cursor, is lit up and activated. The SPIN button 46, when the icon is not selected by the cursor, is lit down and deactivated. The GAMBLE button 44 is lit down and deactivated.

(Detail of Operation of Control Panel 30: After Each of the Free Games and Upon Displaying the TOTAL WIN Signboard)

Figure 36B:
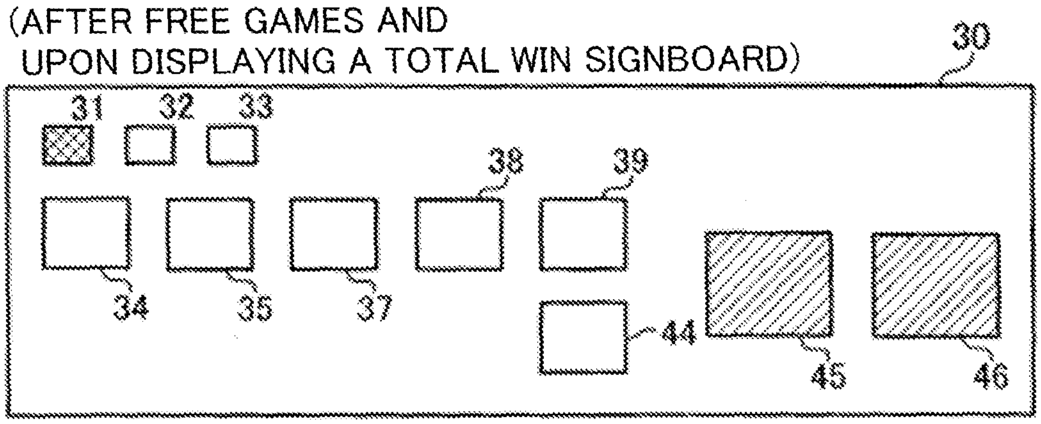
FIG. 36B is an explanatory diagram showing operation state of the control panel.

As shown in FIG. 36B, the CHANGE button 31 is lit down and activated. Each time the CHANGE button 31 is pressed down, lighting-up and lighting-down are repeated. The CASHOUT button 32 is lit down and deactivated. The HELP button 33 is lit down and deactivated. The MAX BET button 45 is lit down and deactivated until four seconds have elapsed. The MAX BET button 45 is lit up and activated after the four seconds have elapsed. The SPIN button 46 is lit down and deactivated until four seconds have elapsed. By pressing down the SPIN button 46, the determination is made. The SPIN button 46 is lit up and activated after the four seconds have elapsed.

By pressing down the SPIN button 46, the incrementing is cancelled. The GAMBLE button 44 is lit down and deactivated.

(Detail of Operation of Control Panel 30: During Displaying PLAYON, GAMBLE, or TAKEWIN)

Figure 36C:
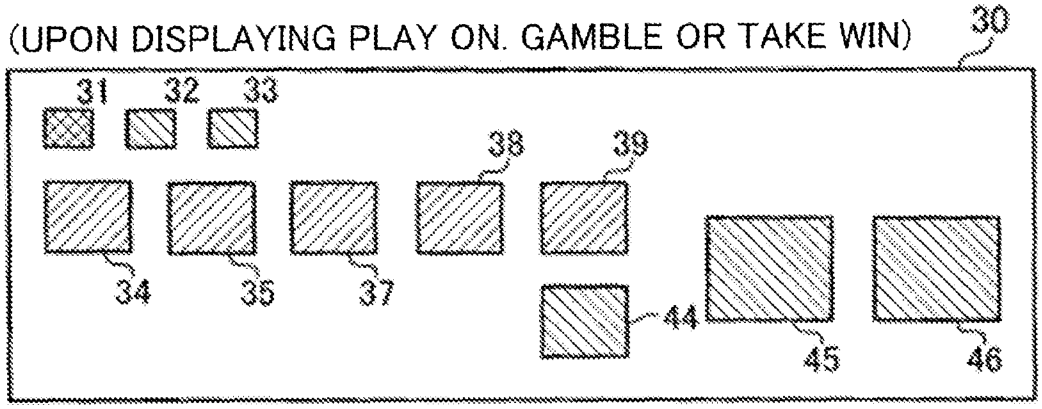
FIG. 36C is an explanatory diagram showing operation state of the control panel.

As shown in FIG. 36C, the CHANGE button 31 is lit down and activated. Each time the CHANGE button 31 is pressed down, lighting-up and lighting-down are repeated. The CASHOUT button 32 is lit up and activated. By pressing down the CASHOUT button 32, the take-win is performed and the game-over occurs. The HELP button 33 is lit up and activated. By pressing down the HELP button 33, the operation enters HELP. The 1-BET button 34 to 10-BET button 39 are lit down or up and activated. In other words, a state of a previous play is held. By pressing down each of the 1-BET button 34 to 10-BET button 39, the take-win is performed and the game-over occurs. The MAX BET button 45 is lit up and activated. By pressing down the MAX BET button 45, the incrementing is cancelled and the game-over occurs. The SPIN button 46 is lit up and activated. By pressing down the SPIN button 46, the take-win is performed and the game-over occurs. Thereafter, the next game is started. By pressing down the SPIN button 46, the incrementing may be cancelled and the game-over may occur. The GAMBLE button 44 is lit up and activated. By pressing down the GAMBLE button 44, gambling is executed.

(Detail of Operation of Control Panel 30: During Gambling)

Figure 37A:
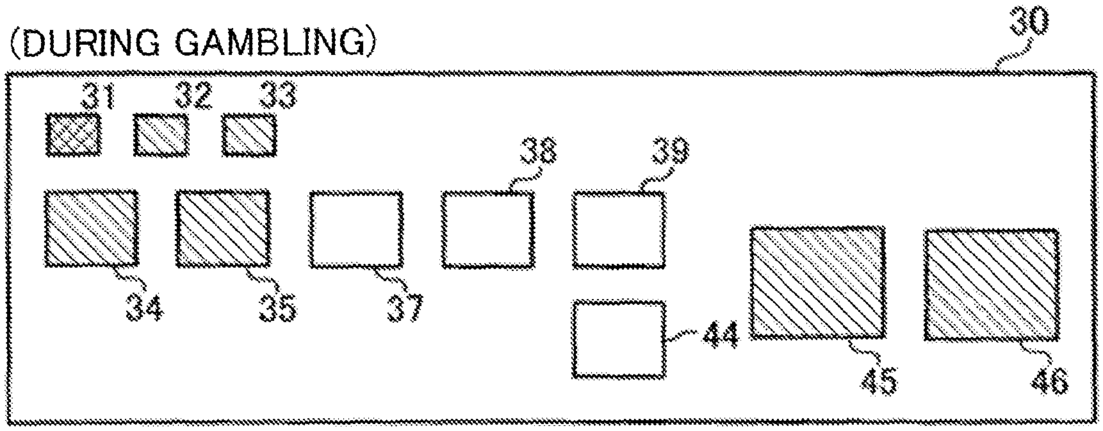
FIG. 37A is an explanatory diagram showing operation state of the control panel.

As shown in FIG. 37A, the CHANGE button 31 is lit down and activated. Each time the CHANGE button 31 is pressed down, lighting-up and lighting-down are repeated. The CASHOUT button 32 is lit up and activated. By pressing down the CASHOUT button 32, the take-win is performed and the game-over occurs. The HELP button 33 is lit up and activated. By pressing down the HELP button 33, the HELP screen is displayed. The 1-BET button 34 is lit up and activated. By pressing down the 1-BET button 34, a color of red is selected. The 2-BET button 35 is lit up and activated. By pressing down the 2-BET button 35, a color of black is selected. The MAX BET button 45 is lit up and activated. By pressing down the MAX BET button 45, the take-win is performed and the game-over occurs. The SPIN button 46 is lit up and activated. By pressing down the SPIN button 46, the take-win is performed and the next game is started. By pressing down the SPIN button 46, the take-win may be performed and the game-over may occur. The other buttons are lit down and deactivated.

(Detail of Operation of Control Panel 30: During Residual Gambling)

Figure 37B:
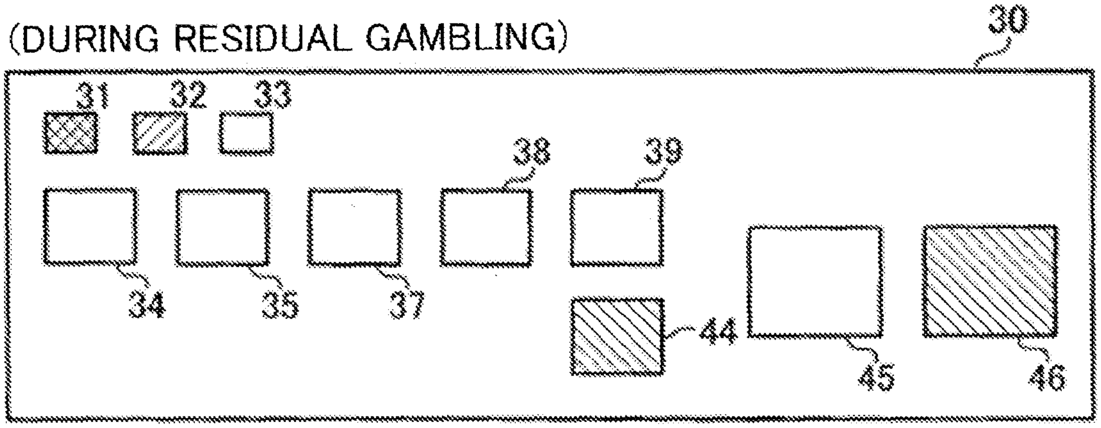
FIG. 37B is an explanatory diagram showing operation state of the control panel.

As shown in FIG. 37B, the CHANGE button 31 is lit down and activated. Each time the CHANGE button 31 is pressed down, lighting-up and lighting-down are repeated. The CASHOUT button 32 is lit up and activated in a case of GAMBLE-ODD SUM. By pressing down the CASHOUT button 32, ATTENDANT PAY is performed. In a case of GAMBLE-NONE, the CASHOUT button 32 is lit down and deactivated. The HELP button 33 is lit down and deactivated. The MAX BET button 45 is lit down and deactivated. The SPIN button 46 is lit up and activated. By pressing down the SPIN button 46, the operation returns to the base game. The GAMBLE button 44 is lit up and activated. By pressing down the GAMBLE button 44, a residual gamble is executed. The other buttons are lit down and deactivated.

(Detail of Operation of Control Panel 30: Upon the Occurrence of an Error)

Figure 38A:
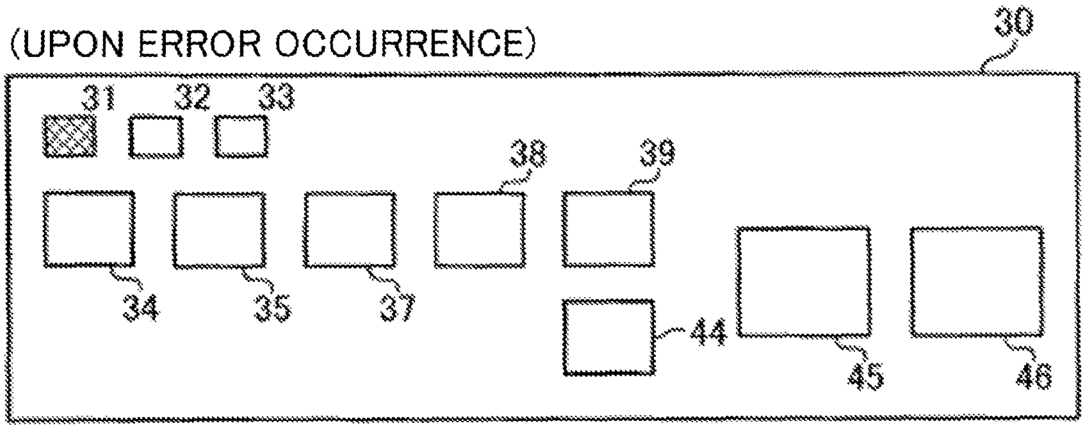
FIG. 38A is an explanatory diagram showing operation state of the control panel.

As shown in FIG. 38A, the CHANGE button 31 is lit down and activated. Each time the CHANGE button 31 is pressed down, lighting-up and lighting-down are repeated. The CASHOUT button 32 is lit down and deactivated. The other buttons are lit down and deactivated.

(Detail of Operation of Control Panel 30: After Recovering from an Error)

Figure 38B:
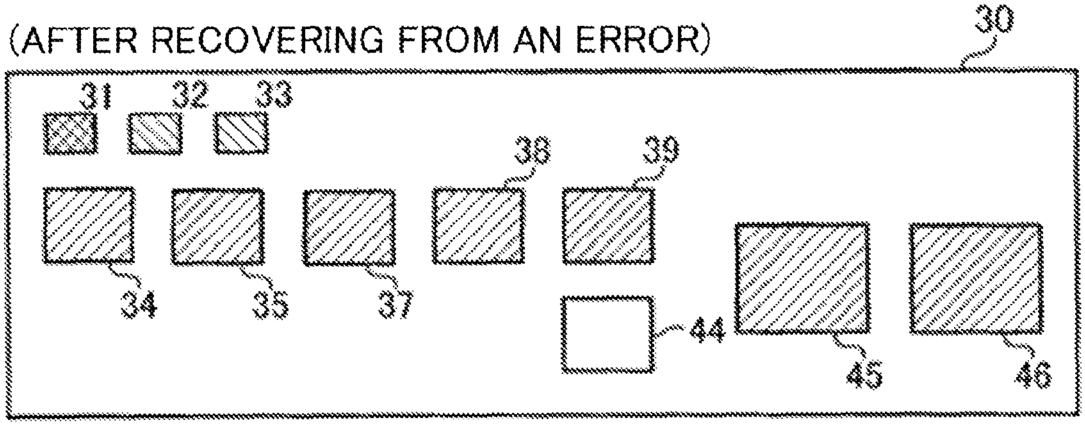
FIG. 38B is an explanatory diagram showing operation state of the control panel.

As shown in FIG. 38B, the CHANGE button 31 is lit down and deactivated. the CHANGE button 31 is lit down and activated after 120 seconds have elapsed. The CASHOUT button 32 is lit up and activated. The HELP button 33 is lit up and activated. The 1-BET button 34 to 10-BET button 39 are lit down or up and activated. In other words, a state of a previous play is held. The GAMBLE button 44 is lit down and deactivated. The MAX BET button 45 is lit up when a maximum bet can be placed, and upon pressing the MAX BET button 45, a game is started with the "maximum bet". When there is a credit less than the maximum bet, the MAX BET button 45 is lit up, and upon pressing the MAX BET button 45, the maximum bet which can be placed is selected. When there is a credit less than one bet, the MAX BET button 45 is lit down and deactivated. The SPIN button 46 is lit up and activated in a bet pattern in which the remaining credit is selected. When the remaining credit is more than an amount in the selected bet pattern, the SPIN button 46 is lit up and activated. When the remaining credit is less than the amount in the selected bet pattern, the SPIN button 46 is lit down and deactivated.

<Definitions of Terms of Gaming Machine>

The "base game" is a game which is executed on the condition that a gaming value is bet, and a gaming value in accordance with rearranged symbols is provided therein. In other words, the "base game" is a game started on the premise that the gaming value is consumed.

The "symbols" includes particular symbols and normal symbols. The particular symbols includes wild symbols and trigger symbols (bonus symbols). The wild symbols are symbols which can be used as any kinds of symbols. The trigger symbols are symbols which serve as a trigger for starting the execution of at least the bonus game. For example, the trigger symbols functions as a trigger for shifting from the base game to each of the variety of bonus games.

The "rearrangement" means a state in which after the arrangement of the symbols has been released, the symbols are arranged again. The "arrangement" means a still state in which the symbols can be visually confirmed by an outside player.

The "gaming value" indicates coins, bills, or electronic valuable information corresponding the coins or the bills. The gaming value in the present invention is not particularly limited and may be, for example, gaming media of medals, tokens, electronic money, and tickets. The ticket is not particularly limited and may be, for example, a ticket having a bar code.

The "bonus game" is a game which allows a lot of gaming values to be obtained and includes the windmill bonus game and the feature game.

The windmill bonus game includes the "equipage bonus game", the "free games", the "fixed payout bonus", the "story bonus game", and the "jackpot challenge game". Each of these bonus games is selected by a drawing which makes reference to each of the bonus game selection tables. An outcome of drawing in the bonus game is indicated on the windmill roulette 300 when three trigger symbols appear (are rearranged). The windmill roulette 300 has the four vane parts 301, 302, 303, and 304 and the inner periphery roulette 310. The vane parts 301, 302, 303, and 304 are associated with the "jackpot challenge game", the "free games", the "fixed payout (1000) bonus", and the "equipage bonus game", respectively. On the inner periphery roulette 310, a "fixed payout (30) bonus", a "fixed payout (50) bonus", a "fixed payout (100) bonus", a "fixed payout (150) bonus", a "fixed payout (200) bonus", a "story (reading) bonus game", a "story (Princess Dolcia) bonus game", a "story (battle-with-mirror knight) bonus game", and a "story (fight-against-lion) bonus game" are indicated.

The feature game includes the "wild expand feature game" and the "wild scatter feature game".

The predictive presentation effects are presentation effects for providing a notification of winning or losing in the bonus game.

In the present embodiment, as shown in FIG. 121 and FIG. 122, the predictive presentation effects includes, for example: (1) presentation effects (notification presentation effects) in which Don Quixote and Sancho fall down and drop down to the reels and the fifth reel is set in a high-speed long ready-to-win state (branch presentation effects) and it is displayed whether or not the bonus symbols are rearranged on the fifth reel; (2) presentation effects (notification presentation effects) in which Don Quixote drops down to the reel parts and a Don Quixote ready-to-win state which is a frame feed ready-to-win state is developed (branch presentation effects) and it is displayed whether or not the bonus symbols are rearranged on the fifth reel; and (3) presentation effects (success notification presentation effects) in which being caught in a thunderstorm, Don Quixote and Sancho become confused (branch presentation effects) and a bonus symbol is struck by lightning or presentation effects (failure notification presentation effects) in which Don Quixote and Sancho are struck by lightning.

As described above, since the "predictive presentation effects" are the presentation effects for providing the notification of the winning or losing in the bonus by using the branch presentation effects and the notification presentation effects, the "predictive presentation effects" are different from the "determination presentation effects" in which winning in the bonus is determined by the occurrence of the presentation effects. In the present embodiment, as shown in FIG. 121 and FIG. 122, the "determination presentation effects" includes: full-screen presentation effects, for example, (1) in presentation effects (presentation effects 2) in which a sudden gust of wind blows, Sancho and Don Quixote are blown off into the back, Don Quixote crashes against the reel parts, and all reels are stopped; (2) full-screen presentation effects in which, in presentation effects (presentation effects 3) in which Don Quixote shouts and Rosinante starts running, Sancho also pursues; and (3) windmill full-screen presentation effects (presentation effects 5) which abruptly starts without previous presentation effects.

The "predictive presentation effects cancel process" is to deactivate cancellation of presentation effects, which is conducted through the operation or the like of the BET button 601 and the SPIN button 602 (refer to FIG. 31), with respect to all or a part of kinds of predictive presentation effects among the plurality of kinds of predictive presentation effects. In the present embodiment, the predictive presentation effects cancel deactivation process is conducted when a drawing outcome in which two or more trigger symbols are rearranged results. Here, the windmill bonus game is triggered when three or more trigger symbols are rearranged. Accordingly, the "rearrangement of two or more trigger symbols" is a rearrangement by which the windmill bonus game is triggered or a rearrangement which is in short of one bonus symbol to trigger the windmill bonus game.

The "premium presentation effects" are presentation effects which do not occur unless a special condition is satisfied. In the present embodiment, the premium presentation effects are selected by a drawing when it is determined that wild symbols are displayed in an expanded manner in two or more columns in the wild expand feature game.

<Detail of a Variety of Bonus Games>

[Windmill Bonus Game]

Figure 41:
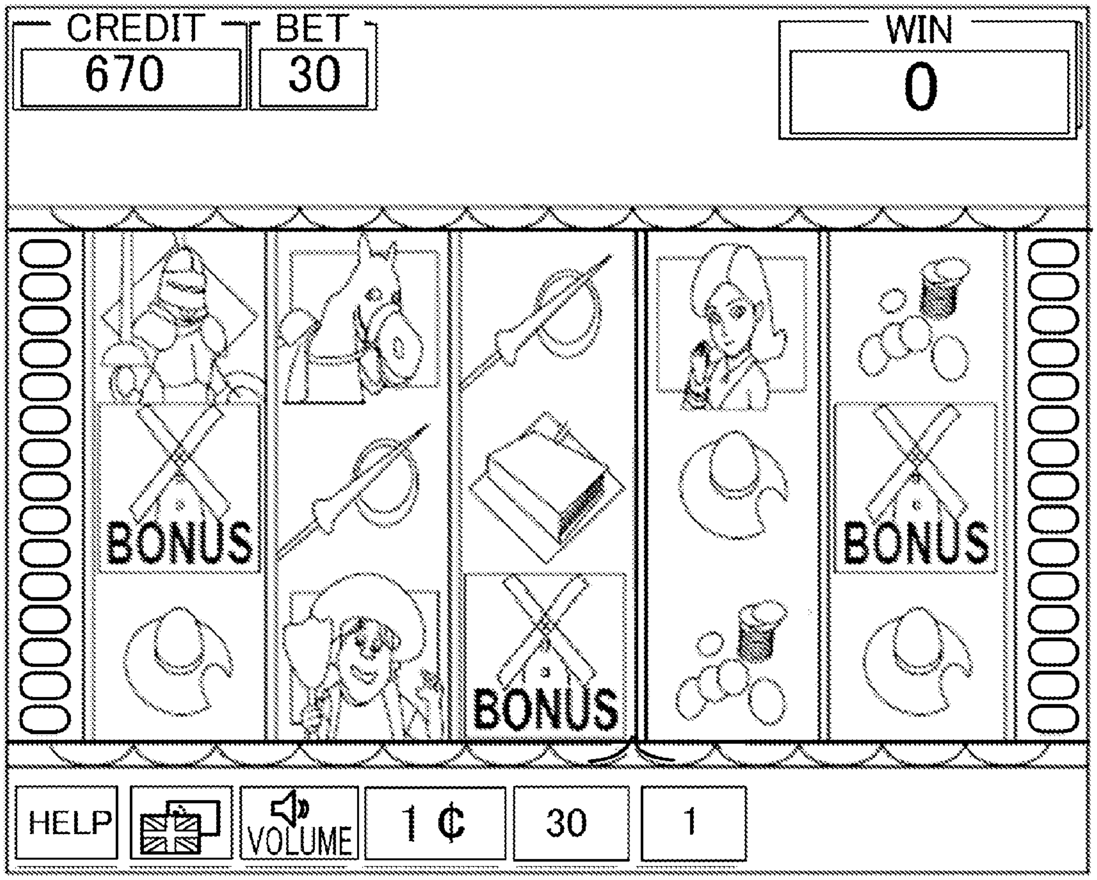
FIG. 41 is an explanatory diagram of an example of arrangement of symbols upon winning a bonus game.

As shown in FIG. 41, the windmill bonus game is a bonus game which is triggered when three or more trigger symbols (bonus symbols) are rearranged in the matrix-like symbol display region 20 of the display 2. In the present embodiment, one trigger symbol (bonus symbol) is present only in each of the odd-numbered columns among the five reels (columns). Accordingly, the windmill bonus game in the present embodiment is triggered when the trigger symbols are rearranged in the respective odd-numbered reels, whereby all of the three trigger symbols are rearranged.

Figure 42:
FIG. 42 is an explanatory diagram of an operation process of a windmill bonus game.
Figure 43:
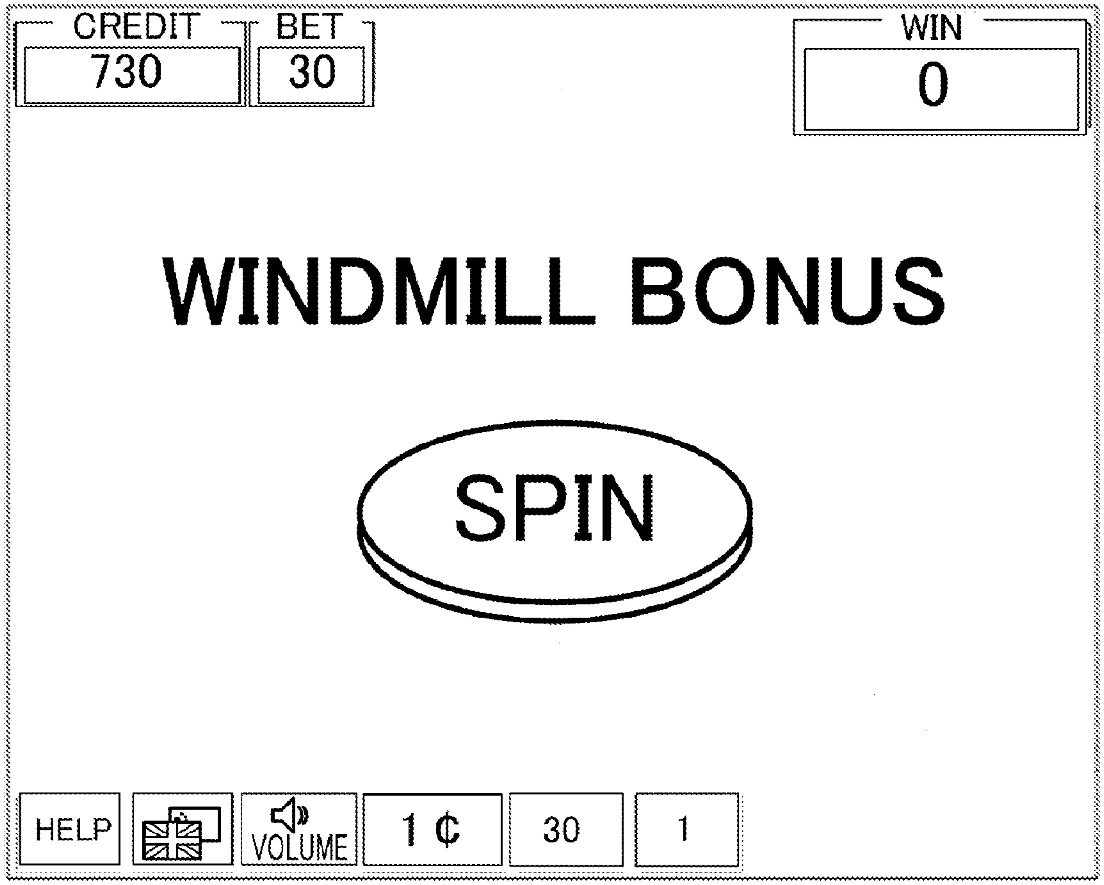
FIG. 43 is an explanatory diagram of the operation process of the windmill bonus game.

When this windmill bonus game is triggered, as shown in FIG. 42, "WINDMILL BONUS" is displayed on the display 2 and a player is notified that the windmill bonus is started. Next, as shown in FIG. 43, on the display 2, a symbol imitating the SPIN button 602 is displayed below the display of the "WINDMILL BONUS", and a display for prompting a player to operate the SPIN button 602 (refer to FIG. 3) is provided.

Figure 44:
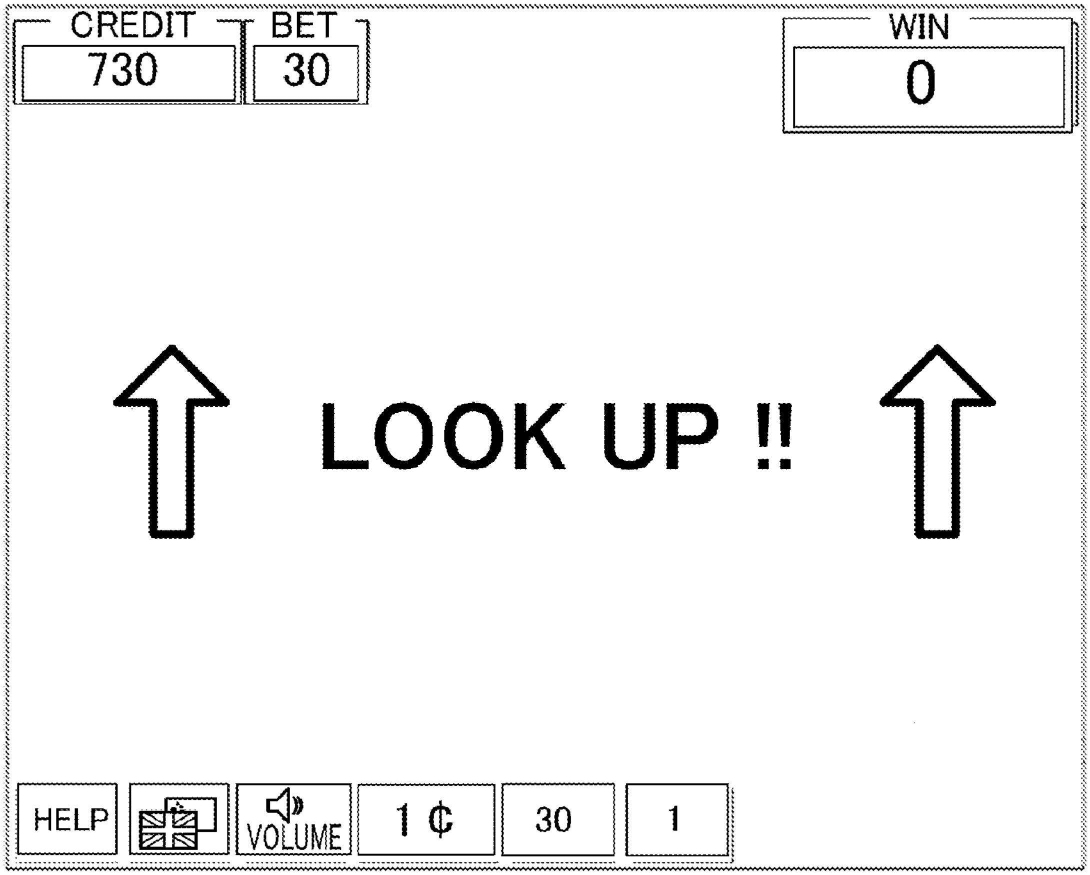
FIG. 44 is an explanatory diagram of the operation process of the windmill bonus game.

When a player operates the SPIN button 602 or a predetermined period of time has elapsed since the display for prompting a player to operate the SPIN button 602 was provided, the windmill roulette 300 is rotated (refer to FIG. 7), whereas as shown in FIG. 44, "LOOK UP!!" is displayed together with upward-pointing arrows on the display 2, and a player is prompted to pay attention to the windmill roulette 300.

After a predetermined period of time has elapsed since the rotation of the windmill roulette 300, the rotation of the windmill roulette 300 is stopped so as to display an indication of a selected bonus game on the windmill roulette 300. Specifically, as is seen from FIG. 7, on the windmill roulette 300, a bonus game to be executed in the windmill bonus game is indicated by the indication part 320. The bonus game to be executed in the windmill bonus game is any of the equipage bonus game, the free games, the fixed payout bonus, the story bonus game, and the jackpot challenge game. In the example shown in FIG. 7, it is indicated that the fixed payout bonus (200) is selected.

When the windmill bonus game is finished, the process shifts to a revival chance game in which it is determined whether or not the windmill bonus game is retriggered by the "windmill destruction game". The number of times at which the windmill bonus game is continuously retriggered is up to 9, and the windmill bonus game is likely to be continuously generated at the total number, including the time of initial winning, of ten times.

Hereinafter, the variety of bonus games executed in the windmill bonus game and the "windmill destruction game" (revival chance game) will be described.

(Equipage Bonus Game)

The "equipage bonus game" is a bonus game executed when after the rotation of the windmill roulette 300, a display "BONUS" is indicated by the indication part 320. In this equipage bonus game, Don Quixote who is a hero character is going to be equipped with armor and protective gear. In the equipage bonus game, three-choice picking-out from three boxes in which three kinds of payouts are hidden is conducted at a total of six times for each of six kinds of body parts, and a total value of payouts of respective equipages can be obtained.

The three kinds of payouts are: for example, a "high payout", a "low payout", and "no payout". The six kinds of body parts are: a "head", a "body, an "arm", a leg", a "left hand", and a "right hand". Each of the payouts and each of the equipages are associated with each of the body parts. For example, as shown in FIG. 45A and FIG. 45B, the equipage of the "head" is associated with the "high payout"+a "warrior helmet", the "low payout"+a "hat", and the "no payout"+an "empty box (no equipage)". The equipage of the "right hand" is associated with the "high payout"+an "armory (sword)", the "low payout"+a "farming tool", and the "no payout"+an "empty box (no equipage)". When one box is selected from among the three boxes, a change in a frame of the selected box appears. When the box associated with the high payout is selected, the frame of the box becomes a gold frame; when the box associated with the low payout is selected, a frame of the box becomes a silver frame; and when the box associated with the no payout is selected, a frame of the box becomes a dark frame. In other words, a payout of the selected box can be anticipated by the change in the frame appearing when any of the boxes is selected, thereby enhancing amusement in gaming. Of course, it is not necessarily required to associate each of the payouts with each of the colors of the frames on a one-to-one basis. For example, with respect to the high payout, assignment can be made such that the gold frame is most easily selected, the silver frame is next easily selected, and the dark frame is less easily selected or is not selected at all. With respect to each of the low payout and the no payout, similarly, an easily selected frame and a less easily selected frame may be provided.

Figure 46:
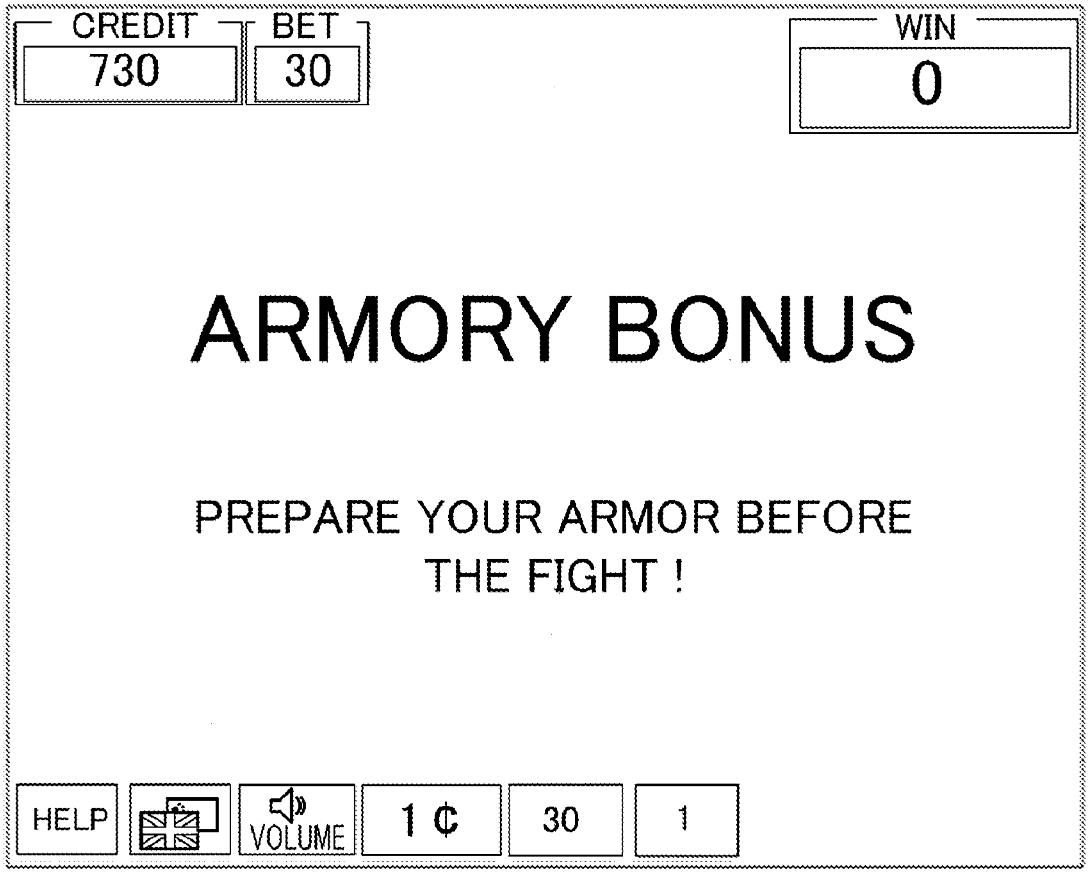
FIG. 46 is an explanatory diagram of an operation process of the equipage bonus game.

As shown in FIG. 46, upon staring the "equipage bonus game", on the display 2, "ARMORY BONUS" as a name of the bonus game to be started from now is displayed. At this time, on the display 2, a message "PREPARE YOUR ARMOR BEFORE THE FIGHT!" is concurrently displayed, thereby showing a concept of the equipage bonus game.

Figure 47:
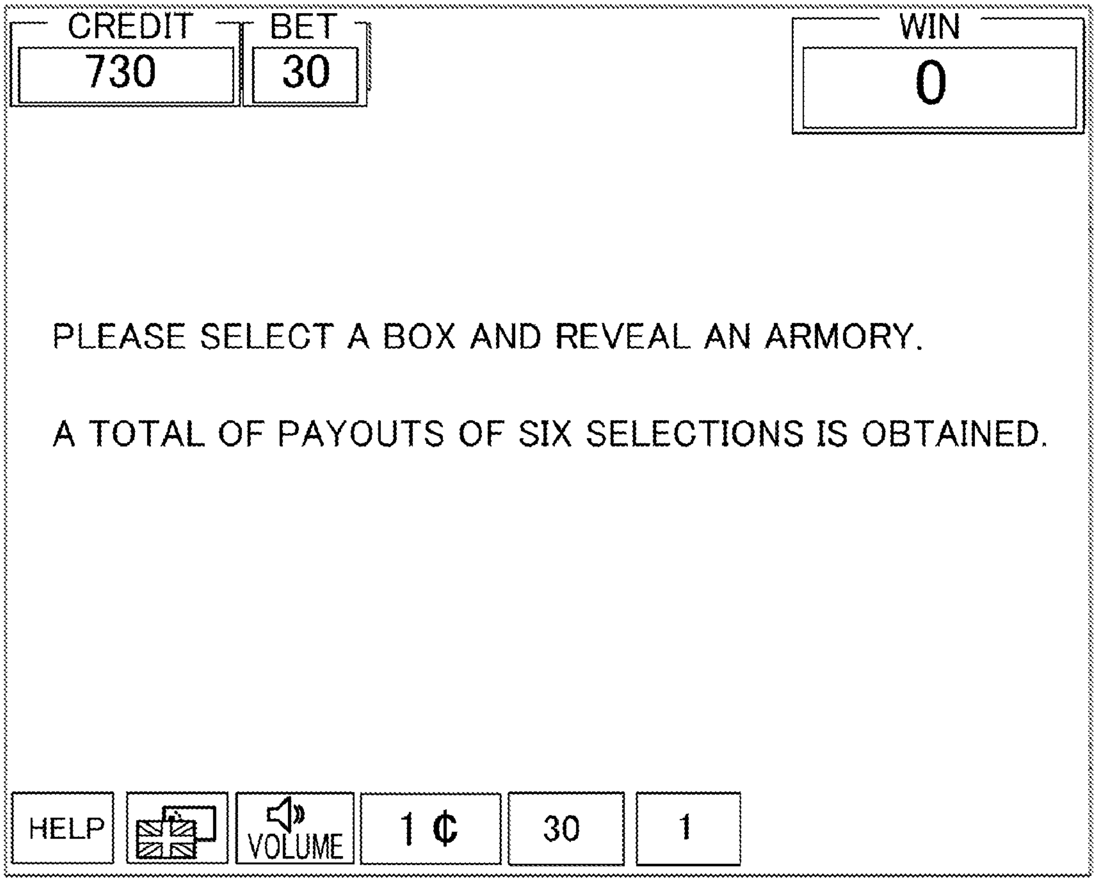
FIG. 47 is an explanatory diagram of the operation process of the equipage bonus game.

As shown in FIG. 47, on the display 2, messages of gaming explanations "Please select a box and reveal an armory." and "A total of payouts of six selections is obtained." are displayed.

Figure 48:
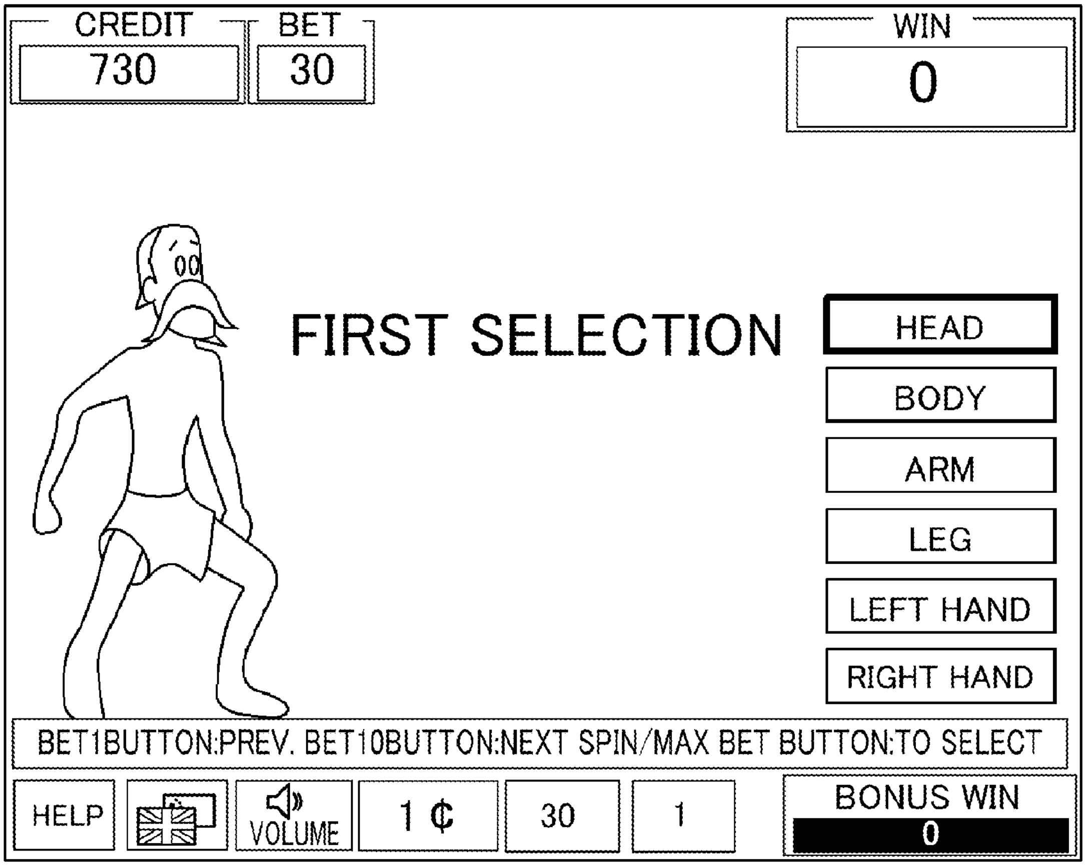
FIG. 48 is an explanatory diagram of the operation process of the equipage bonus game.

As shown in FIG. 48, on the display 2, a motif of "Don Quixote" is displayed and concurrently, a character string "The first selection" is displayed. At this time, on the display 2, in a lower left corner, operating instructions "BET 1 BUTTON: PREV.", "BET 10 BUTTON: NEXT", and "SPIN/MAX BET BUTTON: TO SELECT" are concurrently displayed in a bottom left corner. Specifically, selection of each of the boxes by a player is conducted by operating the BET 1 button and BET 10 button (refer to FIG. 31), and determination of each of the boxes is conducted by operating the SPIN button or the MAX BET button (refer to FIG. 31). Of course, the selection of each of the boxes may be conducted by operation any buttons other than the above-mentioned buttons. Below the display 2, payouts obtained in the bonus game are displayed in an accumulated manner. Furthermore, on the display 2, icons of the "head", the "body", the "arm", the "leg", the "left hand", and the "right hand" are concurrently displayed in an area on a right side. These displays indicate the body parts targeted for the selections conducted at six times, starting from now on, and the selection of each of the equipages is conducted in the order starting from the uppermost "head". The "First Selection" is made for the "head", and the icon of the "head" on the display 2 is made closeup, as compared with the icons of the other body parts.

Figure 49:
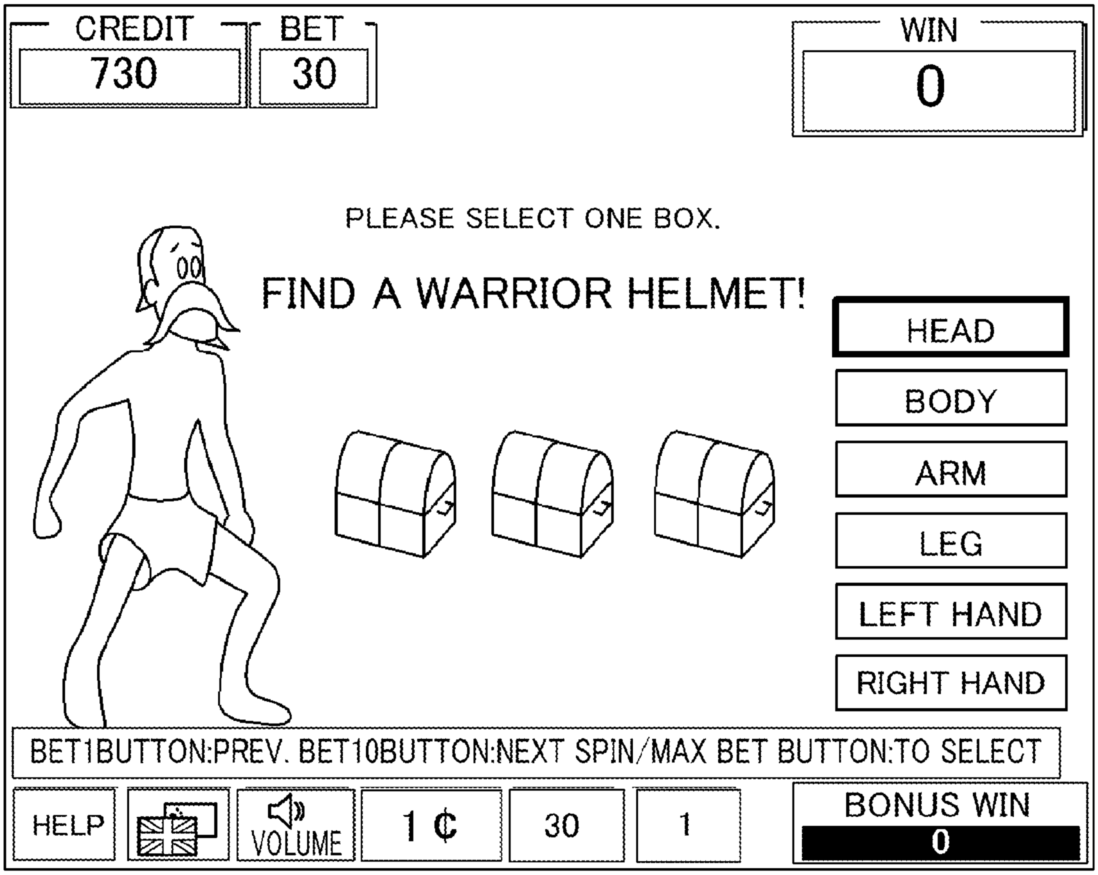
FIG. 49 is an explanatory diagram of the operation process of the equipage bonus game.

As shown in FIG. 49, on the display 2, the three boxes are displayed together with a message "Please select one box. Find a warrior helmet!" The message "Find a warrior helmet!" suggests that a grade of the "warrior helmet" as an equipage for the "head" is the highest and the payout is high.

Figure 50:
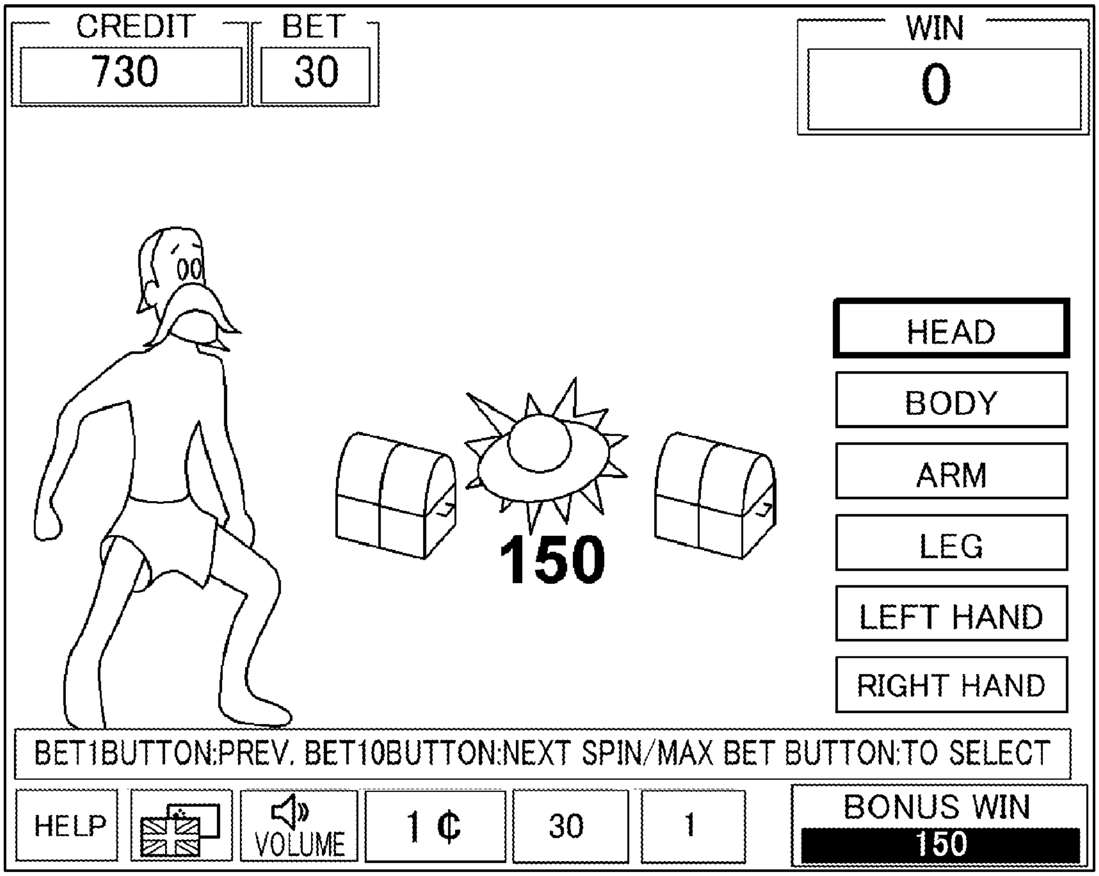
FIG. 50 is an explanatory diagram of the operation process of the equipage bonus game.

When a player selects the box from among the displayed three boxes through the button operation, as shown in FIG. 50, a payout is displayed together with the equipage from the selected box. In the example shown in FIG. 50, the box in the middle is selected from among the three boxes and the "hat" is selected as the equipage, resulting in the obtainment of a "150 credit" as a payout. The obtained payout is displayed in a lower right portion of the display 2, and in the example shown in FIG. 50, since the obtained payout is the "150" credit, "150" is displayed.

Figure 51:
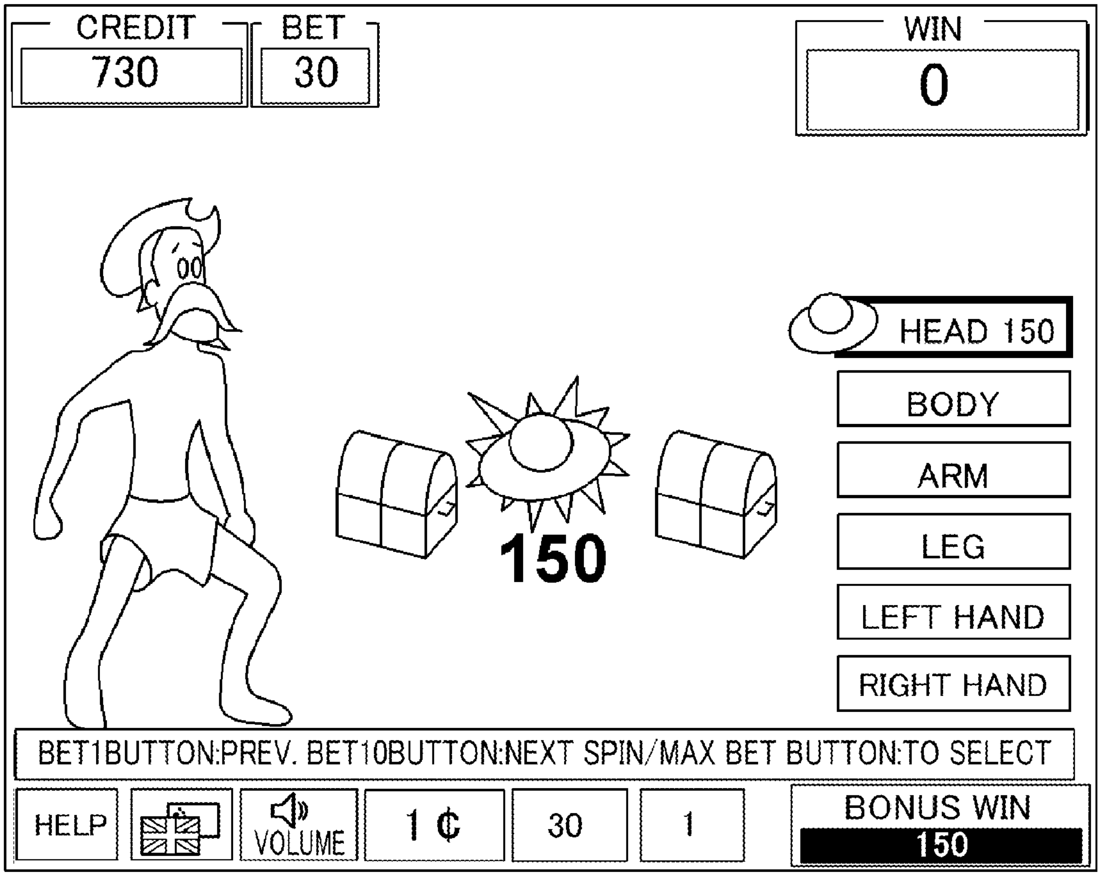
FIG. 51 is an explanatory diagram of the operation process of the equipage bonus game.

As shown in FIG. 51, the obtained hat is worn by Don Quixote on the display 2. On the other hand, at the icon of the "head", the obtained payout (150) is displayed, and a motif of the obtained equipage (hat) is appended.

Figure 52:
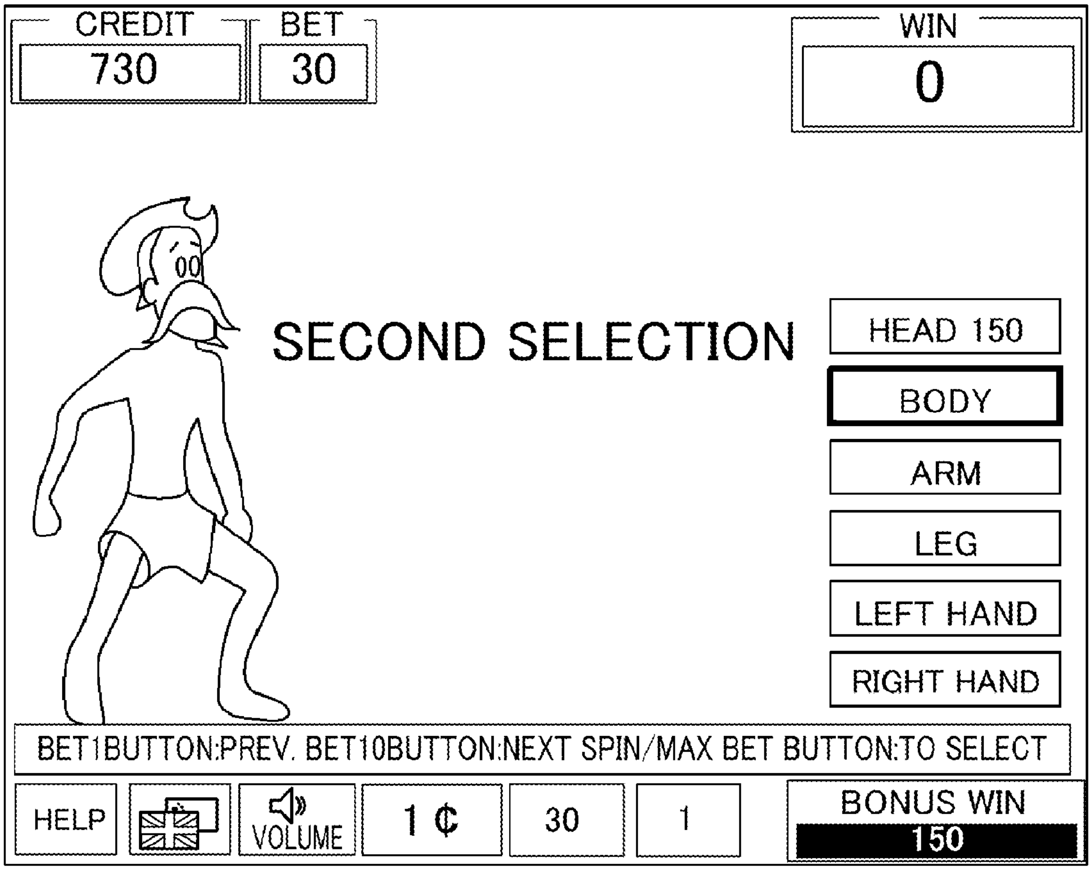
FIG. 52 is an explanatory diagram of the operation process of the equipage bonus game.

Next, as shown in FIG. 52, on the display 2, a character string "Second Selection" is displayed and concurrently, the icon of the "body", instead of "head", is made closeup, as compared with the icons of the other body parts.

Figure 53:
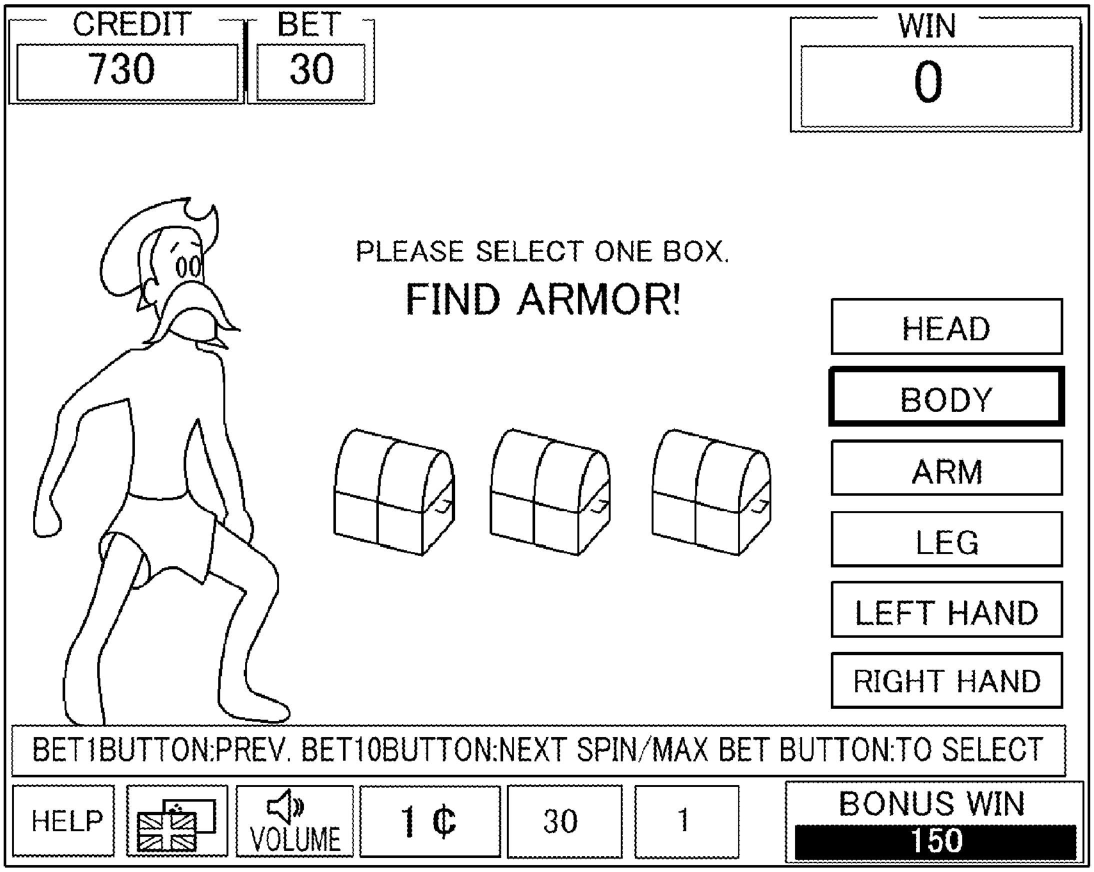
FIG. 53 is an explanatory diagram of the operation process of the equipage bonus game.
Figure 54:
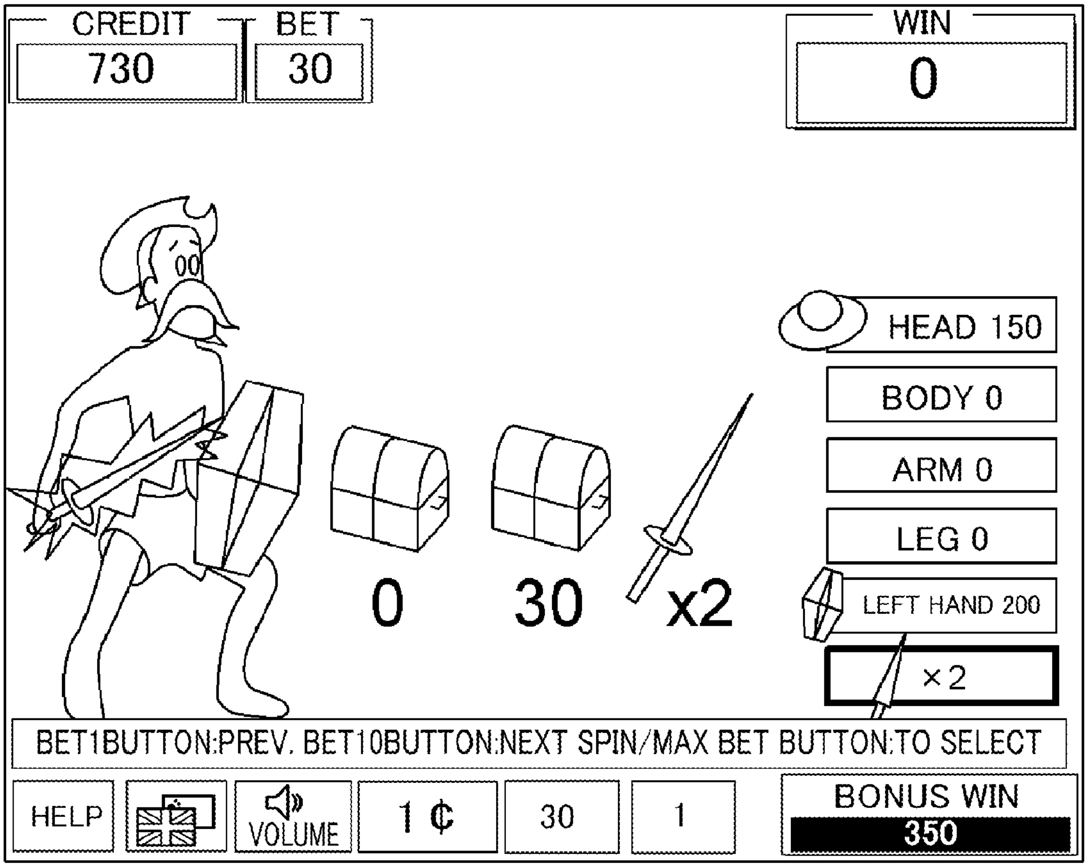
FIG. 54 is an explanatory diagram of the operation process of the equipage bonus game.

Next, as shown in FIG. 53, on the display 2, the three boxes are displayed together with the message "Please select one box. Find armor!" The message "Find armor!" suggests that a grade of the "armor" as an equipage for the "head" is the highest and the payout is high. Hereinafter, as with the "First Selection", the selection of any box, displaying of the equipage and payout, wearing of the equipage, and rewriting of the icon are conducted. Each of the "Third Selection", "Fourth Selection", "Fifth Selection", and "Sixth Selection" is conducted as with the "First Selection". However, as shown in FIG. 54, as for "Sixth Selection" with respect to the equipage for the "right hand" and payout, in the box associated with the "high payout", "×2" which doubles the gross number of wins and conducts wearing of the armory (sword) is displayed.

Figure 55:
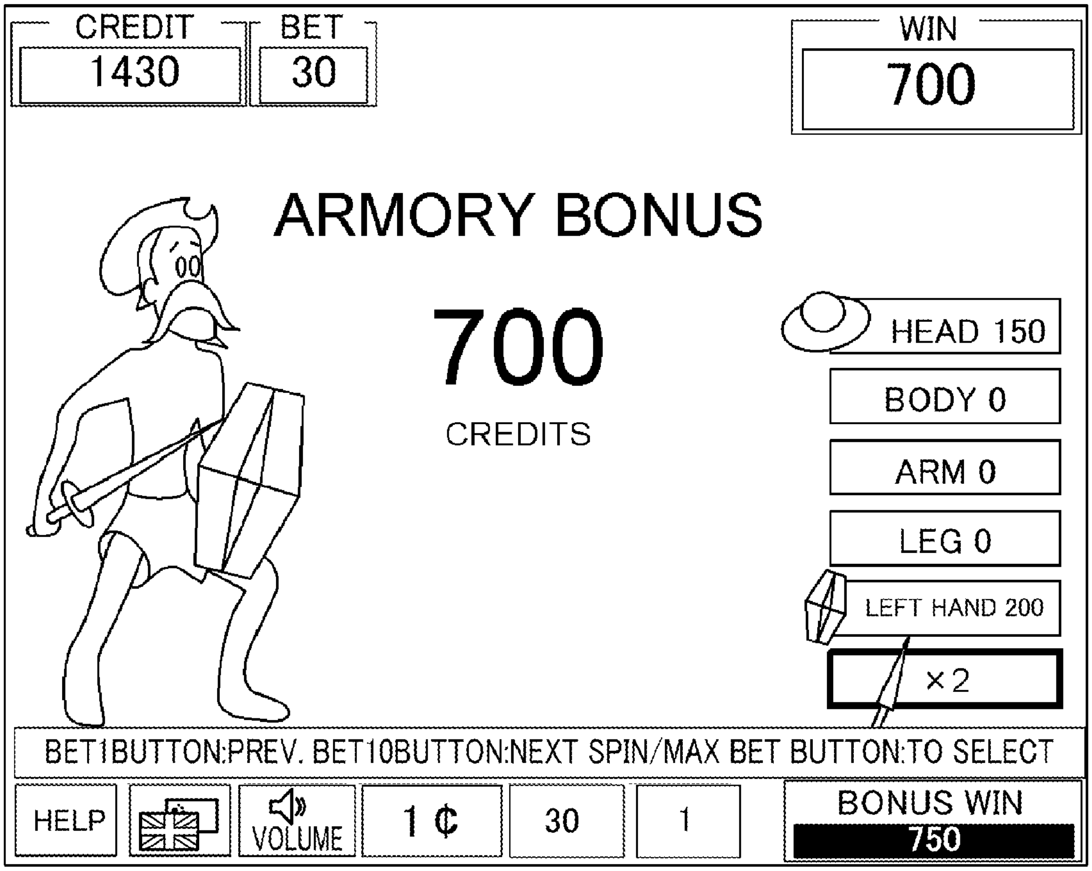
FIG. 55 is an explanatory diagram of the operation process of the equipage bonus game.

As shown in FIG. 55, when the wearing of the equipages for all the body parts and the picking-out of the payouts are finished, on the display 2, "ARMORY BONUS" as the name of the bonus game which has been conducted until then is displayed. Concurrently therewith, the obtained payout is displayed. In the example shown in FIG. 55, the gross payout is a "700 credit". The gross payout is calculated by multiplying the total of payouts obtained with respect to the six kinds of body parts by the number of bet lines. Exceptionally, when the payout of the "×2" is obtained as the payout for the "Six Selection", the gross payout is calculated by doubling the payout obtained by multiplying the total payout obtained with respect to the 5 kinds of body parts by the number of bet lines. In the example shown in FIG. 55, since the total payout obtained with respect to the 5 kinds of body parts with the right hand excluded is 350 (150+0+0+0+200) and the number of bet lines is "one", the gross payout is calculated by doubling the above-mentioned total payout, resulting in "700". The obtained payout is displayed at an icon "WIN" in the upper right on the display 2 and is added to the figure shown at an icon "CREDIT" in the upper left on the display 2 to be displayed.

Figure 56:
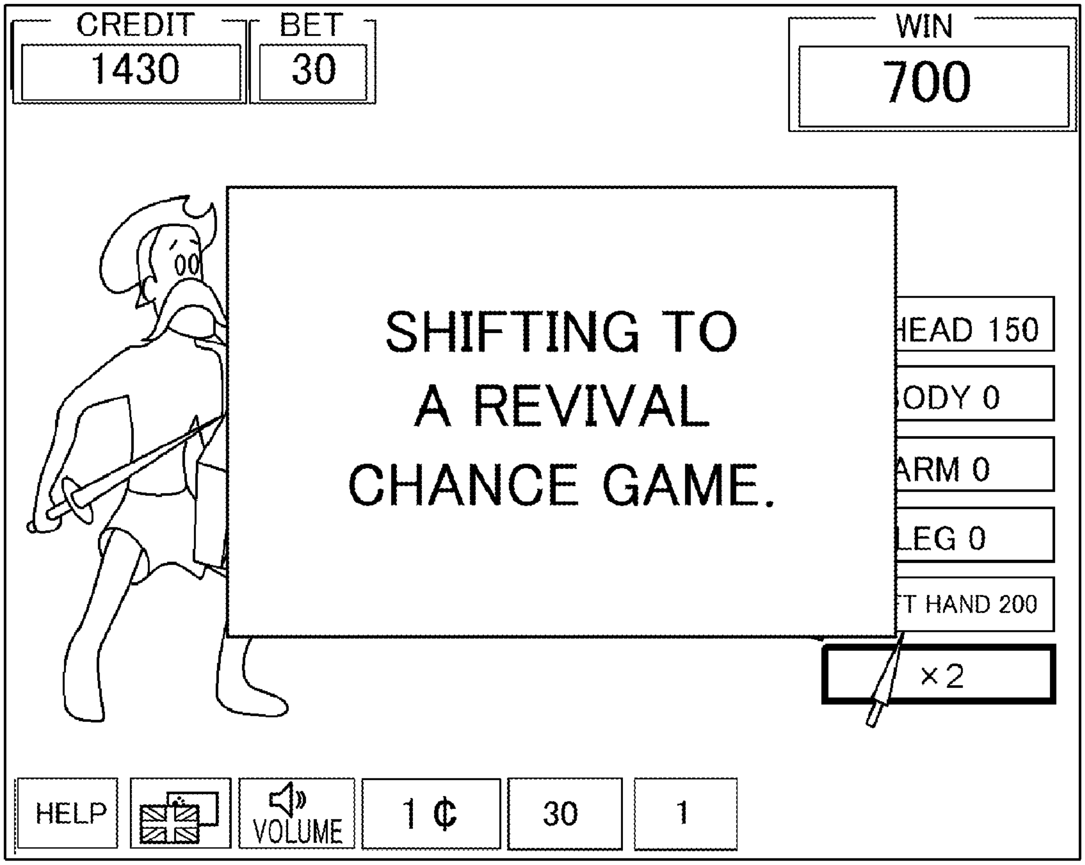
FIG. 56 is an explanatory diagram of the operation process of the equipage bonus game.

As shown in FIG. 56, when the equipage bonus game is finished, a character string "Shifting to a revival chance game." is displayed and it is notified that the game shifts to the "windmill destruction game" (revival chance game). A display of the revival chance game is provided, for example, by falling-down of a signboard with the description "Shifting to a revival chance game" from an upper portion of the display 2. Shifting to the revival chance game is executed, for example, at the moment that Don Quixote and the others traverse the screen.

Figure 57:
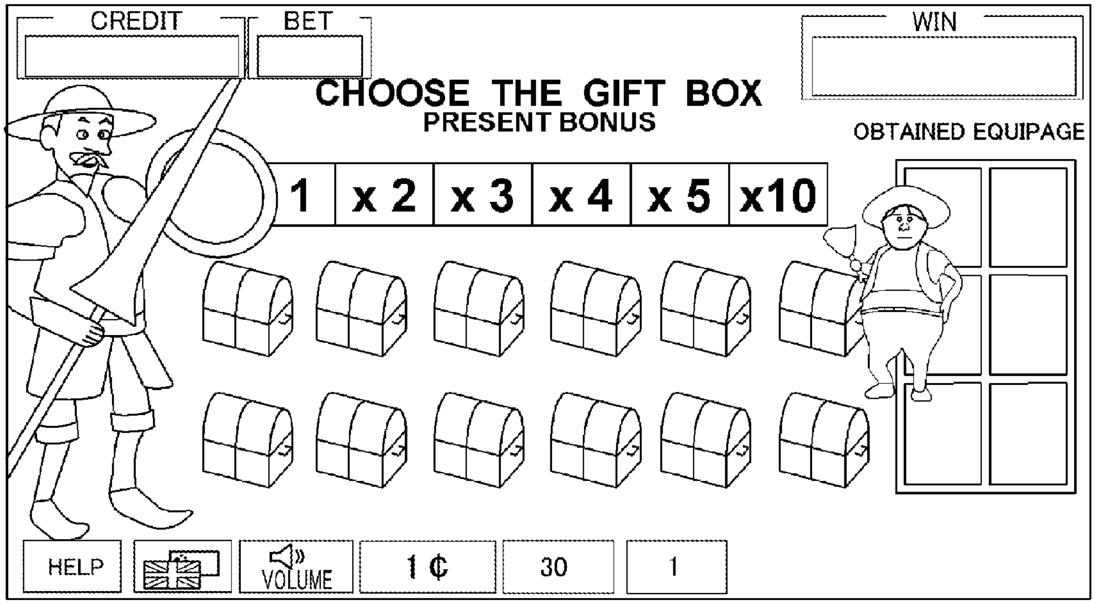
FIG. 57 is an explanatory diagram of the operation process of the equipage bonus game.

Next, another example of the "equipage bonus game" will be described. In the above-described equipage bonus game, in the "Sixth Selection" with respect to the equipage and payout for the "right hand", in the box associated with the "high payout", the "×2" which doubles the gross number of wins and conducts wearing of the armory (sword) is displayed. Instead of this, as shown in FIG. 57, after finishing the selections with respect to all the equipages, a special bonus game which multiplies the payout obtained the selections of the equipages may be provided. This special bonus game is executed, for example, when the equipage (high payout) having the highest grade among all the six kinds of equipages is obtained. Increasing the payout is conducted, for example, such that a player selects one treasure box from among 12 treasure boxes. In each of the treasure boxes, any of displays for example, "×1", "×2", "×3", "×4", "×5", and "×10", each of which multiplies the payout, is hidden.

When a player selects the one treasure box, a numeral, which multiplies the payout, with an arithmetic symbol appears from the treasure box. The final gross payout is calculated by multiplying the payout obtained in the selections of the equipages by the numeral having appeared from the treasure box. For example, when the payout obtained in the selections of the equipages is a "750 credit" and the numeral with the arithmetic symbol having appeared from the treasure box is "×4", the final gross payout is a "3000 credit".

The gist of another example described herein is that the game is arranged such that when the selections of all the equipages have been finished and the combination of the equipages is a previously determined combination of the equipages, the special bonus described with reference to FIG. 57 can be obtained. Therefore, the game may be arranged such that when one equipage group determined with one predetermined concept (for example, merchant equipages, infantry equipages, and warrior equipages) can be selected, even though the group is not an equipage group with a high payout but is an equipage group with a low payout, the provision of the special bonus is executed.

Of course, the numerals hidden in the treasure boxes are not limited to those mentioned above. In addition, when the multiplication of the payout is conducted after the selections of all the equipages, the "high payout" in the "Sixth Selection" may be a credit payout as with those in the other selections, instead of the payout calculated by doubling the obtained total payout. The bonus obtained when the equipage (high payout) having the highest grade among all the equipages is obtained may be a fixed payout, instead of the gross payout obtained by multiplying the obtained total payout. Kind(s) of the fixed payout(s) may be one kind and also a plurality of kinds.

(Free Game)

A "free game" is a bonus game which is executed when after the rotation of the windmill roulette 300, a display "FREE GAMES" is indicted by the indication part 320. This free game can be executed with a gaming value of a bet smaller than that of the base game. The "case in which the free game can be executed with the smaller gaming value of a bet" includes a case in which a gaming value of a bet is "0". Accordingly, the "free game" may be a game which is executed without the condition that a gaming value is bet and in which an amount of a gaming value in accordance with rearranged symbols is paid. On other words, the "free game" may be a game which is started not on the premise that any gaming value is consumed.

Figure 58:
FIG. 58 is an explanatory diagram of a modified example of the equipage bonus game.

As shown in FIG. 58, upon starting the free game, on the display 2, "FREE GAMES" is displayed, and it is indicated that the bonus game to be started from now is the free game. At this time, on the display 2, "BONUS REELS IN PLAY" is displayed in a bottom right corner and concurrently, "FREE GAME" and "0 OF 5" which indicate the number of spins in the free game are displayed. The display "0 OF 5" indicates that the number of spins so far executed, among up to five executable free spins, is zero. Each time one free spin is executed, the display is altered to be "1 OF 5", "2 OF 5", and so forth, and in the final free spin, "5 OF 5" is displayed.

Figure 59:
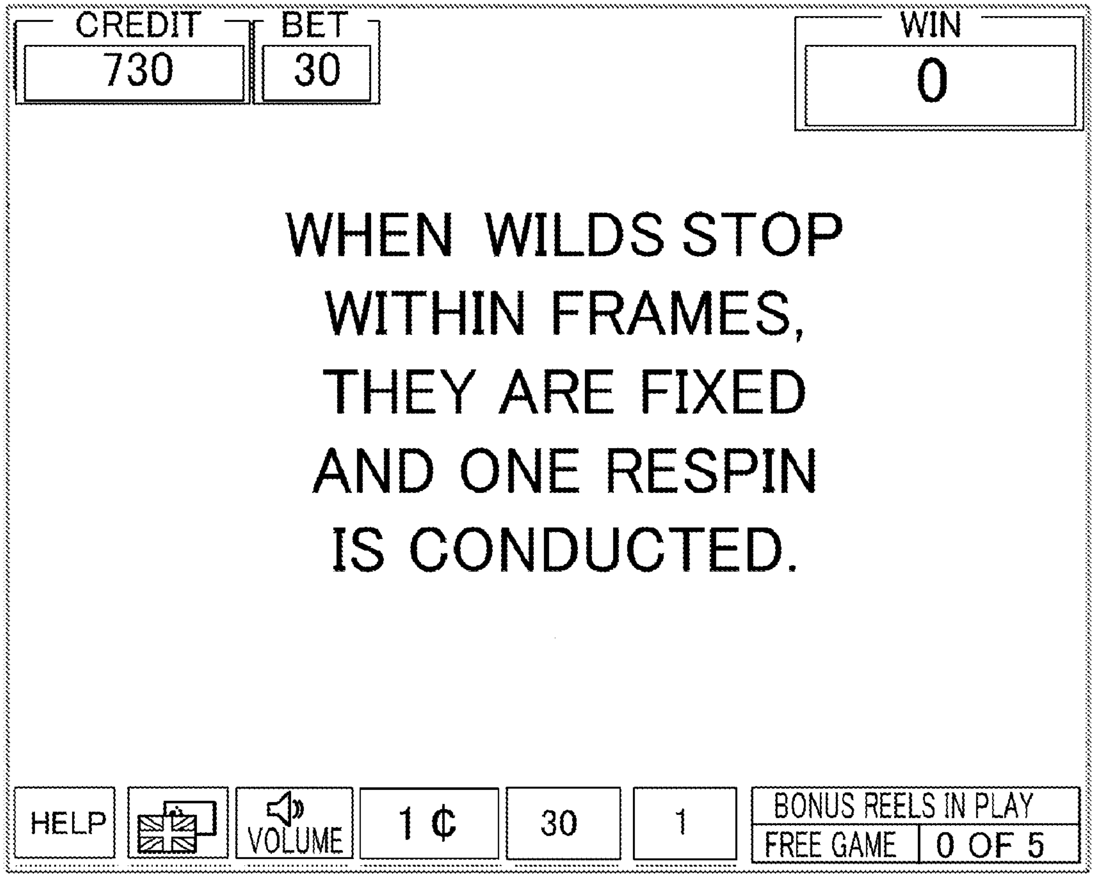
FIG. 59 is an explanatory diagram of an operation process of each free game.
Figure 60:
FIG. 60 is an explanatory diagram of the operation process of the each free game.

Next, as shown in FIG. 59, on the display 2, a gaming explanation of the free spin is displayed. In the example shown in FIG. 59, the explanation "When WILDs stop within frames, they are fixed and one respin is conducted." is displayed. Next, as shown in FIG. 60, on the display 2, the basic number of games, in each of which the free spin is conducted, is displayed.

Figure 61:
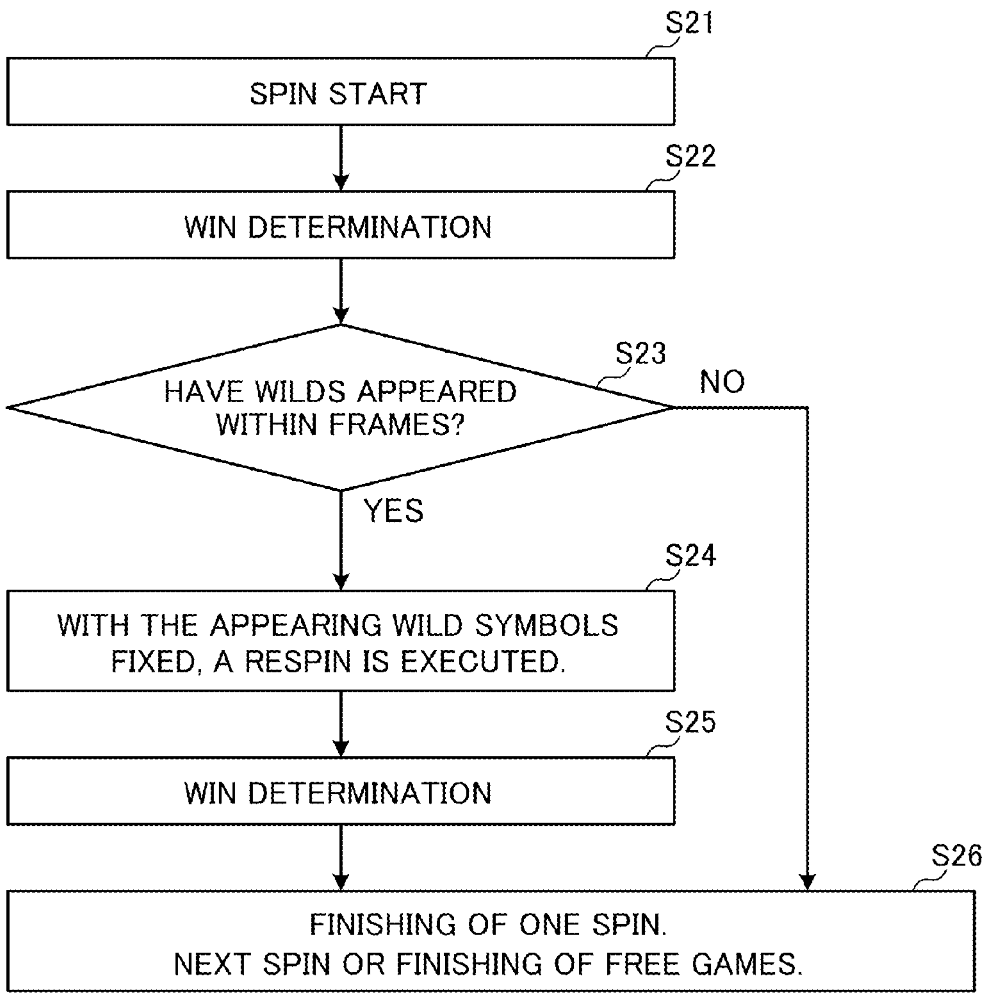
FIG. 61 is an explanatory diagram of the operation process of the each free game.
Figure 62A:
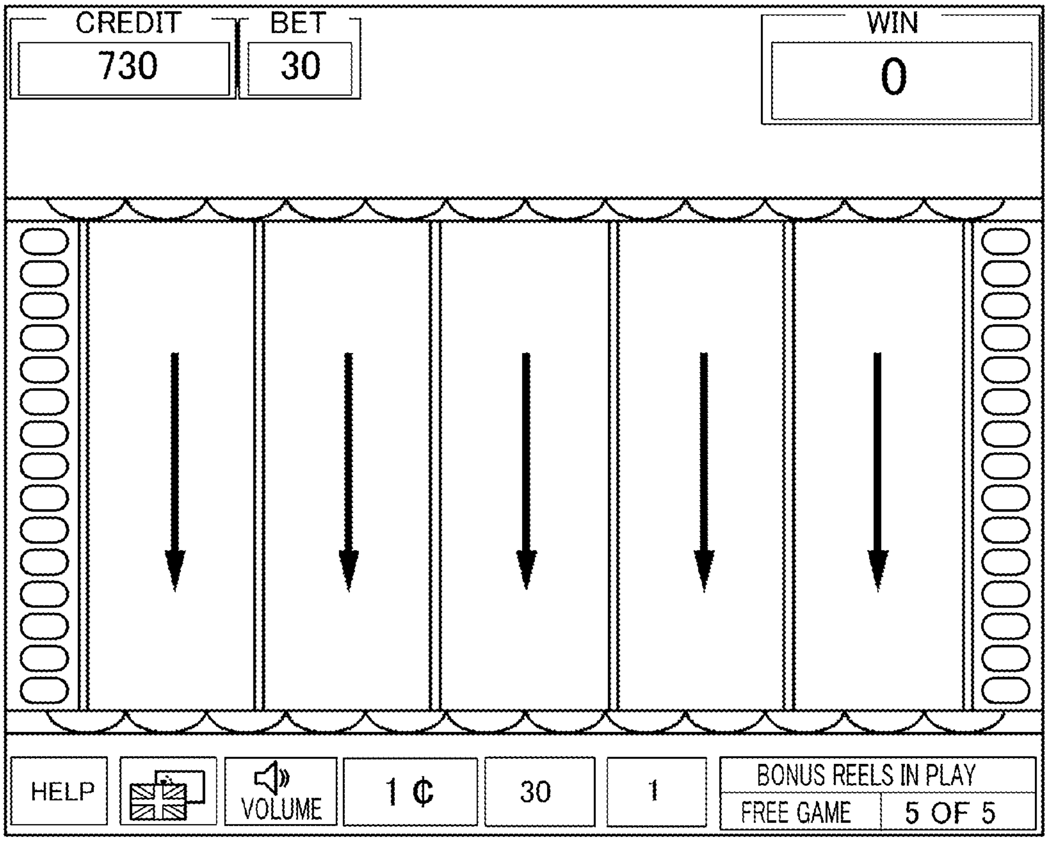
FIG. 62A is an explanatory diagram of the operation process of the each free game.

As shown in FIG. 61 and FIG. 62A, first, each of the gaming machines 1 starts spinning of symbols on the display 2 (S21). Next, Each of the gaming machines 1 conducts "WIN determination" based on the rearranged symbols in the symbol display region 20 on the display 2 (S22). As a result of this WIN determination, each of the gaming machines 1 determines a payout, executes WIN presentation effects, and provides the payout. The payout in the free game is distinct from that in the base game and is higher than that in the base game. Of course, the payout in the free game may be the same as that in the base game.

Figure 62B:
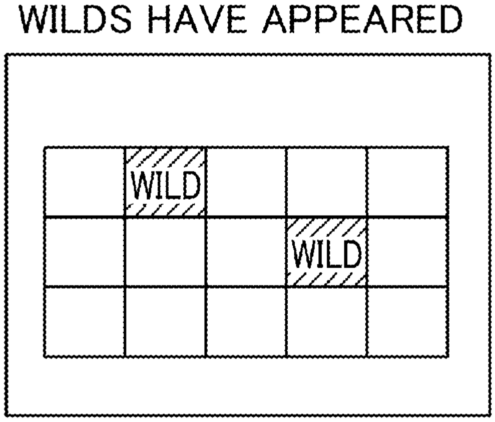
FIG. 62B is an explanatory diagram of the operation process of the each free game.
Figure 62C:
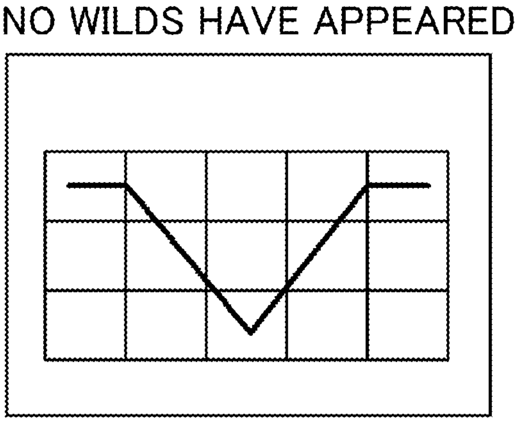
FIG. 62C is an explanatory diagram of the operation process of the each free game.

As shown in FIG. 61, FIG. 62B, and FIG. 62C, after conducting the "WIN determination", each of the gaming machines 1 determines whether or not wild symbols are included in the symbol display region 20 (S23). As shown in FIG. 62C, when determining that the wild symbols are not included in the symbol display region 20 (S23: NO), each of the gaming machines 1 finishes one of the spin games.

On the other hand, as shown in FIG. 62B, when determining that the wild symbols are included in the symbol display region 20 (S23: YES), each of the gaming machines 1, with the wild symbols fixed, executes a respin of symbols other than the wild symbols (S24).

Figure 63A:
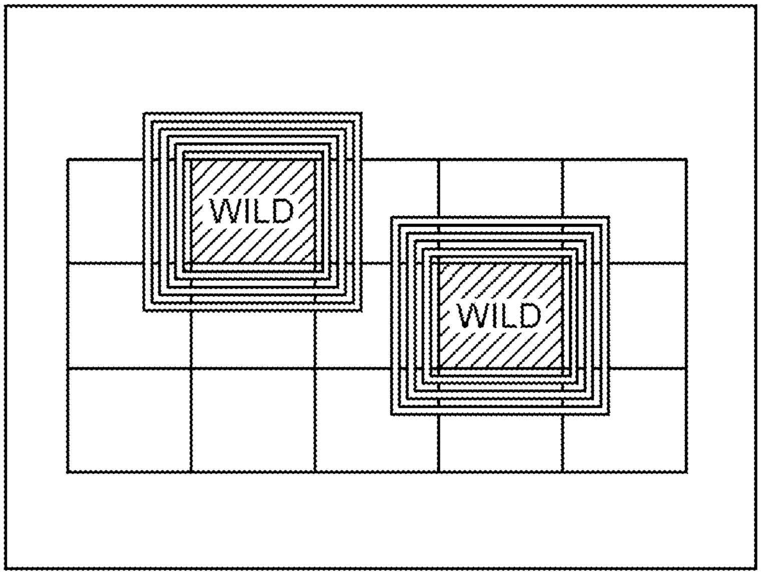
FIG. 63A is an explanatory diagram of the operation process of the each free game.
Figure 63B:
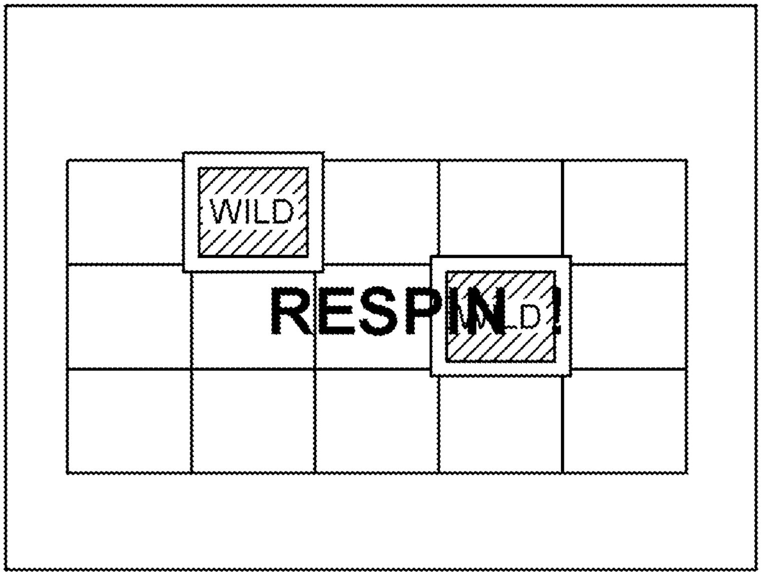
FIG. 63B is an explanatory diagram of the operation process of the each free game.

Upon respinning the symbols, as shown in FIG. 63A, presentation effects in which the wild symbols are fixed, for example, presentation effects in which lights turns round and round so as to enclose the wild symbols are conducted. Furthermore, as shown in FIG. 63B, each of the gaming machines 1 displays a word "RESPIN!" which indicates that respinning of the symbols is conducted.

Figure 64A:
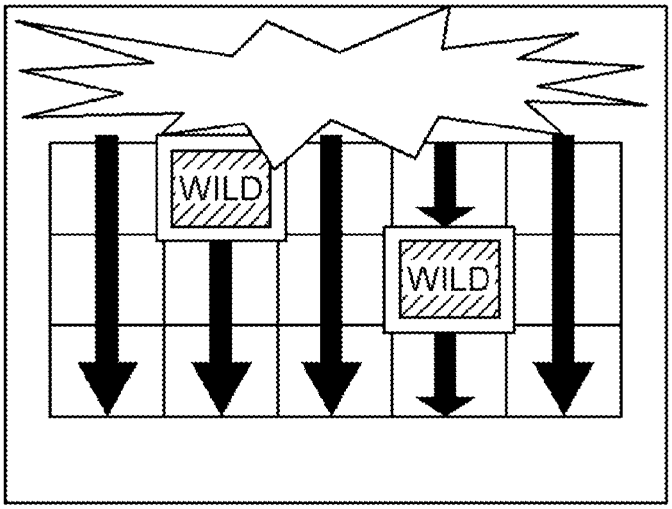
FIG. 64A is an explanatory diagram of the operation process of the each free game.

After displaying the word "RESPIN!", as shown in FIG. 64A, each of the gaming machines 1, with the wild symbols fixed, executes spinning of the other symbols. During the respinning, the wild symbols are fixed with the light turning round and round therearound. In the presentation effects display region 21 of the display 2, presentation effects such as respin-dedicated animation are executed.

Figure 64B:
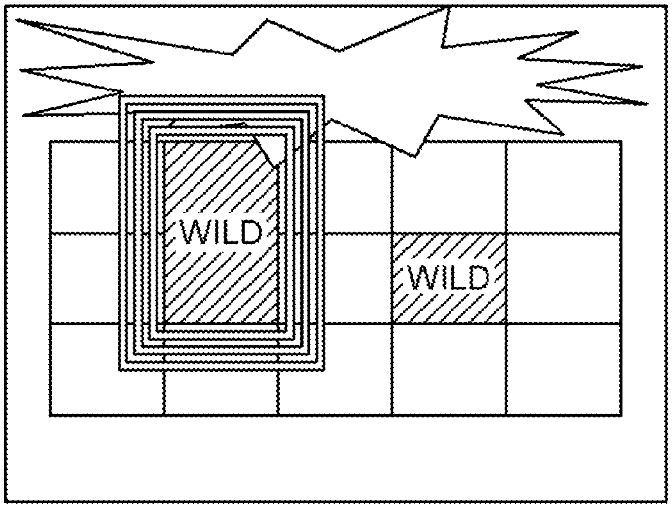
FIG. 64B is an explanatory diagram of the operation process of the each free game.

After respinning of the symbols, the symbols other than the wild symbols are rearranged. At this time, as shown in FIG. 64B, when wild symbols continue on the upper and lower sides in the same one column, these wild symbols are combined and displayed as one wild symbol.

Figure 64C:
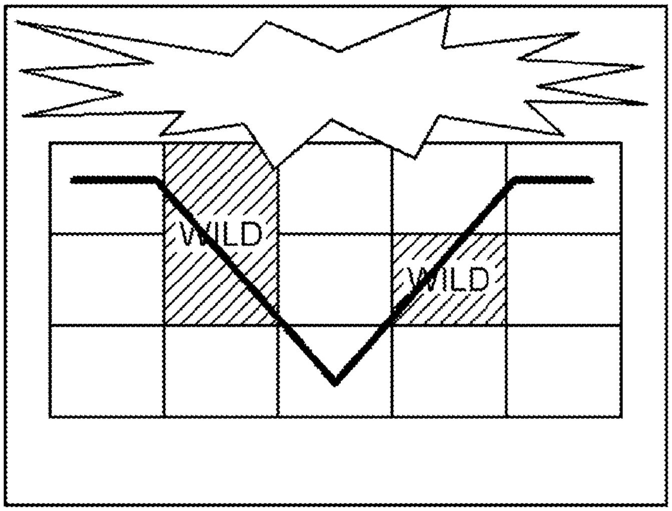
FIG. 64C is an explanatory diagram of the operation process of the each free game.

Based on the rearranged symbols in the symbol display region 20, each of the gaming machines 1 conducts the "WIN determination" again (S25). As a result of this WIN determination, as shown in FIG. 64C, each of the gaming machines 1 determines a payout, executes the WIN presentation effects, and provides the payout.

Figure 65A:
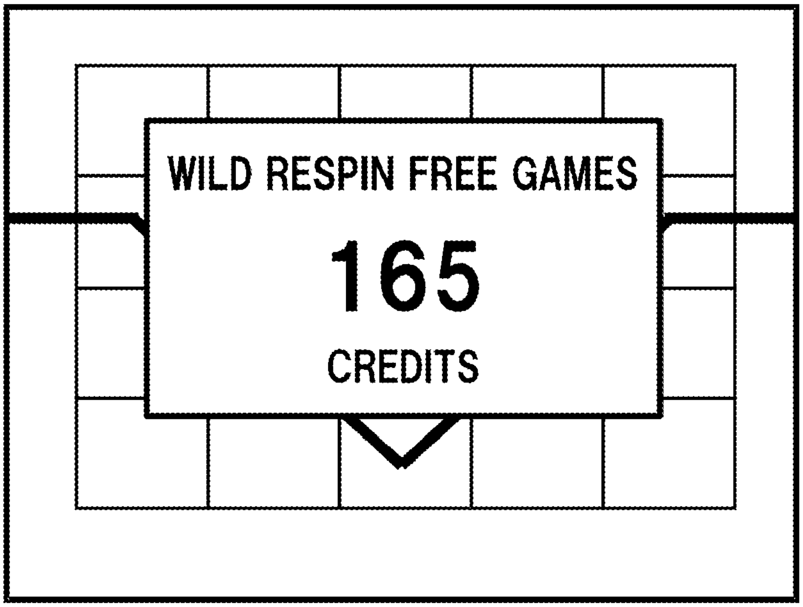
FIG. 65A is an explanatory diagram of the operation process of the each free game.

When the provision of the payout is finished, each of the gaming machines 1 finished one of the spin games. When the number of executed free games is less than 5, each of the gaming machines 1 executes the processes of S21 to S26 again. When the number of executed free games is 5, each of the gaming machines 1 executes a process for finishing the free games. At this time, as shown in FIG. 65A, on the display 2, each of the gaming machines 1 displays the obtained gross payout. In the example shown in FIG. 65A, the gross payout in the free games is a 165 credit.

Figure 65B:
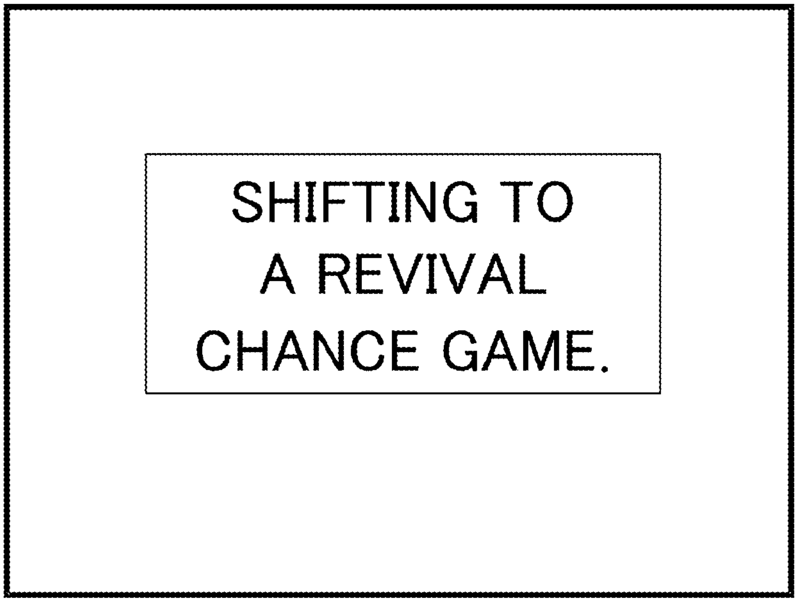
FIG. 65B is an explanatory diagram of the operation process of the each free game.

After displaying the gross payout, as shown in FIG. 65B, each of the gaming machines 1 displays the character string "Shifting to a revival chance game.", and it is notified that the game shifts to the "windmill destruction game" (revival chance game). A display of the revival chance game is provided, for example, by falling-down of a signboard with the description "Shifting to a revival chance game" from an upper portion of the display 2. Shifting to the revival chance game is executed, for example, at the moment that Don Quixote and the others traverse the screen.

Figure 66A:
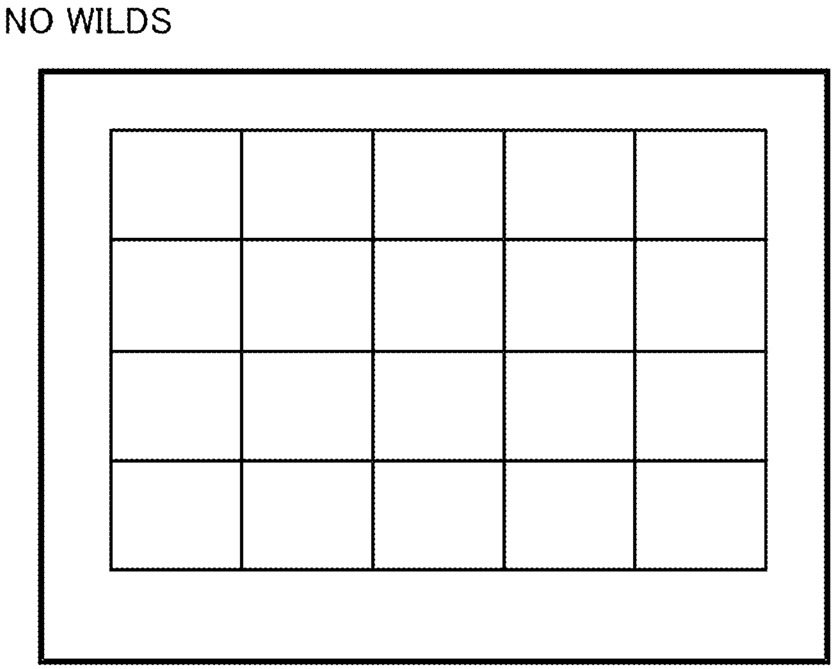
FIG. 66A is an explanatory diagram of the operation process of the each free game.
Figure 66B:
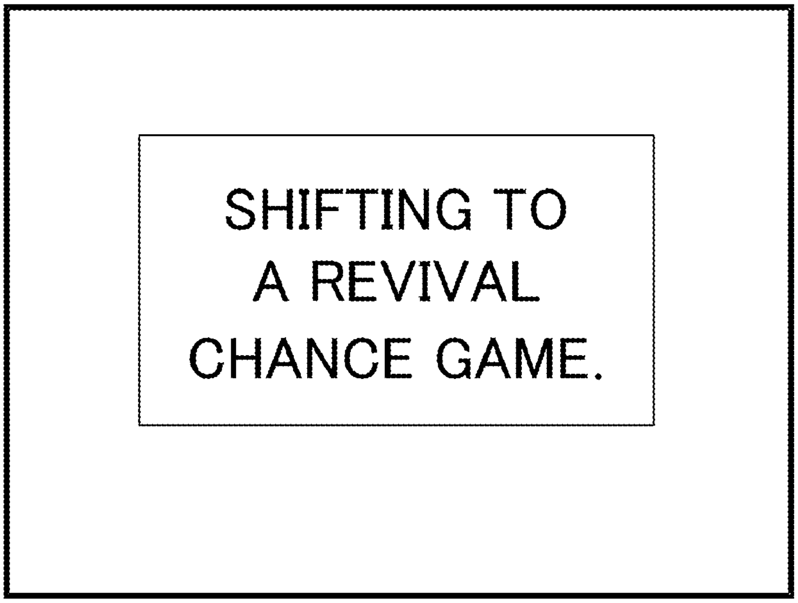
FIG. 66B is an explanatory diagram of the operation process of the each free game.

On the other hand, when there is no payout, as shown in FIG. 66A and FIG. 66B, the display of the payout is not conducted, and a display indicating that the game shifts to the revival chance game is conducted. Thereafter, the same presentation effects as in the case in which there is the payout are conducted, and the game shifts to the revival chance game.

(Fixed Payout Bonus)

In a "fixed payout bonus", a payout indicated on the windmill roulette 300 is provided. In the present embodiment, the fixed payout bonus includes: a "fixed payout (1000) bonus" which is set on the vane part 303 of the windmill roulette 300; and a "fixed payout (30) bonus", a "fixed payout (50) bonus", a "fixed payout (100) bonus", a "fixed payout (150) bonus", and a "fixed payout (200) bonus" which are set on the inner periphery roulette 310 of the windmill roulette 300. In the "fixed payout (1000) bonus", payout of a 1000 credit per bet line is provided. In the "fixed payout (30) bonus", payout of a 30 credit per bet line is provided. In the "fixed payout (50) bonus game", payout of a 50 credit per bet line. In the "fixed payout (100) bonus", payout of a 100 credit per bet line is provided. In the "fixed payout (150) bonus", payout of a 150 credit per bet line is provided. In the "fixed payout (200) bonus", payout of a 200 credit per bet line. When winning occurs in each of the fixed payout bonus, each of the gaming machines 1 displays each of the payouts to be provided on the display 2.

(Story Bonus Game)

A "story bonus game" is a bonus game in which after the rotation of the windmill roulette 300, a game of a display of "Book BONUS", "Princess BONUS", "Battle BONUS", or "Lion BONUS" on the inner periphery roulette 310 which is indicated by the indication part 320 is executed. The "story bonus game" includes a "reading game", a "Princess Dolcia game", a "battle-with-mirror knight game", and a "fight-against-lion game".

<Reading Game>

A "reading game" is a bonus game which is executed when a display "Book BONUS" is indicated. This "reading game" is a game in which a predetermined number of books (for example, three books) are selected from among a "plurality of books (for example, 10 books) on the inner periphery roulette 310 by the indication part 320 and the selected numbers (0 to 9) of books become a digit in the one's place, a digit in the ten's place, a digit in the hundred' place, and so forth in the order of the selections, resulting in a final payout. For example, when three books can be selected and the numbers of books are "3", "9", and "1" in this order, a payout is "193". In the present embodiment, a digit hidden in the books is any of "1" to "4".

Figure 67:
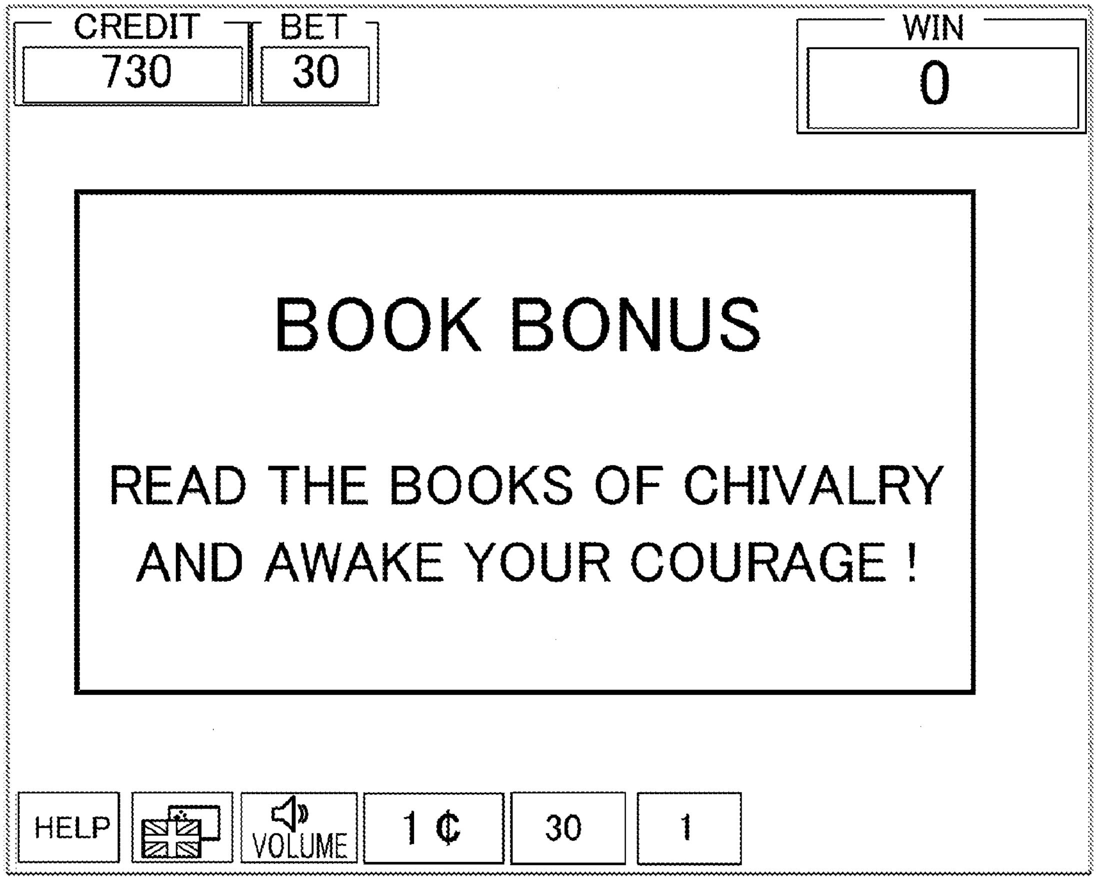
FIG. 67 is an explanatory diagram of an operation process of a reading game.

As shown in FIG. 67, upon starting the "reading game", on the display 2, "BOOK BONUS" as a name of the bonus game to be started from now is displayed. At this time, on the display 2, a message "READ THE BOOKS OF CHIVALRY AND AWAKE YOUR COURAGE!" is concurrently displayed, thereby showing a concept of the reading game.

Figure 68:
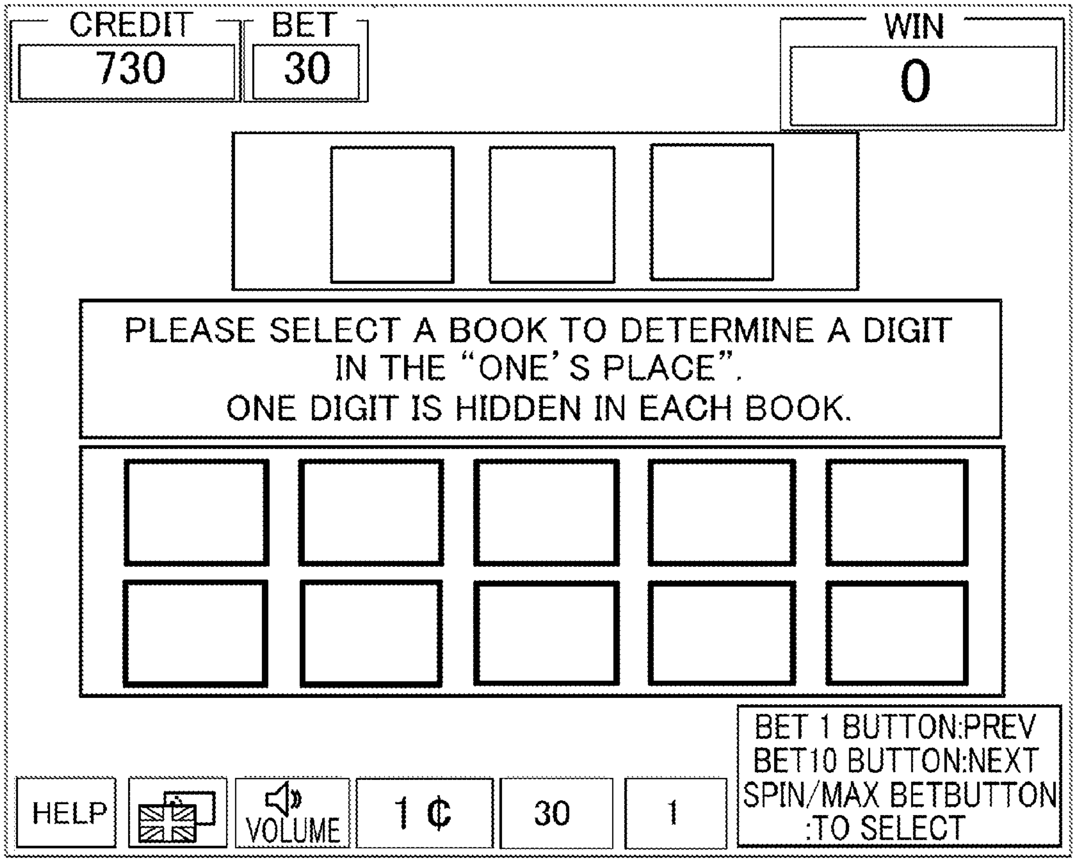
FIG. 68 is an explanatory diagram of the operation process of the reading game.

Next, as shown in FIG. 68, on the display 2, a motif of ten books and three text boxes for displaying the selected digits are displayed. On the display 2, furthermore, a message of a gaming explanation "Please select a book to determine a digit in "the one's place". One digit is hidden in each book." is displayed. On the display 2, in a bottom right corner, operating instructions "BET 1 BUTTON: PREV.", "BET 10 BUTTON: NEXT", and "SPIN/MAX BET BUTTON: TO SELECT" are concurrently displayed. In other words, the selections of books by a player are conducted by operating the BET 1 button and the BET 10 button (refer to FIG. 31), and the determination of the selections of books is conducted by operating the SPIN button or the MAX BET button (refer to FIG. 31). Of course, the selections of books may be conducted by operating buttons other than the above-mentioned buttons.

Although it is not shown in FIG. 68, when the selection of books by a player comes to be operable, presentation effects which indicate a digit hidden in the selected book is reflected in the "one's place", for example, presentation effects in which the one's place blinks are executed.

Figure 69A:
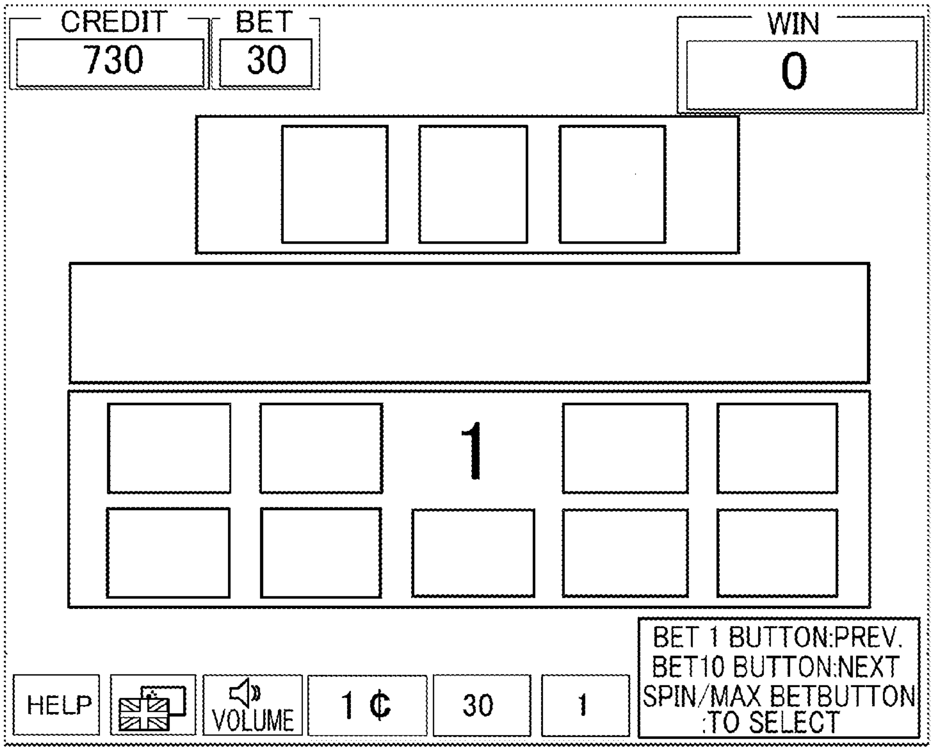
FIG. 69A is an explanatory diagram of the operation process of the reading game.
Figure 69B:
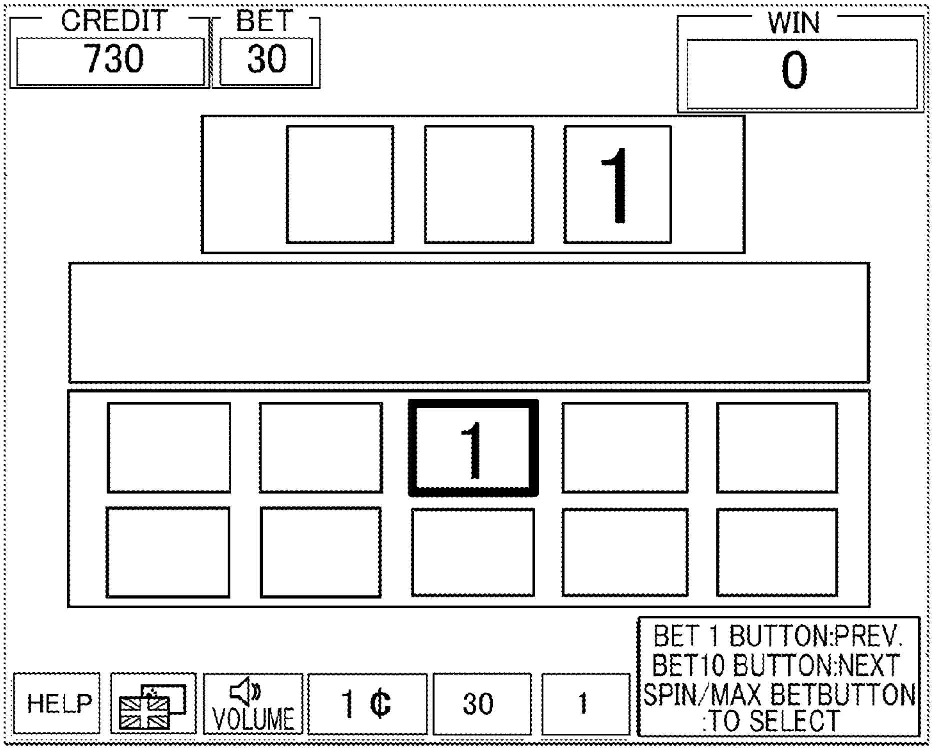
FIG. 69B is an explanatory diagram of the operation process of the reading game.

As shown in FIG. 69A, when the book is selected by operating the BET 1 button and the BET 10 button (refer to FIG. 31) and the book selected by a player is determined by operating the SPIN button or the MAX BET button (refer to FIG. 31), a digit hidden in the selected book appears. In the example shown in FIG. 69A, a digit "1" is displayed. As shown in FIG. 69B, effect presentation effects make a notification that a digit of the selected book is displayed in a blinking text box, and concurrently, the digit is displayed in the "one's place" of the text box. In other words, in the text box, it is indicated that the lowest digit of a payout in the reading game is "1".

Figure 70:
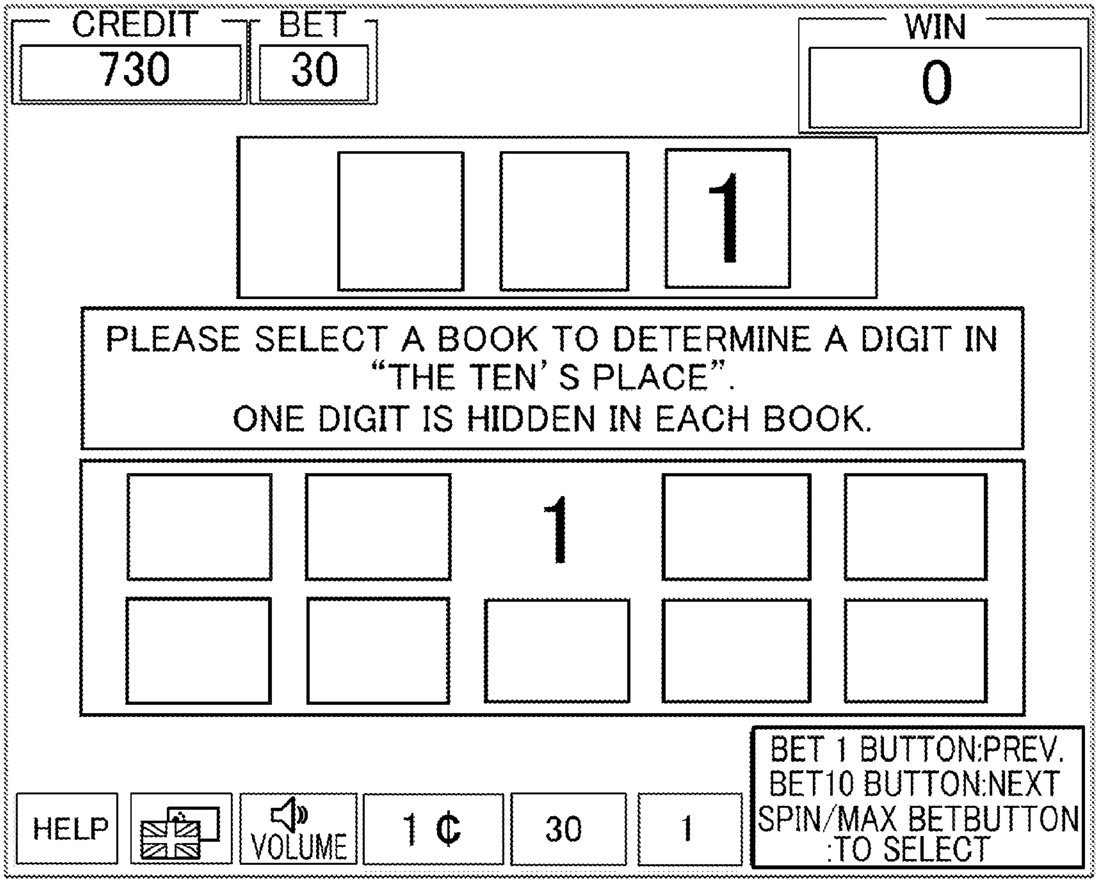
FIG. 70 is an explanatory diagram of the operation process of the reading game.

When the selection of the digit in the "one's place" is finished, as shown in FIG. 70, a message "Please select a book to determine a digit in the "ten's place." One digit is hidden in each book." is displayed.

Figure 71A:
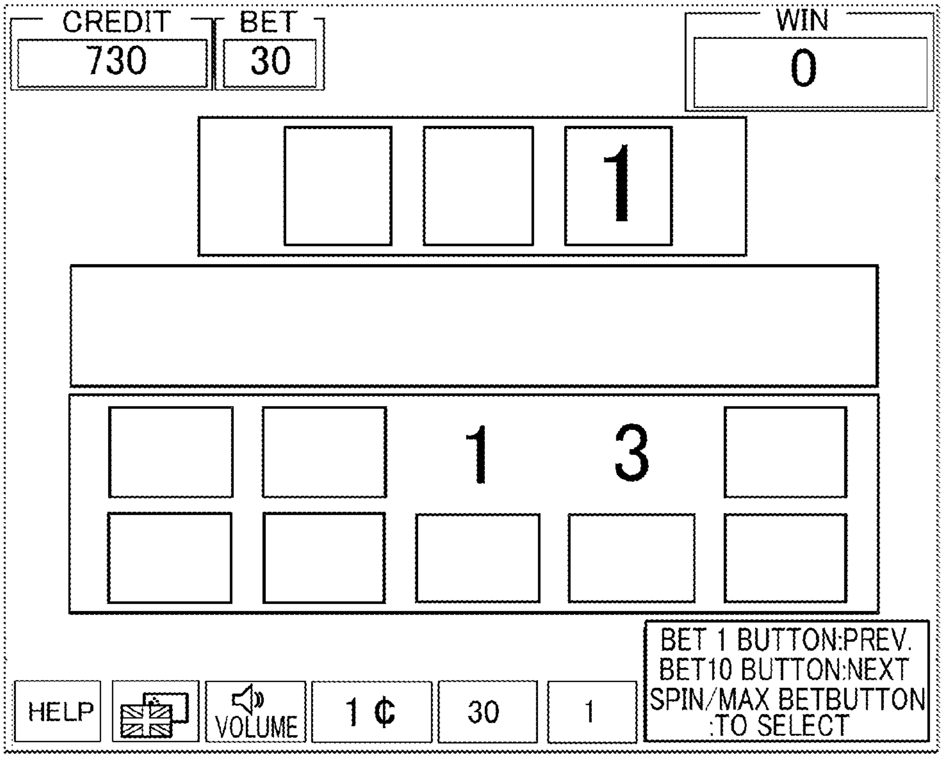
FIG. 71A is an explanatory diagram of the operation process of the reading game.
Figure 71B:
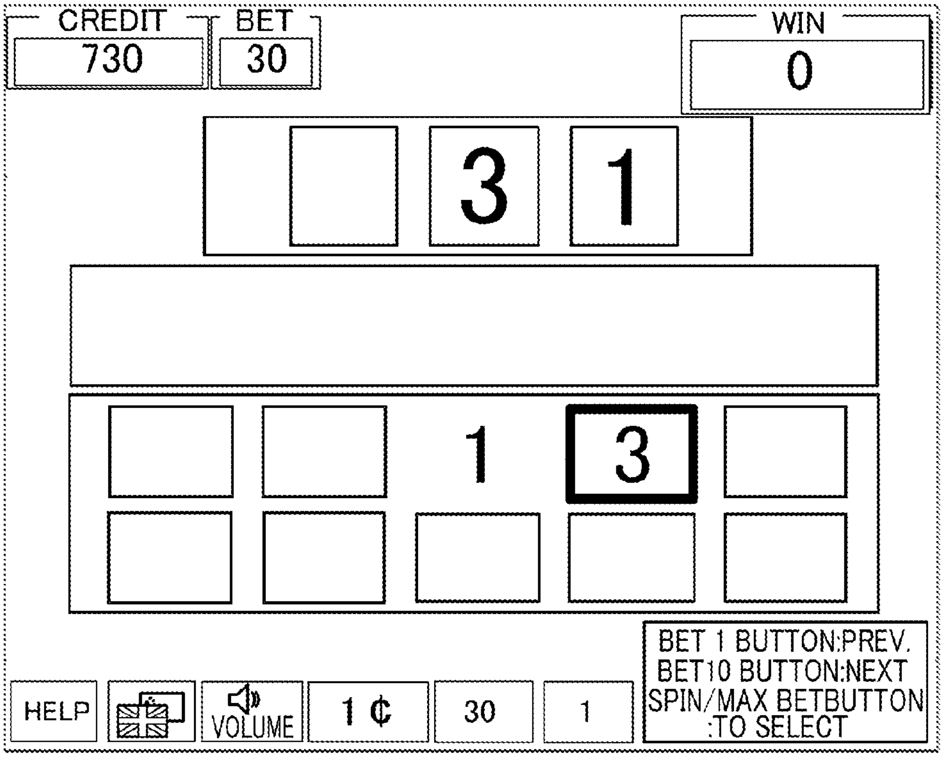
FIG. 71B is an explanatory diagram of the operation process of the reading game.

As shown in FIG. 71A, when the book is selected by operating the BET 1 button and the BET 10 button (refer to FIG. 31) and the book selected by a player is determined by operating the SPIN button or the MAX BET button (refer to FIG. 31), a digit hidden in the selected book appears. In the example shown in FIG. 71A, a digit "3" is displayed. As shown in FIG. 71B, effect presentation effects make a notification that a digit of the selected book is displayed in a blinking text box, and concurrently, the digit is displayed in the "ten's place" of the text box. In other words, in the text boxes, it is indicated that the lower digits of the payout in the reading game is "31".

Figure 72:
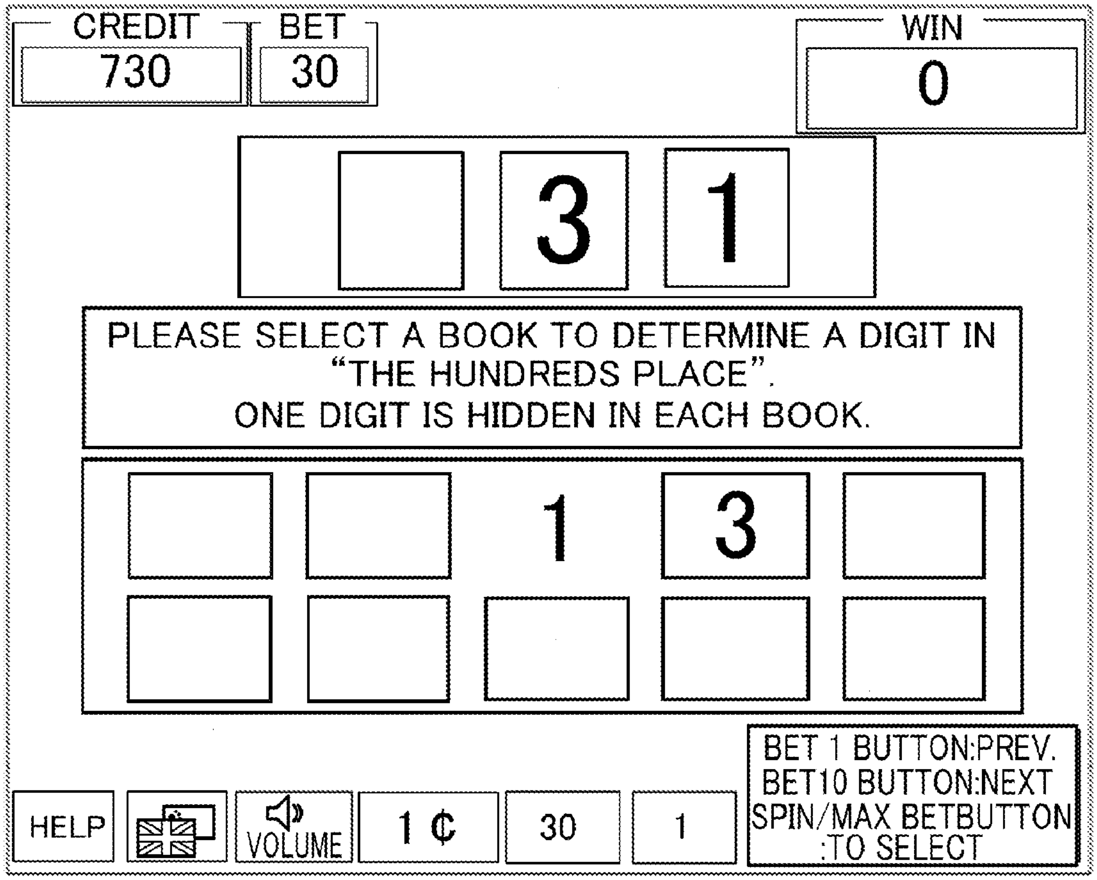
FIG. 72 is an explanatory diagram of the operation process of the reading game.

When the selection of the digit in the "ten's place" is finished, as shown in FIG. 72, a message "Please select a book to determine a digit in the "hundred's place." One digit is hidden in each book." is displayed.

Figure 73A:
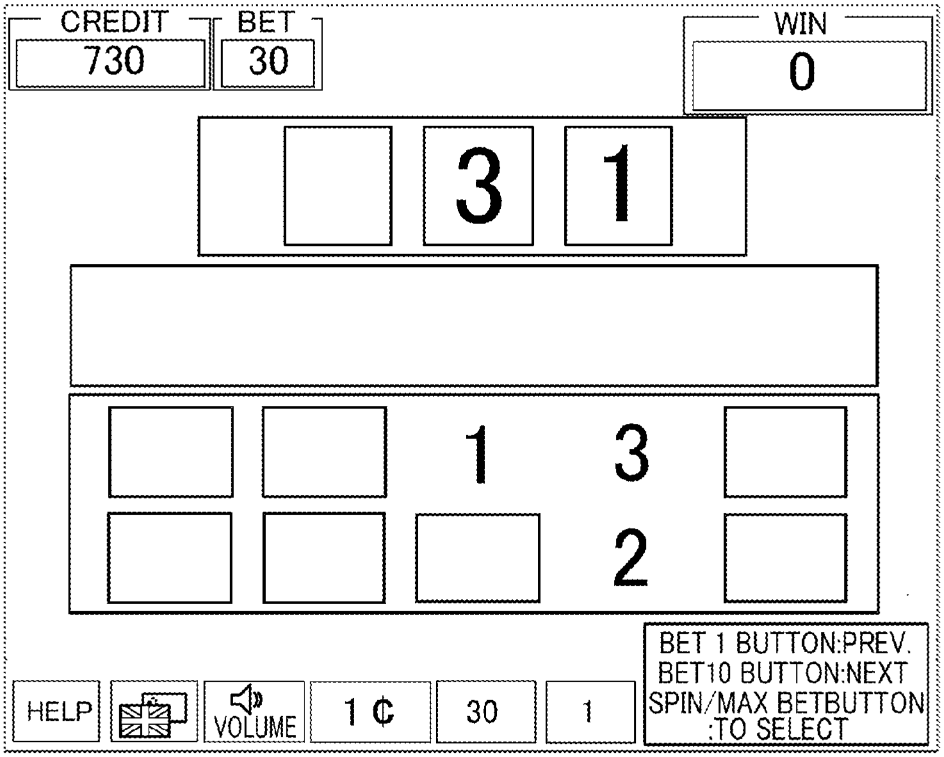
FIG. 73A is an explanatory diagram of the operation process of the reading game.
Figure 73B:
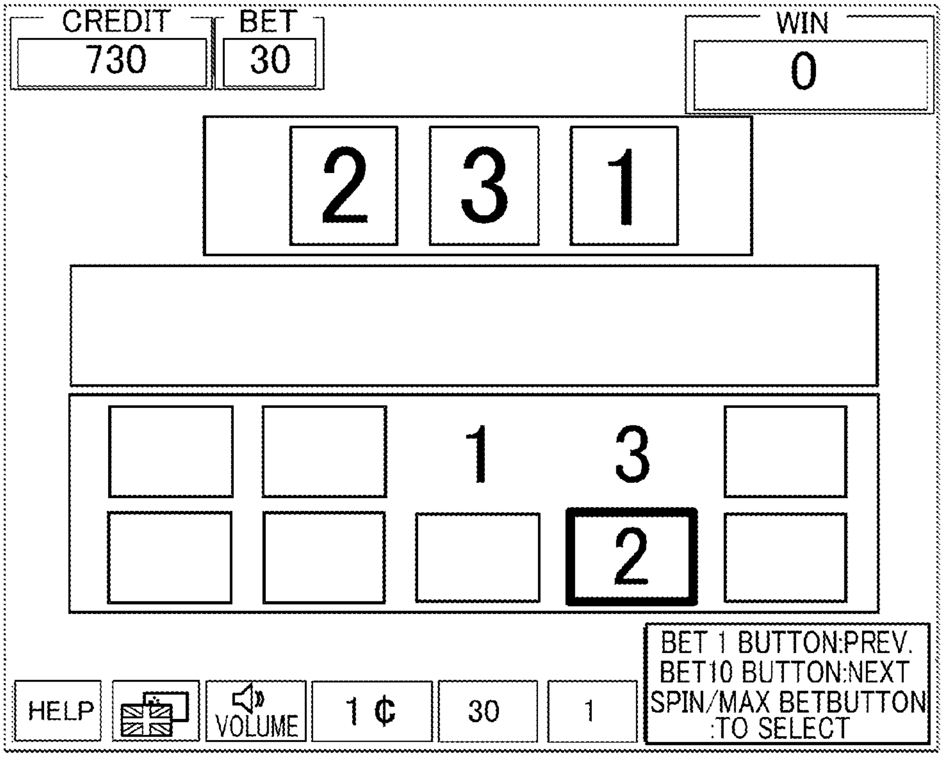
FIG. 73B is an explanatory diagram of the operation process of the reading game.

As shown in FIG. 73A, when the book is selected by operating the BET 1 button and the BET 10 button (refer to FIG. 31) and the book selected by a player is determined by operating the SPIN button or the MAX BET button (refer to FIG. 31), a digit hidden in the selected book appears. In the example shown in FIG. 73A, a digit "2" is displayed. As shown in FIG. 73B, effect presentation effects make a notification that a digit of the selected book is displayed in a blinking text box, and concurrently, the digit is displayed in the "hundred's place" of the text box. In other words, in the text boxes, it is indicated that the payout in the reading game is "231".

Figure 74A:
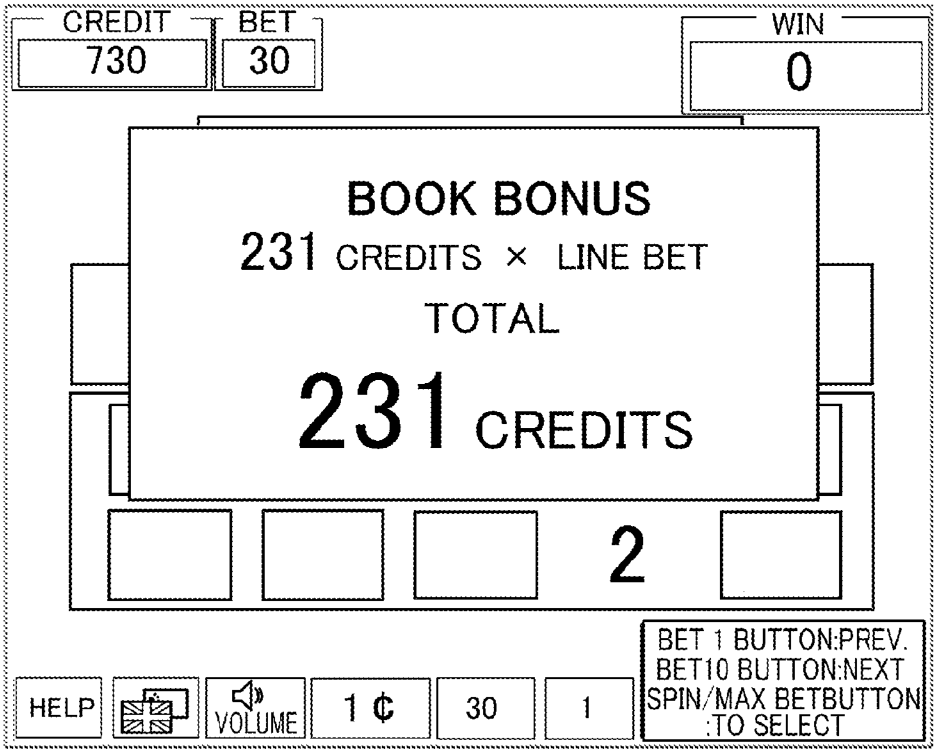
FIG. 74A is an explanatory diagram of the operation process of the reading game.

As shown in FIG. 74A, when the digits in all the places are determined, on the display 2, "BOOK BONUS" as the name of the bonus game which has been conducted until then is displayed. Concurrently therewith, the obtained payout is displayed. In the example shown in FIG. 74A, the payout is a "231 credit" per line. In the present embodiment, since the number of bet lines is one, the gross payout is also the 231 credit.

Figure 74B:
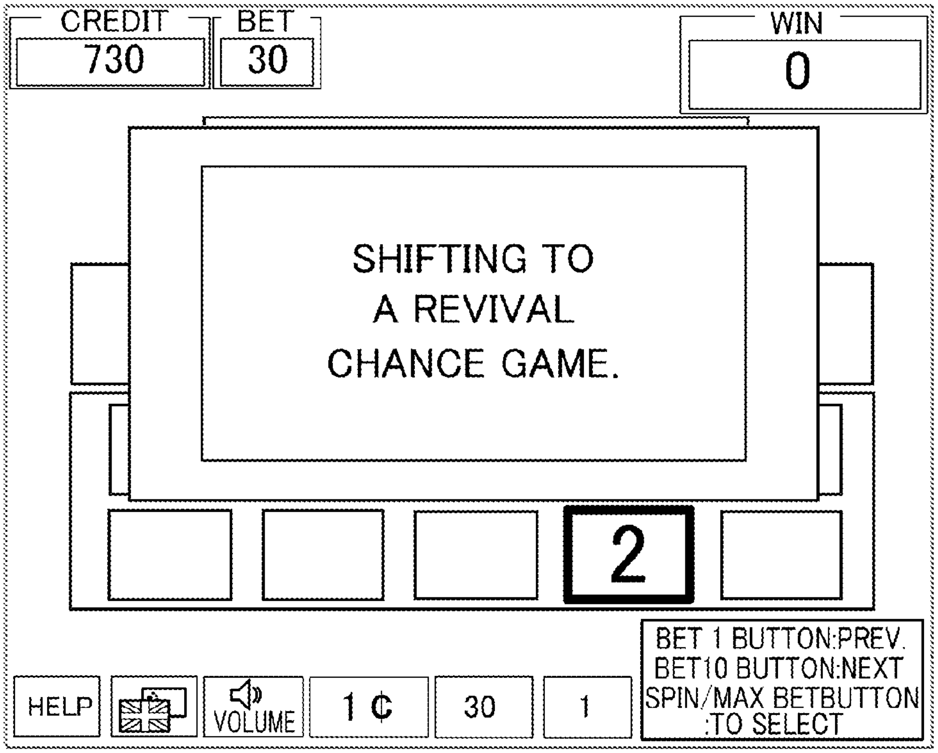
FIG. 74B is an explanatory diagram of the operation process of the reading game.

As shown in FIG. 74B, when the book bonus game is finished, a character string "Shifting to a revival chance game." is displayed, and it is notified that the game shifts to the "windmill destruction game" (revival chance game). A display of the revival chance game is provided, for example, by falling-down of a signboard with the description "Shifting to a revival chance game" from an upper portion of the display 2. Shifting to the revival chance game is executed, for example, at the moment that Don Quixote and the others traverse the screen.

In the above-described example, the selection of each of the books for determining the payout is conducted by operating the "BET 1 button" and the "BET 10 button as well as the "SPIN button" or the "MAX BET button". However, the selection thereof may be conducted by employing other method. For example, the selection of each of the books may be arranged such that a player touches a symbol of each of the books or the selection may be conducted by moving a cursor appearing on a display using buttons of a control panel.

Figure 75:
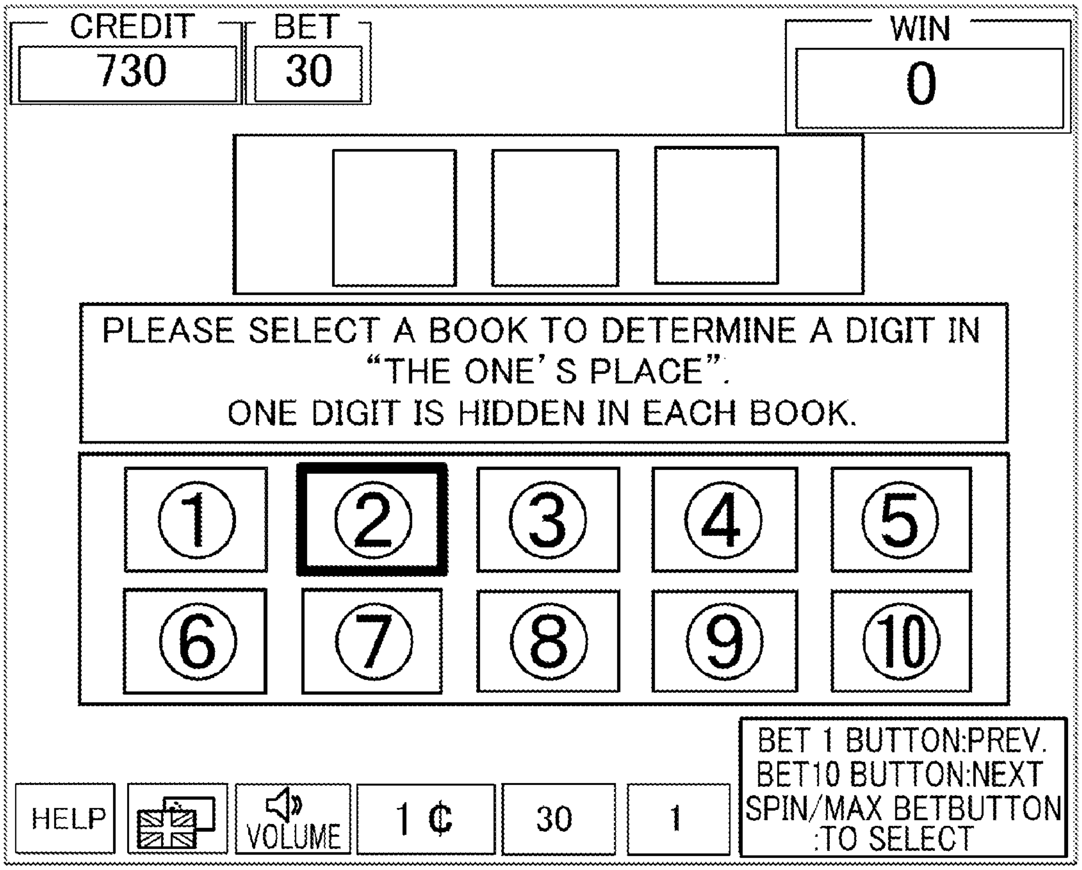
FIG. 75 is an explanatory diagram of a modified example of the reading game.

As shown in FIG. 75, the selection thereof may be conducted by providing symbols of the books with digits and moving a cursor enclosing each of the symbols. In this case, buttons for moving the cursor are the BET button 1 and the BET 10, and a determination button is the MAX BET button. The BET 1 button is to move the cursor to the left and the BET 10 button is to move the cursor to the right. Although the digits provided for the symbols of the books are "1" to "10", when the BET 10 button is operated with the cursor being present at the digit "10", the cursor moves to the digit "1". Conversely, when the BET 1 button is operated with the cursor being present at the digit "1", the cursor moves to the digit "10". In other words, the digits “1” and “10” are continuous, and the arrangement of these digits “1” to “10” is equivalent to an arrangement in which these digits “1” to “10” are disposed in a loop-like manner. In addition, when there is a digit which has already been selected and the cursor is moved, the digit is skipped and it is arranged that the cursor is not moved to the selected digit.

<Princess Dolcia Game>

A Princess Dolcia game” is a bonus game which is executed when a display “Princess BONUS” on the inner periphery roulette 310 is indicated by the indication part 320. In this “Princess Dolcia game”, one lady silhouette is selected from among a plurality of lady silhouettes and a payout is determined based on the selected lady. When the selected lady is Princess Dolcia, a high payout is obtained. This Princess Dolcia game is finished by playing one game.

Figure 76:
FIG. 76 is an explanatory diagram of an operation process of a Princess Dolcia game.

As shown in FIG. 76, upon staring the “Princess Dolcia game”, on the display 2, “PRINCESS BONUS” as a name of the bonus game to be started from now is displayed. At this time, on the display 2, a message “DECLARE YOUR LOVE TO THE BEAUTIFUL PRINCESS!” is concurrently displayed, thereby showing a concept of the Princess Dolcia game.

Figure 77:
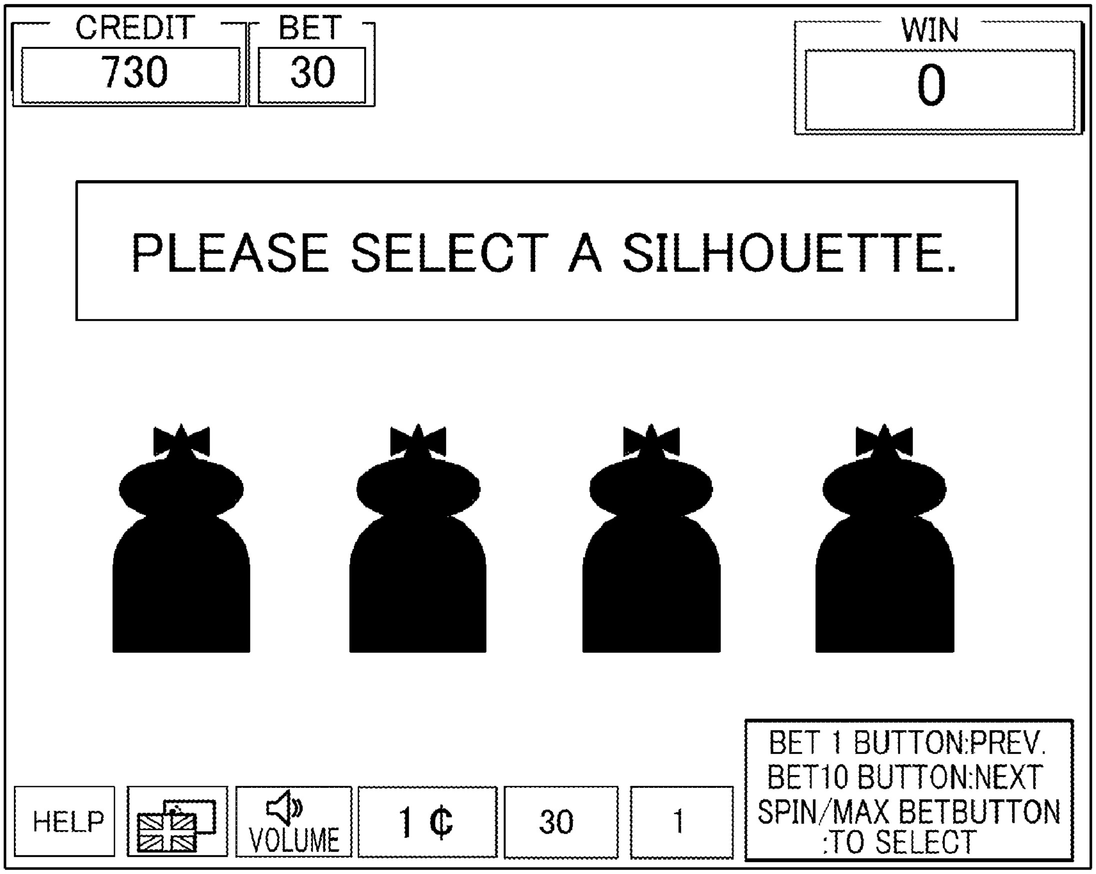
FIG. 77 is an explanatory diagram of the operation process of the Princess Dolcia game.

Next, as shown in FIG. 77, on the display 2, four silhouettes and a message of a gaming explanation “Please select a silhouette.” are displayed. On the display 2, furthermore, in a bottom right corner, operating instructions “BET 1 BUTTON: PREV.”, “BET 10 BUTTON: NEXT”, and “SPIN/MAX BET BUTTON: TO SELECT” are concurrently displayed. In other words, the selection of the silhouette by a player is conducted by operating the BET 1 button and the BET 10 button (refer to FIG. 31) and the determination of the selection of the selected silhouette is conducted by operating the SPIN button or the MAX BET button (refer to FIG. 31). Of course, the selection of the silhouette may be conducted by operating buttons other than the above-mentioned buttons.

Figure 78:
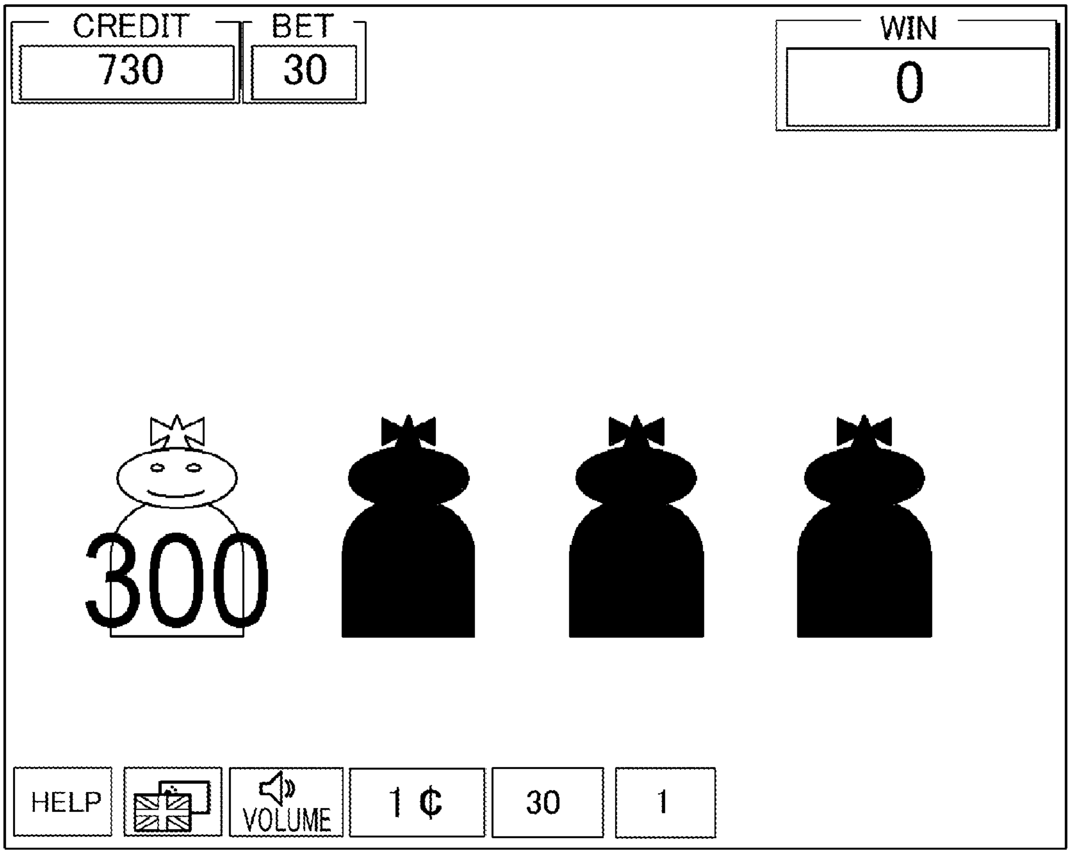
FIG. 78 is an explanatory diagram of the operation process of the Princess Dolcia game.

As shown in FIG. 78, when the selection of the silhouette is conducted by operating the BET 1 button and the BET 10 button (refer to FIG. 31) and the determination of the selected silhouette is conducted by operating the SPIN button or the MAX BET button (refer to FIG. 31), a personage appears from the silhouette. In the example shown in FIG. 78, a silhouette on a leftmost side is selected, and Princess Dolcia has appeared from the silhouette. By the silhouette of Princess Dolcia, the highest payout is obtained, and in the example shown in FIG. 78, the payout is a “300 credit”.

Figure 79:
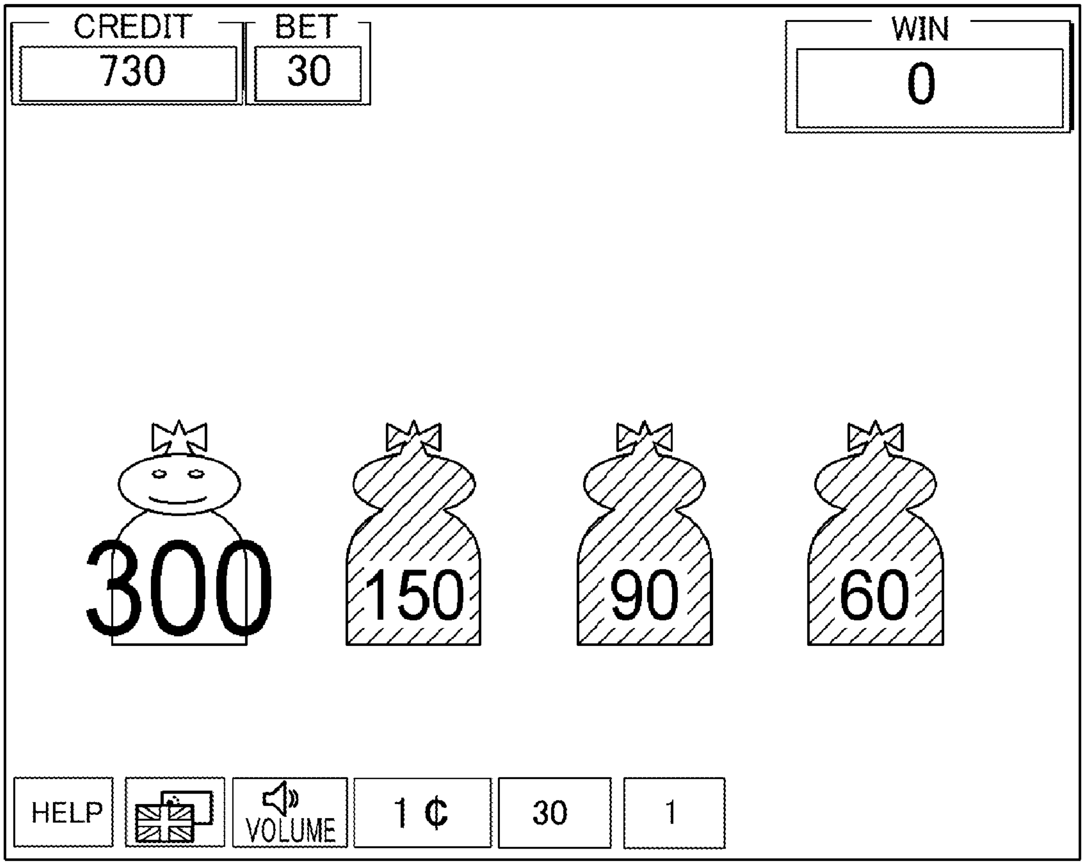
FIG. 79 is an explanatory diagram of the operation process of the Princess Dolcia game.

As shown in FIG. 79, when displaying the payout of the selected silhouette is finished, payouts of the remaining silhouettes are displayed. In the example shown in FIG. 79, the payouts of the remaining silhouettes are “150”, “90”, and “60 from the left side.

Figure 80:
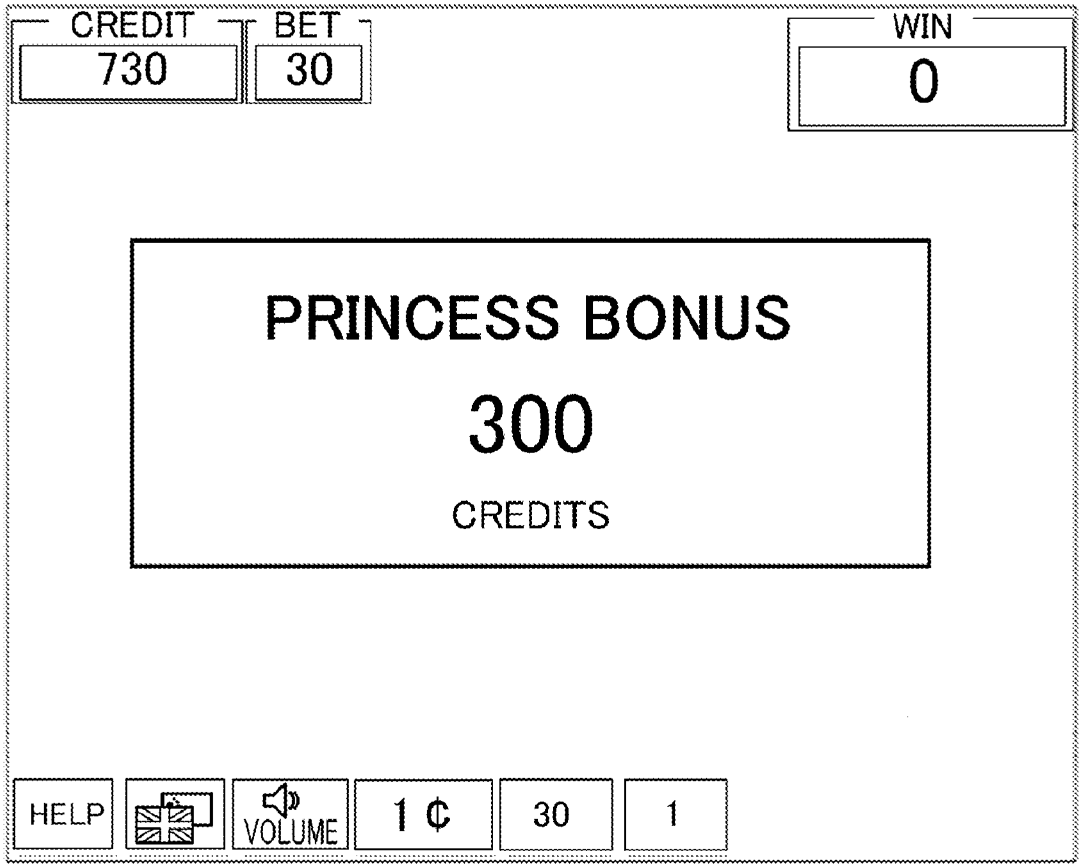
FIG. 80 is an explanatory diagram of the operation process of the Princess Dolcia game.

As shown in FIG. 80, when displaying the payouts of the remaining silhouettes is finished, on the display 2, “PRINCESS BONUS” as the name of the bonus game which has been conducted until then is displayed. Concurrently therewith, the obtained payout is displayed. In the example shown in FIG. 80, the payout is the “300 credit”.

Figure 81:
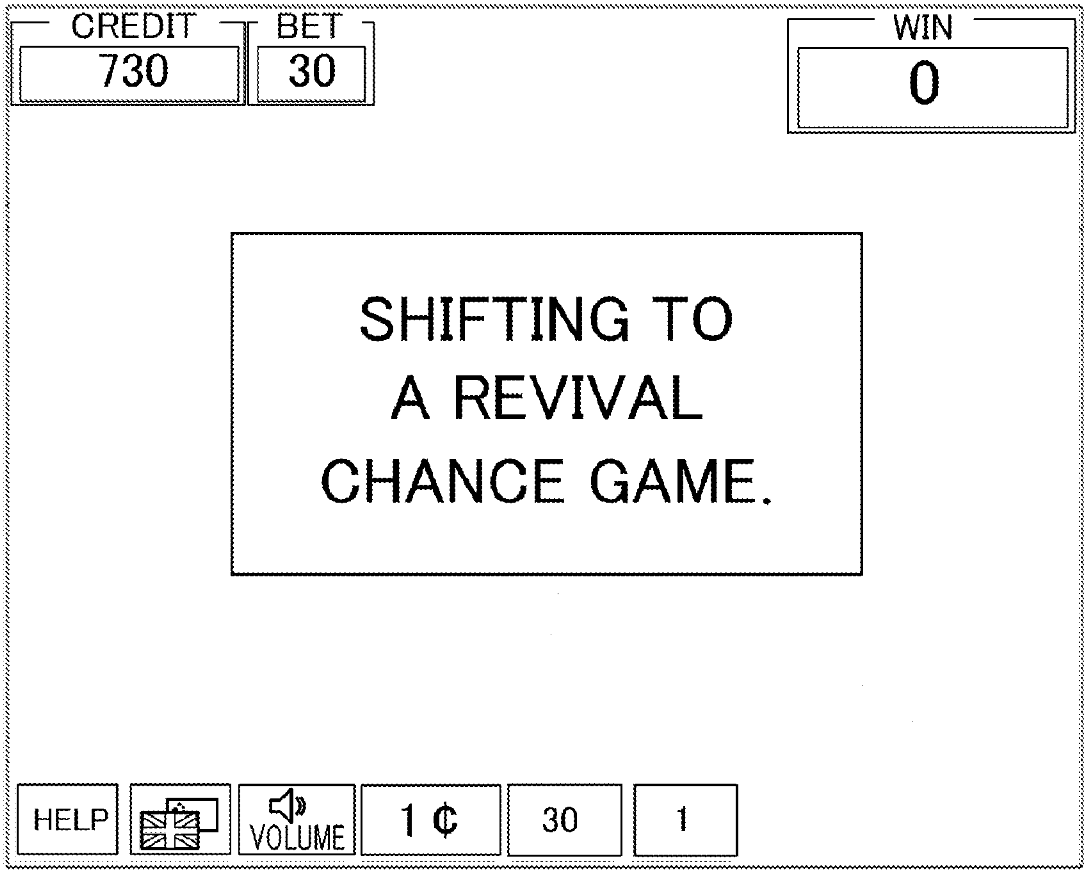
FIG. 81 is an explanatory diagram of the operation process of the Princess Dolcia game.

As shown in FIG. 81, when the Princess Dolcia game is finished, a character string “Shifting to a revival chance game.” is displayed, and it is notified that the game shifts to the “windmill destruction game” (revival chance game). A display of the revival chance game is provided, for example, by falling-down of a signboard with the description “Shifting to a revival chance game” from an upper portion of the display 2. Shifting to the revival chance game is executed, for example, at the moment that Don Quixote and the others traverse the screen.

Figure 82:
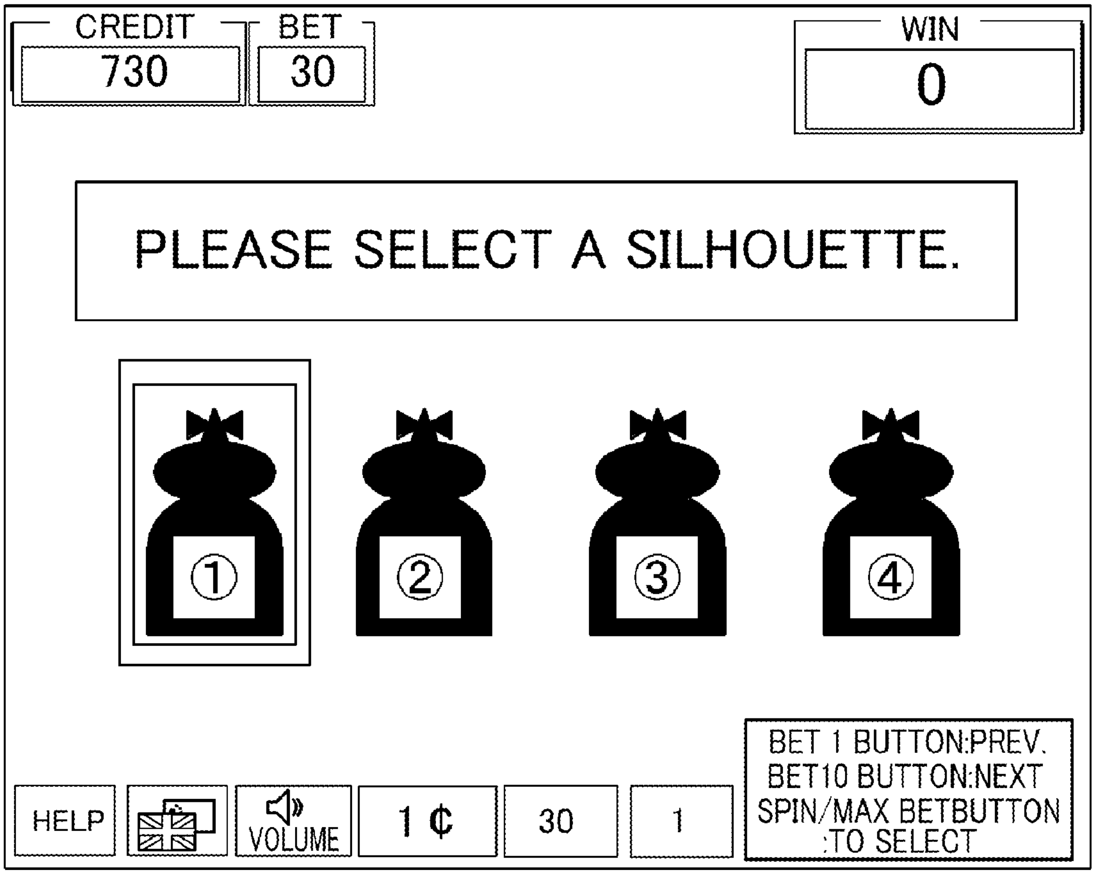

As shown in FIG. 82, the selection of the silhouette may be conducted by providing the silhouettes with digits and moving a cursor enclosing each of the silhouettes. In this case, buttons for moving the cursor are the BET button 1 and the BET 10, and a determination button is the MAX BET button. The BET 1 button is to move the cursor to the left and the BET 10 button is to move the cursor to the right. Although the digits provided for the silhouettes are “1” to “10”, when the BET 10 button is operated with the cursor being present at the digit “10”, the cursor moves to the digit “1”. Conversely, when the BET 1 button is operated with the cursor being present at the digit “1”, the cursor moves to the digit “10”. In other words, the digits “1” and “10” are continuous, and the arrangement of these digits “1” to “10” is equivalent to an arrangement in which these digits “1” to “10” are disposed in a loop-like manner. In addition, when there is a digit which has already been selected and the cursor is moved, the digit is skipped and it is arranged that the cursor is not moved to the selected digit.

<Battle-With-Mirror Knight Game>

A “battle-with-mirror knight game” is a bonus game which is executed when a display of “Battle BONUS” on the inner periphery roulette 310 is indicated by the indication part 320. In this “battle-with-mirror knight game”, Don Quixote who is a hero battles with a mirror knight as a one-on-one fight. When Don Quixote wins in the battle, a high payout is obtained, and when Don Quixote loses in the battle, a low payout is obtained.

Figure 83:

As shown in FIG. 83, upon staring the bonus game of the battle-with-mirror knight game, on the display 2, “BATTLE BONUS” as a name of the bonus game to be started from now is displayed. At this time, on the display 2, a message “DEFEAT THE KNIGHT OF THE MIRRORS!” is concurrently displayed, thereby showing a concept of the battle-with-mirror knight game.

Figure 84:
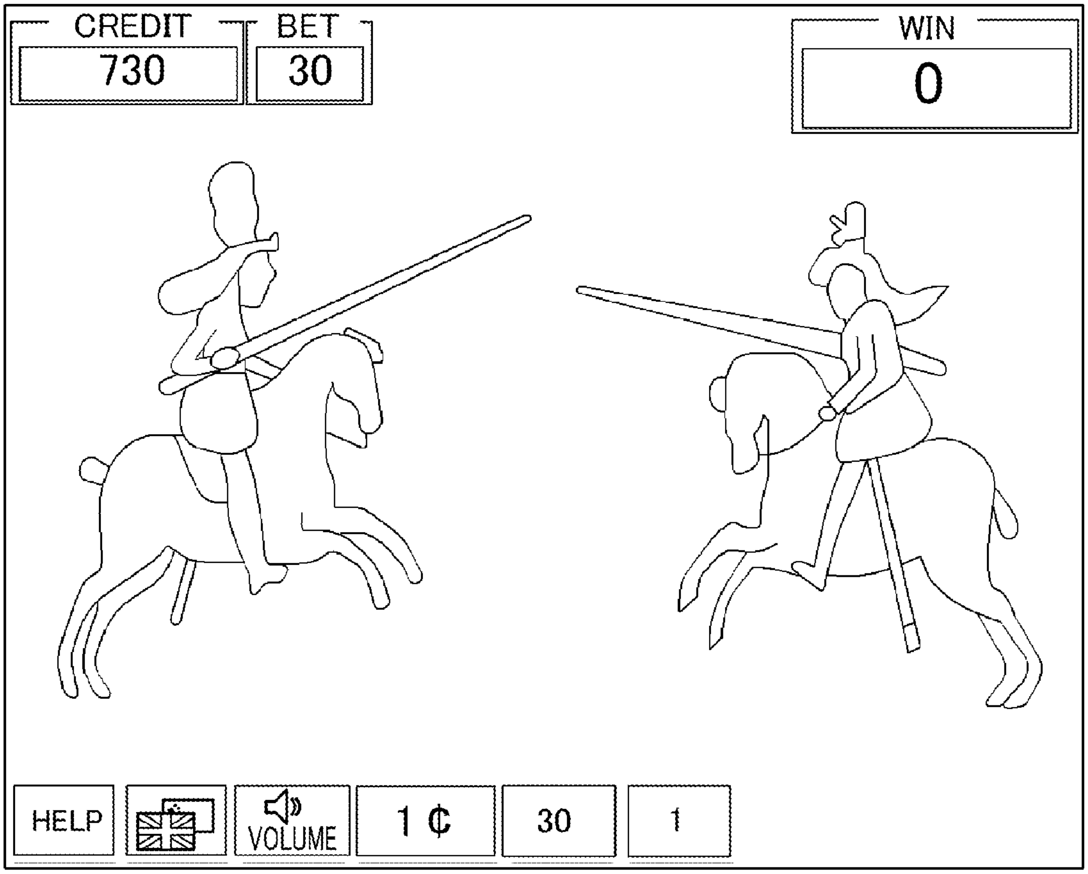

Next, as shown in FIG. 84, on the display 2, battle presentation effects of Don Quixote as the hero and the other are displayed. In the example shown in FIG. 84, the battle with Princess Dolcia is displayed. The opponent against Don Quixote in the battle is not limited to Princess Dolcia, and a plurality of battle opponents may be previously prepared. In this case, a winning ratio may vary and the payouts may differ depending on the battle opponents.

Figure 85:
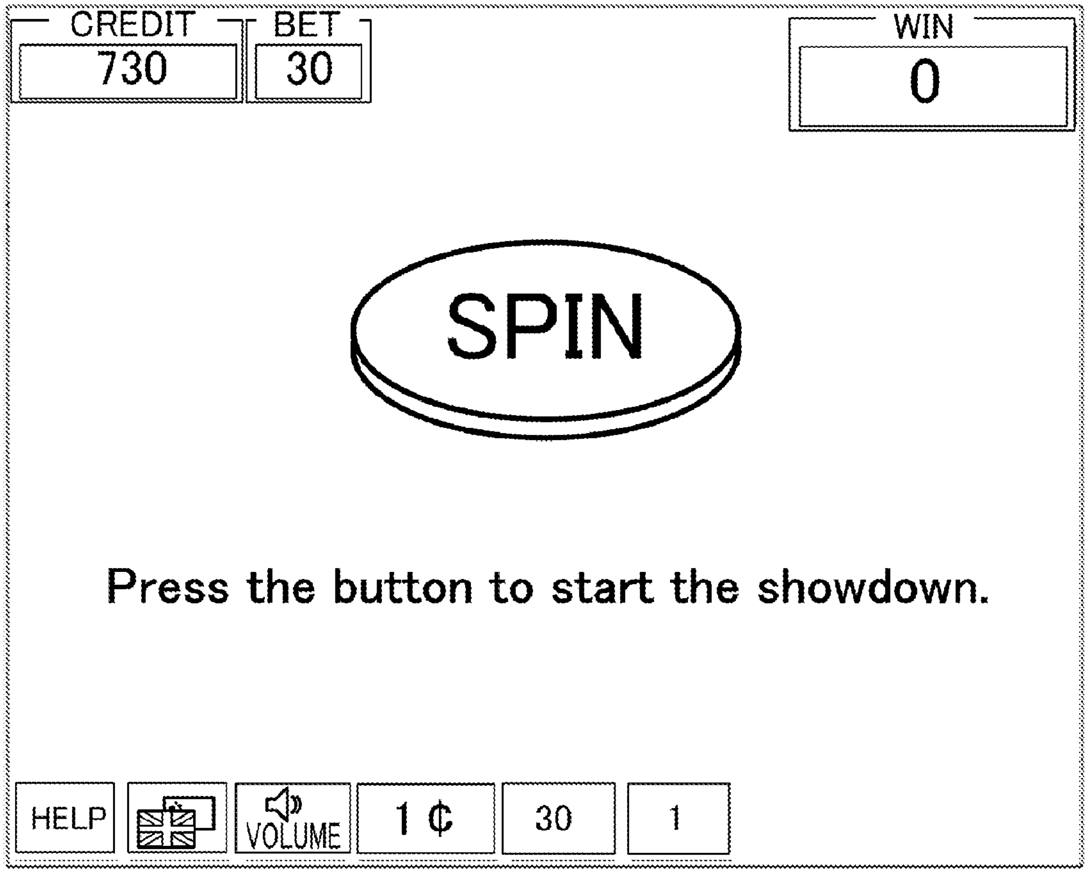
Figure 86:
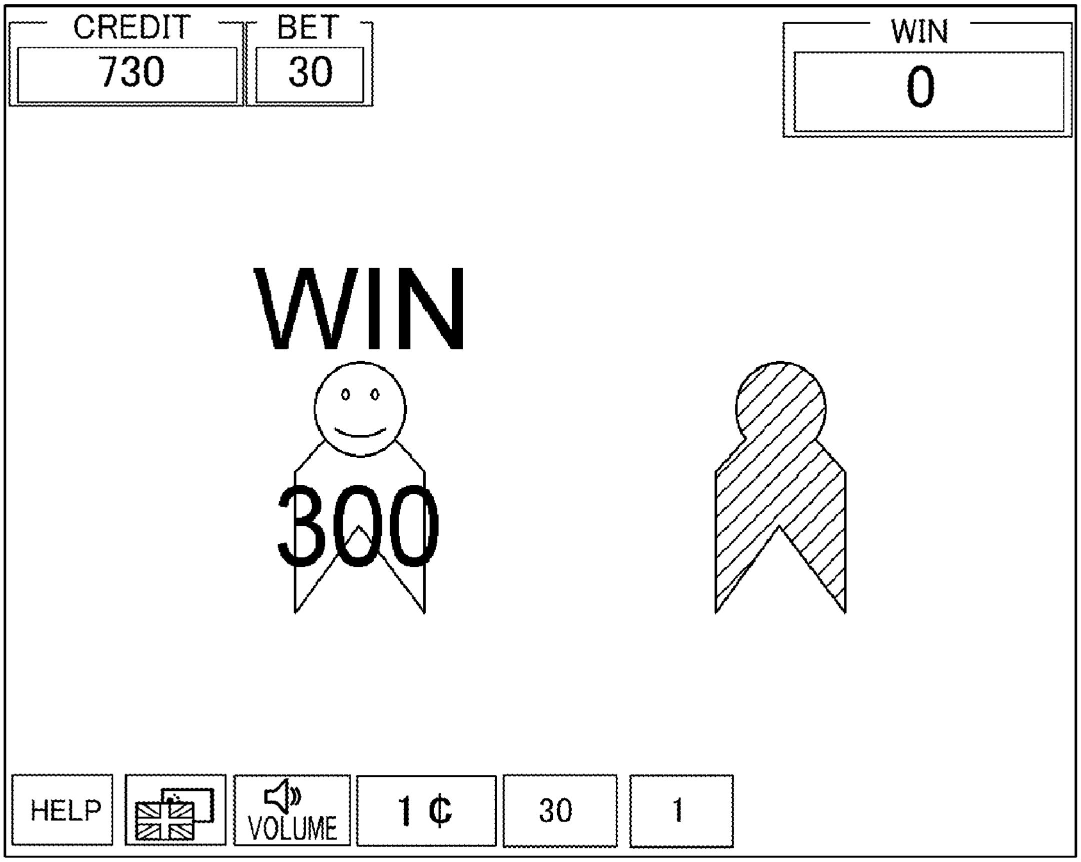

As shown in FIG. 85, when the battle presentation effects are conducted, on the display 2, a symbol imitating the SPIN button 602 is displayed and concurrently therewith, a display “Press the button to start the showdown.” for prompting a player to operate the SPIN button 602 (refer to FIG. 31) is indicated. When the SPIN button is operated, as shown in FIG. 86, an outcome of the battle is displayed. In the example shown in FIG. 86, a case in which Don Quixote has won in the battle is displayed and a display of “WIN” and a “300” payout are indicated on a side of Don Quixote.

Figure 87A:
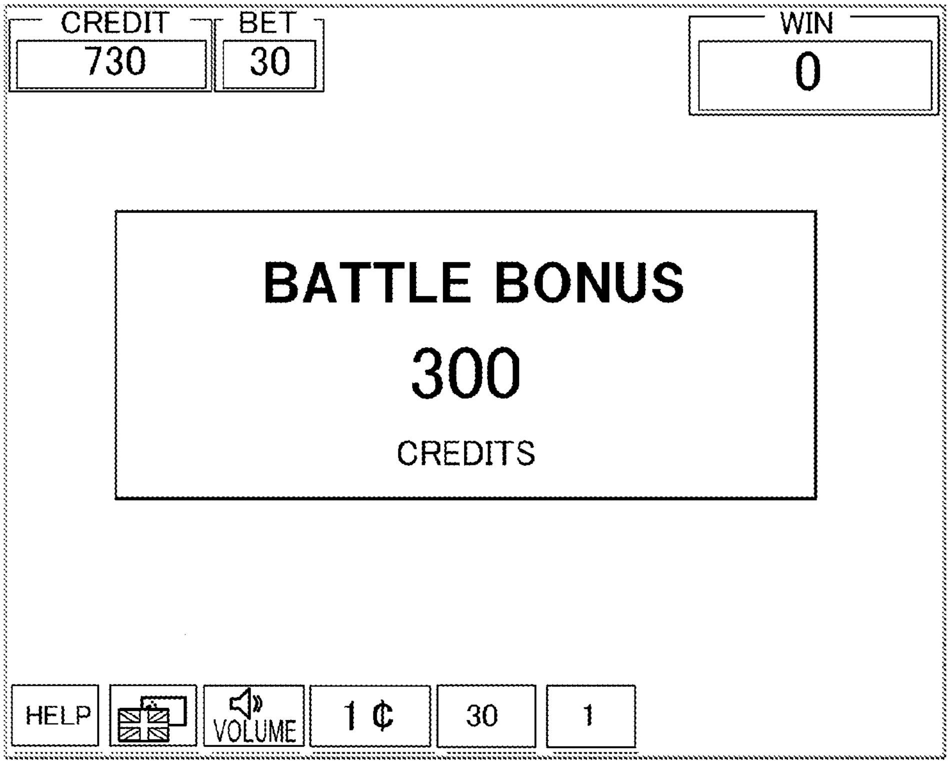

As shown in FIG. 87A, when displaying the outcome of the battle and the payout is finished, on the display 2, “BATTLE BONUS” as the name of the bonus game which has been conducted until then is displayed. Concurrently therewith, the obtained payout is displayed. In the example shown in FIG. 87A, the payout is a “300 credit”.

Figure 87B:
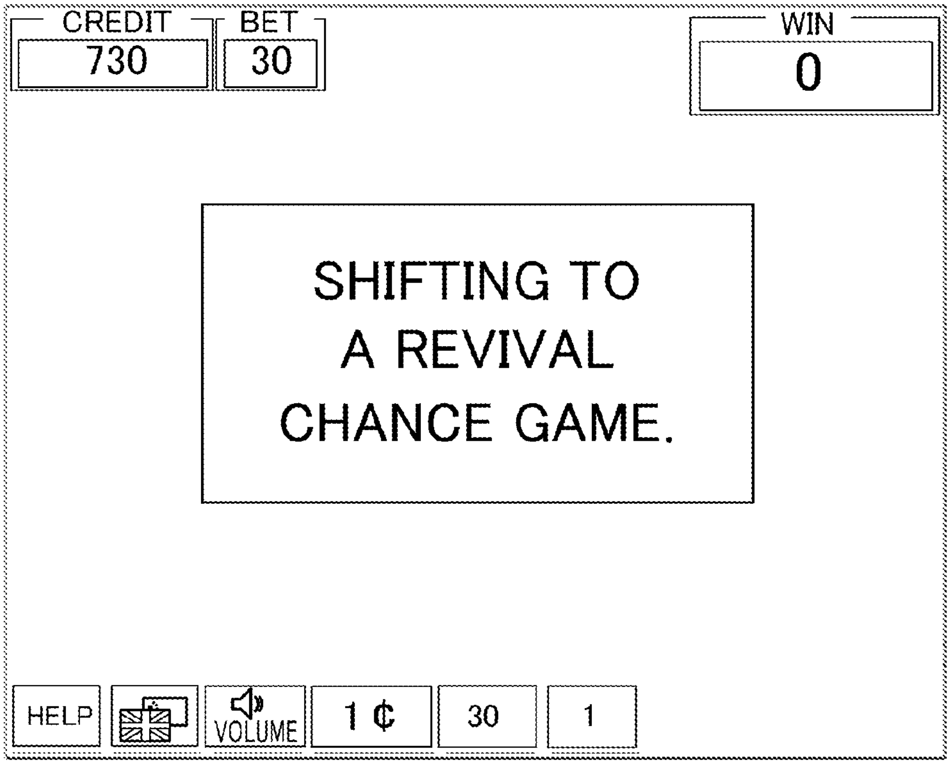

As shown in FIG. 87B, when the battle-with-mirror knight game is finished, a character string “Shifting to a revival chance game.” is displayed and it is notified that the game shifts to the “windmill destruction game” (revival chance game). A display of the revival chance game is provided, for example, by falling-down of a signboard with the description “Shifting to a revival chance game” from an upper portion of the display 2. Shifting to the revival chance game is executed, for example, at the moment that Don Quixote and the others traverse the screen.

In the battle-with-mirror knight game, when the SPIN button is operated, as shown in FIG. 86, the outcome of the battle is displayed. In this case, although the outcome of the battle may be displayed by operating the SPIN button once, which one of Don Quixote and the mirror knight has an advantage may be displayed. For example, physical strength gauges associated with Don Quixote and the mirror knight are provided and during the battle, a player is prompted to repeatedly press the SPIN button. During the battle, values of the physical strength gauges of Don Quixote and the mirror knight are decreasing respectively. Ultimately, one of Don Quixote and the mirror knight who has one of the physical strength gauges whose value has reached zero is a loser and the other who has the other of the physical strength gauges whose value remains as not being zero is a winner. Of course, since winning or losing of the battle is predetermined, even if a player does not operate the SPIN button, the battle results in the predetermined outcome.

<Fight-Against-Lion Game>

A fight-against-lion game is a bonus game which is executed when a display of "Lion BONUS on the inner periphery roulette 310 is indicted by the indication part 320. In this fight-against-lion game, a hunk of meat is selected from among five hunks of meat in front of a sleeping lion. The selected hunk of meat is associated with a payout, this fighting game can be continued until a hunk of meat associated with "END" is selected.

Figure 88:
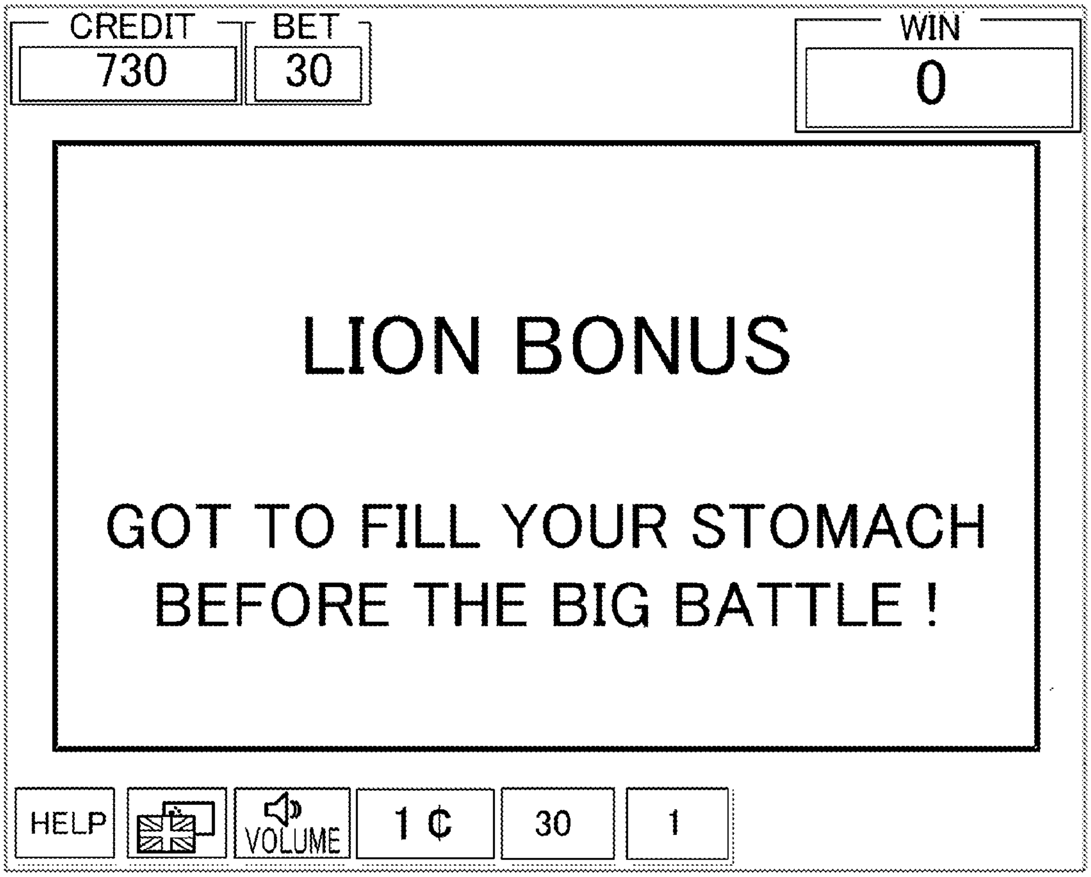

As shown in FIG. 88, upon starting the "fight-against-lion game, on the display 2, "LION BONUS" as a name of the bonus game to be started from now is displayed. At this time, on the display 2, a message "GOT TO FILL YOUR STOMACH BEFORE THE BIG BATTLE!" is concurrently displayed, thereby showing a concept of the fight-against-lion game.

Figure 89:
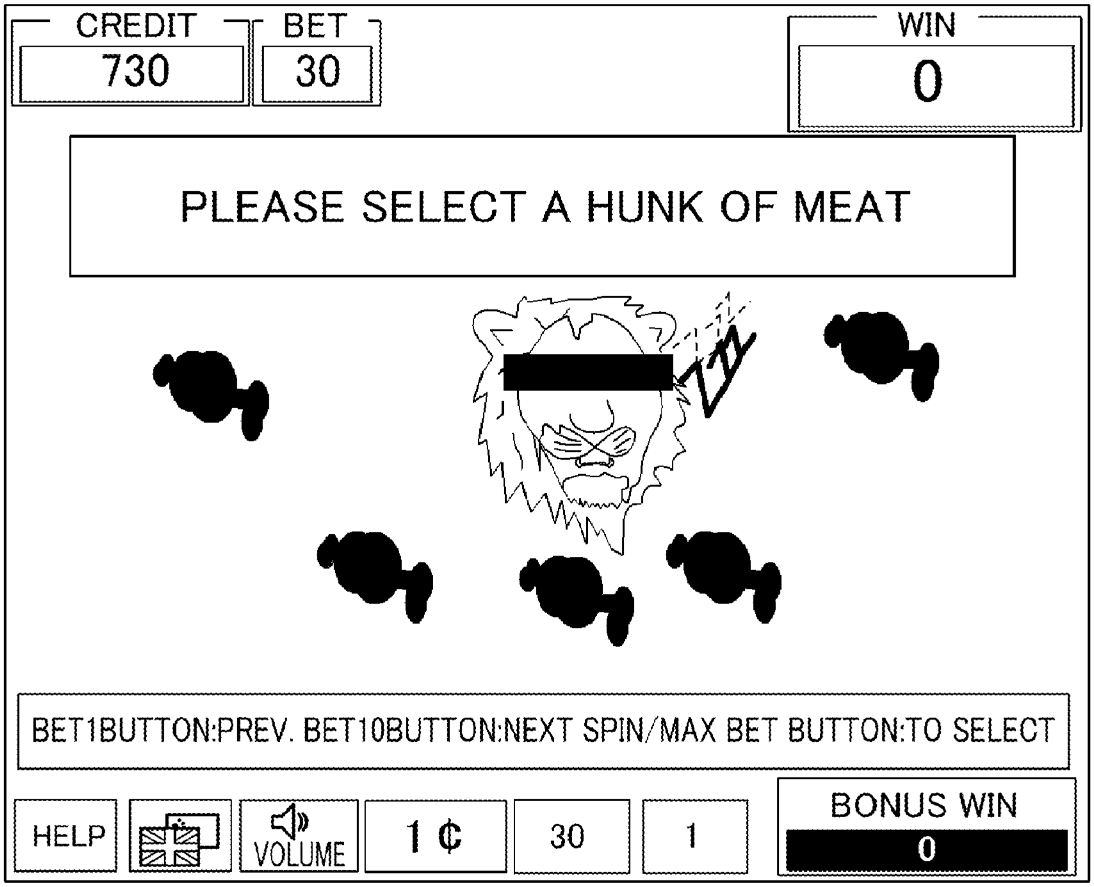

As shown in FIG. 89, on the display 2, silhouettes of the sleeping lion and the five hunks of meat and a message of a gaming explanation "Please select a hunk of meat." are displayed. Of course, instead of the silhouettes, symbols imitating hunks of meat may be displayed.

On the display 2, furthermore, in a lower portion, operating instructions "BET 1 BUTTON: PREV.", "BET 10 BUTTON: NEXT", and "SPIN/MAX BET BUTTON: TO SELECT" are concurrently displayed. In other words, the selection of each of the hunks of meat by a player is conducted by operating the BET 1 button and the BET 10 button (refer to FIG. 31) and the determination of the selection of the selected silhouette is conducted by operating the SPIN button or the MAX BET button (refer to FIG. 31). Of course, the selection of the silhouette may be conducted by operating buttons other than the above-mentioned buttons. In a lower right portion of the display 2, payouts obtained in the bonus game are displayed in an accumulated manner.

Figure 90:
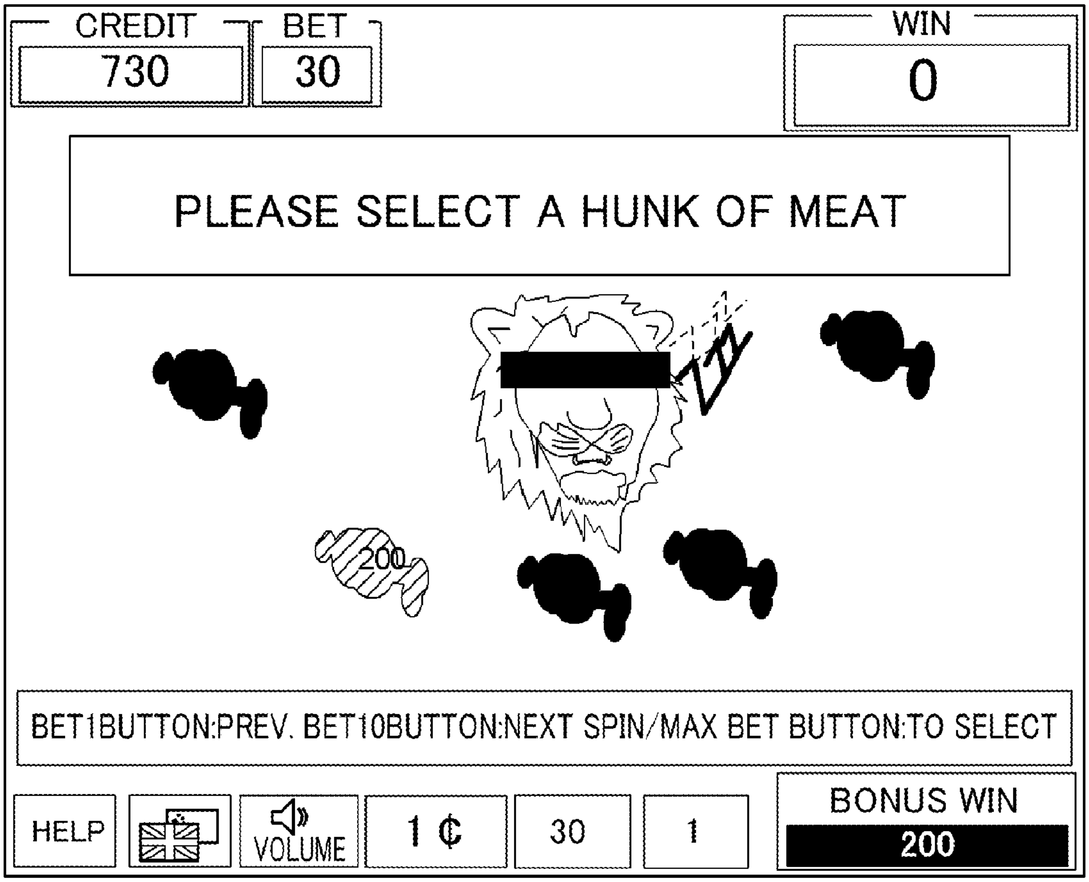

As shown in FIG. 90, when the selection of each of the hunks of meat is conducted by operating the buttons, a payout is displayed at the selected hunk of meat. In the example shown in FIG. 90, the payout of a "200" credit is obtained. The obtained payout is displayed in the lower right portion of the display 2, and in the example shown in FIG. 90, since the obtained payout is the "200" credit, "200" is displayed.

Figure 91:
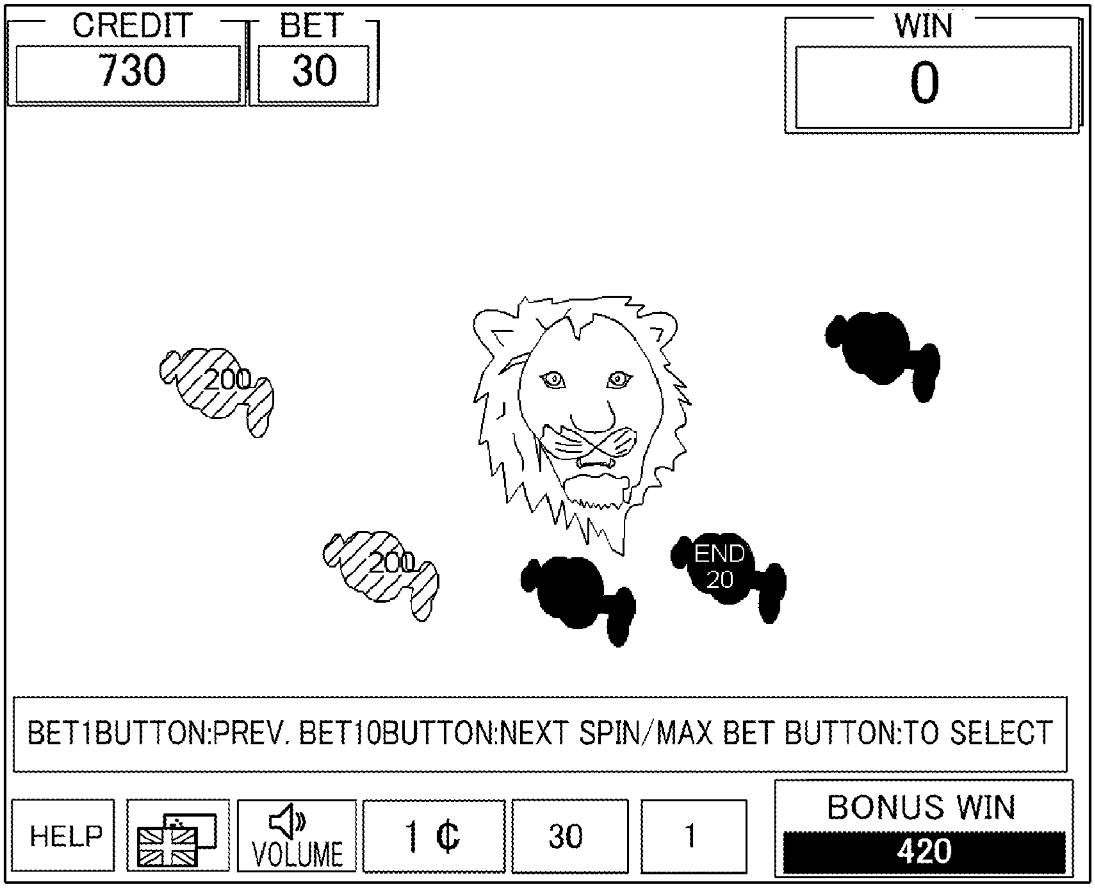
Figure 92:

As shown in FIG. 91, when a word "END" is displayed, the sleeping lion wakes up and the fight-against-lion game is finished. When the word "END" is displayed by the first selection, the fight-against-lion game is finished by the selection conducted at one time. However, the selection of each of the hunks of meat can be conducted at up to five times, the number thereof corresponding to the number of the initially displayed hunks of meat. In the example shown in FIG. 91, the payout of the "200" credit is obtained by the first selection, a payout of a "200" credit is obtained by the second selection, and when a payout of a "20" credit is obtained by the third selection, "END" is displayed and the fighting game is finished. In the example shown in FIG. 91, the payouts obtained until "END" is displayed are displayed in the lower right portion of the display 2. In the example shown in FIG. 91, since the payout of the "200" credit is obtained by the first selection, the payout of the "200" credit is obtained by the second selection, and the payout of the "20" credit is obtained by the third selection, it is displayed that a total payout of a "420" credit is obtained. As shown in FIG. 92, after the word "END" has been displayed, payouts of the remaining hunks of meat which have not been selected are displayed.

As shown in FIG. 93A, when the word "END" is displayed and the fighting game is finished, on the display 2, "LION BONUS" as the name of the bonus game which has been conducted until then is displayed. Concurrently therewith, the obtained payout is displayed. In the example shown in FIG. 93A, the gross payout is the "420 credit".

As shown in FIG. 93B, when the fight-against-lion game is finished, a character string "Shifting to a revival chance game." is displayed and it is notified that the game shifts to the "windmill destruction game" (revival chance game). A display of the revival chance game is provided, for example, by falling-down of a signboard with the description "Shifting to a revival chance game" from an upper portion of the display 2. Shifting to the revival chance game is executed, for example, at the moment that Don Quixote and the others traverse the screen.

As shown in FIG. 94, the selection of each of the hunks of meat may be conducted by moving a cursor enclosing each of the hunks of meat. In this case, buttons for moving the cursor are the BET button 1 and the BET 10, and a determination button is the MAX BET button. The BET 1 button is to move the cursor to the left and the BET 10 button is to move the cursor to the right.

(Jackpot Challenge Game)

A "jackpot challenge game" is a game which allows jackpot drawing to be accepted. In this "jackpot challenge game", one motif is selected from among a plurality of motifs including a motif associated with a jackpot. In the present embodiment, three windmills constitute the plurality of motifs. Among these windmills, one windmill is associated with the jackpot and the remaining two windmills are associated with fixed payouts. Here, the jackpot challenge game (progressive bonus game) is a special bonus game which allows all of the credits accumulated in a plurality of games to be obtained with a part of a plurality of bet amounts placed by a plurality of players as funds and is a bonus game which has the potential of obtaining a large gaming value, as compared with other bonus games. In a case in which a large number of gaming machines located in a lot of places are connected via a network or in a system in which each of the gaming machines 1 is used by an individual terminal such as a personal computer to play an online game, since amounts of large funds can be accumulated, a credit of the jackpot is likely to be further a large amount of a payout.

As shown in FIG. 95, upon starting the "jackpot challenge game", on the display 2, "CHALLENGE FOR JACKPOT" as a name of the bonus game to be started from now is displayed. At this time, on the display 2, a message "THIS IS THE LAST BATTLE!" is concurrently displayed, thereby showing a concept of the jackpot challenge game.

As shown in FIG. 96, on the display 2, a character string "CHALLENGE FOR JACKPOT" and a message of a gaming explanation "1 (JACK POT) IS HIDDEN WITHIN THE WINDMILLS." are displayed. In a lower portion of the display 2, furthermore, operating instructions "BET 1 BUTTON: PREV.", "BET 10 BUTTON: NEXT", and "SPIN/MAX BET BUTTON: TO SELECT" are concurrently displayed. In other words, the selection of each of the windmills by a player is conducted by operating the BET 1 button and the BET 10 button (refer to FIG. 31) and the determination of the selection of each of the windmills is conducted by operating the SPIN button or the MAX BET button (refer to FIG. 31). Of course, the selection of each of the windmills may be conducted by operating buttons other than the above-mentioned buttons.

As shown in FIG. 97, on the display 2, a display "SELECT A WINDMILL." and silhouettes of the three windmills are displayed. In the silhouettes of the three windmills, one "JACK POT" and two credits are hidden. Of course, instead of the silhouettes, symbols imitating the windmills may be displayed.

As shown in FIG. 98A, when one of the silhouettes is selected by operating the buttons, the selected silhouette is subjected to effects, thereby displaying an outcome. When the displayed outcome is not the jackpot, a payout is displayed. In the example shown in FIG. 98A, a payout of a "150" credit is obtained.

As shown in FIG. 98B, after the outcome of the selected silhouette has been displayed, outcomes of the remaining silhouettes are displayed. In the example shown in FIG. 98B, the jackpot is on the left and the payout of a "500" credit is on the right. Thereafter, termination presentation effects for the jackpot challenge game are conducted. The termination presentation effects are conducted, for example, as animation in which Don Quixote as the hero collides with the windmill and is blown off.

As shown in FIG. 99A, when the termination presentation effects are conducted, on the display 2, "CHALLENGE FOR JACKPOT" as the name of the bonus game which has been conducted until then is displayed. Concurrently therewith, the obtained payout is displayed. In the example shown in FIG. 99A, the gross payout is a "150 credit".

As shown in FIG. 99B, when the jackpot challenge game is finished without obtaining the jackpot, a character string "Shifting to a revival chance game." is displayed and it is notified that the game shifts to the "windmill destruction game" (revival chance game). A display of the revival chance game is provided, for example, by falling-down of a signboard with the description "Shifting to a revival chance game" from an upper portion of the display 2. Shifting to the revival chance game is executed, for example, at the moment that Don Quixote and the others traverse the screen.

On the other hand, as shown in FIG. 100A, when from the selected silhouette, the jackpot appears, as shown in FIG. 100B, the outcomes of the remaining silhouettes are displayed, and thereafter, as shown in FIG. 101A, a "JACKPOT WIN" screen is displayed. Concurrently with this displaying of the screen, a payout of the jackpot is displayed. Since a large amount of the payout can be obtained by the jackpot in general, upon displaying the "JACKPOT WIN" screen, presentation effects which allows a player to clearly recognize the jackpot may be conducted.

As shown in FIG. 101B, when the jackpot challenge game is finished, on the display 2, "CHALLENGE FOR JACKPOT" as the name of the bonus game which has been conducted until then is displayed. Concurrently therewith, the obtained jackpot payout is displayed.

When the jackpot is obtained and the jackpot challenge game is finished, the game returns to the base game without conducting the "windmill destruction game" (revival chance game). Of course, even when the jackpot is obtained, the "windmill destruction game" (revival chance game) may be conducted. In this case, as compared with a case in which the other bonuses and the jackpot in the jackpot challenge game cannot be obtained, a probability with which the revival occurs in the windmill bonus game is decreased.

As shown in FIG. 102, the selection of each of the silhouettes may be conducted by providing the silhouettes with digits and moving a cursor enclosing each of the silhouettes. In this case, buttons for moving the cursor are the BET button 1 and the BET 10, and a determination button is the MAX BET button. The BET 1 button is to move the cursor to the left and the BET 10 button is to move the cursor to the right.

Instead of the jackpot challenge game, a progressive bonus challenge game in which a part of credits accumulated in a plurality of games with a part of plurality of bet amounts placed by a plurality of players as funds is obtained may be adopted.

[Windmill Destruction Game (Revival Chance Game)]

A "windmill destruction game" (revival chance game) is a game in which after finishing each of the bonus games, it is determined whether or not to execute a windmill bonus game again. However, when the jackpot has been won in the jackpot challenge game, shifting to the windmill destruction game is not conducted or a revival probability in the windmill bonus game in the windmill destruction game is set to be low, as compared with the bonus games. In addition, the number of times at which the windmill destruction game is conducted is limited to nine, and for the tenth bonus game, a revival drawing is not conducted, and neither is the windmill destruction game.

A probability with which the windmill bonus game is revived, that is, a probability with which a windmill is destroyed in the windmill destruction bonus game is defined, for example, as shown in FIG. 103A and FIG. 103B.

A revival drawing table A shown in FIG. 103A is a table selected when upon selecting the bonus game in the windmill bonus game, reference is made to the drawing table A shown in FIG. 39A. In other words, when the drawing table A with no jackpot challenge game selected is used upon selecting a bonus game, reference is made to the revival drawing table A. In this revival drawing table A, a revival winning probability is 1/3.

On the other hand, a revival drawing table B shown in FIG. 103B is a table selected when upon selecting a bonus game in the windmill bonus game, reference is made to the drawing table B shown in FIG. 39B. In other words, when upon selecting the bonus game, the drawing table B with which the jackpot challenge game is likely to be selected is used, reference is made to the revival drawing table B. In this revival drawing table B, a revival winning probability is 12/35 and is slightly higher than that in the revival drawing table A. This is because the potential of obtaining a jackpot is taken into consideration and substantially, the revival winning probability is the same as that in the revival drawing table A.

It is not necessarily required that the tables used in the revival drawing are two kinds as with the revival drawing tables A and B, and three kinds or one kind thereof may be used. When one kind of the revival drawing table is used, a revival winning probability is, for example, 1/2.

The windmill destruction game is a game in which ascending is conducted through graduations 80 on a meter 8 by repeatedly pressing the SPIN button, thereby destroying the windmill and proceeds in a flow of introduction presentation effects, repeated pressing presentation effects, and outcome display presentation effects. On an upper part of the meter 8, a word "SUCCESS" is displayed, and this display "blinks" each time the ascending is conducted by one graduation 80 of the meter 8 and lights up when the ascending through the graduations 80 of the meter 8 has reached the top. The graduations 80 of the meter 8 may be configured such that colors of the graduations upon the lighting-up are made different from one another and the colors of the graduations 80 change in a phased manner upon the ascending through each of the graduations of the meter 8. In addition, a frame 81 of the meter 8 blinks in accordance with a pressing operation of the SPIN button 602, and when the last one of the graduations 80 of the meter 8 has remained, a blinking pattern of the frame 81 is changed to a pattern which fans a sense of expectation. Such a change in the blinking pattern is conducted, for example, by changing a color of the frame 81 or shortening each blinking interval.

As shown in FIG. 104 and FIG. 105, in the introduction presentation effects, first, presentation effects in which Don Quixote runs, aiming at the windmill are conducted. Next, an image for explaining the repeated pressing presentation effects is displayed. Specifically, as shown in FIG. 106A and FIG. 106B, it is explained the ascending is conducted through each of the graduations 80 of the meter 8 by repeatedly pressing the SPIN button 602. When the ascending through the graduations 80 of the meter 8 has reached the top and the word "SUCCESS" is displayed, the windmill is destroyed by Don Quixote, and it is explained that a reentry into the windmill bonus game is conducted. At this time, a message such as "Accumulate power by repeatedly pressing a button and destroy a windmill!" is displayed. When the button repeated pressing presentation effects is finished, as shown in FIG. 105, a character string "GET READY" is displayed and thereafter, animation of "GO!" which is a cue to start the repeated pressing of the SPIN button 602 is displayed.

As shown in FIG. 107, in the repeated pressing presentation effects, a "repeated pressing screen 1" in which Don Quixote and Sancho make a dash at the windmill is displayed. At this time, as shown in FIG. 104, in a lower right portion of the screen, animation for prompting a player to repeatedly press the SPIN button 602 is continuously displayed.

On the other hand, when a player repeatedly presses the SPIN button 602, as shown in FIG. 108, the ascending is conducted through each of the graduations 80 and the frame 81 of the meter 8 blinks in response to the pressing-down operation of the SPIN button 602. When the ascending is conducted by one of the graduations 80 of the meter 8 by the repeated pressing, the display "SUCCESS" located on the upper portion of the meter 8 blinks. When the ascending through the graduations 80 of the meter 8 exceeds the sixth graduation, a concentration line is displayed in the background. This increases a sense of speed of the presentation effects and allows an expectation that the ascending through the graduations 80 of the meter 8 would reach the top to be enhanced.

When the last one of the graduations 80 of the meter 8 has remained, switching of the repeated pressing presentation effects is conducted, a "repeated pressing screen 2" in which a face of Don Quixote is taken in closeup is displayed. At this time, a lighting-up pattern of the frame 81 of the meter 8 also changes, thereby fanning a sense of expectation that the ascending through the graduations 80 of the meter 8 would reach the top.

When the ascending through the graduations 80 of the meter 8 has reached the top by repeatedly pressing the SPIN button 602, the word "SUCCESS" on the upper portion of the meter 8 lights up. This determines that winning has occurred in the revival drawing of the windmill bonus game. However, even when the ascending through the graduations 80 of the meter 8 has not reached the top, it is not necessarily determined that no winning has occurred in the revival drawing. In other words, since the condition under which the ascending through the graduations 80 of the meter 8 reaches the top is that winning in the revival drawing of the windmill bonus game occurs and the repeated pressing is executed at a predetermined specified number of times within a predetermined period of time, when the repeated pressing is executed at the number of times less than the predetermined specified number of times within the predetermined period of time, the fact remains that the winning has occurred in the revival drawing, even if the ascending through the graduations 80 of the meter 8 has not reached the top.

After a predetermined period of time during which the repeated pressing of the SPIN button 602 is activated has elapsed, when the ascending through the graduations 80 of the meter 8 has not reached the top, the outcome display presentation effects are executed. When the winning has occurred in the revival drawing of the windmill bonus game, as shown in FIG. 109, the presentation effects in which Don Quixote destroys the windmill are executed. On the display 2, a character string "Perfect Victory!" is displayed, and the windmill destruction game is finished.

After finishing the windmill destruction game, the windmill bonus game is started again. In other words, on the display 2, "↑LOOK UP↑" is displayed, and a player is prompted to pay attention to the windmill roulette 300. Each of the gaming machines 1 conducts a drawing for determining a kind of a bonus game to be executed in the windmill bonus game, rotates the windmill roulette 300 in accordance with an outcome of the drawing, and notifies a player of the won bonus game.

When winning has occurred in the revival drawing in the windmill bonus game, as shown in FIG. 110, presentation effects in which Don Quixote crashes against the windmill and is blown off are executed. At this time, on the display 2, the number of the graduations 80 of the meter 8 through which the ascending is conducted is decreased to "0" and a word "Failure" is displayed. Thereafter, on the display 2, a signboard which displays the gross payout is displayed and the windmill destruction game is finished.

In the windmill destruction game, as described above, the introduction presentation effects are executed only for the bonus game in which the first winning has occurred, and only the repeated pressing presentation effects and outcome display presentation effects are executed for the second and subsequent bonus games in the windmill destruction game. Regarding these operation patterns, as is understood from the above description, basically, there are three patterns. These three operation patterns include, as shown in FIG. 111, patterns of success time 1, success time 2, failure time 1.

The pattern of the success time 1 is a pattern in which after the repeated pressing screen 1, shifting to the repeated pressing screen 2 is conducted and on this repeated pressing screen 2, it is determined that the ascending through the graduations 80 of the meter 8 has reached the top and the winning has occurred in the revival drawing. After the repeated pressing screen 2, success presentation effects which destroy the windmill are executed.

The patter of the success time 2 is a pattern in which after the repeated pressing screen 1, shifting to the repeated pressing screen 2 is conducted, but the ascending through the graduations 80 of the meter 8 has not reached the remaining last one because of a shortage of the number of times at which the repeated pressing is conducted, and thereafter, by executing the success presentation effects, it is determined by the success presentation effects that the winning has occurred in the revival drawing. However, when a state in which the last one of the graduations 80 of the meter 8 has remained is not brought about because of the shortage of number of times at which the repeated pressing is conducted, the success presentation effects which destroys the windmill are conducted from the repeated pressing screen 1, bypassing the repeated pressing screen 2.

The pattern of the failure time 1 is a pattern in which after the repeated pressing screen 1, shifting to the repeated pressing screen 2 is conducted, but the ascending through the graduations 80 of the meter 8 has not reached the top because of the shortage of the number of times at which the repeated pressing is conducted, and thereafter, by executing failure presentation effects, it is determined by the failure presentation effects that no winning has occurred in the revival drawing. However, when the state in which the last one of the graduations 80 of the meter 8 has remained is not brought about because of the shortage of number of times at which the repeated pressing is conducted, the failure presentation effects in which Don Quixote is blown off are conducted from the repeated pressing screen 1, bypassing the repeated pressing screen 2

Here, as shown in FIG. 112A and FIG. 112B, patterns of the ascending through the graduations 80 of the meter 8 are previously defined by drawings. The patterns of the ascending are individually defined with respect to revival success time shown in FIG. 112A and revival failure time shown in FIG. 112B, respectively.

With respect to the revival success time shown in FIG. 112A, five kinds of patterns from a pattern 1 to a pattern 5, in each of which the numbers of times at which the repeated pressing is conducted in order to conduct the ascending to reach the first one of the graduations 80 and the numbers of times at which the repeated pressing is conducted in order to conduct the ascending through all of the nine graduations 80 differ from one another, are defined. As shown in FIG. 113A, the pattern 1 is most easily selected and is a standard graduation ascending pattern. Although the other patterns are less easily selected, for example, in the pattern 2, the number of times, at which the repeated pressing is conducted, required to light up all of the nine graduations 80 is the largest and in particular, the number of times, at which the repeated pressing is conducted, required to light up the ninth graduation 80 is large. Therefore, although the ascending to reach the eighth graduation 80 is smoothly conducted, it is difficult to light up the ninth graduation 80 and in reality, the ninth graduation 80 is not lit up within a valid period of time during which the number of times at which the repeated pressing is conducted is counted. Therefore, since in the repeated pressing presentation effects, the behavior of the ascending pattern similar to that of the ascending of the later-described revival failure time results, in a situation where a player is convinced of the failure in the revival by the repeated pressing, the success presentation effects resulting in revival success, which afford a surprise, can be provided by conducting the outcome display presentation effects.

On the other hand, with respect to the revival failure time shown in FIG. 112B, five kinds of patterns from a pattern 6 to a pattern 10, in each of which the numbers of times at which the repeated pressing is conducted in order to conduct the ascending to reach the first one of the graduations 80 and the numbers of times at which the repeated pressing is conducted in order to conduct the ascending to reach the eighth one of graduations 80 are the same as one another, are defined. Since these patterns are the same, during the revival failure time, as shown in FIG. 113B, it is defined that only the pattern 6 is selected.

As shown in FIG. 113C, upon the revival success time, with respect to each of the patterns 1 to 5, an all-lighting-up probability drawing table by an each-time drawing is defined. This all-lighting-up probability by the each-time drawing is a probability to determine that all of the graduations 80 are lit up when the SPIN button 602 is pressed down, regardless of the number of the graduations 80 which are lit up at that time. Five kinds of all-lighting-down probabilities including "0" are defined. By determining the above-mentioned all-lighting-up by conducting the drawing, at an unexpected timing, it may occur that all of the graduations 80 are lit down. Therefore, a surprise as well as pleasure can be imparted to a player, thereby enhancing amusement in gaming.

[Feature Game]

A feature game is a bonus game in which wild symbols are arranged when the symbols are rearranged on the display 2. The feature game includes a wild symbol expand game conducted before stopping the reels and a wild symbol scatter game conducted after stopping the reels.

(Wild Symbol Expand Game)

A wild symbol expand game is generated when bonus symbols do not appear on the third reel in the base game and winning has occurred in a wild expand drawing. In the wild symbol expand game, normal presentation effects and premium presentation effects are executed.

<Normal Presentation Effects>

As shown in FIG. 114A, in the wild symbol expand game in the normal presentation effects, a process is executed in the order of: Reels spin.→Sancho appears from the right of a screen.→"Wild" symbols are arranged.→Reels stop.→A WIN process is conducted.

When a condition of the occurrence of expanding of wild symbols is satisfied, first, a reel on which symbols are changed to wild symbols is determined by a drawing. Next, during the rotation of the reels, a character (Sancho) is caused to appear and change the reel selected by the drawing to a wild reel. Thereafter, the reels are stopped. When a plurality of reels are changed to wild reels, the order of presentation effects is random.

More specifically, the normal presentation effects in the wild symbol expand game are conducted by performing processes (E1) to (E6) shown in FIG. 114B.

(E1) The reels are rotating in a base-game-manner and at a portion above the reels, the presentation effects are started.

(E2) Sancho appears from a right-hand portion of the screen and moves to the central portion of the screen.

(E3) Sancho hangs around and on a reel on which Sancho falls down, an expand wild symbol comes down. When winning on the plurality of reels in the wild expand game has occurred, the presentation effects in which Sancho falls down and the expand wild symbol comes down are repeated.

(E4) Sancho makes an exit to a left-hand portion of the screen.

(E5) After finishing the presentation effects, Sancho returns to an upper portion of the screen.

(E6) The reels are stopped, and a WIN process is conducted.

<Premium Presentation Effects>

As shown in FIG. 115A, in a wild symbol expand game in the premium presentation effects, a process is executed in the order of: Reels spin.→Sancho appears from an upper portion of a screen.→"WILD" symbols are arranged.→Reels stop.→A WIN process is conducted. In other words, in the premium presentation effects, Sancho appears from the upper portion of the screen, instead of the right-hand portion. Accordingly, at the time point when Sancho appears from the upper portion of the screen, the premium presentation effects are determined, that is, it is determined that expanding on two or more reels is executed. Therefore, in an early stage, that is, when the presentation effects are just started, a player's sense of expectation regarding how many reels would be expanded can be enhanced.

Here, a condition of the occurrence of the premium presentation effects is that wild-expanding of the plurality of reels is determined by the wild-expand-drawing and winning in a premium presentation effects occurrence drawing has occurred. When the winning in the premium presentation effects occurrence drawing has occurred, as the premium presentation effects, processes (PE1) to (PE6) shown in FIG. 115B are executed.

(PE1) The reels are rotating in a base-game-manner and at a portion above the reels, the presentation effects are started.

(PE2) Sancho appears from the upper portion of the screen and on a reel on which Sancho has appeared, an expand wild symbol comes down. Thereafter, Sancho moves to the central portion of the screen.

(PE3) Sancho hangs around and on a reel on which Sancho falls down, an expand wild symbol comes down. When winning in three or more reels in the wild expand game has occurred, the presentation effects in which Sancho falls down and the expand wild symbol comes down are repeated.

(PE4) Sancho makes an exit to a left-hand portion of the screen.

(PE5) After finishing the presentation effects, Sancho returns to the upper portion of the screen.

(PE6) The reels are stopped, and a WIN process is conducted.

<Presentation Effects Assignment>

The assignment of the normal presentation effects and the premium presentation effects is as shown in FIG. 116. A winning probability (occurrence probability) in the premium presentation effects tends to be increased in accordance with an increase in the number of winning reels. Specifically, a winning probability in the premium presentation effects is 0% when the number of winning reels is one; a winning probability in the premium presentation effects is 25% when the number of winning reels is two; a winning probability in the premium presentation effects is 50% when the number of winning reels is three to five. Of course, winning probabilities shown in FIG. 116 are merely one example and can be appropriately changed.

(Wild Symbol Scatter Game)

A wild symbol scatter game is generated when in the base game, no bonus symbol appear on the third reel, no wild symbol appear on all reels, and winning in a wild scattering drawing occurs. When the winning in the wild scattering drawing has occurred with the wild symbols appearing on any of the reels, no wild symbol scatter game is not generated.

As shown in FIG. 117, in the wild symbol scatter game in the normal presentation effects, a process is executed in the order of: Reels spin.→Reels stops.→Rosinante appears.→"WILD" symbols are arranged.→A WIN process is conducted.

When a condition of the occurrence of scattering of the wild symbols is satisfied, first, the number of symbols to be changed to the wild symbols and their positions are determined by drawings. Next, during the rotation of the reels, a character (Rosinante) is caused to appear and change the reels selected by the drawings to the wild reels. Thereafter, the reels are stopped. When the wild symbols are scattered on a plurality of reels, Rosinante appears at a plurality of times. Here, rules in scattering the wild symbols are as follows.

(1) Per occurrence of the appearance of Rosinante, scattering of the wild symbols for one reel is conducted (on the same one reel, the scattering is conducted only at one time). In other words, the number of the occurrences of the appearance of Rosinante (scattering of the wild symbols) is up to five.

(2) When the scattering of a plurality of wild symbols is conducted on one reel, the order of scattering in upper, middle, and lower positions is random.

(3) When wild symbols to be scattered still remain after scattering the wild symbols for the one reel, Rosinante appears again and scattering of the wild symbols for one reel is conducted.

(4) On each of the occurrences of the appearance of Rosinante (appearance from a left-hand portion of the screen) at odd-numbered times (the first time, the third time, and the fifth time), the second, third, fourth, and fifth reels are reels targeted for the scattering of the wild symbols. On each of the occurrences of the appearance of Rosinante (appearance from a right-hand portion of the screen) at even-numbered times (the second time and the fourth time), the first, second, third, and fourth reels are reels targeted for the scattering of the wild symbols.

Here, the reason that the reels targeted for the scattering are limited depending on the appearance of Rosinante from the left-hand or the right-hand portion is because a half of a body of Rosinante is cut and is invisible on an image during the scattering of the wild symbols on the fifth reel when Rosinante appears from the left-hand portion and on the first reel when Rosinante appears from the right-hand portion.

(5) As an exception, when the scattering of the wild symbols is conducted only on the fifth reel, the scattering of the wild symbols is conducted by the occurrence of the appearance of Rosinante at the first time.

The reason that in the rule (4), the reels targeted for the scattering are limited is because the half of the body of Rosinante is cut and is invisible on the image during the scattering of the wild symbols on the fifth reel when Rosinante appears from the left-hand portion and on the first reel when Rosinante appears from the right-hand portion.

Next, by taking as an example a case in which the scattering of the wild symbols is conducted in the arrangement shown in FIG. 118A, the description will be given. In the arrangement of the wild symbols shown in FIG. 118A, since the reels targeted for the scattering are all the five reels, the scattering is conducted at five times (Rosinante appears at five times).

First, it is determined by an internal drawing on which one of the reels the scattering is conducted at each of the first, second, third, and fourth, and fifth times. In a case in which an outcome of the drawing is as shown in FIG. 118B, the second reel is selected at the third time and the fifth reel is selected at the fourth time, not satisfying the above-mentioned rule (4). Therefore, the order of the reels on which the scattering is conducted is determined again by a redrawing. Such a redrawing is conducted until the condition defined in the rule is satisfied. As shown in FIG. 118C, when the drawing outcome satisfying the condition is obtained, the scattering of the wild symbols is conducted on each of the reels in the order determined by the drawing.

In the drawing outcome shown in FIG. 118C, the wild symbols are arranged in the order of the second, third, fifth, first, and fourth reels.

As shown in FIG. 119A, the scattering of the wild symbols at the first time is conducted on the second reel as described below.

(B1) The reels are rotating in a base-game-manner.

(B2) After stopping all of the reels, at a portion above the reels, presentation effects are started.

(B3) Rosinante appears from the left-hand portion of the screen.

(B4) and (B5) Rosinante moves from the left-hand portion to the right-hand portion of the screen and a symbol in a middle row on the second reel is changed to the wild symbol. The change to the wild symbol is conducted, for example, such that Rosinante kicks the symbol.

(B6) Rosinante makes an exit to the right-hand portion of the screen, and presentation effects dedicated to when Rosinante makes an exit to the right-hand portion thereof are conducted.

As shown in FIG. 119B, the scattering of the wild symbols at the second time is conducted on the third reel as described below.

(B7) Rosinante appears from the right-hand portion of the screen.

(B8) Rosinante moves from the right-hand portion to the left-hand portion of the screen and symbols in upper and middle rows on the third reel are changed to the wild symbols.

(B9) Rosinante makes an exit to the left-hand portion of the screen, and presentation effects dedicated to when Rosinante makes an exit to the left-hand portion thereof are conducted.

(B10) The vertically arranged wild symbols in the upper and middle rows on the third reel are joined to be one wild symbol.

The dedicated presentation effects may be conducted after joining the wild symbols.

As shown in FIG. 119C, when three wild symbols appear on the same one reel, these three wild symbols are jointed to be one wild symbol.

As shown in FIG. 120A, the scattering of the wild symbols at the third time is conducted on the fifth reel as described below.

(B11) Rosinante appears from the left-hand portion of the screen.

(B12) Rosinante moves from the left-hand portion to the right-hand portion of the screen and a symbol in an upper row on the fifth reel is changed to the wild symbol.

(B13) Rosinante makes an exit to the right-hand portion of the screen, and presentation effects dedicated to when Rosinante makes an exit to the right-hand portion thereof are conducted.

As shown in FIG. 120B, the scattering of the wild symbols at the fourth time is conducted on the first reel as described below.

(B14) Rosinante appears from the right-hand portion of the screen.

(B15) Rosinante moves from the right-hand portion to the left-hand portion of the screen and a symbol in an upper row on the first reel is changed to the wild symbol.

(B16) Rosinante makes an exit to the left-hand portion of the screen, and presentation effects dedicated to when Rosinante makes an exit to the left-hand portion thereof are conducted.

As shown in FIG. 120C, the scattering of the wild symbols at the fifth time is conducted on the fourth reel as described below.

(B17) Rosinante appears from the left-hand portion of the screen.

(B18) Rosinante moves from the left-hand portion to the right-hand portion of the screen and a symbol in a lower row on the fourth reel is changed to the wild symbol.

(B19) Rosinante makes an exit to the right-hand portion of the screen, and presentation effects dedicated to when Rosinante makes an exit to the right-hand portion thereof are conducted.

The above-described method of arranging the wild symbols is not limited to the wild symbol scatter game but also can be adopted in the wild symbol expand game. In other words, in the wild symbol expand game, each time Rosinante traverses the screen, three symbols on one column are changed to the wild symbols together, and when the arrangement of the wild symbols on the reel on the side on which Rosinante appears is determined, redrawing may be executed until that state is avoided.

<Presentation Effects Patterns>

On each of the gaming machines 1, on the symbol display region 20, during a period of time from when the spinning of the symbols is started to when the symbols are rearranged, mainly by using the presentation effects display region 21, also by using the symbol display region 20 in some cases, the presentation effects are conducted. The presentation effects in this case are previously defined. In the present embodiment, for example, 16 patterns shown in FIG. 121 and FIG. 122 are prepared.

[Base Presentation Effects]

The normal presentation effects are presentation effects which do not develop to predictive presentation effects (ready-to-win state presentation effects). In the example shown in shown in FIG. 121 and FIG. 122, seven kinds of presentation effects 1-A, presentation effects 2-A, presentation effects 2-B, presentation effects 2-C, presentation effects 3-A, presentation effects 3-B, and presentation effects 4-A fall thereunder.

The presentation effects 1-A are presentation effects in which concurrently with the spinning of the reels, Don Quixote loses his balance (FIG. 123) and when the first reel is stopped, Don Quixote recovers his balance.

The presentation effects 2-A are presentation effects in which concurrently with the spinning of the reels, a sudden gust of wind blows (FIG. 125) and when the first reel is stopped, the gust of wind dies down.

The presentation effects 2-B are presentation effects in which concurrently with the spinning of the reels, the sudden gust of wind blows (FIG. 125) and Don Quixote sneezes (FIG. 126), and the first reel is stopped.

The presentation effects 2-C are presentation effects in which concurrently with the spinning of the reels, the sudden gust of wind blows (FIG. 125) and the armor which Don Quixote is wearing is blown off (FIG. 127), and the first reel is stopped.

The presentation effects 3-A are presentation effects in which concurrently with the spinning of the reels, Don Quixote holds a lance up and shouts (FIG. 129), and even after the first reel has been stopped, no reaction is made.

The presentation effects 3-B are presentation effects in which concurrently with the spinning of the reels, Don Quixote holds the lance up and shouts (FIG. 129), with the reels being rotated for a long time, Rosinante starts to run (FIG. 130), and after the first reel has been stopped, Rosinante runs into a tree (FIG. 131) and gets dizzy.

The presentation effects 4-A are presentation effects in which concurrently with the spinning of the reels, the sky becomes cloudy (FIG. 138), and after the first reel has been stopped, the sky becomes clear.

[Predictive Presentation Effects]

Predictive presentation effects (ready-to-win state presentation effects) are presentation effects in which a feature-in is conducted by a success and losing occurs by a failure. In the example in FIG. 121 and FIG. 122, six kinds of presentation effects 1-B, presentation effects 1-C, presentation effects 3-C, presentation effects 3-D, presentation effects 4-B, and presentation effects 4-C fall thereunder.

The presentation effects 1-B are success presentation effects in which concurrently with the spinning of the reels, Don Quixote loses his balance (FIG. 123), Don Quixote and Sancho simultaneously fall down together, Sancho drops down to the reel parts (symbol display region 20) with bonus trigger symbols being stopped on the first reel and the third reel and a high-speed long ready-to-win state in which the fifth reel is rotated at a high speed is brought about (FIG. 124), and a bonus trigger symbol is stopped on the fifth reel. In this presentation effects 1-B, the first reel and the third reel are concurrently stopped and at this time, dedicated stop sound is emitted.

The presentation effects 1-C are failure presentation effects in which concurrently with the spinning of the reels, Don Quixote loses his balance (FIG. 123), Don Quixote and Sancho simultaneously fall down together, Sancho drops down to the reel parts (symbol display region 20) with bonus trigger symbols being stopped on the first reel and the third reel and a high-speed long ready-to-win state in which the fifth reel is rotated at a high speed is brought about (FIG. 124), and the bonus trigger symbol is not stopped on the fifth reel. In this presentation effects 1-C, the first reel and the third reel are concurrently stopped and at this time, dedicated stop sound is emitted.

The presentation effects 3-C are success presentation effects (FIG. 134) in which concurrently with the spinning of the reels, Don Quixote holds the lance up and shouts (FIG. 129), with the reels being rotated for a long time, Rosinante starts to run (FIG. 130) and after the first reel has been stopped, runs into a tree (FIG. 131), Don Quixote falls down to the reel parts (symbol display region 20) (FIG. 132) and a frame feed ready-to-win state is brought about (FIG. 133), and the bonus trigger symbol is stopped on the fifth reel.

The presentation effects 3-D are failure presentation effects in which concurrently with the spinning of the reels, Don Quixote holds the lance up and shouts (FIG. 129), with the reels being rotated for a long time, Rosinante starts to run (FIG. 130) and after the first reel has been stopped, runs into a tree (FIG. 131), Don Quixote falls down to the reel parts (symbol display region 20) (FIG. 132) and the frame feed ready-to-win state is brought about (FIG. 133), and the bonus trigger symbol is not stopped on the fifth reel (FIG. 135).

The presentation effects 4-B are success presentation effects in which concurrently with the spinning of the reels, the sky becomes cloudy (FIG. 138), a thunderstorm occurs for a period until the first, second, third, and fourth reels have been stopped, Sancho and Don Quixote get confused on the upper part of the screen (presentation effects display region 21) (FIG. 139), lightning strikes a bonus trigger symbol on the fifth reel, and the bonus trigger symbol is stopped on the fifth reel (FIG. 140). In this presentation effects 4-B, when the first, second, third, and fourth reels have been stopped, dedicated stop sound is emitted.

The presentation effects 4-C are failure presentation effects in which concurrently with the spinning of the reels, the sky becomes cloudy (FIG. 138), a thunderstorm occurs for a period until the first, second, third, and fourth reels have been stopped, Sancho and Don Quixote get confused on the upper part of the screen (presentation effects display region 21) (FIG. 139), lightning strikes the bonus trigger symbol on the fifth reel, and the bonus trigger symbol is not stopped on the fifth reel (FIG. 141). When the first, second, third, and fourth reels have been stopped, dedicated stop sound is emitted.

[Determination Presentation Effects]

Determination presentation effects are presentation effects in which upon the occurrence thereof, a bonus is determined. In the example shown in FIG. 121 and FIG. 122, three kinds of presentation effects 2-D, presentation effects 3-E, and presentation effects 5-A fall thereunder.

The presentation effects 2-D are presentation effects in which concurrently with the spinning of the reels, the sudden gust of wind blows (FIG. 125), Sancho and Don Quixote are blown off into the back, Don Quixote crashes against the reel parts (FIG. 128), and all the reels stop. In this presentation effects 2-D, all-reel-stop dedicated sound is emitted.

The presentation effects 3-E are presentation effects in which concurrently with the spinning of the reels, Don Quixote holds the lance up and shouts (FIG. 129), Rosinante starts to run (FIG. 130) and chases after Sancho, with the reels being rotated for a long time, full-screen presentation effects are developed (FIG. 137), and all the reels are concurrently stopped. In this presentation effects 3-E, the all-reel-stop dedicated sound is emitted.

The presentation effects 5-A are presentation effects in which concurrently with the spinning of the reels, windmill full-screen presentation effects (FIG. 142) are developed and after finishing the windmill full-screen presentation effects, all the reels are concurrently stopped. In this presentation effects 5-A, the all-reel-stop dedicated sound is emitted.

As shown in FIG. 122, in the predictive presentation effects (ready-to-win state presentation effects) and the determination presentation effects, a reel skip (presentation effects cancel) cannot be conducted. In other words, when the predictive presentation effects and the determination presentation effects are selected, during executing these presentation effects, a presentation effects skip invalidation process is executed. In the normal presentation effects, basically, the reel skip can be conducted, but only in the presentation effects 3-B, the reel skip cannot be conducted. Thus, even in the normal presentation effects, since it may be impossible to conduct the reel skip, when the reel skip cannot be conducted even in the normal presentation effects, a player can have an expectation that the predictive presentation effects (ready-to-win state presentation effects) and the determination presentation effects might be developed.

Which kind of presentation effects are conducted is determined by making reference to a data table shown in FIG. 143 with respect to a bonus winning time, a ready-to-win-state losing time, and a non-ready-to-win-state losing time. Specifically, upon the bonus winning time, reference is made to a data table 1; during the ready-to-win-state losing time, reference is made to a data table 2; and during the non-ready-to-win-state losing time, reference is made to a data table 3.

For example, upon the bonus winning time, a probability with which no presentation effects are conducted is 30%; a probability with which the presentation effects 1-A are conducted is 2%; a probability with which the presentation effects 1-B are conducted is 10%; a probability with which the presentation effects 1-C are conducted is 0%; a probability with which the presentation effects 2-A is 2%; a probability with which the presentation effects 2-B are conducted is 3%; a probability with which the presentation effects 2-C are conducted is 4%; a probability with which the presentation effects 2-D are conducted is 10%; a probability with which the presentation effects 3-A are conducted is 2%; a probability with which the presentation effects 3-B are conducted is 3%; a probability with which the presentation effects 3-C are conducted is 10%; a probability with which the presentation effects 3-D are conducted is 0%; a probability with which the presentation effects 3-E are conducted is 5%; a probability with which the presentation effects 4-A are conducted is 2%; a probability with which the presentation effects 4-B are conducted is 10%; a probability with which the presentation effects 4-C are conducted is 0%; and a probability with which the presentation effects 5-A are conducted is 7%.

For example, upon the ready-to-win-state losing time, a probability with which no presentation effects are conducted is 39%; a probability with which the presentation effects 1-A are conducted is 3%; a probability with which the presentation effects 1-B are conducted is 0%; a probability with which the presentation effects 1-C are conducted is 10%; a probability with which the presentation effects 2-A is 3%; a probability with which the presentation effects 2-B are conducted is 10%; a probability with which the presentation effects 2-C are conducted is 8%; a probability with which the presentation effects 2-D are conducted is 0%; a probability with which the presentation effects 3-A are conducted is 3%; a probability with which the presentation effects 3-B are conducted is 10%; a probability with which the presentation effects 3-C are conducted is 0%; a probability with which the presentation effects 3-D are conducted is 7%; a probability with which the presentation effects 3-E are conducted is 0%; a probability with which the presentation effects 4-A are conducted is 2%; a probability with which the presentation effects 4-B are conducted is 0%; a probability with which the presentation effects 4-C are conducted is 5%; and a probability with which the presentation effects 5-A are conducted is 0%.

For example, upon the non-ready-to-win-state losing time, a probability with which no presentation effects are conducted is 75%; a probability with which the presentation effects 1-A are conducted is 5%; a probability with which the presentation effects 1-B are conducted is 0%; a probability with which the presentation effects 1-C are conducted is 0%; a probability with which the presentation effects 2-A is 4%; a probability with which the presentation effects 2-B are conducted is 2%; a probability with which the presentation effects 2-C are conducted is 2%; a probability with which the presentation effects 2-D are conducted is 0%; a probability with which the presentation effects 3-A are conducted is 5%; a probability with which the presentation effects 3-B are conducted is 2%; a probability with which the presentation effects 3-C are conducted is 0%; a probability with which the presentation effects 3-D are conducted is 0%; a probability with which the presentation effects 3-E are conducted is 0%; a probability with which the presentation effects 4-A are conducted is 5%; a probability with which the presentation effects 4-B are conducted is 0%; a probability with which the presentation effects 4-C are conducted is 0%; and a probability with which the presentation effects 5-A are conducted is 0%.

From the data shown in FIG. 143, degrees of reliability and occurrence frequencies of the respective kinds of presentation effects are as shown in FIG. 144 and FIG. 145.

Hereinbefore, the embodiment of the present invention is described. However, the specific example is merely illustrative but the present invention is not particularly limited thereto, and design of the specific configurations such as the respective means is appropriately modifiable. In addition, the effects described in the embodiment of the present invention are merely those listed as the most favorable effects arising from the present invention but effects attained by the present invention are not limited to the effects described in the embodiment of the present invention.

In addition, in the detailed description given above, in order to facilitate the understanding of the present invention, the characteristic parts are mainly described. The present invention is not limited to the detailed description given above but is applicable to other embodiments, and a variety of applications are possible. In addition, the terms and the wording used in the present specification are used to accurately describe the present invention but not to limit the interpretation of the present invention. In addition, it is considered that it is easy for those skilled in the art to figure out other configurations, systems, methods, and the like embraced in the concept of the present invention from the concept of the invention described in the specification of the present invention. Accordingly, the descriptions in the appended claims are to be deemed to embrace equivalency configurations without departing from the scope of technical ideas of the present invention. In addition, the purpose of the abstract is that the Patent Offices and the general public institutions as well as technical personnel who are not conversant with patent terms and legal terms and belong to the technical field of the present invention are enabled to promptly make an assessment as to the technical contents and true nature of the invention of the present application by conducting a simple investigation. Accordingly, the abstract is not intended to limit the scope of the invention that is to be evaluated by the descriptions of the appended claims. In addition, it is recommended that in order to fully understand the purpose of the present invention and the effects specific to the present invention, the interpretation is made by fully taking into consideration the documents and the like which have already been disclosed.

The detailed description given above embraces processes executed by a computer. The description and expressions given above are intended to most efficiently facilitate the understanding by those skilled in the art. In the specification of the present invention, the respective steps used to derive one result are to be understood as a process having no self-contradiction. In addition, in the respective steps, the transmission and reception of the electrical or magnetic signals, the recordings, and the like are conducted. In the processes in the respective steps, the above-mentioned signals are represented by the bits, values, symbols, characters, terms, numerals, and the like. However, it should be noted that these are used because these are convenient in the description. In addition, the processes in the respective steps may be described by the expressions common to those of human behaviors. However, in principle, the processes in the specification of the present application are executed by a variety of devices. In addition, other configurations required to execute the respective steps are to be made obvious from the description given above.

In the above-described embodiment, in the "windmill destruction game" (revival chance game), when after finishing each of the bonus game, the jackpot has been won in the jackpot challenge game, shifting to the windmill destruction game is not conducted, or the revival probability of the windmill bonus game in the windmill destruction game is set to be low, as compared with that of each of the other bonus games. Instead of this, it may be configured that when a particular bonus other than the jackpot has been won, shifting to the windmill destruction game is not conducted, or the revival probability of the windmill bonus game in the windmill destruction game is set to be low, as compared with that of each of the other bonus games. In this case, for example, it may be configured that as the bonus games, a plurality of fixed payout bonus in which different fixed payouts are provided are included, and when a large fixed payout bonus among the plurality of fixed-payout bonus has been won, shifting to the windmill destruction game is conducted.

REFERENCE SIGNS LIST

1: gaming machine

2: display

71: main CPU

72: ROM

100: game controller

What is claimed is:

1. A gaming machine, comprising:

a housing or cabinet;

a display on which a plurality of symbols can be displayed in a matrix arrangement of rows and columns after initially appearing symbols have been caused to be rearranged;

a controller;

a value-addition mechanism by which currency or other gaming value to be bet can be added to the gaming machine and credited to a player's available-betting-amount account;

a bet-placing mechanism by which the player can bet an amount of gaming value on the outcome of a game to be played; and a pay-out mechanism by which currency or other gaming value can be paid out to the player or credited to the player's available-betting-amount account under control of the controller and in accordance with a final outcome of the game once it has been played;

wherein the controller is programmed to execute the steps of (A1) determining by a random number-based process whether a collective wild symbol is to appear in at least one column of the matrix of symbols as a result of the symbols being rearranged, said collective wild symbol being a wild symbol that extends to occupy all row-positions in the column in which it appears;

(A2) if it is determined in step (A1) that collective wild symbols are to appear in two or more columns of the matrix, determining by a random number-based process whether a premium presentation effect is to be displayed, the premium presentation effect being a presentation effect 1) that is displayed only when collective wild symbols are to appear in at least two columns and 2) that is discernible from a normal presentation effect that can be displayed even when a collective wild symbol is to appear in only one column;

(A3) if it is determined in step (A2) that a premium presentation effect is to be displayed, displaying the premium presentation effect; and (B) causing a payout-out to be made, if any, in accordance with a final outcome of the game.

2. The gaming machine according to claim 1, wherein a character is caused to appear on the display, with the character being caused to appear once if the collective wild symbol is to appear only in a single column and the character being caused to appear multiple sequential times if the collective wild symbol is to appear in two or more columns; and if the collective wild symbol is to appear in two or more columns and the character is caused to appear multiple sequential times, the collective wild symbol is caused to appear in a single column each time the character is caused to appear.

3. The gaming machine according to claim 2, wherein if the collective wild symbol is to appear in two or more columns and the character is caused to appear multiple sequential times, the order in which the collective wild symbol is caused to appear in each of said two or more columns is determined by a random number-based process; and each time the character is caused to appear, it appears at a position located near one side of the display and traverses all columns in the matrix while moving toward a position located near an opposite side of the display.

4. The gaming machine according to claim 3, wherein the sequential order in which the two or more collective wild symbols are caused to appear is checked to determine whether, for each sequential traversal of the character across the columns in the matrix, the particular column in which the collective wild symbol is to appear is nearest to the side of the display at which the character will appear; and if the particular column in which the collective wild symbol is to appear in any given traversal is nearest to the side of the display at which the character will appear during said any given traversal, the sequential order is re-determined by another random number-based process.

5. The gaming machine according to claim 1, wherein when a collective wild symbol is to appear in a column, the collective wild symbol moves into the respective column in the same direction as the plurality of symbols move while they are being rearranged.

6. The gaming machine according to claim 1, wherein when a premium presentation effect is to be displayed, a collective wild symbol is caused to appear as the premium presentation effect is being displayed.

7. The gaming machine according to claim 1, wherein collective wild symbols are caused to appear in their respective columns while symbols in other columns continue to be rearranged.

8. A gaming machine, comprising:

a housing or cabinet;

a symbol display device on which a plurality of symbols can be displayed in a matrix arrangement of rows and columns after initially appearing symbols have been caused to be rearranged;

a presentation effects display device on which presentation effects associated with a specific, predetermined symbol can be displayed;

a controller;

a value-addition mechanism by which currency or other gaming value to be bet can be added to the gaming machine and credited to a player's available-betting-amount account;

a bet-placing mechanism by which the player can bet an amount of gaming value on the outcome of a game to be played; and a pay-out mechanism by which currency or other gaming value can be paid out to the player or credited to the player's available-betting-amount account under control of the controller and in accordance with a final outcome of the game once it has been played;

wherein the controller is programmed to execute the steps of (E1) determining by a random number-based process the final outcome of the game, including a final, rearranged matrix arrangement of symbols;

(E2) causing the symbols to be rearranged and displayed on the symbol display device in accordance with the final outcome of the game determined in step (E1);

(E3) selecting at least one of the columns in the matrix in which the specific, predetermined symbol is to appear in all row-positions in the column;

(E4) if it is determined in step (E3) that the specific, predetermined symbol is to appear in all row-positions of two or more columns in the matrix, determining whether special presentation effects are to be displayed, the special presentation effects being presentation effects 1) that are displayed only when the specific, predetermined symbol is to appear in all row-positions of at least two columns and 2) that are discernible from a normal presentation effect that can be displayed even when the specific, predetermined symbol is to appear in all row-positions of only one column;

(E5) if it is determined in step (E4) that special presentation effects are to be displayed, displaying the special presentation effects; and (F) causing a payout-out to be made, if any, in accordance with the final outcome of the game.

* * * * *